United States Patent
Miyazaki et al.

(10) Patent No.: US 9,904,828 B2
(45) Date of Patent: Feb. 27, 2018

(54) PORTABLE INFORMATION CODE READER

(71) Applicant: DENSO WAVE INCORPORATED, Chita-gun, Aichi-pref. (JP)

(72) Inventors: Manabu Miyazaki, Nagoya (JP); Takahiro Tanaka, Obu (JP); Kentaro Maruyama, Chita-gun (JP); Soutaro Tabata, Kariya (JP); Takuya Yoda, Obu (JP); Ryota Banno, Chita-gun (JP); Hiroshi Ota, Nagoya (JP); Akira Kida, Obu (JP)

(73) Assignee: DENSO WAVE INCORPORATED, Aichi-Pref (JP)

( * ) Notice: Subject to any disclaimer, the term of this patent is extended or adjusted under 35 U.S.C. 154(b) by 0 days.

(21) Appl. No.: 14/764,608

(22) PCT Filed: Jan. 30, 2014

(86) PCT No.: PCT/JP2014/052142
§ 371 (c)(1),
(2) Date: Oct. 6, 2015

(87) PCT Pub. No.: WO2014/119673
PCT Pub. Date: Aug. 7, 2014

(65) Prior Publication Data
US 2016/0063290 A1    Mar. 3, 2016

(30) Foreign Application Priority Data

Jan. 31, 2013  (JP) .................................. 2013-017532
May 31, 2013  (JP) .................................. 2013-116261
(Continued)

(51) Int. Cl.
*G06K 7/10*    (2006.01)
*G06F 1/16*    (2006.01)

(52) U.S. Cl.
CPC .......... *G06K 7/10722* (2013.01); *G06F 1/163* (2013.01); *G06K 7/10891* (2013.01)

(58) Field of Classification Search
CPC ........... G06K 7/10722; G06K 7/10891; G06K 2007/10534
(Continued)

(56) References Cited

U.S. PATENT DOCUMENTS 5,208,449 A * 5/1993 Eastman ............ G06K 7/10891
235/462.3
5,250,790 A * 10/1993 Melitsky ............ G06K 7/10564
235/462.44
(Continued)

FOREIGN PATENT DOCUMENTS

JP    H08272484 A    10/1996
JP     3020943 B1     3/2000
(Continued)

OTHER PUBLICATIONS

Aug. 13, 2015 International Preliminary Report on Patentability issued in International Patent Application No. PCT/JP2014/052142.
(Continued)

*Primary Examiner* — Paultep Savusdiphol
(74) *Attorney, Agent, or Firm* — Oliff PLC

(57) ABSTRACT

A portable information code reading apparatus includes an image unit imaging an information code, a processing unit encoding the information code imaged by the imaging unit, a case that holds the imaging unit and the processing unit. An attaching member is produced integrally with the case or produced as a separate member from the case. The attaching member is used to hook the case on a user's ear.

8 Claims, 79 Drawing Sheets

(30) Foreign Application Priority Data

| | | |
|---|---|---|
| May 31, 2013 | (JP) | 2013-116262 |
| Sep. 24, 2013 | (JP) | 2013-197413 |
| Jan. 28, 2014 | (JP) | 2014-013060 |

(58) Field of Classification Search
USPC ............ 235/462.01, 462.09, 462.06, 462.32, 235/462.43, 462.44
See application file for complete search history.

(56) References Cited

U.S. PATENT DOCUMENTS

| | | | | |
|---|---|---|---|---|
| 5,380,994 | A * | 1/1995 | Ray | G06F 1/163 235/375 |
| 5,479,000 | A * | 12/1995 | Dvorkis | G06K 7/10653 235/462.36 |
| 5,479,002 | A * | 12/1995 | Heiman | G06K 7/10564 235/462.45 |
| 5,742,043 | A * | 4/1998 | Knowles | G06K 7/10 235/462.3 |
| 5,744,788 | A * | 4/1998 | Metlitsky | G06K 7/10564 235/454 |
| 5,756,982 | A * | 5/1998 | Knowles | G06K 7/10 235/462.44 |
| 5,874,721 | A * | 2/1999 | Knowles | G06K 7/10 235/462.07 |
| 5,898,161 | A * | 4/1999 | DeVita | G04B 37/0016 235/462.44 |
| 5,969,327 | A * | 10/1999 | Metlitsky | G06K 7/10564 235/462.44 |
| 5,984,187 | A * | 11/1999 | Knowles | G06K 7/10 235/462.44 |
| 6,085,981 | A * | 7/2000 | Knowles | G06K 7/10 235/462.45 |
| 6,098,877 | A | 8/2000 | Barkan et al. | |
| 6,223,987 | B1 * | 5/2001 | Knowles | G06K 7/10 235/462.44 |
| 6,491,225 | B1 * | 12/2002 | Dvorkis | G06K 7/10564 235/462.01 |
| 6,688,526 | B2 * | 2/2004 | Metlitsky | G06K 7/10564 235/462.44 |
| 2001/0017321 | A1 * | 8/2001 | Knowles | G06K 7/10 235/462.44 |
| 2002/0113129 | A1 * | 8/2002 | Metlitsky | G06K 7/10564 235/462.44 |
| 2006/0118629 | A1 * | 6/2006 | Shiramizu | G06K 7/10722 235/454 |

FOREIGN PATENT DOCUMENTS

| | | |
|---|---|---|
| JP | 2000-215267 A | 8/2000 |
| JP | 2004-030014 A | 1/2004 |
| JP | 2006-134303 A | 5/2006 |
| JP | 2010-510602 A | 4/2010 |
| JP | 2011-209805 A | 10/2011 |

OTHER PUBLICATIONS

Apr. 8, 2014 International Search Report issued in International Patent Application No. PCT/JP2014/052142.

* cited by examiner

FIG.7
(A)
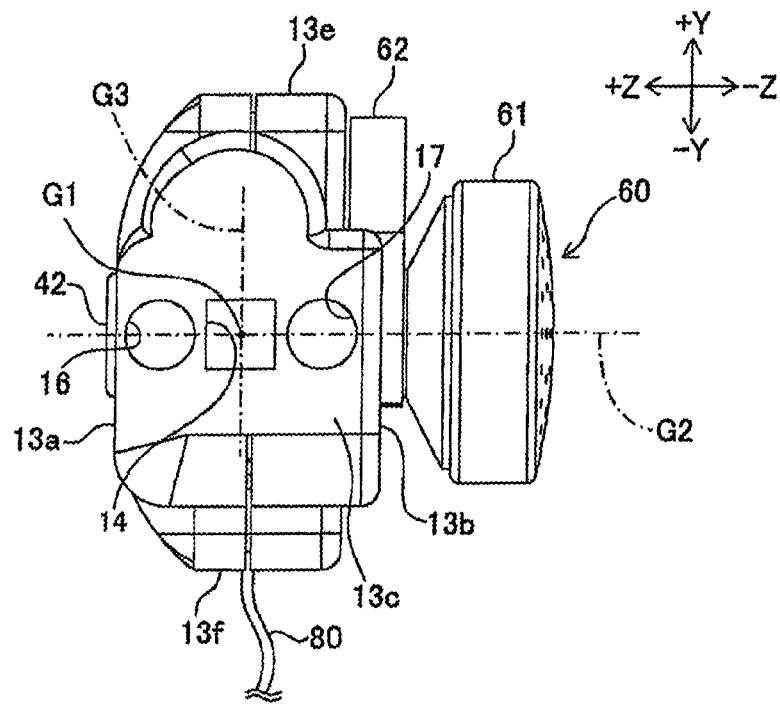
(B)
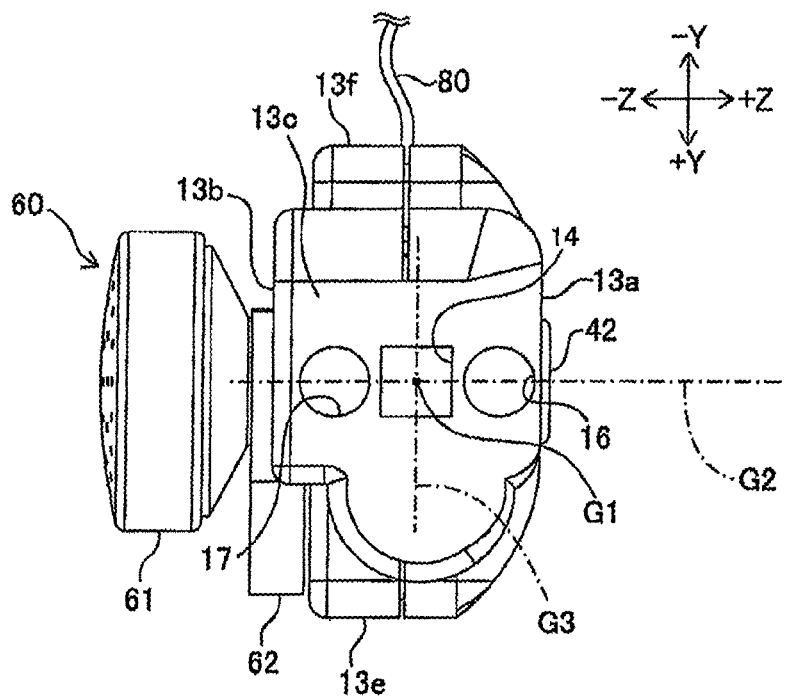

FIG.9
(A)
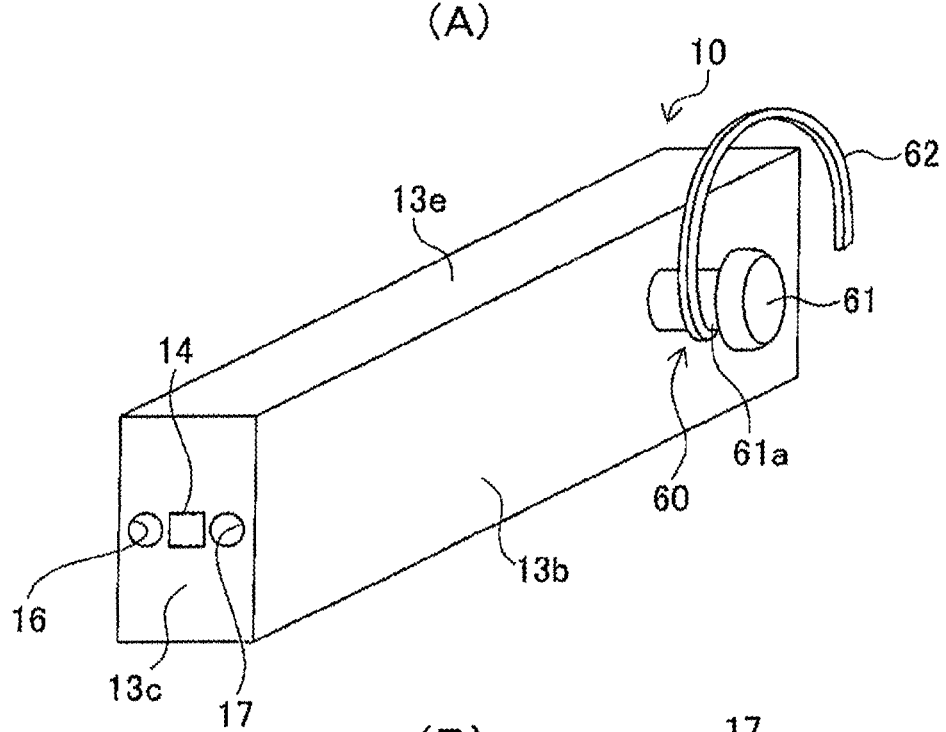
(B)
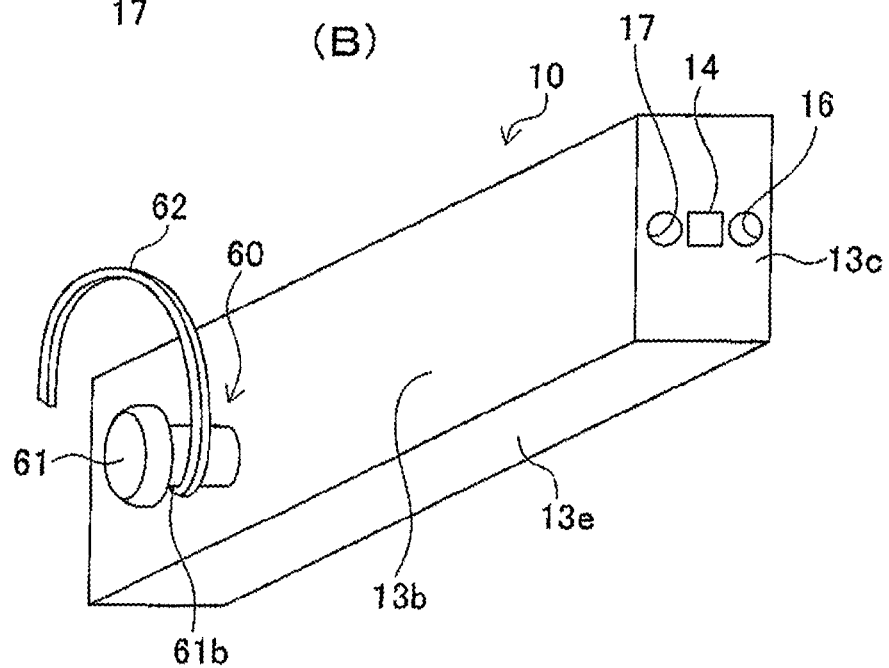

FIG.13
(A)
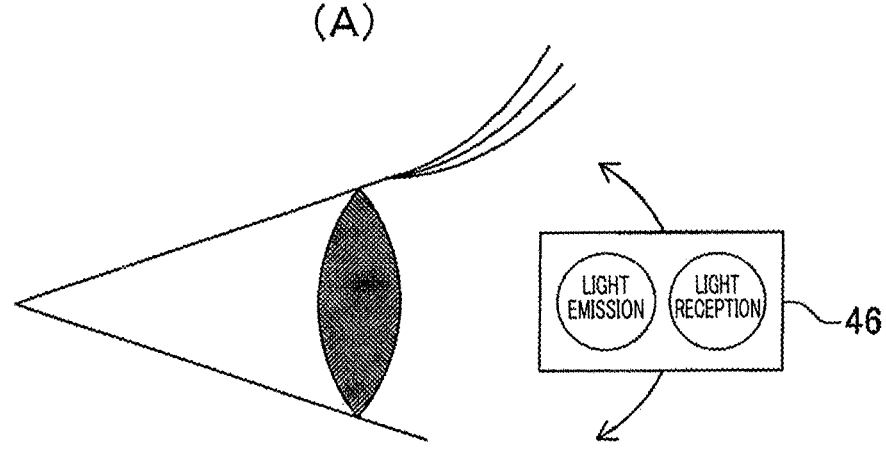
(B)
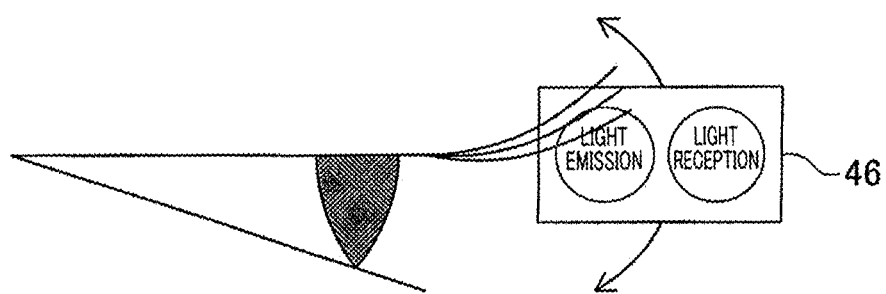

FIG. 16
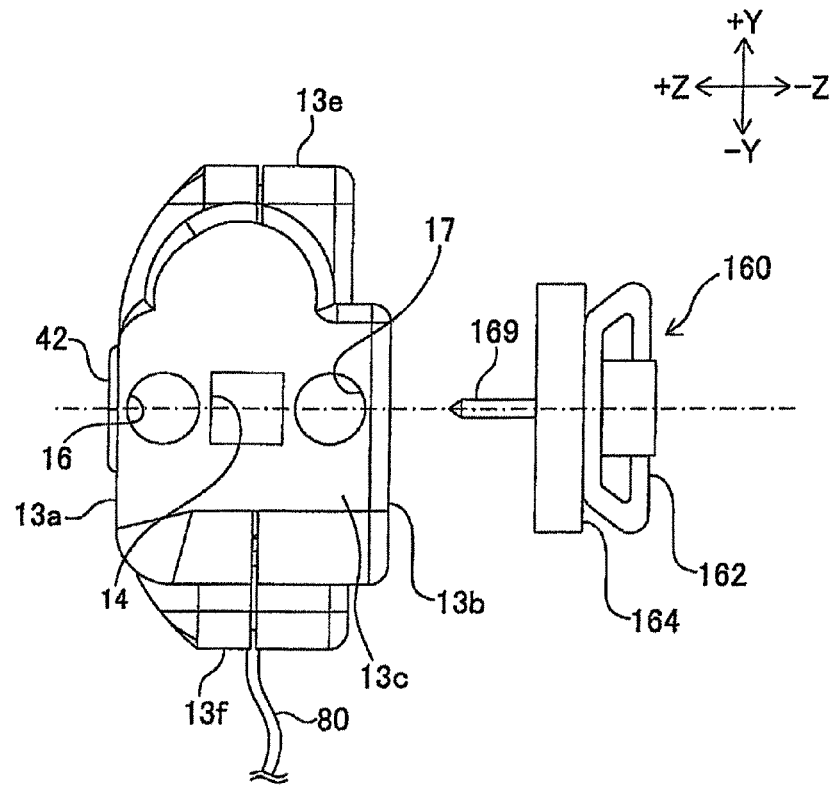
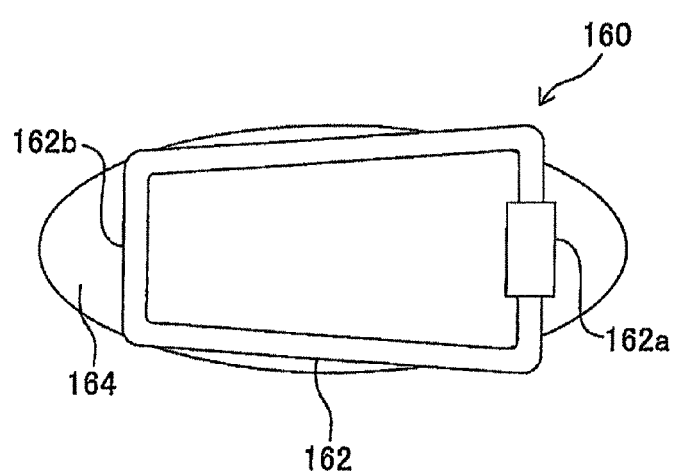

FIG.20
READ CODE
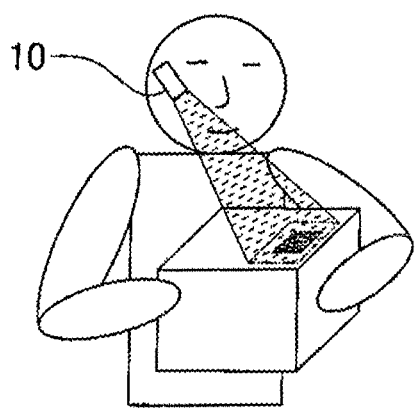
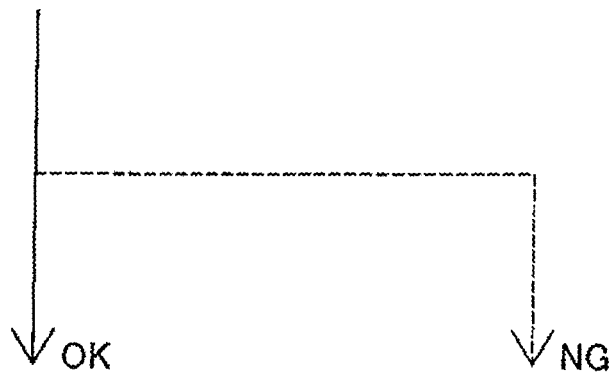
↓ OK    ↓ NG
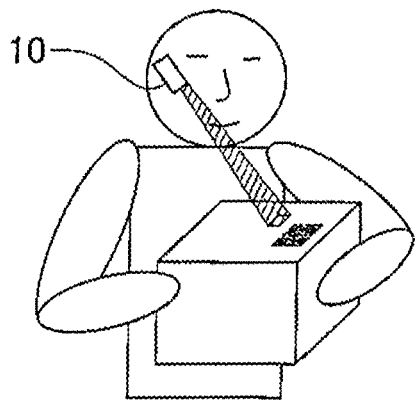 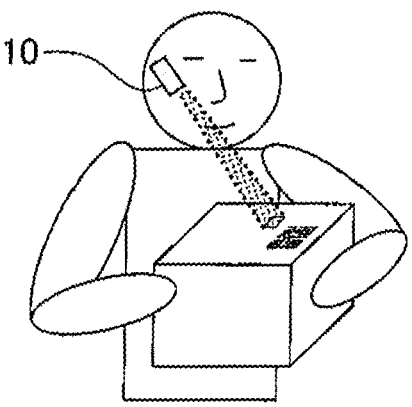
TURN ON BLUE LED    FLASH RED LED

FIG.22
(A)
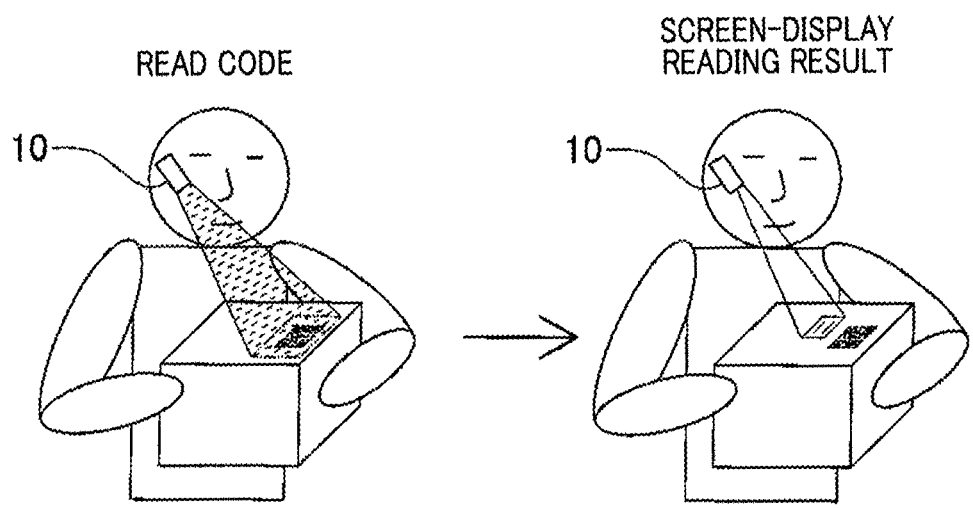
(B)
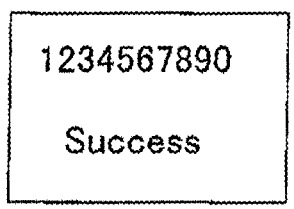
(C)
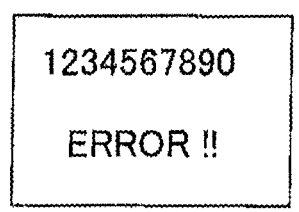

FIG.52
(A)
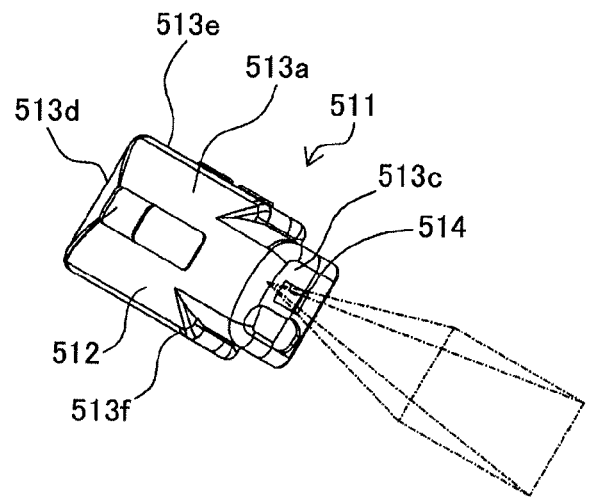
(B)
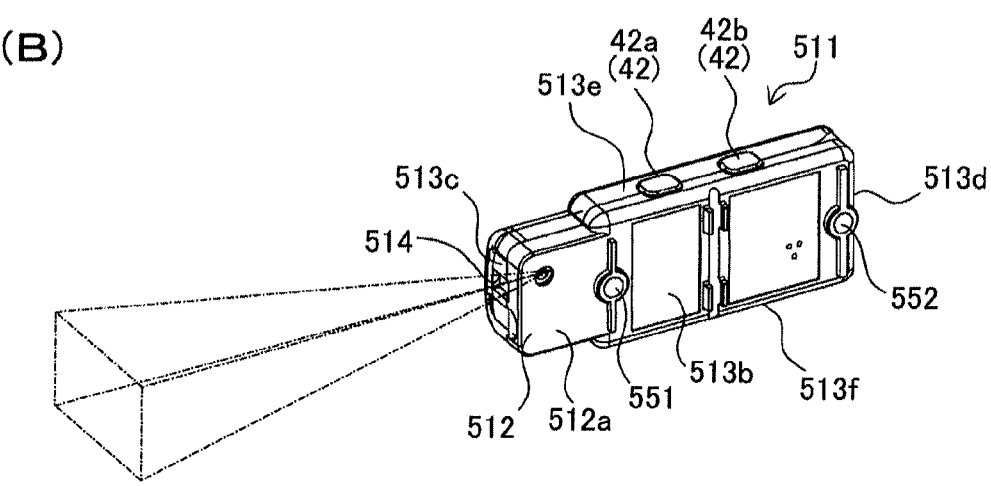

FIG.53
(A)
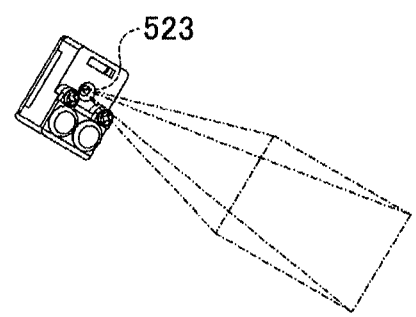
(B)
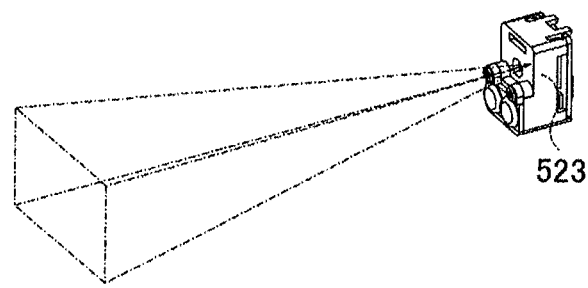

FIG.65
(A)
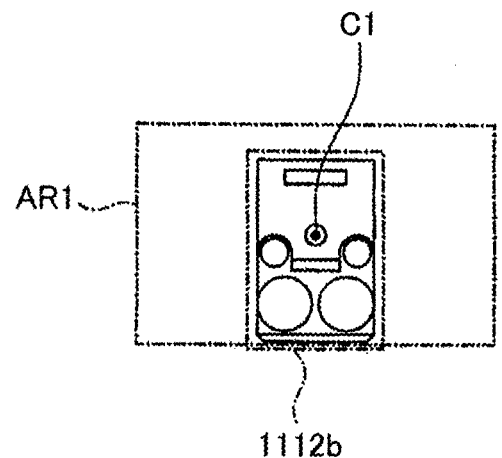
(B)
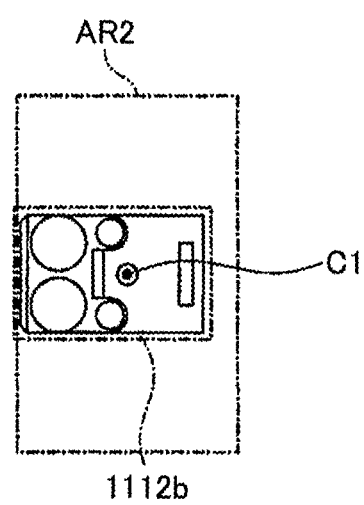

FIG.74
(A) ARm
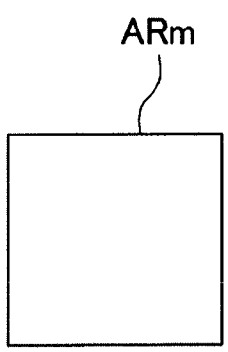
(B) ARm
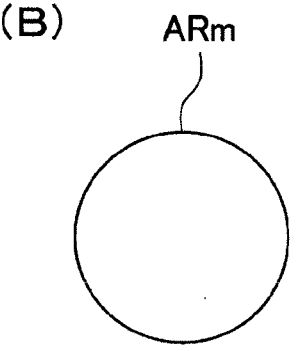
(C) ARm
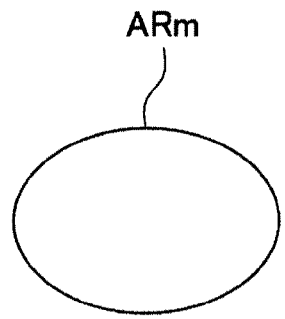
(D) ARm
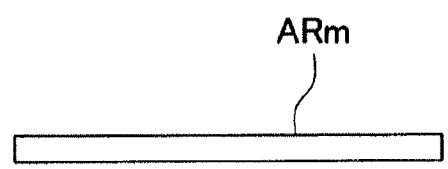
(E) ARm
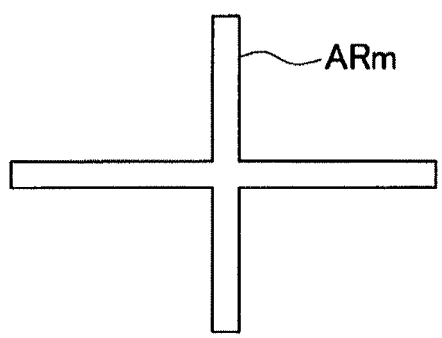

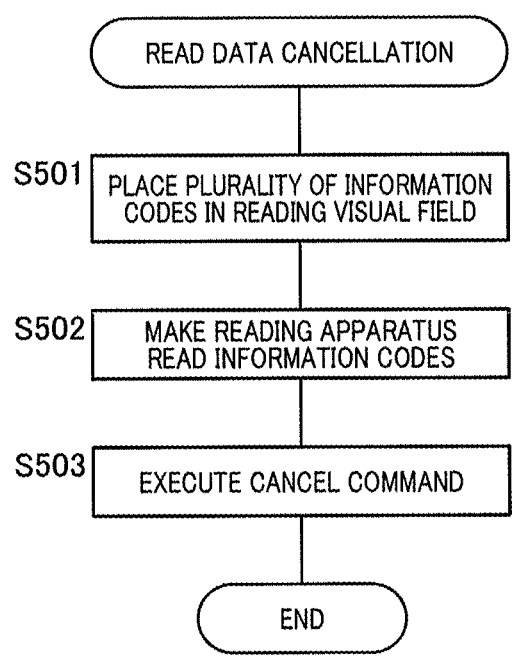

PORTABLE INFORMATION CODE READER

CROSS-REFERENCE TO RELATED APPLICATIONS

This application is based on and claims the benefit of priority from earlier Japanese Patent Applications 2013-017532 filed Jan. 31, 2013; 2013-116261 filed May 31, 2013; 2013-116262 filed May 31, 2013; 2013-197413 filed Sep. 24, 2013; and 2014-013060 filed Jan. 28, 2014, the descriptions of which are incorporated herein by reference in their entireties.

TECHNICAL FIELD

The present invention relates to a portable information code reading apparatus.

Portable information code reading apparatuses that have been provided since the past are typically based on a configuration in which the user holds the apparatus in his or her hand, performs an operation to aim the apparatus towards an information code, and reads the information code. However, in a configuration that requires the apparatus to be held in the hand in this manner, a problem occurs in that the user is unable to use one hand for other operations. Improving workability is difficult.

CITATION LIST

Patent Literature

[PTL 1] JP-A-H08-272484
[PTL 2] JP-B-3020943

SUMMARY OF INVENTION

Technical Problem

JP-A-H08-272484 and Japanese Patent Publication No. 3020943 both disclose a configuration in which an information code can be read without the user holding the apparatus in the hand. For example, a portable transaction terminal disclosed in JP-A-H08-272484 includes a band 12 that is fitted onto the head of the user. An arm 22 extends from the band 12 towards the side ahead of the face. A screen 34 that is in the shape of glasses is provided. A barcode reading apparatus 24 is provided in the upper portion of the screen 34. In addition, in a portable code reading apparatus disclosed in FIG. 1 of Japanese Patent Publication No. 3020943, a two-dimensional imaging unit 100 is fixed to a band 2 that is attached like a headband to the head of the user.

However, the following problem occurs in a configuration, such as that in JP-A-H08-272484 and FIG. 1 in Japanese Patent Publication No. 3020943, in which the reading apparatus is completely fixed to a band or the like, and the band or the like is attached by being fitted onto the head of the user. That is, it is difficult to quickly and easily perform an operation for mounting the reading apparatus with the orientation thereof set with more accuracy such that the side (field) that the face of the user faces is the reading area.

However, in the configuration in JP-A-H08-272484, once the reading apparatus is attached to the user, the reading apparatus cannot be easily detached. Therefore, it is difficult to temporarily detach and use the reading apparatus. For example, when the reading apparatus that is already attached is detached and used, the reading apparatus is required to be detached together with the overall fixing portion (the band, headset, or the like) that is fixed to the user. Therefore, the detachment operation is very troublesome and time-consuming.

In addition, when the reading apparatus is configured to be detachable, in addition to the operation for detaching the reading apparatus from the user, the operation for attaching the reading apparatus to the user becomes a problem. For example, in a case in which the reading apparatus is used such as to be attached to the body, rather than being held in the hand, when the reading apparatus is required to be temporarily detached from the body for some reason, the reading apparatus is required to be reattached at the original position after use in the detached state is completed. However, in a configuration such as those in JP-A-H08-272484 and Japanese Patent Publication No. 3020943, it is not easy to arrange the reading apparatus, which has once been detached, in the correct position in the correct posture. Therefore, the burden accompanying attachment and positioning is significant. Reattachment is unavoidably time-consuming.

Furthermore, when the information code is read, decoded data of an information code that has accidentally entered the reading area remains. It is preferable that forced accumulation, display, and the like of unnecessary decoded data be eliminated. In addition, problems resulting from the accumulation of unnecessary data that occur when, for example, items and information codes are managed in association, that is, problems such as an inconsistency between the number of information codes read and the number of items are also preferably avoided.

The present invention has been achieved to solve the above-described problems. A first object of the present invention is to provide a portable information code reading apparatus that is easy to use for purposes other than a reading operation in which a user holds the reading apparatus in both hands, that is capable of setting a reading direction in tandem with the movement of the face of the user, and that is also easily attached to the body.

In addition, the present invention has been achieved to solve the above-described problems. A second object of the present invention is to provide a configuration that enables the reading apparatus to be used such as to be mounted on the body or on a mounted article on the body, rather than being gripped in the hand, and further, a configuration that facilitates detachment of an apparatus main body from the body or the mounted article on the body, and enables quicker mounting in a more accurate mounting position during reattachment.

Furthermore, the present invention has been achieved to solve the above-described problems. A third object of the present invention is to provide a configuration that enables the reading apparatus to be used such as to be mounted on the body or on a mounted article on the body, rather than being gripped in the hand, and a configuration that offers a large degree of freedom during attachment to the body or the mounted article, and facilitates detachment of the reading apparatus from the body or the mounted article.

Still further, the present invention has been achieved to solve the above-described problems. A fourth object of the present invention is to provide a configuration that enables the reading apparatus to be used such as to be mounted on the body or on a mounted article on the body, rather than being gripped in the hand, and a configuration that facilitates acquisition of decoded data of a desired information code and elimination of decoded data of an undesired information code.

Solution to Problem

To achieve the above-described first object, as a first aspect of the present invention, a portable information code reading apparatus is provided that includes: an imaging unit that images an information code; a processing unit that processes an image of the information code captured by the imaging unit; a case that holds the imaging unit and the processing unit; and an attaching portion that is provided as a component separate from the case and attaches the imaging unit to a user such as to image the side (field) that the face of the user faces.

As a result of this aspect, the case that holds the imaging unit and the processing unit can be attached by the attaching portion such as to face the field that the face of the user faces. Therefore, a reading operation matching on the orientation of the face can be performed while attaching the imaging unit and the like to a section other than the hand. The user can more easily use both hands for purposes other than the reading operation.

In addition, to achieve the first object, as a second aspect of the present invention, a portable information code reading apparatus is provided that includes: an imaging unit that images an information code; a processing unit that processes an image of the information code captured by the imaging unit; a case that holds the imaging unit and the processing unit; and an attaching portion that is provided integrally with the case or as a component separate from the case, and attaches the case to at least either of the ears of a user.

As a result of this aspect, the case that holds the imaging unit and the processing unit can be attached to the ear. Therefore, the movement of the face and the case move in tandem. The imaging direction can be set to match the movement of the face of the user. Furthermore, because the case can be attached to the ear, mounting can be facilitated even when another mounted tool (such as a helmet or glasses) is used.

To achieve the second object, as a third aspect of the present invention, a portable information code reading apparatus is provided that includes: an imaging unit that images an information code; a processing unit that processes an image of the information code captured by the imaging unit; a case that holds the imaging unit and the processing unit; an attaching member that is provided as a component separate from the case and is attached to a user; and a guide portion that detachably connects the case to a predetermined attaching portion of the attaching member, and guides the posture of the case in relation to the attaching portion to a predetermined posture during connection.

As a result of this aspect, in a configuration in which the reading apparatus can be used such as to be mounted on the body, rather than being gripped in the hand, detachment of the case side from the body can be easily performed. In addition, a configuration in which remounting after detachment can be easily performed can be actualized. In particular, during remounting, the guide portion provides guidance such that the posture of the case in relation to the attached attaching portion becomes a predetermined posture. Therefore, the case side can be more quickly mounted such as to be in a more accurate position and orientation.

To achieve the third object, as a fourth aspect of the present invention, a portable information code reading apparatus is provided that includes: an imaging unit that images an information code; a processing unit that processes an image of the information code captured by the imaging unit; a case that holds the imaging unit and the processing unit, and an attaching member comprising a flexible body mounting portion that is capable of flexible deformation and an attaching portion that is attached to and detached from the case, wherein the attaching member is provided as a component separate from the case As a result of this aspect, a configuration enabling an information code reading apparatus to be used such as to be mounted on the body, rather than being gripped in the hand, can be actualized. Furthermore, in this configuration, the case side can be detached such as to be separated, in a state in which a section (body mounting portion) mounted on the body is attached to the body. Therefore, detachment operation can be facilitated. Furthermore, because the body mounting portion has a flexible structure enabling flexible deformation, the degree of freedom in mounting on the body can be increased.

To achieve the third object, still other various aspects can be used. These aspects will be made clear in the embodiments described hereafter.

Furthermore, to achieve the fourth object, as a fifth aspect of the present invention, a portable information code reading apparatus is provided that includes: an imaging unit that captures an image of a predetermined imaging area; a marker light irradiating unit that irradiates a marker light towards the imaging area; an illumination light source that irradiates an illumination light differing from the marker light; a case that holds at least the marker light irradiating unit, the illumination light source, and the imaging unit; an attaching member that is provided integrally with the case or as a component separate from the case, and is attached to the body of a user or a mounted article on the user; a light source control unit that switches between first control in which the marker light irradiating unit is driven without driving the illumination light source and second control in which the illumination light source is driven; a detecting unit that detects a predetermined feature pattern of an information code from a first captured image obtained by the imaging unit in a state in which the marker light is irradiated based on the first control by the light source control unit; a processing unit that processes a second captured image obtained by the imaging unit in a state in which the illumination light is irradiated based on the second control by the light source control unit, wherein, when the detecting unit detects the feature pattern from the first captured image, the light source control unit switches control of the marker light irradiating unit and the illumination light source from the first control to the second control.

As a result of this aspect, the light source control unit switches between the first control in which the marker light irradiating unit is driven without driving the illumination light source and the second control in which the illumination light source is driven. Detection of a feature pattern using the first captured image obtained in a state in which the marker light is irradiated is attempted until the feature pattern is detected. After the feature pattern is detected, processing of the information code is performed using the second captured image obtained by driving the illumination light source.

When the feature pattern is detected using the first captured image obtained in a state in which the marker light is irradiated, the likelihood is high that the information code is present in the direction intended by the user (the direction in which the reading apparatus is facing). When the illumination light source is driven and the second captured image is captured when a detection result such as this is obtained, the information code intended by the user can be selectively decoded. Compared to a configuration in which decoding of an information code is attempted with the illumination light source being driven at all times, decoding of unintended information codes can be more easily prevented. In addition, because the illumination light source is driven when the likelihood is high that the information code is present in the direction in which the reading apparatus is facing, power consumption can be effectively suppressed.

To achieve the fourth object, still other various aspects can be used. These aspects will be made clear in the embodiments described hereafter.

BRIEF DESCRIPTION OF DRAWINGS

In the accompanying drawings:

In FIG. 7, FIG. 7(A) is a front view of the portable information code reading apparatus in FIG. 1 and FIG. 7(B) is a diagram of the portable information code reading apparatus in an upside down state from that in FIG. 7(A);

In FIG. 9, FIG. 9(A) is a simplified explanatory diagram of a placement structure of an ear hook portion and the like, when the portable information code reading apparatus in FIG. 1 is attached to a right ear, and FIG. 9(B) is a simplified explanatory diagram of a placement structure of the ear hook portion and the like, when the portable information code reading apparatus in FIG. 1 is attached to a left ear;

FIG. 13 is an explanatory diagram for explaining the concept behind the blinking detection by the blinking detection sensor in FIG. 12;

In FIG. 16, FIG. 16(A) is a front view schematically showing the ear inserting portion being detached as in FIG. 14 and another member being attached, and FIG. 16(B) is a diagram of the other member viewed from an angle differing from that in FIG. 16(A);

FIG. 20 is an explanatory diagram for conceptually explaining the reading performed by the portable information code reading apparatus in the first variation example according to the second embodiment;

In FIG. 22, FIG. 22(A) is an explanatory diagram for conceptually explaining the reading performed by the portable information code reading apparatus in the second variation example according to the second embodiment, FIG. 22(B) is an explanatory diagram of an example of a display by a light source in a predetermined successful state, and FIG. 22(C) is an explanatory diagram of an example of a display by the light source in a predetermined failure state;

In FIG. 52, FIG. 52(A) is a perspective view of the apparatus main body of the portable information code reading apparatus in FIG. 49, and FIG. 52(B) is a perspective view viewed from a direction differing from that in FIG. 52(A);

In FIG. 53, FIG. 53(A) is a perspective view of a configuration of a camera inside the portable information code reading apparatus in FIG. 49, and FIG. 53(B) is a perspective view viewed from a direction differing from that in FIG. 53(A);

In FIG. 65, FIG. 65(A) is an explanatory diagram of an imaging unit in a first rotation position in the portable information code reading apparatus according to the sixth embodiment, and FIG. 65(B) is an explanatory diagram of the imaging unit is in a second rotation position;

FIG. 74 is an explanatory diagram for explaining several examples of an irradiation shape when the marker light is irradiated on a flat surface;

FIG. 75 is an explanatory diagram for explaining a relationship between an imaging area of an imaging unit and an irradiation direction of the marker light, and the like;

FIG. 79 is an explanatory diagram for explaining the flow of a cancel operation when a portable information code reading apparatus according to a sixteenth embodiment is used.

DESCRIPTION OF EMBODIMENTS

First Embodiment

A first embodiment actualizing the present invention will hereinafter be described with reference to the drawings.

(Overall Configuration)

Figure 1:
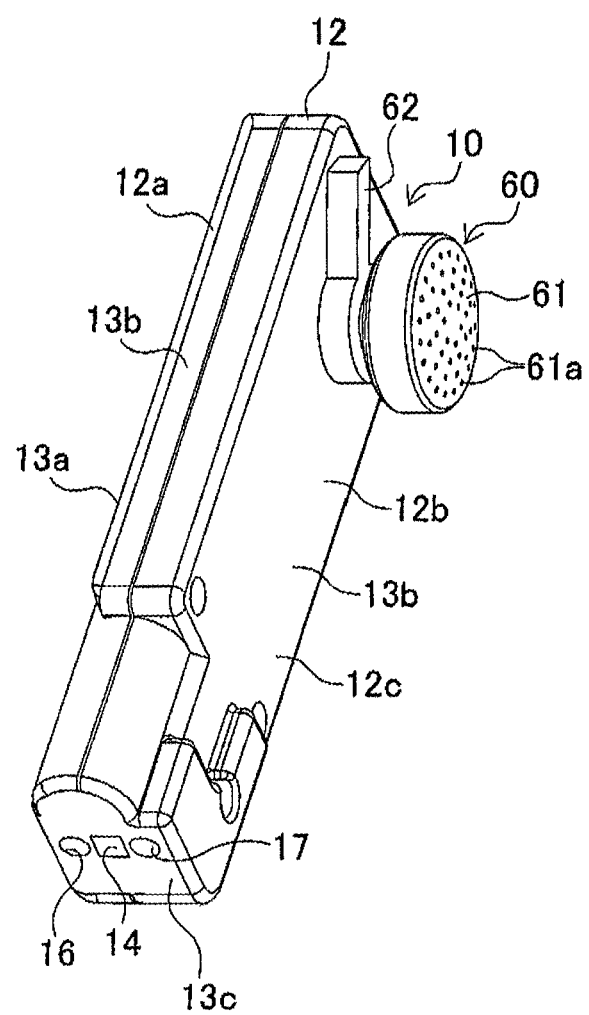
FIG. 1 is a perspective view schematically showing an example of a portable information code reading apparatus according to a first embodiment of the present invention.

As shown in FIG. 1, a portable information code reading apparatus (or reader) 10 (also referred to, hereafter, as simply an information code reading apparatus 10 or a reading apparatus 19) according to the first embodiment includes an imaging unit 23, a processing unit (control circuit 40 (FIG. 2)), a case 12, and an attaching portion 60. The imaging unit 23 captures an image of an information code. The processing unit processes the image of the information code captured by the imaging unit 23. The case 12 holds the imaging unit 23 and the processing unit. The attaching portion 60 is provided integrally with the case 12 or as a component separate from the case 12. The attaching portion 60 attaches the case 12 to either ear of a user.

Figure 2:
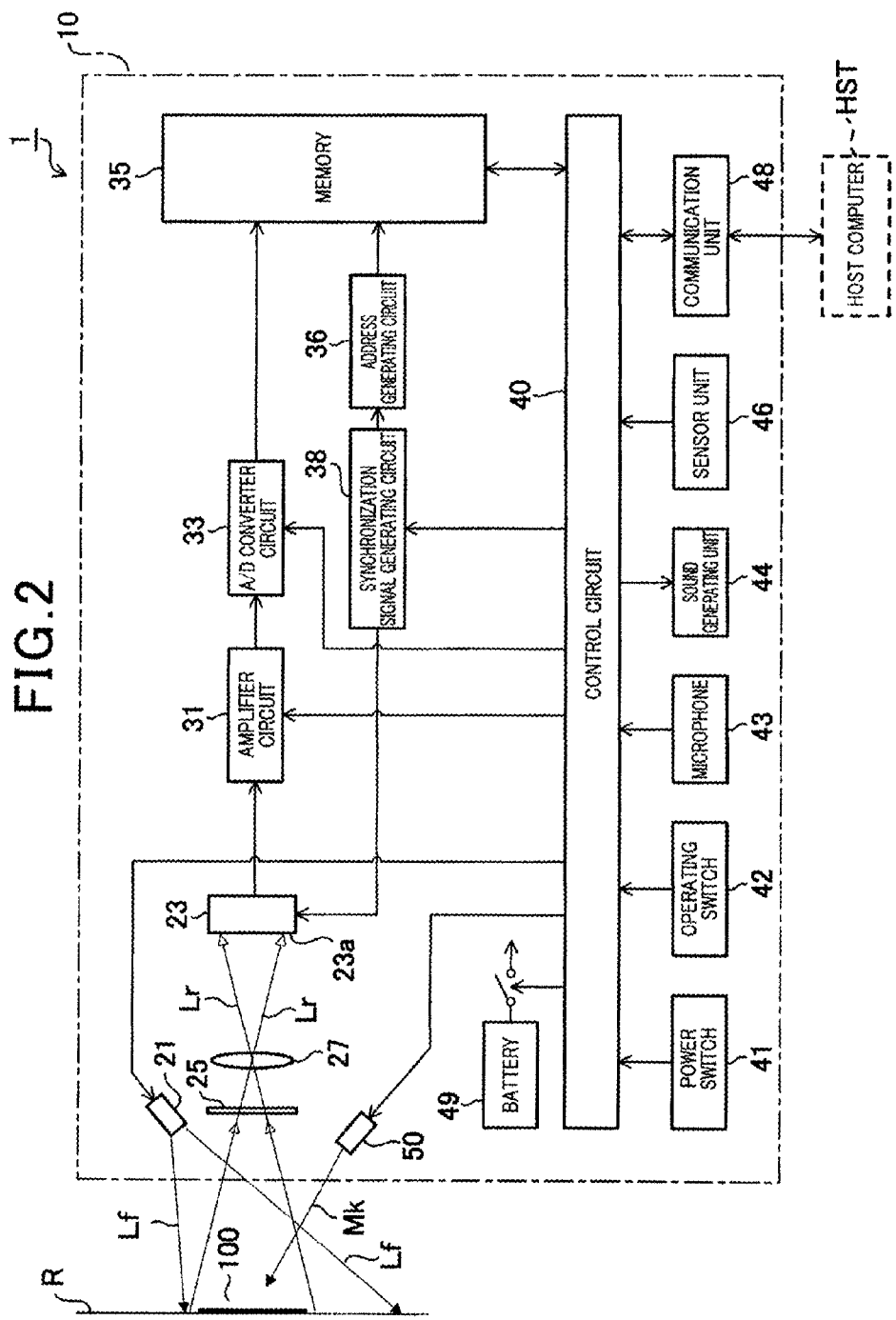
FIG. 2 is a block diagram schematically showing an example of an electrical configuration of the portable information code reading apparatus in FIG. 1.

First, an electrical configuration of the information code reading apparatus (reader) 10 will be described. As shown in FIG. 2, in terms of hardware, the information code reading apparatus 10 is configured as a code reader that is capable of reading a two-dimensional code. The outer shell of the information code reading apparatus 10 is configured by the case 12. The information code reading apparatus 10 is configured such that various electronic components are housed inside the case 12.

The information code reading apparatus 10 is mainly configured by an optical system, a microcomputer (referred to, hereafter, as "micon") system, and a power supply system. The optical system includes an illumination light source 21, a marker light irradiating unit 50, the imaging unit 23, a filter 25, an imaging lens 27, and the like. The micon system includes a memory 35, a control circuit 40, an operating switch 42, and the like. The power supply system includes a power switch 41, a battery 49, and the like. These components are mounted on a printed wiring board (not shown) or provided inside the case 12.

The optical system is configured by the illumination light source 21, the imaging unit 23, the filter 25, the imaging lens 27, the marker light irradiating unit 50, and the like. The illumination light source 21 functions as an illumination light source capable of emitting an illumination light Lf. For example, the illumination light source 21 is composed of a red light-emitting diode (LED), and a diffusing lens, a condenser lens, or the like that is provided on the outgoing side of the LED. According to the first embodiment, the illumination light source 21 is configured to be capable of irradiating the illumination light Lf towards a reading target R, via an irradiation opening 16 formed in the case. For example, a resin material, a metal material, and various other subjects can be considered as the reading target R. An information code 100, such as that in FIG. 2, is formed by printing or the like on such a reading target R. The type of information code 100 that is to be read may be a one-dimensional code, such as a barcode, or a two-dimensional code, such as a QR code (registered trademark), a Data Matrix code, or a MaxiCode. The marker light irradiating unit 50 is configured by a publically known marker light source or the like. The marker light irradiating unit 50 is configured to irradiate (emit) a marker light MK having high directivity, for example, towards the same side as the side to which the illumination light source 21 irradiates light.

The imaging unit 23 is configured by a light-receiving sensor (such as an area sensor in which light-receiving elements, such as complementary metal-oxide semiconductors (CMOS) or charge-coupled devices (CCD), are two-dimensionally arrayed) that is capable of imaging the information code 100. The imaging unit 23 is capable of receiving reflected light Lr that has been reflected after being irradiated (emitted) onto the reading target R and the information code 100. The imaging unit 23 is disposed such that a light-receiving surface 23a thereof is capable of receiving incident light that enters through the imaging lens 27.

The filter 25 is an optical low-pass filter that is, for example, capable of allowing transmission of light having a wavelength corresponding to the wavelength of the reflected light Lr or lower, and blocking transmission of light having a wavelength exceeding the wavelength of the reflected light Lr. The filter 25 is provided between a reading opening 14 formed in the case 12 and the imaging lens 27. As a result, the filter 25 suppresses unnecessary light having a wavelength that exceeds the wavelength of the reflected light Lr from entering the imaging unit 23. In addition, the imaging lens 27 is configured by, for example, a lens tube and a plurality of condenser lenses housed within the lens tube. According to the present embodiment, the imaging lens 27 collects the reflected light Lr that has enters the reading opening 14 (for example, see FIG. 3) formed in the case 12. The imaging lens 27 then forms a code image of the information code 100 on the light-receiving surface 23a of the imaging unit 23.

The micon system is configured by an amplifier circuit 31, an analog-to-digital (A/D) converter circuit 33, the memory 35, an address generating circuit 36, a synchronization signal generating circuit 38, the control circuit 40, the operating switch 42, a microphone 43, a sound generating unit 44, a sensor unit 46, a communication unit 48, and the like. The micon system is configured mainly by the control circuit 40 and the memory 35. The control circuit 40 is capable of functioning as a microcomputer (information processing unit). The micon system is capable of performing signal processing, as hardware and software, on an image signal of the information code 100 imaged by the above-described optical system.

The image signal (analog signal) outputted from the imaging unit 23 in the optical system is inputted into the amplifier circuit 31. As a result, the image signal is amplified at a predetermined gain. The image signal is then inputted into the A/D converter circuit 33 and converted from an analog signal into a digital signal. The digitalized image signal, that is, image data (image information) is inputted into the memory 35 and collected in an image data collection region of the memory 35. The synchronization signal generating circuit 38 is capable of generating synchronization signals for the imaging unit 23 and the address generating circuit 36. The address generating circuit 36 is capable of generating a storage address of the image data stored in the memory 35 based on the synchronization signal supplied from the synchronization signal generating circuit 38.

The memory 35 is configured by a semiconductor memory device or the like. For example, a random access memory (RAM) (such as a dynamic random access memory (DRAM) or a static random access memory (SRAM)) and a read-only memory (ROM) (such as an erasable programmable read-only memory (EPROM) or an electrically erasable programmable read-only memory (EEPROM)) correspond to the memory 35. In addition to the above-described image data collection region, a work area and a reading condition table can also be secured in the RAM of the memory 35. The work area is used by the control circuit 40 during processing, such as arithmetic operations and logic operations. In addition, predetermined programs enabling a reading process, described hereafter, and the like to be performed are stored in advance in the ROM. Furthermore, system programs and the like that enable control of hardware, such as the illumination light source 21 and the imaging unit 23, are also stored in advance in the ROM.

The control circuit 40 is a microcomputer that is capable of controlling the overall information code reading apparatus 10. The control circuit 40 is composed of a central processing unit (CPU), a system bus, an input/output interface, and the like. The control circuit 40 provides an information processing function. Various input/output apparatuses (peripheral apparatuses) are connected to the control circuit 40 via the input/output interface provided therein. In the present configuration, a power switch 41, the operating switch 42, the microphone 43, the sound generating unit 44, the sensor unit 46, the communication unit 48, and the like are connected to the control circuit 40. In addition, the communication unit 48 is configured as a publically known communication interface that performs wired communication or wireless communication. The communication unit 48 functions to perform communication with an external apparatus provided outside of the case 12, and transmit information to the external apparatus or receive information from the external apparatus. In the example in FIG. 2, a computer HST (such as a stationary personal computer or a portable personal computer) is connected such as to be capable of wired communication or wireless communication (such as publically known local area network (LAN) communication or Bluetooth (registered trademark) communication), as the "external apparatus". The computer HST corresponds to a high-order system of the information code reading apparatus 10.

The power supply system is configured by the power switch 41, the battery 49, and the like. The power switch 41 is managed by the control circuit 40. As a result of the power switch 41 being turned ON and OFF, conduction and blocking of drive voltage supplied from the battery 49 to each of the above-described units and circuits is controlled. The battery 49 is a secondary battery capable of generating a predetermined direct-current voltage. For example, a lithium ion battery corresponds to the battery 49.

(Mounting Structure and the Like)

Next, a mounting structure, which is the main feature of the portable information code reading apparatus 10, and the like will be described.

Figure 3:
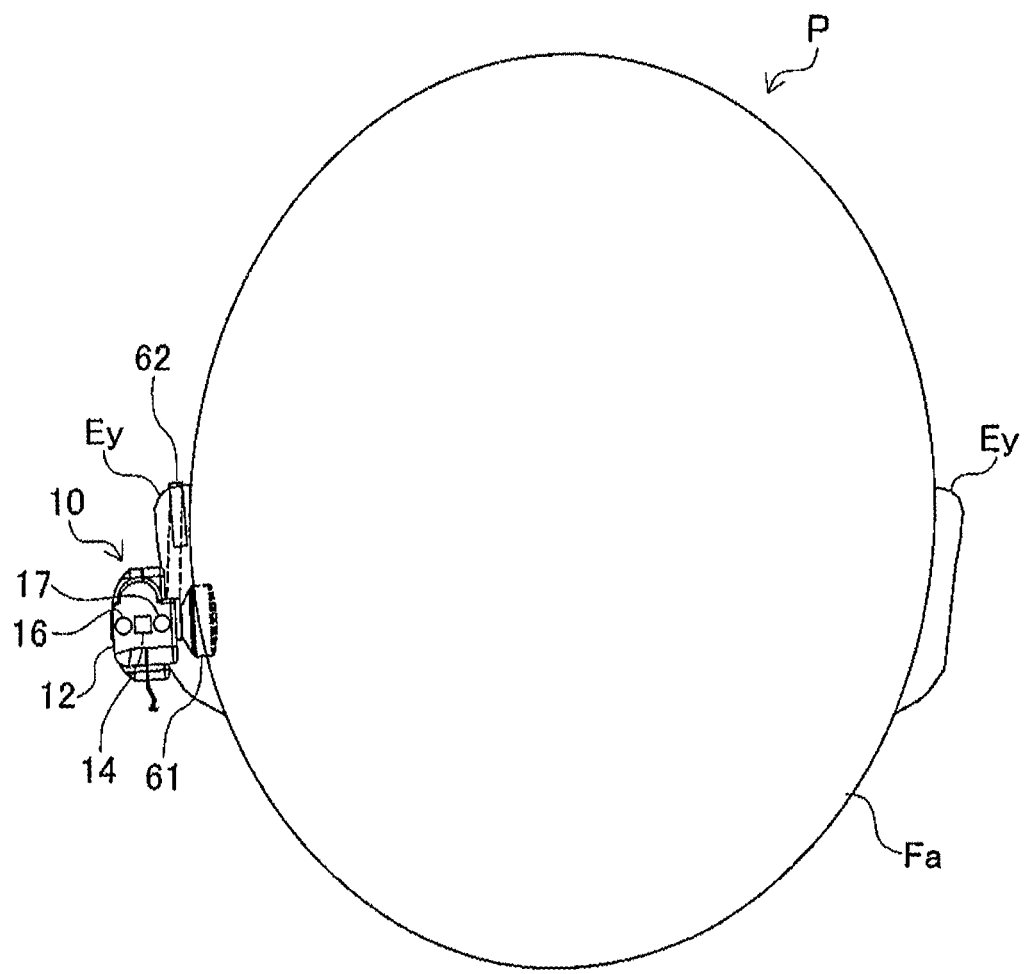
FIG. 3 is an explanatory diagram of a state of use of the portable information code reading apparatus in FIG. 1.
Figure 4:
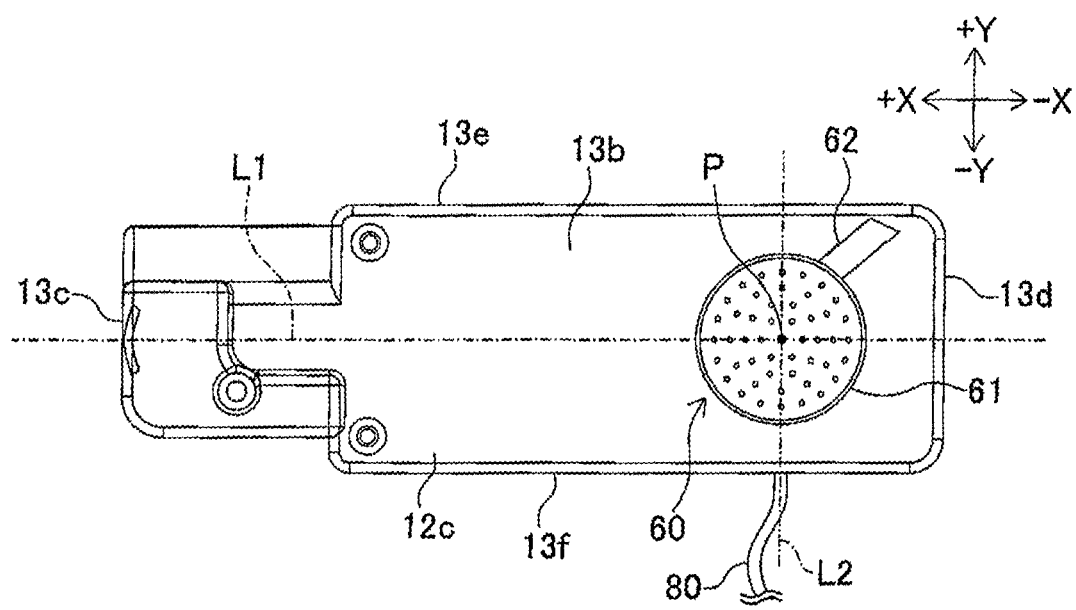
FIG. 4 is a side view of the portable information code reading apparatus in FIG. 1, viewed from one side in a lateral direction.
Figure 5:
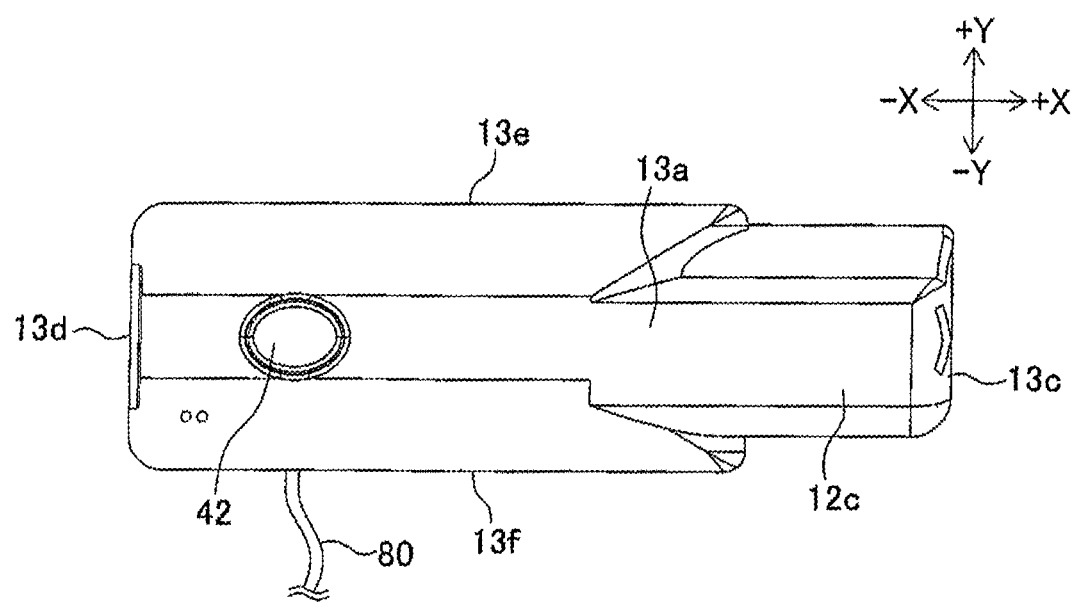
FIG. 5 is a side view of the portable information code reading apparatus in FIG. 1, viewed from a side differing from that in FIG. 4.
Figure 6:
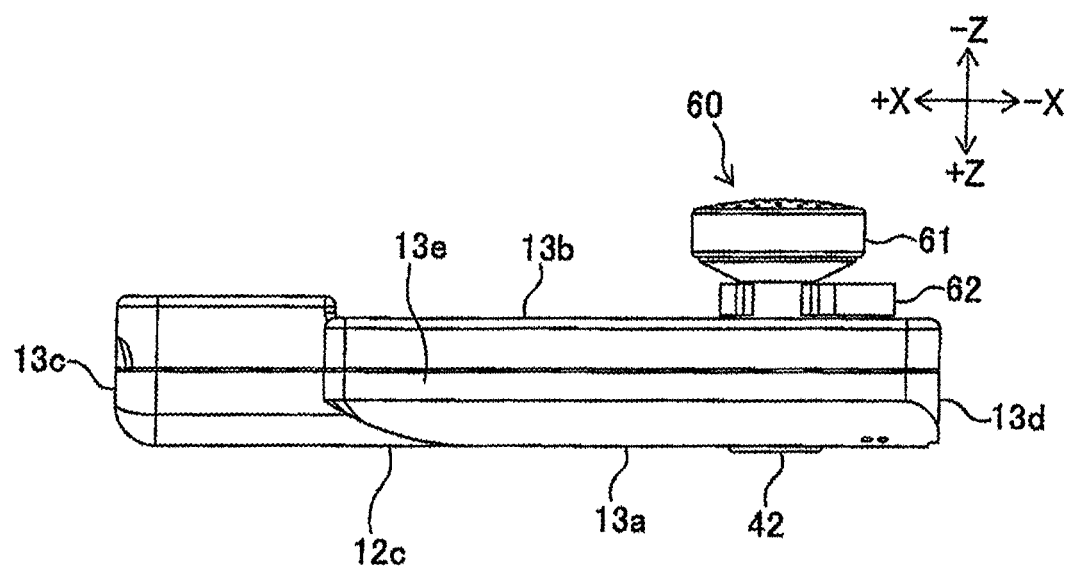
FIG. 6 is a bottom view of the portable information code reading apparatus in FIG. 1.
Figure 8:
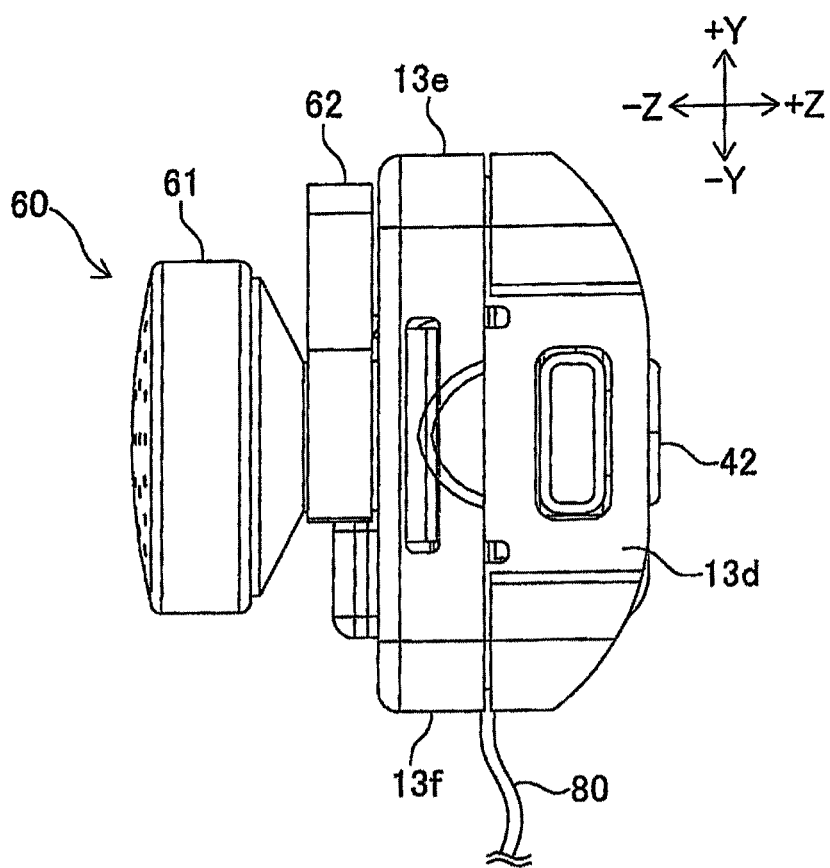
FIG. 8 is a rear view of the portable information code reading apparatus in FIG. 1.

The portable information code reading apparatus 10 includes the imaging unit 23, the processing unit (the control circuit 40 (FIG. 2)), the case 12, and the attaching portion 60. The imaging unit 23 is capable of imaging the information code 100. The processing unit processes decodes the information code 100 when the imaging unit 23 images the information code 100. The case 12 holds the imaging unit 23 and the processing unit. The attaching portion 60 is provided integrally with the case 12 or as a component separate from the case 12. The attaching portion 60 attaches the case 12 to either ear of the user. The case 12 includes the reading opening 14 into which light from the information code can be introduced. The attaching portion 60 attaches the case 12 to an ear Ey of a user P, such that the case 12 is disposed in a lateral position the face Fa of the user and the reading opening 14 faces the front side of the user P, as shown in FIG. 3.

As shown in FIG. 3 to FIG. 8, the case 12 includes an extending portion 12c that extends from the position of the attaching portion 60 in a predetermined direction (specifically, the longitudinal direction of the case 12). The reading opening 14 is provided in the case 12 in a position towards the end portion on the side opposite the attaching portion 60 in the extending portion 12c (specifically, a front wall portion 312c provided in the front end portion of the case 12). The attaching portion 60 attaches the case 12 to the ear Ey of the user such that the extending portion 12c extends at least toward the front side (the field that the face Fa of the user faces, i.e., the field in front of the face Fa of the user) from the ear of the user.

In the present specification, the direction in which the attaching portion 60 and the reading opening 14 are aligned is the front/back direction of the reading apparatus 10. With reference to the attaching portion 60, the reading opening 14 side is the front side, and the side opposite thereto is the back side. In addition, the direction perpendicular to the front/back direction and the direction in which an ear inserting portion 61 protrudes is the left/right direction of the reading apparatus 10. Furthermore, the direction perpendicular to the front/back direction and the left/right direction is the up/down direction. In addition, in the present specification, with reference to the face Fa of the user, the direction in which the face Fa faces is described as the front side of the face Fa. The side of the back of the head is described as the back side of the face Fa.

As shown in FIG. 4 to FIG. 8, based on the foregoing definitions, the front wall portion 312a is provided in the front end portion of the case 12. A back wall portion 312d is provided in the back end portion of the case 12. In addition, a side wall portion 13b is provided on one side (attaching portion 60 side) in the left/right direction, and a side wall portion 13a is provided on the side opposite thereof. Furthermore, an upper wall portion 312e is provided in the upper end portion and a lower wall portion 312f is provided in the lower end portion. A housing portion is formed having a box-like configuration that is surrounded from the front/back, left/right, and up/down by the front wall portion, the back wall portion, the side wall portions, the upper wall portion, and the lower wall portion. The housing portion houses electronic components such as the imaging unit and the control circuit.

Specifically, the attaching portion 60 has the ear inserting portion 61 and the ear hook portion 62. The ear inserting portion 61 is inserted to the hole in the ear Ey of the user. The ear hook portion 62 is hooked onto the ear of the user. In the present configuration, the main body portion of the case 12 is formed such as to be elongated and box-shaped. The ear inserting portion 61 is formed such as to protrude from the side wall portion 13b on one end side in the longitudinal direction of the main body portion. The ear hook portion 62 is provided such as to extend in an arc from the vicinity of the base end portion (the vicinity of the base of the protrusion) of the ear inserting portion 61. The extended tip of the ear hook portion 62 is omitted in FIG. 1, and FIG. 4 to FIG. 8. In actuality, the ear hook portion 62 is curved into an arc as shown in FIG. 3 and FIG. 9, and can be flexibly deformed. When the ear inserting portion 61 is inserted into the hole in the ear Ey as shown in FIG. 3, the ear hook portion 62 is structured to be hooked onto the portion of the ear Ey facing the head side.

In addition, as shown in FIG. 9(A) and FIG. 9(B), the ear hook portion 62 is detachable from a portion of the case 12 or a connecting portion connected to the case 12. A first fixing portion 71 and a second fixing portion 72 are formed in the portion of the case 12 or the connecting portion connected to the case 12. When the ear hook portion 62 is attached to the left ear of the user, the ear hook portion 62 is to be fixed to the first fixing portion 71. When the ear hook portion 62 is attached to the right ear of the user, the ear hook portion 62 is to be fixed to the second fixing portion 72. For example, the first fixing portion 71 is configured as a first hole portion that is open on the lower side on the base end side of the ear inserting portion 61 that has the protruding shape. For example, one end portion of the ear hook portion 62 configured as a curved member is fixed by being inserted and fitted into the first hole portion. As a result, an arrangement configuration for the right ear as shown in FIG. 9(A) can be achieved. In addition, for example, the second fixing portion 72 is configured as a second hole portion that is open on the upper side on the base end side of the ear inserting portion 61 that has the protruding shape. For example, one end portion of the ear hook portion 62 configured as a curved member is fixed by being inserted and fitted into the second hole portion. As a result, an arrangement configuration for the left ear as shown in FIG. 9(B) can be achieved.

The case 12 is provided with the reading opening 14 into which the light from the information code can be introduced. When the attaching portion 60 is attached to the left ear of the user by an arrangement such as that in FIG. 9(B) and when the attaching portion 60 is attached to the right ear of the user by an arrangement such as that in FIG. 9(A), the attaching portion 60 can attach the case 12 to the ear of the user such that the reading opening 14 faces the front side of the user (also see FIG. 7(A) and FIG. 7(B)).

In addition, in the present configuration, the illumination light source 21 and the marker (marking) light irradiating unit 50 are provided as described above. The illumination light source 21 irradiates an illumination light. The marker light irradiating unit 50 irradiates a marker light. The illumination light from the illumination light source 21 and the marker light from the marker light irradiating unit 50 are both irradiated towards the front side of the reading apparatus 10 from the front wall portion 312c. Specifically, the illumination light from the illumination light source 21 is irradiated towards the front side via an illumination light outlet 16. The marker light from the marker light irradiating unit 50 is irradiated towards the front side via a marker light outlet 17. When the attaching portion 60 is attached to the left ear of the user by an arrangement such as that in FIG. 9(B) and when the attaching portion 60 is attached to the right ear of the user by an arrangement such as that in FIG. 9(A), the attaching portion 60 can attach the case 12 to the ear of the user such that the front wall portion 312c faces the front side of the face Fa, and the illumination light from the illumination light source 21 and the marker light from the marker light irradiating unit 50 are irradiated towards the front side of the user. More specifically, as shown in FIG. 7(A), the illumination light outlet 16 and the marker light outlet 17 are respectively disposed to the left and right of the reading opening 14. When the attaching portion 60 is attached to the left ear of the user by an arrangement such as that in FIG. 7(B) and when the attaching portion 60 is attached to the right ear of the user by an arrangement such as that in FIG. 7(A), a positional relationship is established in which the illumination light outlet 16 is disposed on the outer side from the reading opening 14 in the left/right direction and the marker light outlet 17 is disposed on the inner side from the reading opening 14 in the left/right direction. More specifically, when viewed from the front as in FIG. 7, the marker light outlet 17 and the illumination light outlet 16 are substantially linearly symmetrical with a center line G as the center. The center line G3 runs in the up/down direction and passes through the center G1 of the reading opening 14. A positional relationship is established in which the marker light outlet 17, the illumination light outlet 16, and the reading opening 14 are aligned on a line G2 that passes through the center G1 and is perpendicular to the center line G3.

In addition, as shown in FIG. 4 to FIG. 8, the reading apparatus 10 includes a cable 80 that is held by the case 12. The cable 80 is electrically connected to an external apparatus provided outside of the case 12. The cable 80 is led outside of the case 12 from one side in the short direction near one side in the longitudinal direction of the case 12 (specifically, from the side below the attaching portion 60 provided near one longitudinal direction of the case 12).

In addition, the operating switch 42 is provided in a position on the back side of the attaching portion 60 in the wall portion (side wall portion 13a) that is on the side opposite the wall portion (side wall portion 13b) in which the attaching portion 60 is provided in the case 12. The operating switch 42 is can be externally operated. In this configuration, the operating switch 42 is operated from the back side of the attaching portion 60 that serves as the rotational center portion. Therefore, even when a pressing operation or the like is performed on the operating switch 42, moment centered around the attaching portion 60 does not readily occur as a result of the pressing force. Therefore, the case 12 does not readily rotate. As a result, the relative orientation of the overall reading apparatus in relation to the face of the user is more stably maintained.

(Method of Use and Others)

Next, a cooperative process performed between the reading apparatus 10 and an external apparatus (for example, a host apparatus such as a personal computer or a smartphone, herein) will be described. In the reading apparatus 10 according to the present embodiment, specifically, for example, when the user presses the operating switch 42, the irradiation of illumination light from the illumination light source 21 and the marker light from the marker light irradiating unit 50 is started. In addition, imaging by the imaging unit 23 is started. When a reading target to which the information code 100 is attached is disposed on the front side of the reading apparatus 10 (that is, on the front side of the face of the user) as in FIG. 9, the information code 100 is imaged and read. The imaging area from the reading apparatus 10 is preferably within a range reachable by hand by the user (in particular, within a range in which the user can easily place an object while holding the object in the hand). For example, the imaging area may be from 10 cm to 150 cm (more preferable, 20 cm to 100 cm).

When reading is successful, the sound generating unit 44 generates a predetermined notification sound. When reading is a failure, the sound generating unit 44 may generate an error sound that differs from the predetermined notification sound. In the present configuration, the sound generating unit 44 corresponds to an example of a "notifying unit". The sound generating unit 44 functions at least to give notification of the processing results from the processing unit.

In addition, in the present configuration, a lead-out portion (lead-out hole 61a) is provided in the ear inserting portion 61. The sound from the sound generating unit 44 is led out from the lead-out portion. The sound generated by the sound generating portion 44 reaches the ear of the user through the lead-out portion. As long as the path over which the sound from the sound generating unit 44 is led to the lead-out portion is configured, the sound generating unit 44 itself may be provided inside the ear inserting portion 61 or outside the ear inserting portion 61.

Figure 10:
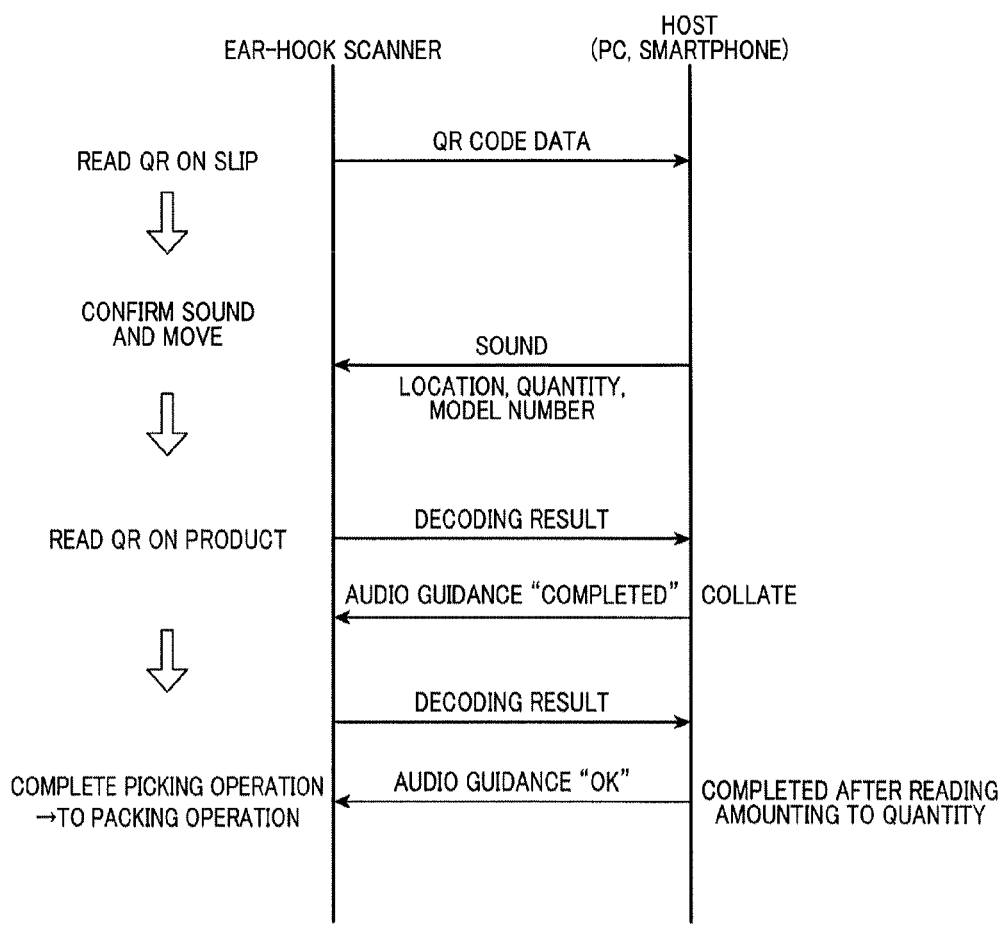
FIG. 10 is a chart of an example of a cooperative process performed by the portable information code reading apparatus in FIG. 1 and an external apparatus.
Figure 11:
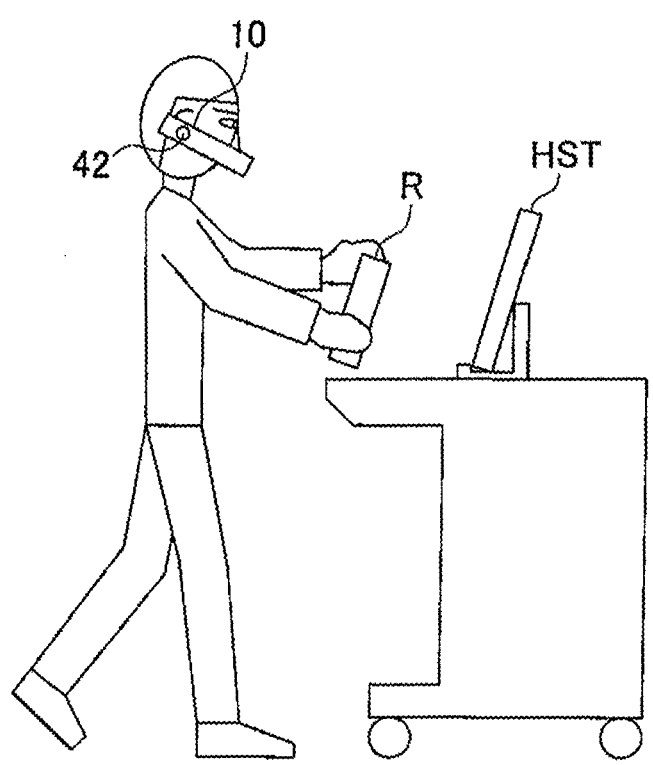
FIG. 11 is a diagram schematically showing the portable information code reading apparatus in FIG. 1 in actual use.

For example, in cases such as those in FIG. 10 and FIG. 11, when an information code that is attached to an slip is decoded by the reading apparatus 10, first, the reading apparatus 10 outputs the decoded data (QR code data (QR code is a registered trademark) in FIG. 10) to the external apparatus. Then, the external apparatus (host) analyzes the content of the decoded data and transmits guidance information to the reading apparatus 10. In the example in FIG. 10, position information of a product corresponding to the code on the slip, the quantity to be read, data on model number information, and sound information are transmitted to the reading apparatus 10 as the guidance information. In this case, the user can move to the designated position based on the sound information and read the target product. Subsequently, when the reading apparatus 10 reads the information code on the product, the reading apparatus 10 outputs the decoded data to the external apparatus each time an information code is read. Collation is performed on the external apparatus side. In the present configuration, the control circuit 40 and the sound generating unit 44 correspond to an example of an "audio guidance unit". Based on decoded information obtained as a result of the processing unit decoding the information code, the control circuit 40 and the sound generating unit 44 functions to perform audio guidance of information to be handled after decoding of the decoded information.

Main Effects According to the First Embodiment

In the configuration in JP-A-H08-272484; as well as in a configuration in which the reading apparatus is fixed by a band or the like is fitted onto the head of the user as in FIG. 1 in Japanese Patent Publication No. 3020943, a problem occurs in that the configuration is difficult to apply in instances in which a mounted tool of some sort is worn on the head of the user. For example, when the user performs a reading operation while wearing a helmet, a hat, or the like, in the head-mounted type reading apparatuses disclosed in these patent documents, application may be difficult, and mounting may be troublesome. In addition, in a configuration in which the reading apparatus is attached onto a screen that covers the eye as in JP-A-H08-272484, a problem occurs in that the configuration is difficult to apply when the user works while wearing glasses. Furthermore, FIG. 7 and the like in Japanese Patent Publication No. 3020943 discloses a configuration in which the reading apparatus is attached to a part of the user other than the head. For example, as shown in FIG. 7, when the reading apparatus is fixed to the arm, the trunk of the body, or the like, the reading apparatus can be fixed without difficulty, even when used in combination with a helmet, glasses, or the like. However, in such a fixing structure, the reading direction of the reading apparatus cannot move in tandem with the movement of the face of the user. The direction in which the user is looking and the direction in which the reading apparatus performs reading easily become unaligned. For example, the user becomes conscious of the item to be read, such as by bringing the arm or the trunk of the body near the item to be read. As a result, workability is no different from that when a conventional portable terminal is used.

In this regard, in the present configuration, the case 12 holding the imaging unit 23 and the processing unit can be attached to the ear of the user by the attaching portion 60. Therefore, the reading operation can be performed with the reading apparatus attached to a part other than the hands. The user can more easily use both hands for purposes other than the reading operation. In addition, because the reading apparatus is attached to one ear, the overall reading apparatus moves in tandem with the movement of the face. The reading direction can be set such as to match the movement of the face of the user. Furthermore, because the attachment position is one ear, the reading apparatus can be easily mounted even when another mounted tools (such as a helmet or glasses) is used.

In addition, because the reading apparatus is a type that is attached to the ear, shaking (such as shaking from the hands) does not readily occur compared to a type that is hand-held. In addition, because shaking during imaging is reduced, the shutter speed can be made relatively slow. A sufficient amount of received light can be ensured. Therefore, the amount of illumination light can be more easily reduced. In addition, because there is little shaking, complicated correction mechanisms can be omitted. Simplification of the apparatus configuration, compactness, and reduced cost can be more easily achieved.

In addition, the case 12 is provided with the reading opening 14 into which light from the information code can be introduced. The attaching portion 60 is configured to attached the case 12 to the ear of the user such that the case 12 is placed in a lateral position of the face of the user and the reading opening 14 faces the front side of the user. As a result of this configuration, the orientation of the face of the user and the reading direction can more favorably move in tandem. The information code disposed in the field that the face of the user faces can be smoothly read without discomfort.

Furthermore, the case 12 is provided with the extending portion that extends in a predetermined direction from the position of the attaching portion 60. In addition, the reading opening 14 is provided towards the end portion on the side opposite the attaching portion 60 in the extending portion. The attaching portion 60 is configured to attach the case 12 to the ear of the user such that the extending portion extends at least to the front of the ear of the user. The case 12 is extended slightly more forward than the ear in this way, and the information code is read via the reading opening 14 on this end portion side. As a result, the face of the user can be removed as much as possible from the imaging area, and the space in front of the face can be more widely imaged.

In addition, the attaching portion 60 has the ear inserting portion 61 that is inserted into the ear of the user. As a result of this configuration, the case 12 can be held using the earhole. Furthermore, the position of the attaching portion 60 and the position of the earhole can be accurately matched. Therefore, the position of the case 12 can be more easily determined with accuracy with reference to the earhole.

In addition, the attaching portion 60 has the ear hook portion 62 that is hooked onto the ear of the user. As a result of this configuration, the case 12 can be more stably held by the ear of the user.

In addition, the ear hook portion 62 is detachable from a portion of the case 12 or the connecting portion that is connected to the case 12. The first fixing portion 71 and the second fixing portion 72 are formed in the portion of the case 12 or the connecting portion connected to the case 12. The ear hook portion 62 is to be fixed to the first fixing portion 71 when the ear hook portion 62 is attached to the left ear of the user. The ear hook portion 62 is to be fixed to the second fixing portion 72 when the ear hook portion 62 is attached to the right ear of the user. As a result of this configuration, the reading apparatus can be attached to the right ear and to the left ear of the user. When the reading apparatus is attached to either ear, the ear hook portion 62 can be fixed to a position based on the ear.

In addition, the case 12 is provided with the reading opening 14 into which light from the information code can be introduced. Regardless of whether the attaching portion 60 is attached to the left ear or the right ear of the user, the attaching portion 60 can attach the case 12 to the ear of the user such that the reading opening 14 faces the front side of the user. As a result of the configuration, regardless of whether the reading apparatus is attached to the right ear or the left ear of the user, the orientation of the face of the user and the reading direction can favorably move in tandem.

In addition, the illumination light source 21 and the marker light irradiating unit 50 are provided. The illumination light source 21 irradiates the illumination light. The marker light irradiating unit 50 irradiates the marker light. Regardless of whether the attaching portion 60 is attached to the left ear or the right ear of the user, the attaching portion 60 can attach the case 12 to the ear of the user such that the illumination light from the illumination light source 21 and the marker light from the marker light irradiating unit 50 are irradiated towards the front side of the user. As a result of the configuration, regardless of whether the reading apparatus is attached to the right ear or the left ear of the user, the illumination light and the marker light can be irradiated towards the front side of the user, which is the reading side.

In addition, the sensor unit 46 is provided inside or outside the case 12. The processing unit decodes the information code at least under a condition that a predetermined detection result is obtained from the sensor unit 46. In this configuration, the decoding process by the processing unit can be stopped until the predetermined detection result is detected by the sensor unit 46. Power can be saved. As a result of measures being taken such that the predetermined detection result is obtained by the sensor unit 46, the reading apparatus can return to an decoding start state.

In addition, the sensor unit 46 is capable of detecting a predetermined state in which the attaching portion 60 is attached to the ear of the user. The processing unit decodes the information code under a condition that the sensor unit 46 has detected the predetermined state. In this configuration, the decoding process by the processing unit can be stopped until the attaching portion 60 is attached to the ear of the user. Power can be saved. The reading apparatus can return to the decoding start state when the attaching portion 60 is attached to the ear.

In addition, at least either of the illumination light source 21, which irradiates the illumination light, and the marker light irradiating unit 50, which irradiates the marker light, and the irradiation control unit are provided. The irradiation control unit operates at least either of the illumination light source 21 and the marker light irradiating unit 50 under a condition that a predetermined state has occurred, and starts irradiation of at least either of the illumination light and the marker light. In this configuration, at least either of the illumination light source 21 and the marker light irradiating unit 50 is not operated until the predetermined state occurs. Power is further saved. As a result of measures being taken such that the predetermined state occurs, at least either of the illumination light source 21 and the marker light irradiating unit 50 is operated, and reading is facilitated.

In addition, the communication unit 48 that communicates with the external apparatus provided outside of the case 12 is provided. The communication unit 48 enables information transmission to the external apparatus or information reception from the external apparatus. As a result of this configuration, information can be exchanged with the external apparatus. Therefore, not all processing functions are required to be provided within the reading apparatus. Some of the processing functions can be shared with the external apparatus. As a result, simplification of the reading apparatus can be facilitated, leading to advantages in terms of size reduction and weight reduction.

In addition, the notifying unit is provided within the case 12 or in a portion attached to the case 12. The notifying unit at least gives notification of the reading result from the processing unit. As a result of this configuration, the reading result from the processing unit can be favorably transmitted to the user. In particular, because notification is performed near the ear, the notification can be transmitted to the user with more certainty.

In addition, the attaching portion 60 is provided with the ear inserting portion 61 that is inserted into the earhole of the user. The sound generating portion 44 that generates sound or the lead-out portion that leads out the sound from the sound generating portion 44 that generates sound is provided in the ear inserting portion 61. As a result of this configuration, the ear inserting portion 61 functions not only as a member for attachment, but also as an earphone. Furthermore, in this attachment structure, the sound generated inside the reading apparatus can be directly transmitted to the ear from the portion inserted into the ear. Therefore, the content can be transmitted to the user with certainty, even at a low sound output. Such an effect becomes even more notable in the case 12 in which noise is presumed during use.

In addition, the audio guidance unit is provided that performs audio guidance of information to be handled after decoding of the decoded information, based on the decoded information obtained by the processing unit decoding the information code. According to this configuration, the user can more quickly and appropriately respond after the decoding of the information code. Furthermore, the reading apparatus is attached to the ear and audio guidance is generated from a position near the ear. Therefore, the user can more favorably hear the audio guidance.

In addition, the cable 80 that is held by the case 12 and is electrically connected to the external apparatus provided outside of the case 12 is provided. The case 12 is formed into an elongated shape, and the attaching portion 60 is provided towards one longitudinal direction of the case 12. The cable 80 is led outside of the case 12 from one side in the short direction of the case 12 on one side in the longitudinal direction of the case 12. According to this configuration, rotational force is not readily generated in the case 12 even when the case 12 is pulled to a certain extent. Therefore, the relative orientation of the overall reading apparatus in relation to the face of the user can be more stably maintained.

In addition, the operating switch 42 that can be externally operated is provided in a position on the back side of the attaching portion 60 in the wall portion on the side opposite the wall portion in which the attaching portion 60 is provided in the case 12. In this configuration, the operating switch 42 is operated on the back side of the attaching portion 60 that serves as the rotation center portion. Therefore, even when a pressing operation or the like is performed on the operating switch 42, moment centered around the attaching portion 60 does not readily occur as a result of the pressing force. Therefore, the case 12 does not readily rotate. As a result, the relative orientation of the overall reading apparatus in relation to the face of the user can be more stably maintained.

Second Embodiment

Next, a second embodiment will be described.

A reading apparatus 10 according to the second embodiment includes all of the features according to the first embodiment and has an additional feature. Therefore, the configurations shown in FIG. 1 to FIG. 11 are considered to be the same as those according to the first embodiment. Detailed descriptions thereof are omitted. FIG. 1 to FIG. 11 will be referenced as appropriate.

First, a representative example according to the second embodiment will be described.

Figure 17:
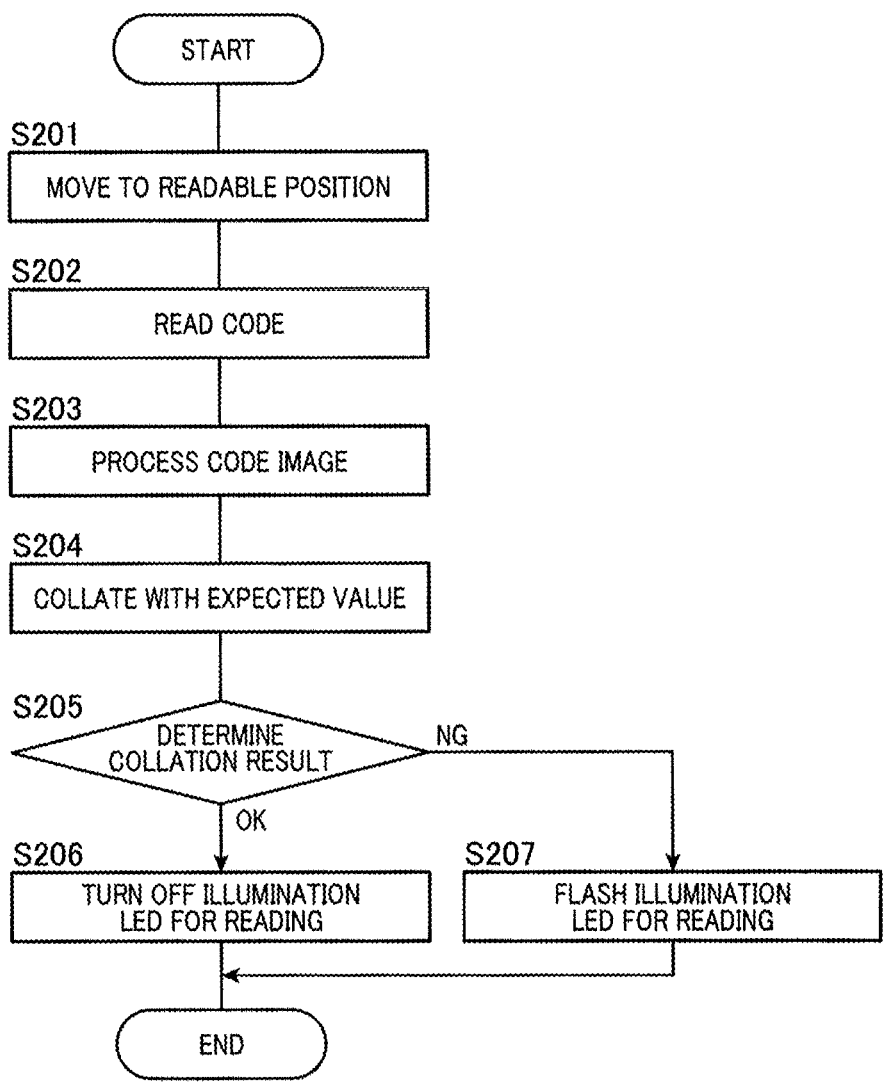
FIG. 17 is a flowchart of an example of the flow of a reading process performed by a portable information code reading apparatus according to a second embodiment.

In the present configuration, in addition to the configuration according to the first embodiment, a specific process performed during reading of an information code is added as a feature. Specifically, a reading process is performed based on a flow such as that in FIG. 17. The reading process in FIG. 17 is performed under a condition that a predetermined start condition is met. In accompaniment with the start of the process, a light-receiving sensor (imaging unit) 23 continuously images an imaging area set outside of the case (S201). At S201, while the illumination light source 21 shown in FIG. 2 irradiates the illumination light towards the imaging area, the light-receiving sensor 23 images the area irradiated by the illumination light (see the upper drawing in FIG. 18). When the information code enters the imaging area and the information code is imaged, the reading apparatus 10 analyzes the code image of the imaged information code (S202). At S202, the reading apparatus 10 attempts to perform a publically known decoding process on the code image of the information code. When the decoding process is successful, the reading apparatus 10 acquires the data recorded in the information code (S203). Then, the reading apparatus 10 collates the data acquired at S203 (the data recorded in the information code) with an expected value stored in the memory 35 (FIG. 2) in advance (S204). The reading apparatus 10 determines whether or not the data matches the expected value (S205).

One or a plurality of expected values are registered in the memory 35 in advance. When determined that the decoded data acquired at S203 matches the expected value registered in the memory 35, the reading apparatus 10 proceeds to OK at S205. Conversely, when determined that the decoded data acquired at S203 does not match the expected value registered in the memory 35, the reading apparatus 10 proceeds to NG at S205. For example, as the expected value, a list of three model numbers, "1234567890001", "1234567890002", and "1234567890003", is stored in the memory 35. When the decoded data of the information code acquired at S203 is "1234567890001", the decoded data matches the expected value. Therefore, the reading apparatus 10 proceeds to OK at S205 and performs the process at S206. Meanwhile, when the decoded data of the information code acquired at S203 is "1234567890009", the decoded data does not match the expected value. Therefore, the reading apparatus 10 proceeds to NG and performs the process at S207.

Figure 18:
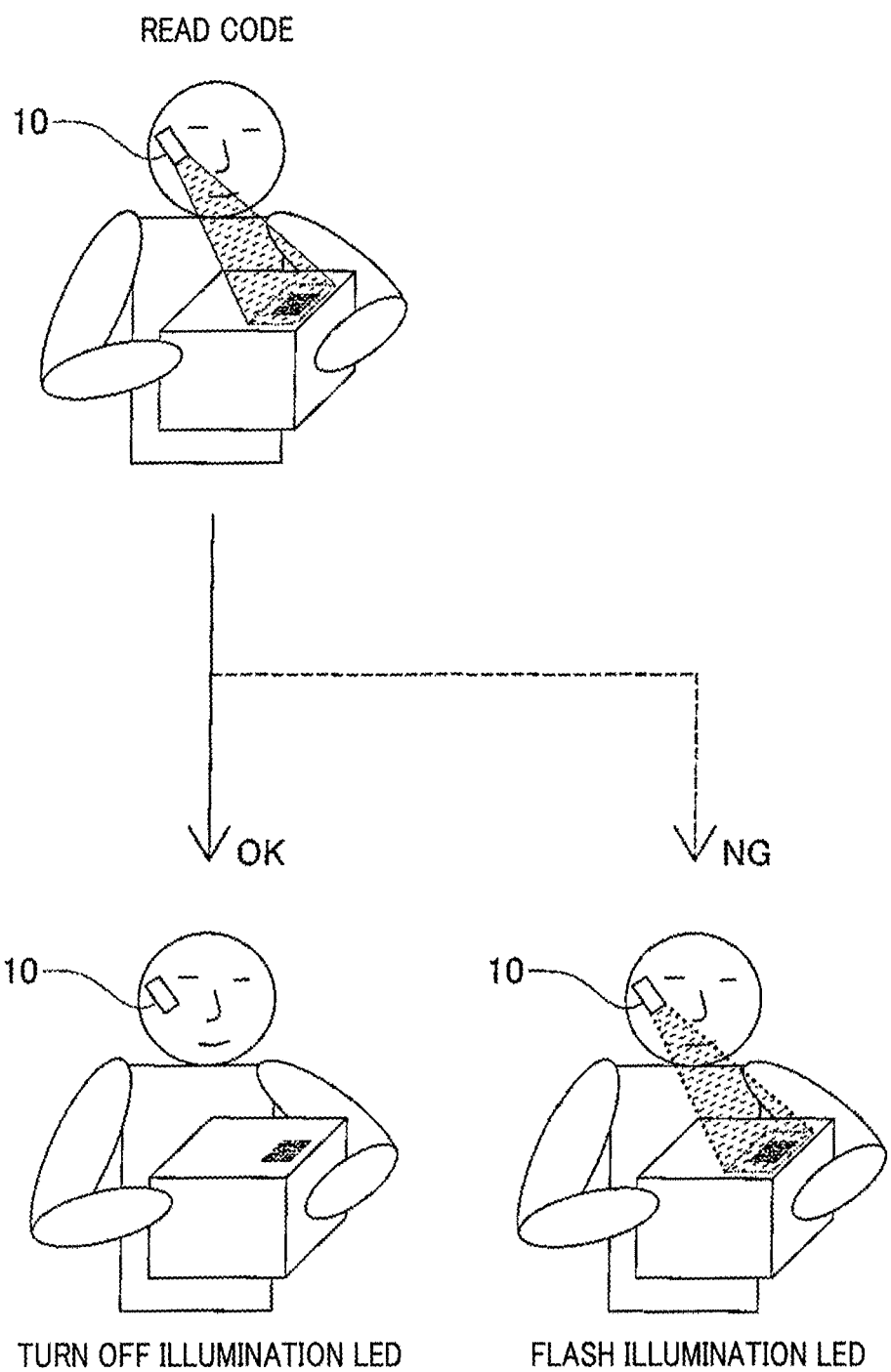
FIG. 18 is an explanatory diagram for conceptually explaining the reading performed by the portable information code reading apparatus according to the second embodiment.

When proceeding to OK at S205, at S206, the reading apparatus 10 turns off the illumination light from the illumination light source 21 that has been continuously irradiated since S201 (see the lower left drawing in FIG. 18). The illumination light being turned off in this way serves as an indication that the collation result is a match. Therefore, the user can know that the collation result is a match from the illumination light being turned off. Meanwhile, when proceeding to NG at S205, at S207, the reading apparatus 10 flashes the illumination light from the illumination light source 21 that has been continuously irradiated since S201 (see the lower right drawing in FIG. 18). The illumination light flashing in this way serves as an indication that the collation result is not a match. Therefore, the user can know that the collation result is not a match from the flashing of the illumination light.

In the present configuration, the illumination light source 21 corresponds to an example of a "light source". The illumination light source 21 is provided integrally with the case 12 and functions to irradiate light outside of the case 12. In addition, the imaging unit 23 corresponds to an example of an "imaging unit". The imaging unit 23 functions to perform imaging outside of the case 12 in a state in which light is being irradiated outside of the case 12 by the "light source". Furthermore, the control circuit 40 (FIG. 2) functionally corresponds to a "processing unit" and an "analyzing unit". The control circuit 40 functions to decode the data recorded in the information code imaged by the imaging unit 23. Specifically, the control circuit 40 functions to decode the code imaged by the imaging unit 23 in a state in which light is being irradiated outside of the case 12 by the "light source". Still further, the control circuit 40 functionally corresponds to an example of a "determining unit". The control circuit 40 functions to determine an instance in which the decoding result of the information code by the "decoding unit" indicates a predetermined successful state (in the above-described example, the decoded data acquired at S203 and the expected value stored in the memory 35 match), and an instance in which the decoding result indicates a predetermined failure state that is not the predetermined successful state (in the above-described example, the decoded data acquired at S203 and the expected value stored in the memory 35 do not match). In addition, the control circuit 40 functionally corresponds to an example of an "irradiation state control unit". The control circuit 40 functions to control the irradiation state of the light from the "light source" to a state based on the determination result from the "determining unit", after the "decoding unit" attempts to decode the information code. Specifically, the control circuit 40 performs control to set the time interval of the light-on time or the light-off time of the light from the "light source" when the "determining unit" determines a predetermined successful state to differ from the time interval of the light-on time or the light-off time of the light from the "light source" when the "determining unit" determines a predetermined failure state.

In the present configuration such as that described above as well, effects similar to those according to the first embodiment are achieved.

Furthermore, as a result of the present configuration, even in a state in which the case 12 is mounted on the body of the user and the user cannot easily directly see the case 12, the user can know the decoding results of an information code by the irradiation state of the light from the "light source".

In addition, notification of the decoding results of an information code can be given through use of the light source that is used during imaging by the imaging unit 23. Therefore, simplification of the apparatus configuration can be facilitated.

In addition, as a result of this configuration, notification of the decoding results of an information code can be given through adjustment of the light-on time or the light-off time of the light from the "light source". Therefore, load in terms of hardware can be reduced, and notification can be performed with easier control.

First Variation Example According to the Second Embodiment

Next, a first variation example according to the second embodiment will be described.

The reading apparatus 10 in the first variation example according to the second embodiment includes all of the features according to the first embodiment and has an additional feature. Therefore, the configurations shown in FIG. 1 to FIG. 11 are considered to be the same as those according to the first embodiment. Detailed descriptions thereof are omitted. FIG. 1 to FIG. 11 will be referenced as appropriate.

Figure 19:
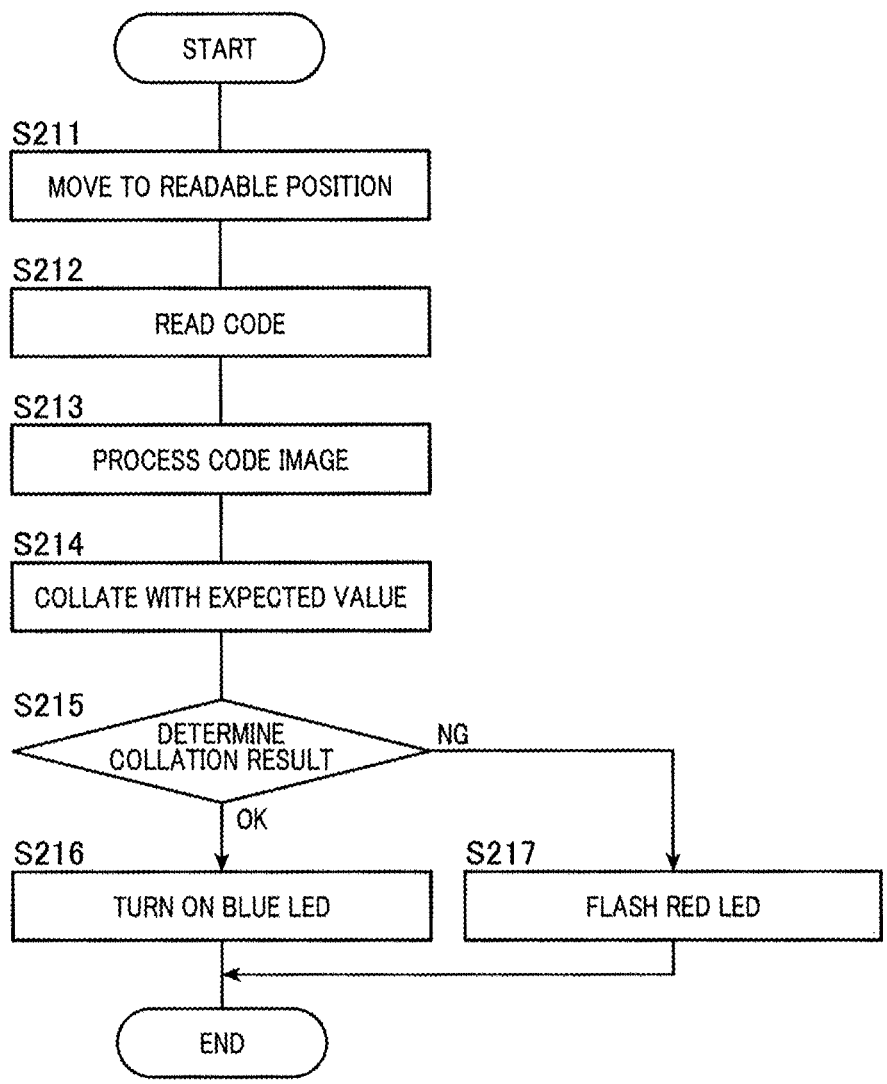
FIG. 19 is a flowchart of an example of the flow of the reading process performed by the portable information code reading apparatus in a first variation example according to the second embodiment.

In the first variation example as well, in addition to the configuration according to the first embodiment, a specific process performed during reading of an information code is added as a feature. Specifically, a reading process is performed based on a flow such as that in FIG. 19. The reading process in FIG. 19 is performed under a condition that a predetermined start condition is met. In accompaniment with the start of the process, a light-receiving sensor (imaging unit) 23 continuously images an imaging area set outside of the case (S211). At S211, while the illumination light source 21 (illumination light irradiating unit) shown in FIG. 2 irradiates the illumination light towards the imaging area, the light-receiving sensor 23 images the area irradiated by the illumination light (see the upper drawing in FIG. 20). When the information code enters the imaging area and the information code is imaged, the reading apparatus 10 analyzes the code image of the imaged information code (S212). At S212, the reading apparatus 10 attempts to perform a publically known decoding process on the code image of the information code. When the decoding process is successful, the reading apparatus 10 acquires the data recorded in the information code (S213). Then, the reading apparatus 10 collates the data acquired at S213 (the data recorded in the information code) with an expected value stored in the memory 35 (FIG. 2) in advance (S214). The reading apparatus 10 determines whether or not the data matches the expected value (S215).

In the present configuration as well, one or a plurality of expected values are registered in the memory 35 in advance. When determined that the decoded data acquired at S213 matches the expected value registered in the memory 35, the reading apparatus 10 proceeds to OK at S215. Conversely, when determined that the decoded data acquired at S213 does not match the expected value registered in the memory 35, the reading apparatus 10 proceeds to NG at S215. For example, as the expected value, a list of three model numbers, "1234567890001", "1234567890002", and "1234567890003", is stored in the memory 35. When the decoded data of the information code acquired at S213 is "1234567890001", the decoded data matches the expected value. Therefore, the reading apparatus 10 proceeds to OK at S215 and performs the process at S216. Meanwhile, when the decoded data of the information code acquired at S213 is "1234567890009", the decoded data does not match the expected value. Therefore, the reading apparatus 10 proceeds to NG and performs the process at S217.

When proceeding to OK at S215, at S216, the reading apparatus 10 turns off the illumination light from the illumination light source 21 that has been continuously irradiated since S211 and irradiates a blue (first color) light using a blue LED (not shown in FIG. 2) (see the lower left drawing in FIG. 20). The blue light being irradiated in this way serves as an indication that the collation result is a match. Therefore, the user can know that the collation result is a match from the blue light. Meanwhile, when proceeding to NG at S215, at S217, the reading apparatus 10 turns off the illumination light from the illumination light source 21 that has been continuously irradiated since S211 and irradiates a red (second color) light using a red LED (not shown in FIG. 2) (see the lower right drawing in FIG. 20). The red light being irradiated in this way in this way serves as an indication that the collation result is not a match. Therefore, the user can know that the collation result is not a match from the red light.

In the present configuration, the above-described blue LED and red LED correspond to an example of a "light source". The blue LED and the red LED are provided integrally with the case 12 and function to irradiate light outside of the case 12. In addition, the illumination light source 21 corresponds to an example of an "illumination light irradiating unit" and is configured as a separate light source from the above-described "light source". The illumination light source 21 functions to irradiate light towards the outside of the case. In addition, the imaging unit 23 corresponds to an example of an "imaging unit". The imaging unit 23 functions to perform imaging outside of the case 12 in a state in which light is being irradiated outside of the case 12 by the "illumination light irradiating unit". Furthermore, the control circuit 40 (FIG. 2) corresponds to a "processing unit" and an "analyzing unit". The control circuit 40 functions to decode the data recorded in the information code imaged by the imaging unit 23. Specifically, the control circuit 40 functions to decode the code imaged by the imaging unit 23 in a state in which light is being irradiated outside of the case 12 by the "illumination light irradiating unit". Still further, the control circuit 40 corresponds to an example of a "determining unit". The control circuit 40 functions to determine an instance in which the decoding result of the information code by the "decoding unit" indicates a predetermined successful state (in the above-described example, the decoded data acquired at S213 and the expected value stored in the memory 35 match), and an instance in which the decoding result indicates a predetermined failure state that is not the predetermined successful state (in the above-described example, the decoded data acquired at S213 and the expected value stored in the memory 35 do not match). In addition, the control circuit 40 corresponds to an example of an "irradiation state control unit". The control circuit 40 functions to control the irradiation states of the light from the blue LED and the red LED (light source) to states based on the determination result from the "determining unit", after the "decoding unit" attempts to decode the information code. Specifically, the control circuit 40 sets a first color irradiation state in which the blue (first color) light is irradiated from the blue LED and the red LED when the "determining unit" determines a predetermined successful state (in the above-described example, OK at S215), and sets a second color irradiation state in which the red (second color) light differing from the first color is irradiated from the blue LED and the red LED when the "determining unit" determines a predetermined failure state (in the above-described example, NG at S215).

In the present configuration such as that described above as well, effects similar to those according to the first embodiment are achieved. Furthermore, in the present configuration as well, the user can know the decoding results of an information code by the irradiation state of the light from the "light source". In addition, notification of the decoding results of an information code can be given through use of a light source differing from the light source (illumination light irradiating unit) that irradiates illumination light during imaging by the imaging unit. Therefore, a light source suitable for notification can be more freely selected.

Moreover, in this configuration, the notification color for the predetermined successful state and the notification color for the predetermined failure state differ. Therefore, each state can be known with further certainty.

Second Variation Example According to the Second Embodiment

Next, a second variation example according to the second embodiment will be described.

The reading apparatus 10 in the second variation example according to the second embodiment includes all of the features according to the first embodiment and has an additional feature. Therefore, the configurations shown in FIG. 1 to FIG. 11 are considered to be the same as those according to the first embodiment. Detailed descriptions thereof are omitted. FIG. 1 to FIG. 11 will be referenced as appropriate.

Figure 21:
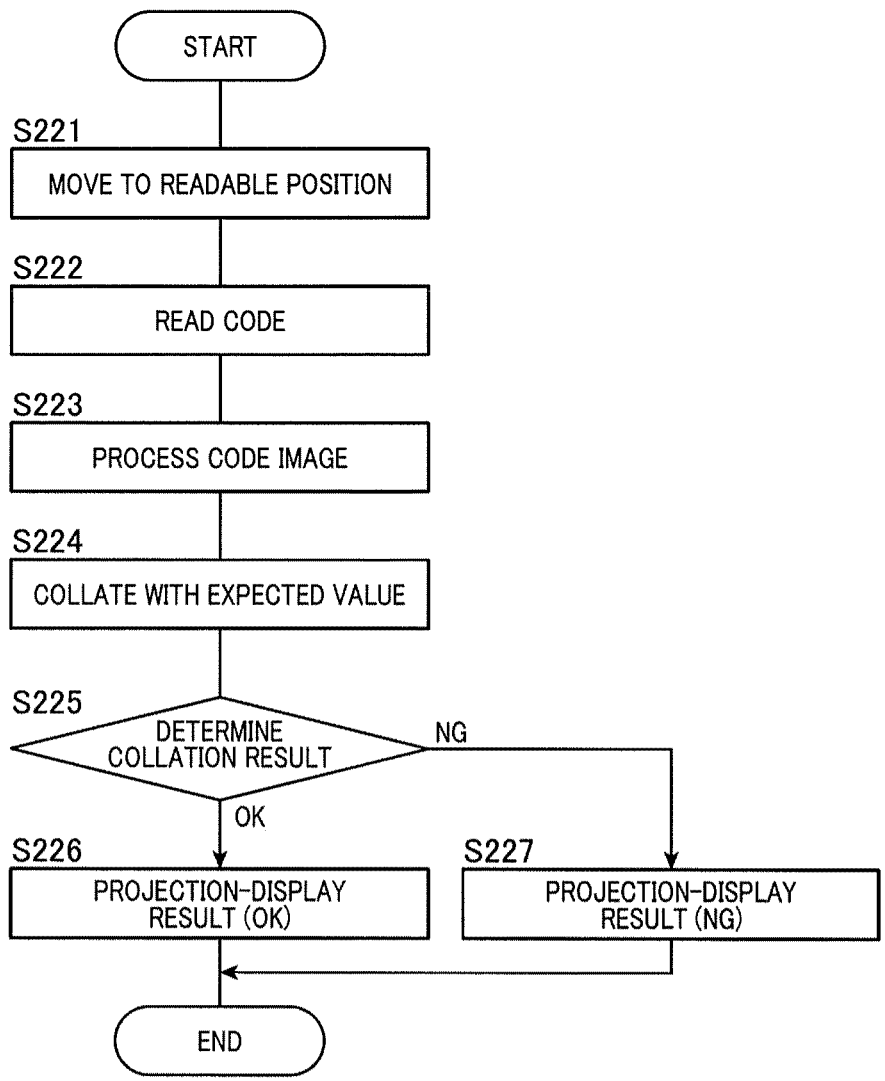
FIG. 21 is a flowchart of an example of the flow of the reading process performed by the portable information code reading apparatus in a second variation example according to the second embodiment.

In the second variation example as well, in addition to the configuration according to the first embodiment, a specific process performed during reading of an information code is added as a feature. Specifically, a reading process is performed based on a flow such as that in FIG. 21. The reading process in FIG. 21 is performed under a condition that a predetermined start condition is met. In accompaniment with the start of the process, a light-receiving sensor (imaging unit) 23 continuously images an imaging area set outside of the case (S221). At S221, while the illumination light source 21 (illumination light irradiating unit) shown in FIG. 2 irradiates the illumination light towards the imaging area, the light-receiving sensor 23 images the area irradiated by the illumination light (see the left drawing in FIG. 22(A). When the information code enters the imaging area and the information code is imaged, the reading apparatus 10 analyzes the code image of the imaged information code (S222). At S222, the reading apparatus 10 attempts to perform a publically known decoding process on the code image of the information code. When the decoding process is successful, the reading apparatus 10 acquires the data recorded in the information code (S223). Then, the reading apparatus 10 collates the data acquired at S223 (the data recorded in the information code) with an expected value stored in the memory 35 (FIG. 2) in advance (S224). The reading apparatus 10 determines whether or not the data matches the expected value (S225).

In the present configuration as well, one or a plurality of expected values are registered in the memory 35 in advance. When determined that the decoded data acquired at S223 matches the expected value registered in the memory 35, the reading apparatus 10 proceeds to OK at S225. Conversely, when determined that the decoded data acquired at S223 does not match the expected value registered in the memory 35, the reading apparatus 10 proceeds to NG at S225. For example, as the expected value, a list of three model numbers, "1234567890001", "1234567890002", and "1234567890003", is stored in the memory 35. When the decoded data of the information code acquired at S223 is "1234567890001", the decoded data matches the expected value. Therefore, the reading apparatus 10 proceeds to OK at S225 and performs the process at S226. Meanwhile, when the decoded data of the information code acquired at S223 is "1234567890009", the decoded data does not match the expected value. Therefore, the reading apparatus 10 proceeds to NG and performs the process at S227.

When proceeding to OK at S225, at S226, the reading apparatus 10 turns off the illumination light from the illumination light source 21 that has been continuously irradiated since S211. The reading apparatus 10 performs screen-display of text information (text information corresponding to the predetermined successful state) corresponding to S226 using a text information display unit (not shown in FIG. 2) (right drawing in FIG. 22(A)). Various publically known configurations can be used as the text information display unit as long as the device is capable of displaying text information on a screen. The text information displayed at S226 is, for example, information such as that shown in FIG. 22(B). In this example, the decoded data decoded at S223 and the information indicating that collation was successful at S224 (that is, information indicating that the decoded data decoded at S223 matches the expected value) are displayed as the text information. The information indicating that the collation was successful being displayed in this way serves as an indication that the collation result is a match. Therefore, the user can know that the collation result is a match from this information. Meanwhile, when proceeding to NG at S225, at S227, the reading apparatus 10 turns off the illumination light from the illumination light source 21 that has been continuously irradiated since S211. The reading apparatus 10 performs screen-display of text information (text information corresponding to the predetermined failure state) corresponding to S227 using the text information display unit (not shown in FIG. 2) (right drawing in FIG. 22(A)). The text information displayed at S227 is, for example, information such as that shown in FIG. 22(C). In this example, the decoded data decoded at S223 and the information indicating that collation was a failure at S224 (that is, information indicating that the decoded data decoded at S223 does not match the expected value) are displayed as the text information. The information indicating that the collation was a failure being displayed in this way serves as an indication that the collation result is not a match. Therefore, the user can know that the collation result is not a match from this information.

In the present configuration, the above-described text information display unit corresponds to an example of a "light source". The text information display unit is provided integrally with the case 12 and function to irradiate light outside of the case 12. In addition, the illumination light source 21 corresponds to an example of an "illumination light irradiating unit" and is configured as a separate light source from the above-described "light source". The illumination light source 21 functions to irradiate light towards the outside of the case. In addition, the imaging unit 23 corresponds to an example of an "imaging unit". The imaging unit 23 functions to perform imaging outside of the case 12 in a state in which light is being irradiated outside of the case 12 by the "illumination light irradiating unit". Furthermore, the control circuit 40 (FIG. 2) corresponds to a "processing unit"

and an "analyzing unit". The control circuit 40 functions to decode the data recorded in the information code imaged by the imaging unit 23. Specifically, the control circuit 40 functions to decode the code imaged by the imaging unit 23 in a state in which light is being irradiated outside of the case 12 by the "illumination light irradiating unit". Still further, the control circuit 40 corresponds to an example of a "determining unit". The control circuit 40 functions to determine an instance in which the decoding result of the information code by the "decoding unit" indicates a predetermined successful state (in the above-described example, the decoded data acquired at S213 and the expected value stored in the memory 35 match), and an instance in which the decoding result indicates a predetermined failure state that is not the predetermined successful state (in the above-described example, the decoded data acquired at S213 and the expected value stored in the memory 35 do not match). In addition, the control circuit 40 corresponds to an example of an "irradiation state control unit". The control circuit 40 functions to control the irradiation state of the light from the text information display unit (light source) to a state based on the determination result from the "determining unit", after the "decoding unit" attempts to decode the information code. Specifically, the control circuit 40 sets the illumination state of the light from the text information display unit (light source) to a first display state displaying predetermined information on an irradiation target that is irradiated with the light from the text information display unit (light source) when the "determining unit" determines either of the predetermined successful state and the predetermined failure state. The control circuit 40 sets the illumination state of the light from the text information display unit to an illumination state differing from the first display state when the "determining unit" determines the other of the predetermined successful state and the predetermined failure state.

In the present configuration such as that described above as well, effects similar to those according to the first embodiment are achieved. Furthermore, in the present configuration as well, the user can know the decoding results of an information code by the irradiation state of the light from the "light source". In addition, in the present configuration, information can be displayed outside of the apparatus at least when the predetermined successful state or the predetermined failure state occurs. Therefore, the user can more easily know specific information provided by the apparatus, even when the case cannot be easily viewed. For example, as in FIG. 22(B) and FIG. 22(C), first information corresponding to the predetermined successful state is displayed in the predetermined successful state. Second information corresponding to the predetermined failure state is displayed in the predetermined failure state. As a result, the user can more clearly and specifically know the decoding results from the information. Usefulness is further improved.

In the representative example and variation examples according to the second embodiment, a configuration in which the control circuit 40 is provided inside the case 12 and the control circuit 40 decodes the information code is given as an example. However, in any of the configurations of the representative example and the variation examples, a memory, a control circuit, and a communication unit similar to the memory 35, the control circuit 40, and the communication unit 48 may be provided in an information processing apparatus (external apparatus) that is communicably connected to an internal apparatus inside the case 12. The data of the image of the information code captured by the imaging unit 23 inside the case 12 may be transmitted to the external apparatus by the control circuit 40 and the communication unit 48 (FIG. 2). The data may be then be decoded by the control circuit of the external apparatus and collated with an expected value stored in the memory of the external apparatus. In this case, the control circuit 40 and the communication unit 48 inside the case 12 correspond to an example of the processing unit. The control circuit of the external apparatus corresponds to an example of an external processing unit, the decoding unit, and the determining unit. In this case, the control circuit and the communication unit of the external apparatus may transmit the collation result (determination result) to the case 12 side. The control circuit 4, which corresponds to the illumination state control unit, may then perform the process at S206 or S207 based on the collation result.

In the representative example and the variation examples according to the second embodiment, an instance in which the decoded data of the information code matches an expected value registered in advance is considered to be the "predetermined successful state". An instance in which the decoded data does not match the expected value is considered to be the "predetermined failure state". However, the present invention is not limited to this example. In any of the examples, an instance in which decoding of the information code is successful may be considered to be the "predetermined successful state". An instance in which the decoding of the information code has failed may be considered to be the "predetermined failure state". Alternatively, in any of the examples, when encrypted data is recorded in the information code, an instance in which decryption of the encrypted data recorded in the information code is successful may be considered to be the "predetermined successful state". An instance in which the decryption of the encrypted data recorded in the information code has failed may be considered to be the "predetermined failure state".

Third Embodiment

Next, a third embodiment will be described.

The portable information code reading apparatus 10 according to the third embodiment differs from that according to the first embodiment only in terms of form. The electrical configuration thereof is the same as that according to the first embodiment. Therefore, detailed descriptions of the electrical configuration will be omitted. FIG. 2 will be referenced as appropriate.

(Overall Configuration)

The portable information code reading apparatus 10 of the present configuration is mainly configured by an apparatus main body 311 and an attaching portion 360. The apparatus main body 311 includes an imaging unit 23 (see FIG. 2 and the like), a processing unit (control circuit 40 (FIG. 2)), and a case 312. The imaging unit 23 is capable of capturing an image of an information code 100. The processing unit processes the image of the information code 100 captured by the imaging unit 23. The case 12 holds the imaging unit 23 and the processing unit. In addition, the attaching portion 360 is also included that is provided as a component separate from the case 312. The attaching portion 360 attaches the imaging unit 23 to the user such that the field that the face of the user is facing is imaged. The attaching portion 360 has a flexible body mounting portion (mounting portion) 362 that is capable of flexible deformation, and a mounting portion 366 to which the case 312 is attached and detached. The attaching portion 360 is configured to be hooked onto the body of the user and functions to attach the case 312 to the ear of the user.

First, a configuration of the apparatus main body 311 will be described.

Figure 30:
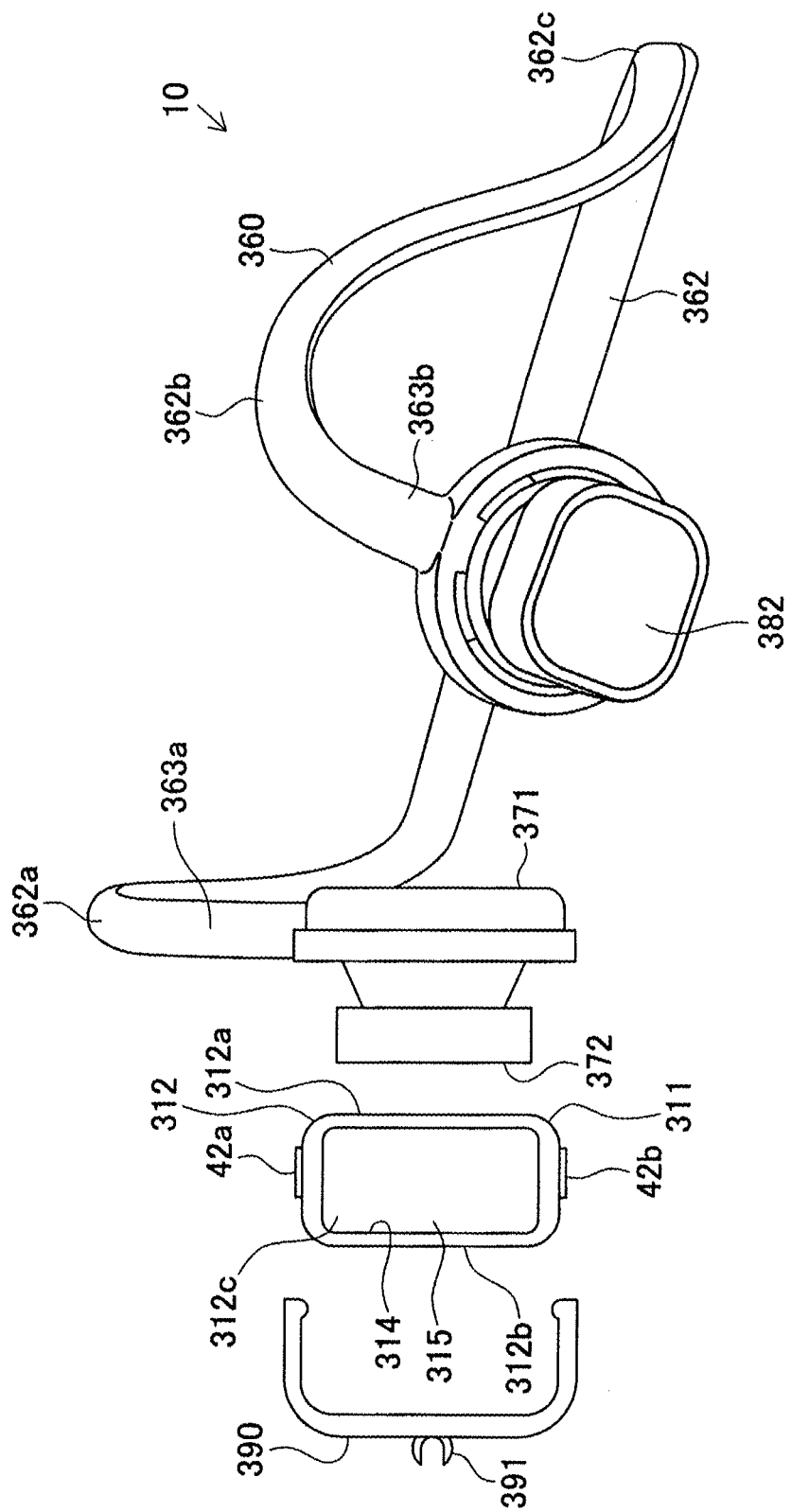
FIG. 30 is a perspective view of the apparatus main body and a holding member disassembled from the configuration in FIG. 25.
Figure 31:
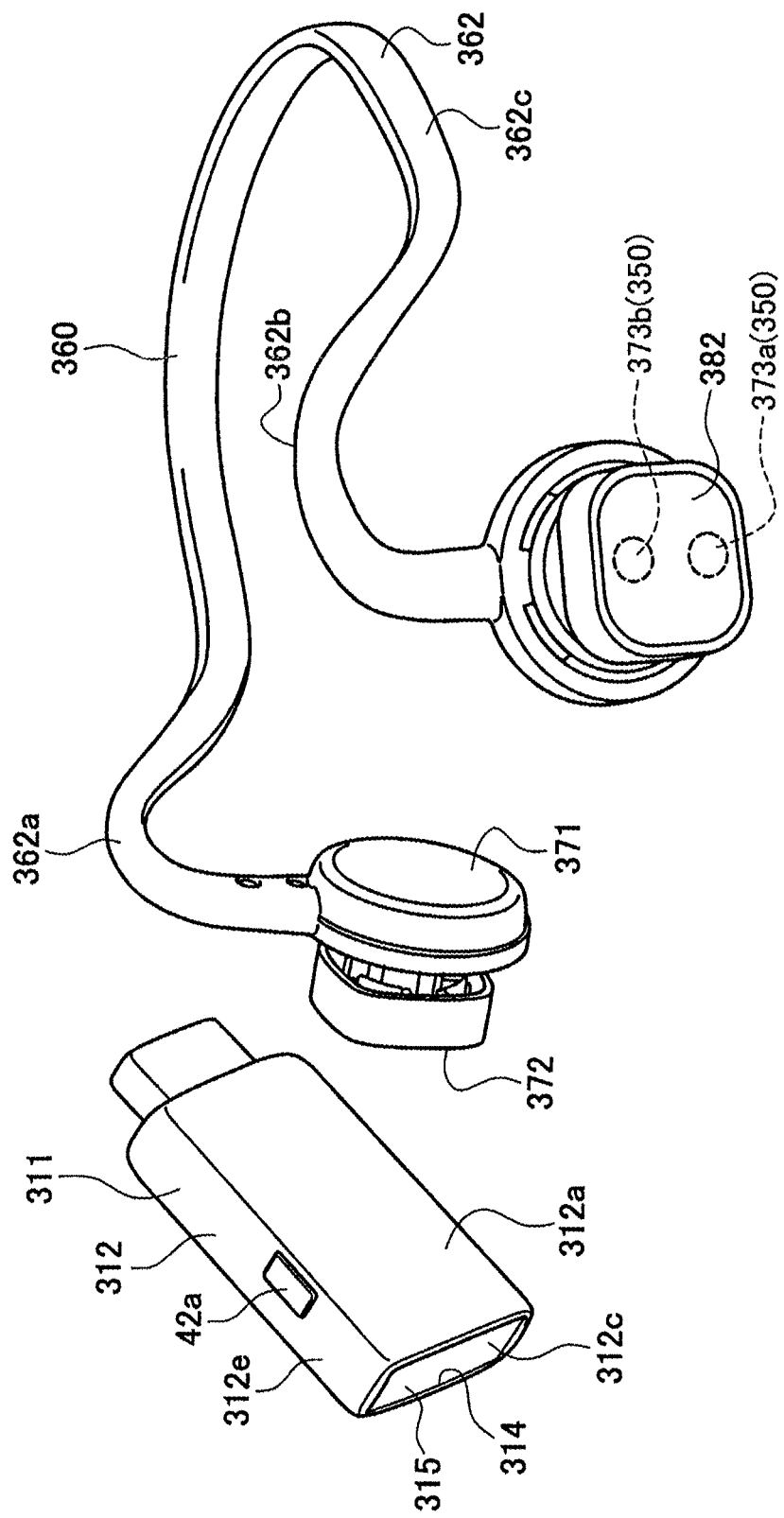
FIG. 31 is a simplified perspective view of a case detached from an attaching portion in the portable information code reading apparatus according to the third embodiment.

The apparatus main body 311 is configured such that various electronic components shown in FIG. 2 are housed inside the case 312. In the present configuration, the apparatus main body 311 can be mounted to the attaching portion 360 as shown in FIG. 23 to FIG. 28. The apparatus main body 311 can be detached as shown in FIG. 30 and FIG. 31.

Figure 33:
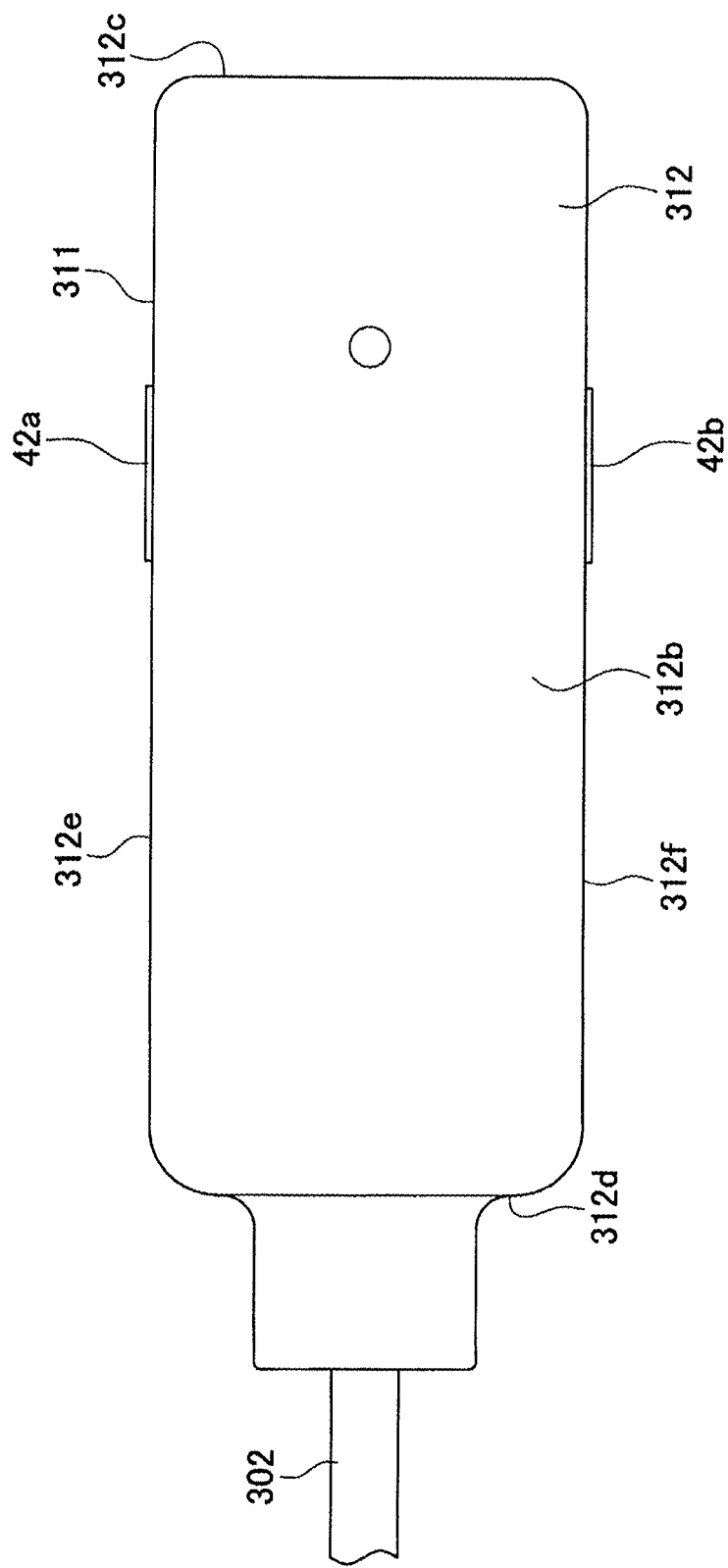
FIG. 33 is a side view showing an example of the apparatus main body, which is a portion of the portable information code reading apparatus according to the third embodiment.
Figure 34:
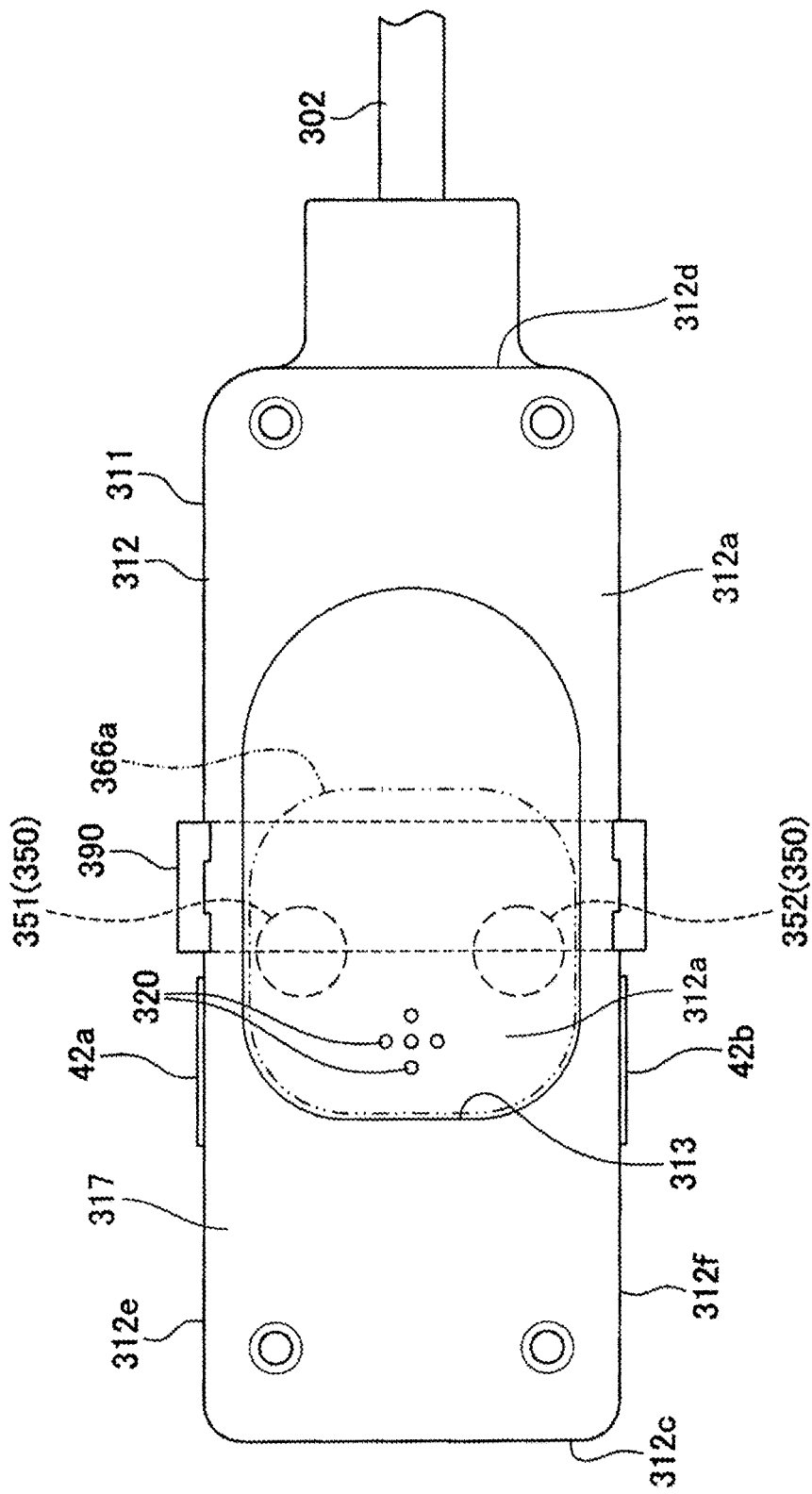
FIG. 34 is a side view of the apparatus main body in FIG. 33, viewed from the side opposite that in FIG. 33.
Figure 35:
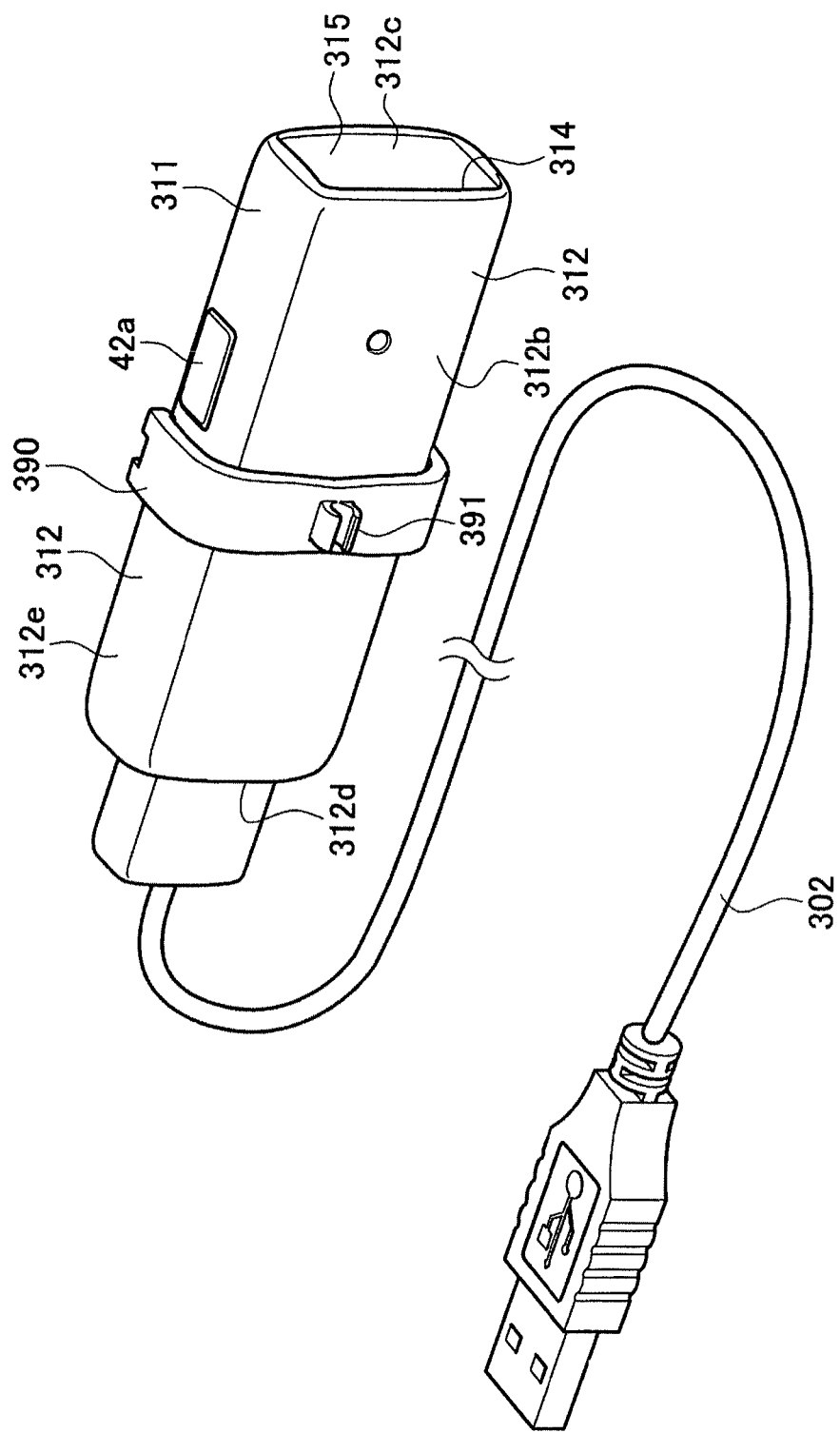
FIG. 35 is a perspective view showing an example of the apparatus main body in FIG. 33 and FIG. 34 connected to a cable.

As shown in FIG. 33 to FIG. 35 and the like, the case 312 is formed such as to be elongated and box-shaped, as a whole. In the present configuration, the front/back direction, the width direction (lateral direction), and the up/down direction of the apparatus main body 311 are prescribed as described below. First, the direction of the center of the visual range of the imaging unit 23 (the optical axis direction) is the front/back direction, and the longitudinal direction of the case 312 is the front/back direction. The thickness direction of the case 312 in the direction perpendicular to the front/back direction is the width direction (lateral direction), and the direction in which an opposing wall portion 312a of the case 312 and a wall portion on the side opposite the opposing wall portion 312a (the side wall portion 312b on the front side) face each other is the width direction (lateral direction). The direction perpendicular to the front/back direction and the width direction is the up/down direction. Hereafter, the front/back direction is described as being an X-axis direction. The up/down direction is described as being a Y-axis direction. The width direction (lateral direction) is described as being a Z-axis direction. The front direction is a positive X-axis direction. The back direction is a negative X-axis direction. Furthermore, the upward direction is a positive Y-axis direction. The downward direction is a negative Y-axis direction. The attaching portion 360 side when viewed from the case 312 side is a negative Z-axis direction. The side opposite the attaching portion 360 side is a positive Z-axis direction.

As shown in FIG. 31, and FIG. 33 to FIG. 35, based on the definitions given above, a front wall portion 312c is provided in the front end portion of the case 312. A back wall portion 312d is provided in the back end portion. Furthermore, a side wall portion (the opposing wall portion 312a) is provided on one side (the attaching portion 360 side) in the width direction (left/right direction). The side wall portion 312b on the front side is provided on the side opposite the one side. Furthermore, a wall portion 312e is provided in one end portion in the up/down direction, and a wall portion 312f is provided in the other end portion in the up/down direction. A housing portion is formed having a box-like configuration that is surrounded from the front/back, left/right, and up/down by the front wall portion, the back wall portion, the side wall portions, and the wall portions. The housing portion houses electronic components such as the imaging unit 23 and the control circuit 40.

In addition, in the present configuration, with reference to the face Fa of the user, the direction in which the face Fa faces is described as the front side of the face Fa, and the side of the back of the head is described as the back side of the face Fa.

Figure 23:
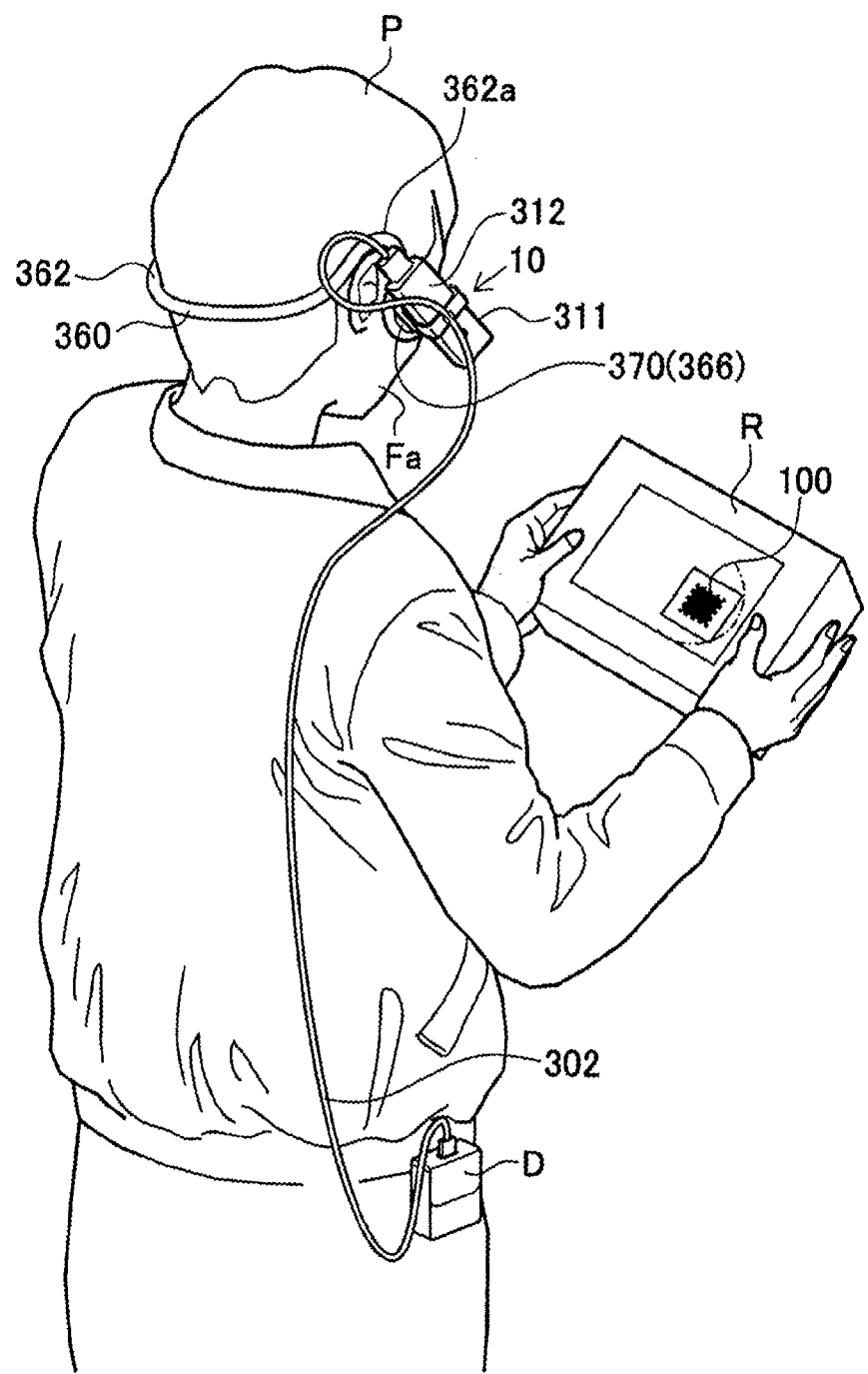
FIG. 23 is an explanatory diagram showing an example of a portable information code reading apparatus according to a third embodiment in use.
Figure 26:
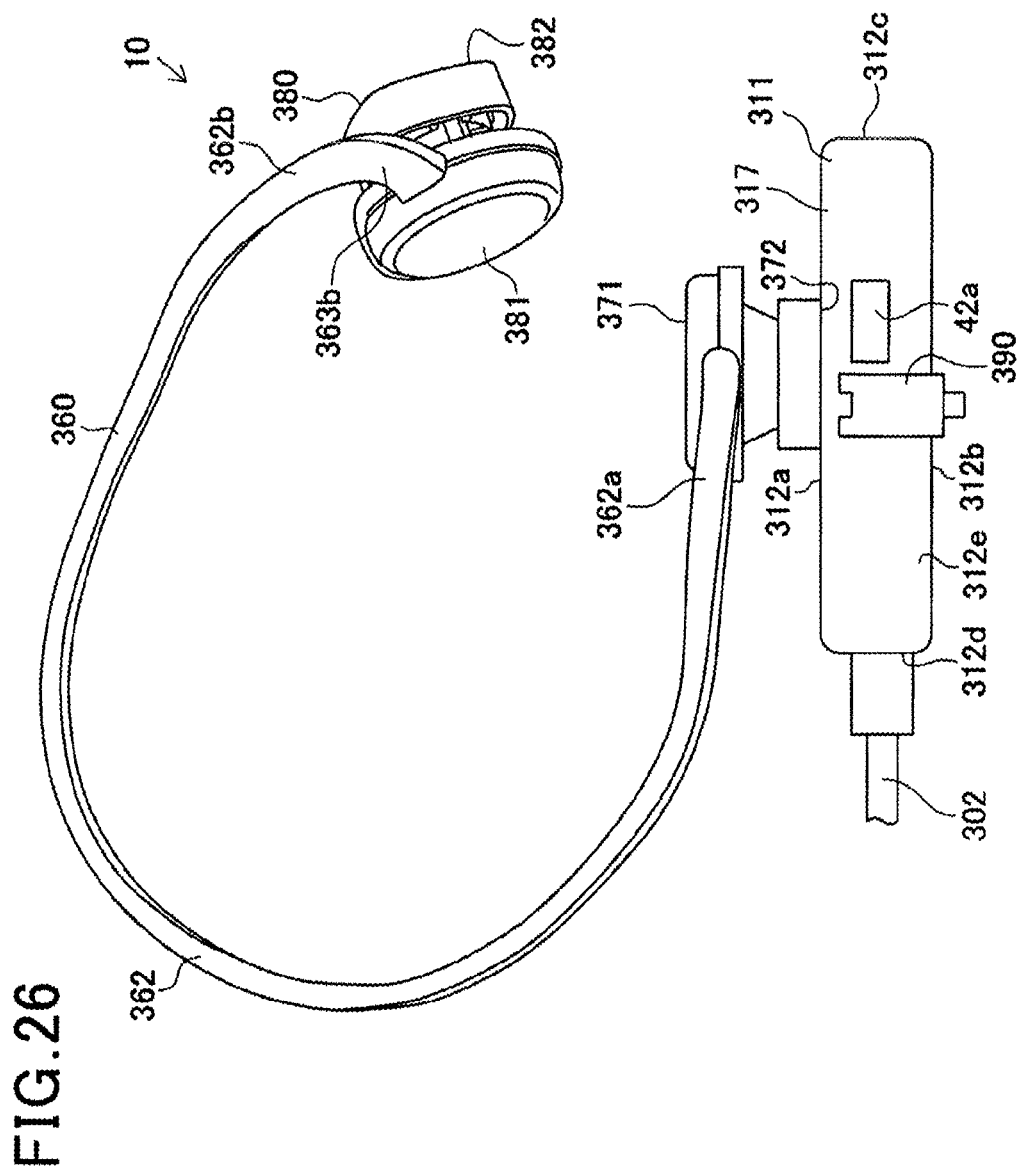
FIG. 26 is a perspective view of the portable information code reading apparatus according to the third embodiment, viewed from a direction differing from those in FIG. 24 and FIG. 25.
Figure 27:
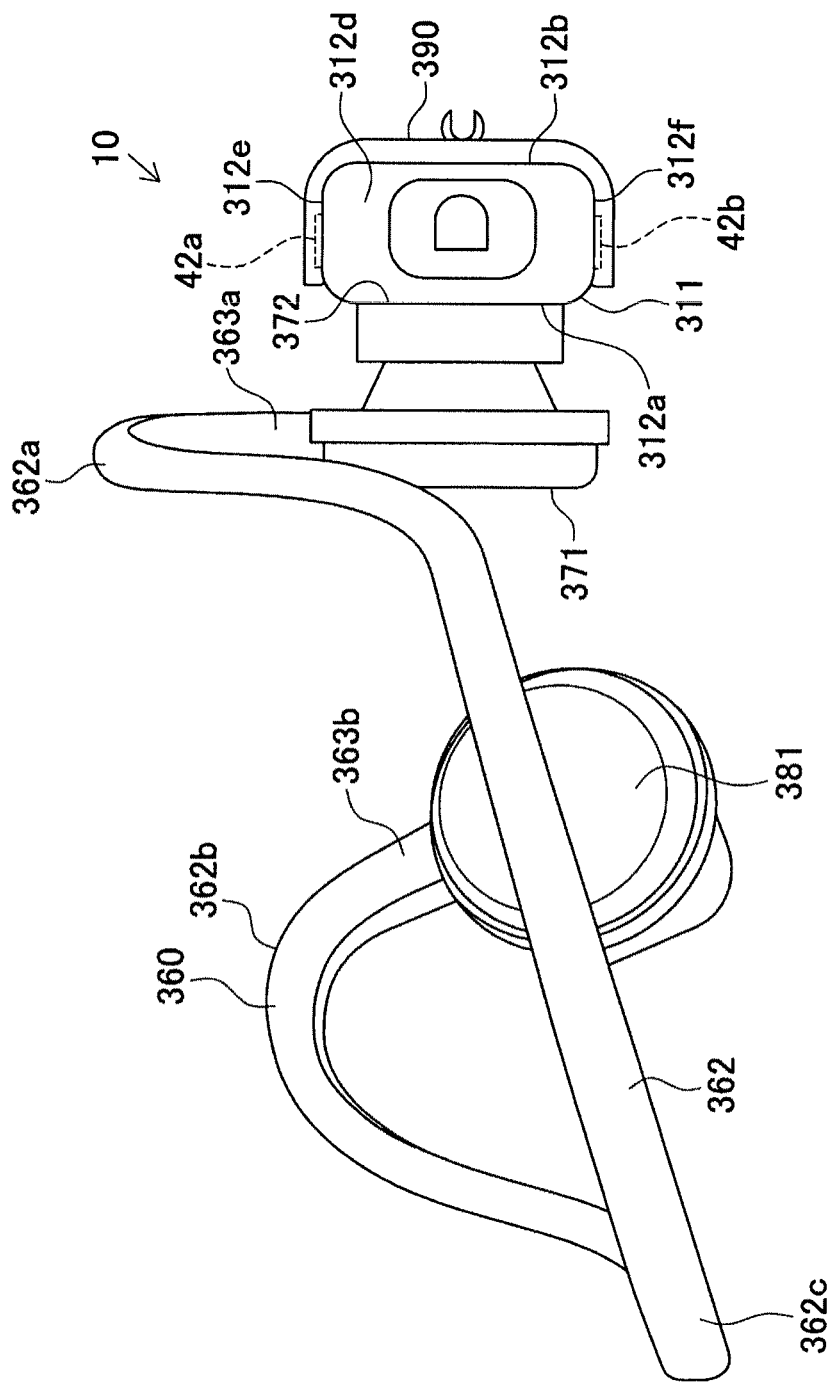
FIG. 27 is a perspective view of the portable information code reading apparatus according to the third embodiment, viewed from a direction differing from those in FIG. 24 to FIG. 26.
Figure 28:
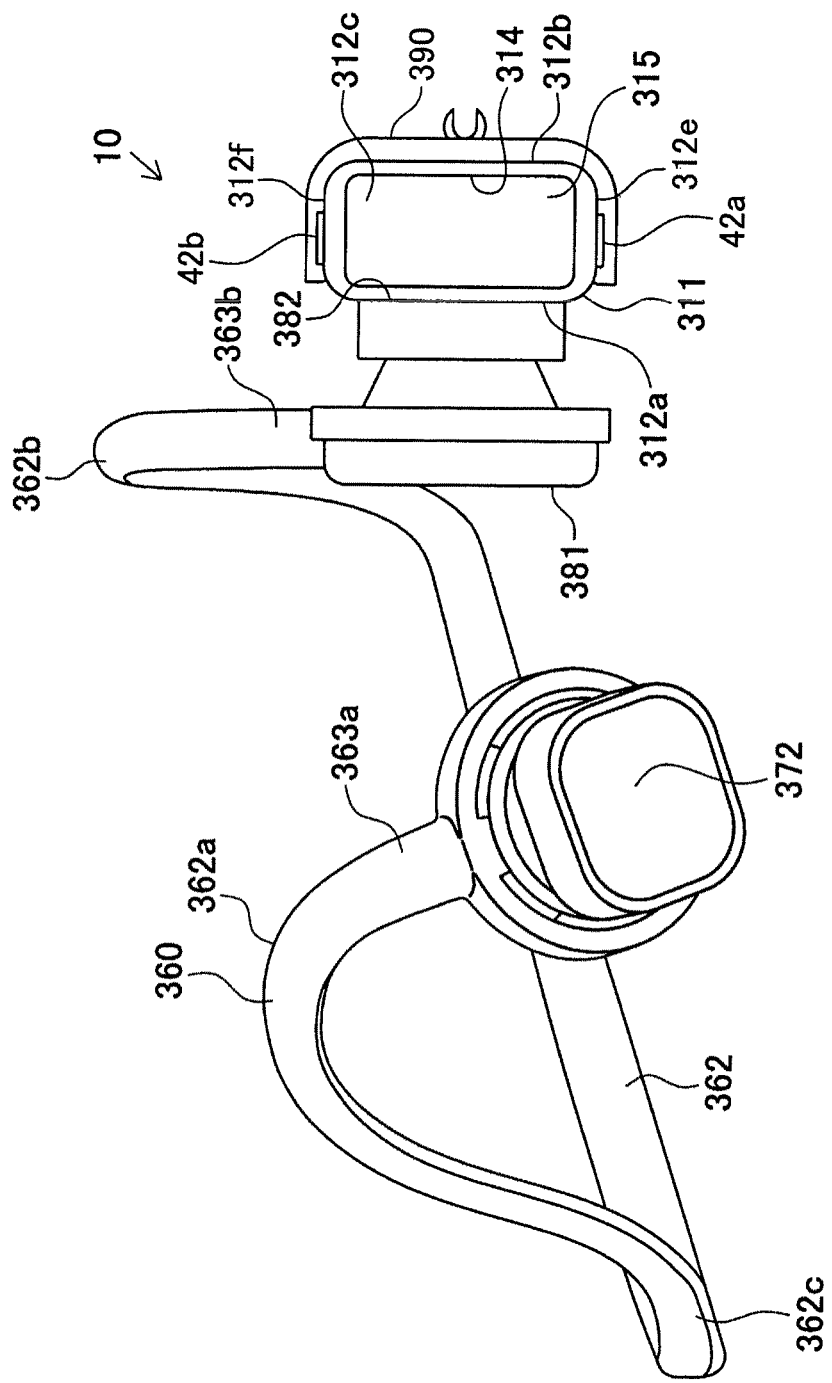
FIG. 28 is a perspective view of the portable information code reading apparatus according to the third embodiment, showing an example in which an apparatus main body is attached to a left-side mounting portion.
Figure 29:
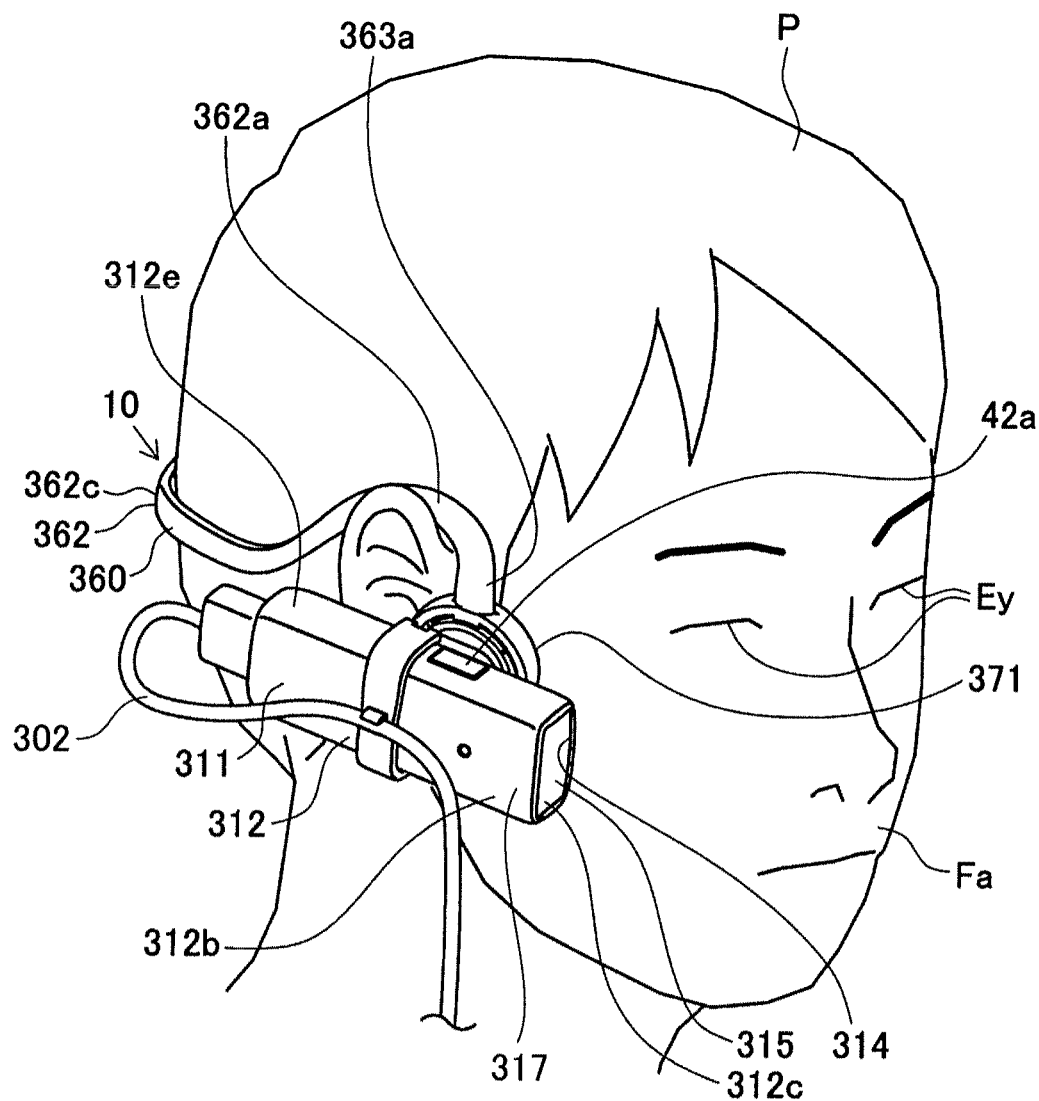
FIG. 29 is an explanatory diagram showing an example of the periphery of the face of a user on which the portable information code reading apparatus according to the third embodiment is mounted.

The case 312 is provided with a reading opening 314 into which the light from the information code can be introduced. A light transmissive cover member 314 is provided such as to cover the reading opening 314. In addition, as shown in FIG. 26, FIG. 29, and the like, the case 312 is provided with an extending portion that extends in a predetermined direction from the mounting position to the attaching portion 360 (a portion that extends to the front side from the portion in contact with the attaching portion 360). The reading opening 314 is provided towards the end portion on the side opposite the attaching portion 360 in the extending portion. The cover member 315 that covers the reading opening 314 is configured as the front wall portion 312c. As shown in FIG. 23 and FIG. 29, the attaching portion 360 is configured to attach the case 312 to the ear Ey of the user P such that the case 312 is disposed in a lateral position of the face Fa of the user and the reading opening 14 faces the field in front of the user P. In this way, the case 312 is attached by the attaching portion 360 such that the imaging unit 23 faces the same field as the field that the face of the user faces (i.e. the field in front of the face of the user).

Figure 48:
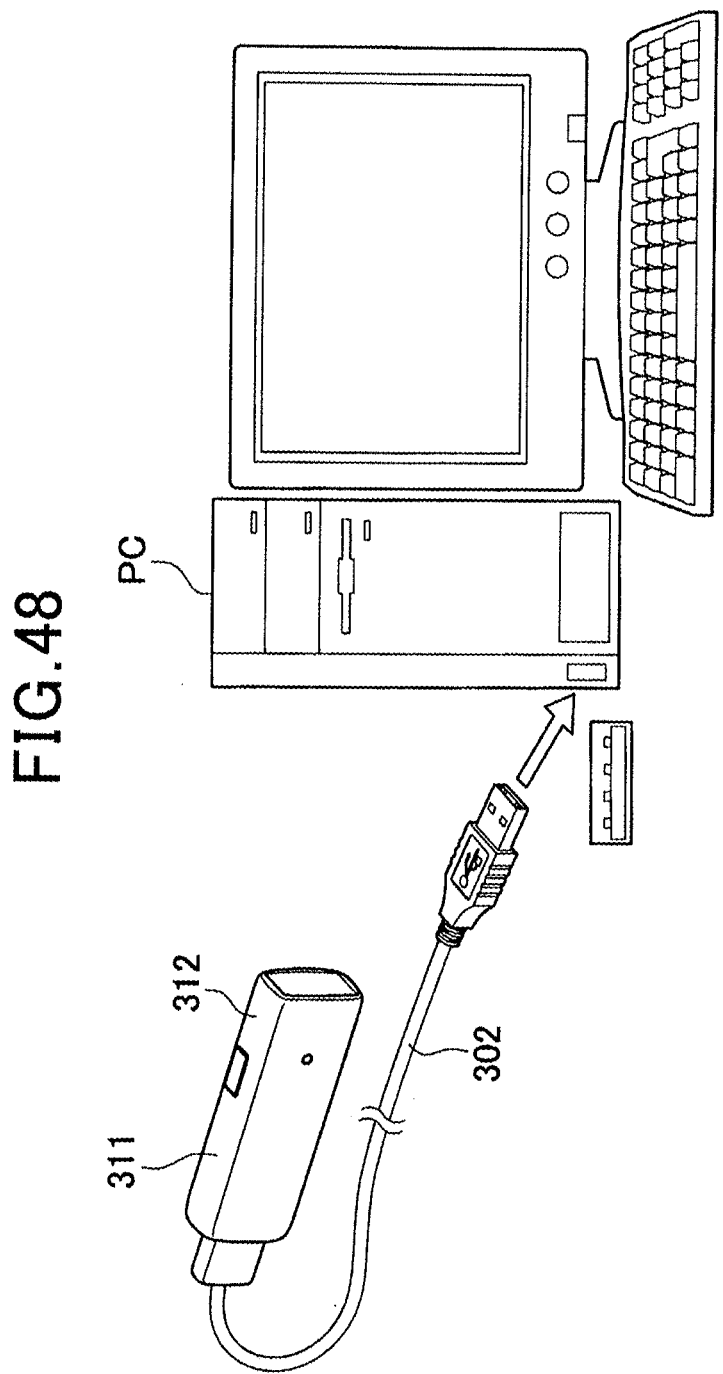
FIG. 48 is an explanatory diagram for explaining the connection of the apparatus main body to external equipment.

In addition, an operating switch 42a that can be externally operated is provided in the wall portion 312e on one side in the up/down direction in the case 312. An operating switch 42b that can be externally operated is provided in the wall portion 312f on the other side. The operating switch 42a functions as a trigger switch. The operating switch 42b functions as an operating switch other than the trigger switch. In the memory 35, setting information is stored that indicates setting (assignment) regarding the switch, of the operating switches 42a and 42b, that is set for the trigger function and the remaining switch that is set for a function other than the trigger function. The operating switches 42a and 42b operate based on the setting information. In addition, when the case 312 is connected to external equipment PC, such as a computer, as shown in FIG. 48, the setting information can be rewritten by the external equipment PC.

Figure 36:
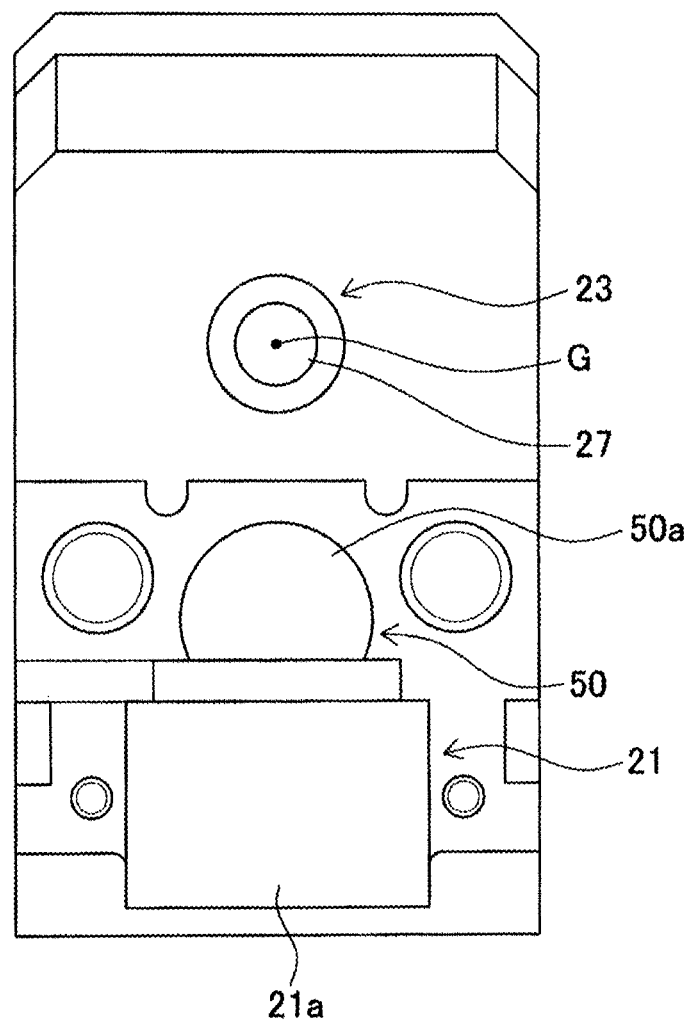
FIG. 36 is a diagram of components housed inside a case, viewed from the front side of the case, and showing an example of the configurations of an imaging unit, a lens, and the like housed inside the case.

In addition, the illumination light source 21 that irradiates an illumination light, the marker light irradiating unit 50 that irradiates a marker light, and the imaging unit 23 that images outside the case 312 are provided inside the case 312. The illumination light from the illumination light source 21 and the marker light from the marker light irradiating unit 50 are both irradiated towards the front side of the case 312 from the front wall portion 312c via the reading opening 314. In addition, in the present configuration, the imaging unit 23 and the lens 27 are disposed slightly above the center portion in the up/down direction. A light-receiving optical axis G is positioned slightly above the center portion in the up/down direction. In addition, the illumination light source 21 is disposed slightly below the center portion in the up/down direction. The marker light irradiating unit 50 is disposed between the illumination light source 21 and the imaging unit 23. As shown in FIG. 36, the lens 27, a lens 50a of the marker light irradiating unit 50, and a lens 21a of the illumination light source 21 are disposed in positions toward the front wall portion 312c. A positional relationship is established in which the lens 50a of the marker light irradiating unit 50 is closer to the lens 27 (light-receiving lens) than the lens 21a of the illumination light source 21. As a result, the path of the marker light can be brought closer to the light-receiving optical axis G.

Next, the attaching portion 360 will be described.

Figure 24:
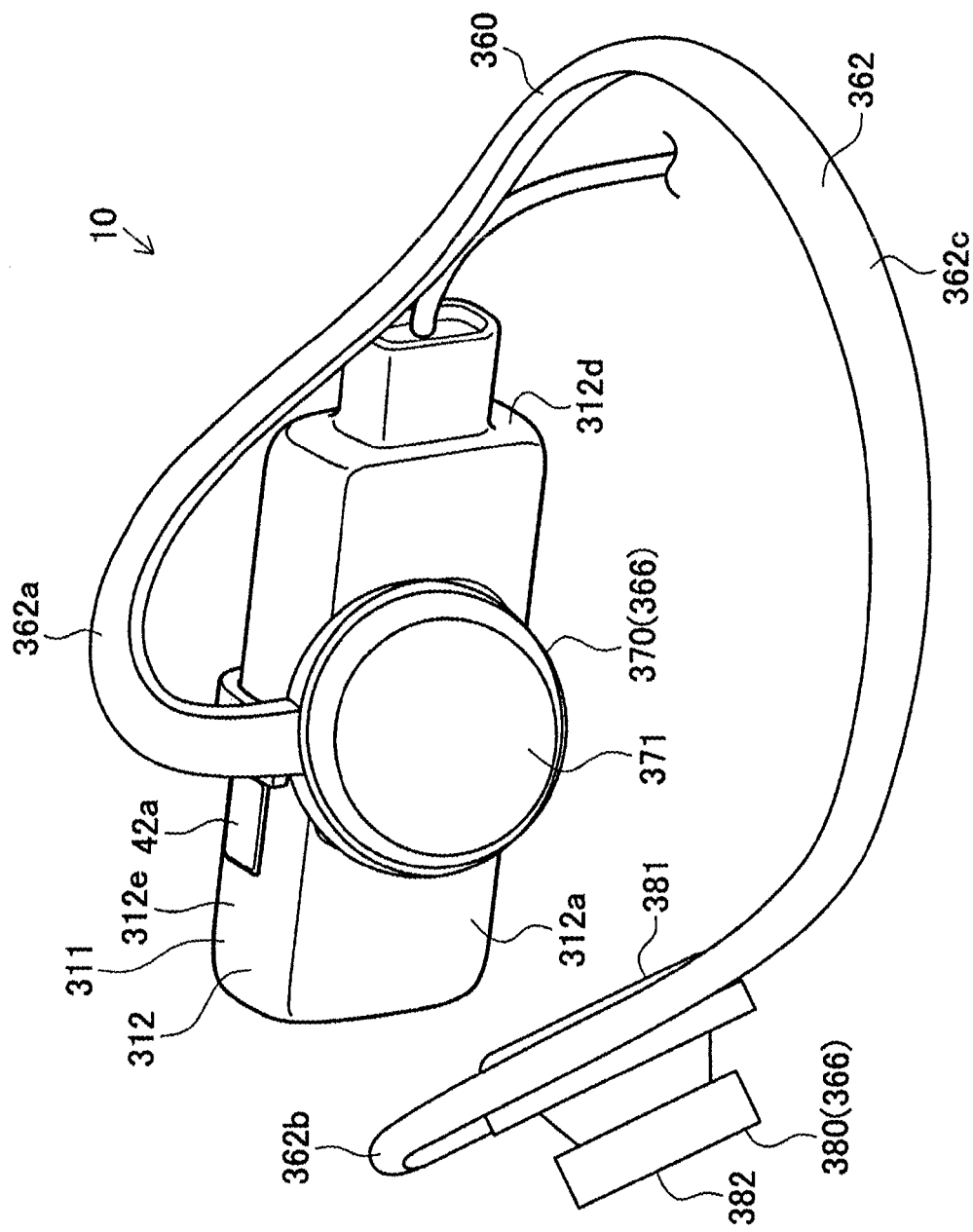
FIG. 24 is a perspective view schematically showing an example of the portable information code reading apparatus according to the third embodiment.
Figure 43:
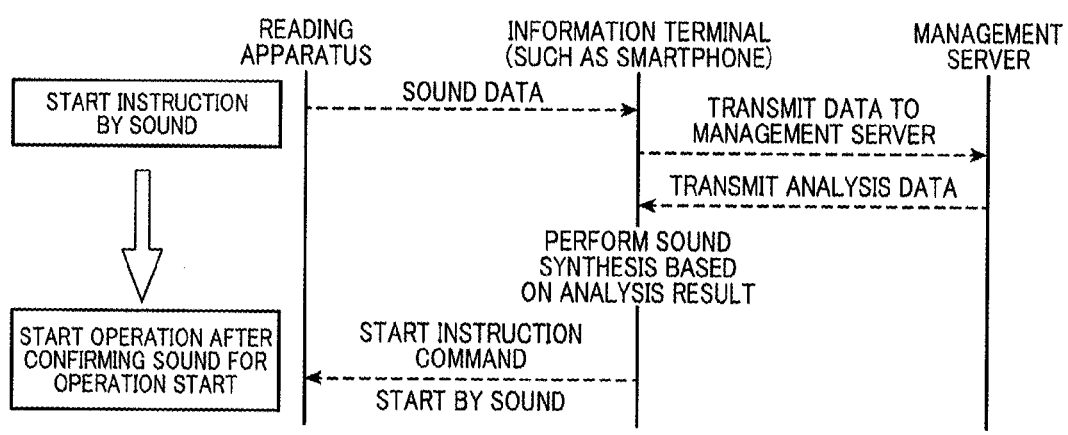
FIG. 43 is an explanatory diagram for explaining the flow of control in the portable information code reading apparatus according to the third embodiment.

As shown by the examples in FIG. 23 to FIG. 29, the attaching portion 360 includes the flexible body mounting portion (mounting portion) 362 that is capable of flexible deformation, and the mounting portion 366 to which the case 312 is attached and detached. The attaching portion 360 is provided as a component separate from the case 312. The attaching portion 360 is a portion that is hooked onto the body of the user and held by the body. Specifically, the attaching portion 360 is hooked onto a part of the body that protrudes based on the structure of the body, in a section from the neck and above of the user (both ear portions in the example below). The attaching portion 360 is thereby held by the body and positioned in a predetermined position on the body. As shown in FIG. 23, FIG. 24, FIG. 43, and the like, the attaching portion 360 attaches the case 312 to at least the ear Ey of the user such that the case 312 is positioned in a lateral position of the face Fa of the user and the reading opening 314 faces the field in front of the face Fa of the user.

The body mounting portion 362 is a portion that is mounted such that at least a portion thereof is in direct contact with the user. Specifically, the body mounting portion 362 is configured as ear hook portions that are hooked onto both ears of the user. As shown in FIG. 24 to FIG. 28, the body mounting portion is configured such that a predetermined shape is retained in a natural state when mounted, that is, when the body mounting portion 362 is not attached to the user. The body mounting portion 362 is capable of elastic deformation, and has a flexible structure. The body mounting portion 362 is configured such that the two end portions thereof are respectively connected to a right-side mounting portion 370 and a left-side mounting portion 380, described hereafter. The body mounting portion 362 is substantially U-shaped, as a whole. The body mounting portion 362 is provided with a right-ear attaching portion (right-ear hook portion) 362a, a left-ear attaching portion (left-ear hook portion) 362b, and an intermediate connecting portion 362c. The right-ear attaching portion 362a is formed into a curve at an adjacent position towards the right-side mounting portion 370 such as to protrude upwards when mounted on the user. The left-ear attaching portion 362b is formed apart from the right-ear attaching portion 362a and is formed into a curve at an adjacent position towards the left-side mounting portion 370 such as to protrude upwards. The intermediate connecting portion 362c connects the right-ear attaching portion 362a and the left-ear attaching portion 362b. As shown in FIG. 23 and the like, the intermediate connecting portion 362c is a portion that wraps around the user such as to be placed against the back of the head or the neck, when mounted such that the attaching portion 360 is hooked onto the ears of the user.

The mounting portion 366 has a right-side mounting portion 370 and a left-side mounting portion 380. The right-side mounting portion 370 is disposed on the right side of the face of the user and can be detached from the case. The left-side mounting portion 380 is disposed on the left side of the face of the user and can be detached from the case. In the present configuration, in the body mounting portion 362, a front-side extending portion 363a extends to the front side (the side opposite the intermediate connecting portion 362c) from the right-ear attaching portion 362a that is hooked onto the right ear of the user and supported by the right ear (the right-ear attaching portion 362a corresponds to an example of a supported portion). The right-side mounting portion 370 is connected to the tip end portion of the front-side extending portion 363a in the body mounting portion 362 and functions as a holding portion that holds the case 312. In this configuration, when the attaching portion 360 is attached to the user as shown in FIG. 23 and FIG. 29, the front-side extending portion 363a is disposed such as to extend further to the front side than the right-ear attaching portion 362a (supported portion). The right-side mounting portion 370 (holding portion) is disposed in a position further to the front than the earhole of the right ear of the user that supports the right-ear attaching portion 362a (supported portion).

The right-side mounting portion 370 (holding portion) includes a back surface portion 371 and a front surface portion 372, as shown in FIG. 23 and FIG. 29. The back surface portion 371 is supported such as to oppose the face of the user in a position further to the front than the earhole of the right ear when mounted on the body. The front surface portion 372 is disposed on the side opposite the back surface portion 371. The back surface portion 371 and the front surface portion 372 are both configured to have a flat outer surface. For example, the outer surface of the back surface portion 371 (the surface supported by the face of the user) and the outer surface of the front surface portion 372 (the surface that is in contact with the case 312 when the case 312 is attached) are substantially parallel. The thickness between the back surface portion 371 and the front surface portion 372 is greater than the thickness of the right-ear attaching portion (right-ear hook portion) 362a. As shown in FIG. 26 and the like, the front surface 372 side protrudes further to the side than the right-ear attaching portion (right-ear hook portion) 362a. As a result of the right-side mounting portion 370 configured in this way, the case 312 is held by the front surface portion 372. The holding structure will be described in detail hereafter.

Figure 25:
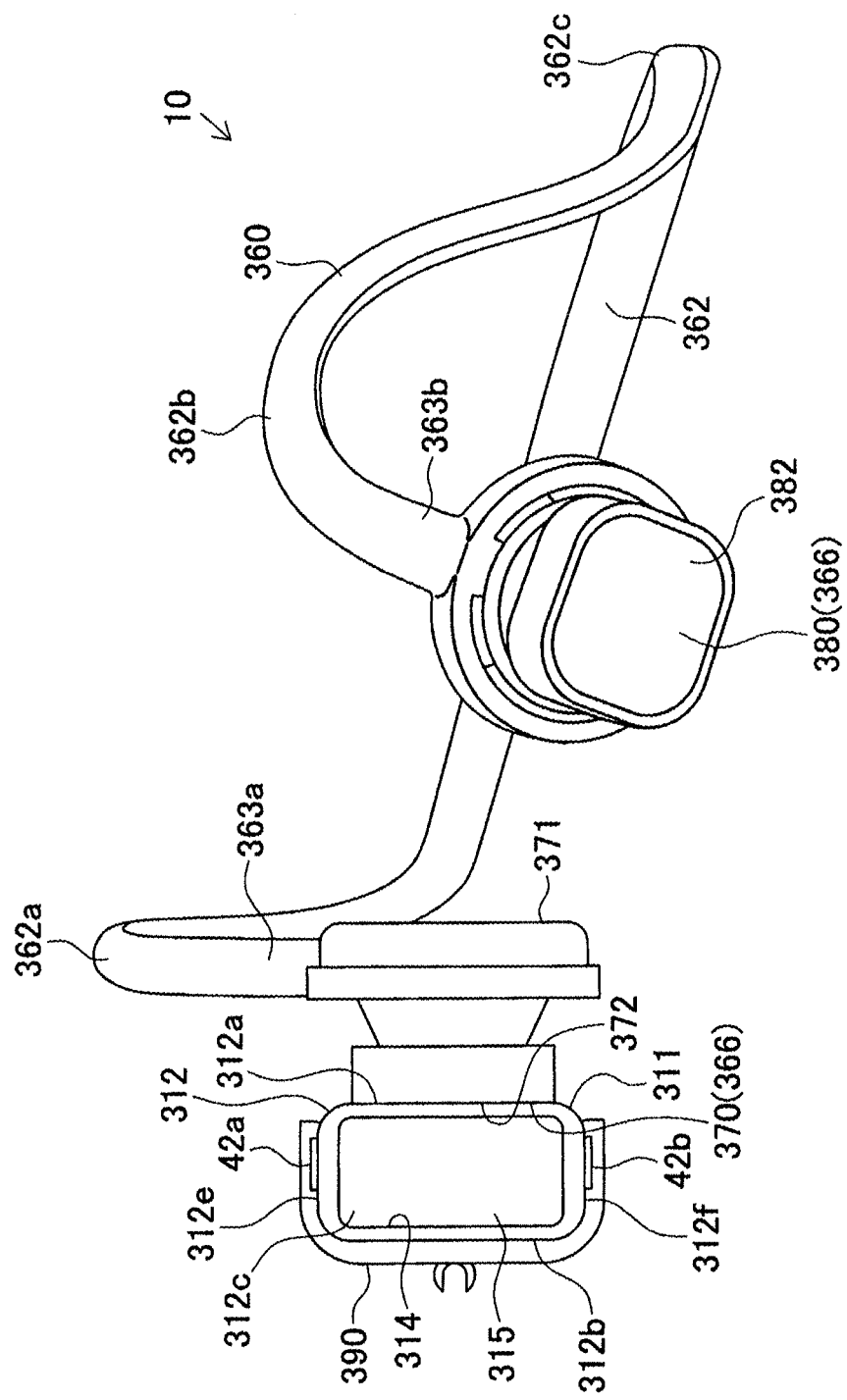
FIG. 25 is a perspective view of the portable information code reading apparatus according to the third embodiment, viewed from a direction differing from that in FIG. 24.

As shown in FIG. 25 and the like, in a manner similar to that on the right side, in the body mounting portion 362, a front-side extending portion 363b extends to the front side (the side opposite the intermediate connecting portion 362c) from the left-ear attaching portion 362b that is hooked onto the left ear of the user and supported by the left ear (the left-ear attaching portion 362b corresponds to an example of a supported portion). The left-side mounting portion 380 is connected to the tip end portion of the front-side extending portion 363b in the body mounting portion 362 and functions as a holding portion that holds the case 312. In this configuration, when the attaching portion 360 is attached to the user as shown in FIG. 23, FIG. 29, FIG. 44, and FIG. 46, the front-side extending portion 363b is disposed such as to extend further to the front side than the left-ear attaching portion 362b (supported portion). The left-side mounting portion 380 (holding portion) is disposed in a position further to the front than the earhole of the left ear of the user that supports the left-ear attaching portion 362b (supported portion).

The left-side mounting portion 380 (holding portion) includes a back surface portion 381 and a front surface portion 382, as shown in FIG. 23, FIG. 29, FIG. 44, and FIG. 46. The back surface portion 381 is supported such as to oppose the face of the user in a position further to the front than the earhole of the left ear when mounted on the body. The front surface portion 382 is disposed on the side opposite the back surface portion 381. The back surface portion 381 and the front surface portion 382 are both configured to have a flat outer surface. For example, the outer surface of the back surface portion 381 (the surface supported by the face of the user) and the outer surface of the front surface portion 382 (the surface that is in contact with the case 312 when the case 312 is attached) are substantially parallel. The thickness between the back surface portion 381 and the front surface portion 382 is greater than the thickness of the left-ear attaching portion (left-ear hook portion) 362b. As shown in FIG. 24 and the like, the front surface 382 side protrudes further to the side than the left-ear attaching portion (left-ear hook portion) 362a. As a result of the left-side mounting portion 380 configured in this way, the case 312 is held by the front surface portion 382. The holding structure will be described in detail hereafter.

Figure 32:
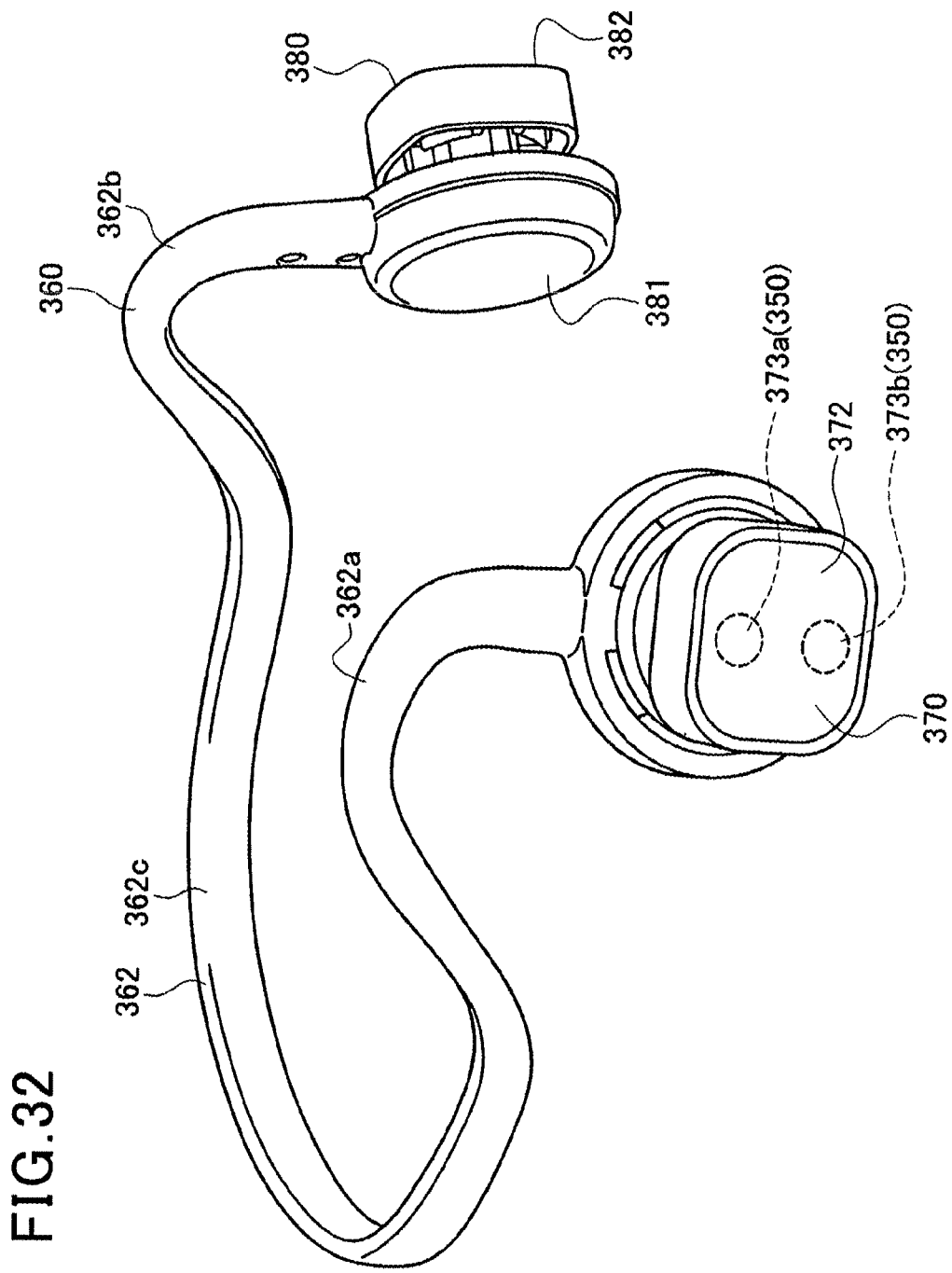
FIG. 32 is a perspective view showing an example of the attaching portion, which is a portion of the portable information code reading apparatus according to the third embodiment.

As shown in FIG. 31, FIG. 32, and FIG. 34, a guide portion 350 detachably connects the case 312 to each mounting portion 366 provided in the attaching portion 360. The guide portion 350 functions to guide the posture of the case 312 in relation to each mounting portion 366 to a predetermined posture during connection. The guide portion 350 includes two case-side connecting portions (a first case-side connecting portion 351 and a second case-side connecting portion 352) provided on the case 312 side, at least two right-side connecting portions (a first right-side connecting portion 373a and a second right-side connecting portion 373b) provided on the right-side mounting portion 370 side, and at least two left-side connecting portions (a first left-side connecting portion 383a and a second left-side connecting portion 383b) provided on the left-side mounting portion 380 side. As a result of the at least two case-side connecting portions (the first case-side connecting portion 351 and the second case-side connecting portion 352) and the at least two right-side connecting portions (the first right-side connecting portion 373a and the second right-side connecting portion 373b) being respectively connected, the case 312 is connected to the right-side mounting portion 370. As a result of the at least two case-side connecting portions (the first case-side connecting portion 351 and the second case-side connecting portion 352) and the at least two left-side connecting portions (the first left-side connecting portion 383a and the second left-side connecting portion 383b) being respectively connected, the case 312 is connected to the left-side mounting portion (the first left-side connecting portion 383a and the second left-side connecting portion 383b).

As shown in FIG. 31, FIG. 32, and FIG. 34, in the present configuration, the two case-side connecting portions (the first case-side connecting portion 351 and the second case-side connecting portion 352) and the two right-side connecting portions (the first right-side connecting portion 373a and the second right-side connecting portion 373b) correspond to a first guide portion. The two case-side connecting portions (the first case-side connecting portion 351 and the second case-side connecting portion 352) and the two right-side connecting portions (the first right-side connecting portion 373a and the second right-side connecting portion 373b) detachably connect the case 312 to the right-side mounting portion 370, and guides the posture of the case 312 in relation to the right-side mounting portion 370 to a first predetermined posture when the case 312 is connected to the right-side mounting portion 370. In addition, the two case-side connecting portions (the first case-side connecting portion 351 and the second case-side connecting portion 352) and the two left-side connecting portions (the first left-side connecting portion 383a and the second left-side connecting portion 383b) correspond to a second guide portion. The two case-side connecting portions (the first case-side connecting portion 351 and the second case-side connecting portion 352) and the two left-side connecting portions (the first left-side connecting portion 383a and the second left-side connecting portion 383b) detachably connect the case 312 to the left-side mounting portion 380, and guides the posture of the case 312 in relation to the left-side mounting portion 380 to a second predetermined posture when the case 312 is connected to the left-side mounting portion 380.

As shown in FIG. 31, FIG. 32, and FIG. 34, in the present configuration, the first case-side connecting portion 351 that is configured as a permanent magnet and the second case-side connecting portion 352 that is configured as a permanent magnet are provided as the two case-side connecting portions. In addition, the first right-side connecting portion 373a that is configured as a permanent magnet and the second right-side connecting portion 373b that is configured as a permanent magnet are provided as the two right-side connecting portions. The first left-side connecting portion 383a that is configured as a permanent magnet and the second left-side connecting portion 383b that is configured as a permanent magnet are provided as the two left-side connecting portions The polarity of the first case-side connecting portion 351 differs from those of the first right-side connecting portion 373a and the first left-side connecting portion 383a, and is the same as those of the second right-side connecting portion 373b and the second left-side connecting portion 383b. The polarity of the second case-side connecting portion 352 differs from those of the second right-side connecting portion 373b and the second left-side connecting portion 383b and is the same as those of the first right-side connecting portion 373a and the first left-side connecting portion 383a.

In this configuration, the polarities differ between the first case-side connecting portion 351 and the first right-side connecting portion 373a. The first case-side connecting portion 351 and the first right-side connecting portion 373a are connected such as to be attracted to each other. For example, the first case-side connecting portion 351 is configured as a permanent magnet of which the surface portion is the N pole. The first right-side connecting portion 373a is configured as a permanent magnet of which the surface portion is the S pole. The first case-side connecting portion 351 and the first right-side connecting portion 373a are attracted to each other when the respective surface portions oppose each other. In addition, the polarities differ between the second case-side connecting portion 352 and the second right-side connecting portion 373b. The second case-side connecting portion 352 and the second right-side connecting portion 373b are connected such as to be attracted to each other. For example, the second case-side connecting portion 352 is configured as a permanent magnet of which the surface portion is the S pole. The second right-side connecting portion 373b is configured as a permanent magnet of which the surface portion is the N pole. The second case-side connecting portion 352 and the second right-side connecting portion 373b are attracted to each other when the respective surface portions oppose each other.

Furthermore, the first case-side connecting portion 351 and the second right-side connecting portion 373b have the same polarity. The second case-side connecting portion 352 and the first right-side connecting portion 373a have the same polarity. In the example described above, the surface portion of the first case-side connecting portion 351 is configured to be the N pole. The surface portion of the second right-side connecting portion 373b is also configured to be the N pole. Therefore, the first case-side connecting portion 351 and the second right-side connecting portion 373b repel each other when the respective surface portions oppose each other. In addition, the surface portion of the second case-side connecting portion 352 is configured to be the S pole. The surface portion of the first right-side connecting portion 373a is also configured to be the S pole. Therefore, the second case-side connecting portion 352 and the first right-side connecting portion 373a repel each other when the respective surface portions oppose each other.

In a manner similar to that on the right side, the polarities differ between the first case-side connecting portion 351 and the first left-side connecting portion 383a. The first case-side connecting portion 351 and the first left-side connecting portion 383a are connected such as to be attracted to each other. For example, the first case-side connecting portion 351 is configured as a permanent magnet of which the surface portion is the N pole. The first left-side connecting portion 383a is configured as a permanent magnet of which the surface portion is the S pole. The first case-side connecting portion 351 and the first left-side connecting portion 383a are attracted to each other when the respective surface portions oppose each other. In addition, the polarities differ between the second case-side connecting portion 352 and the second left-side connecting portion 383b. The second case-side connecting portion 352 and the second left-side connecting portion 383b are connected such as to be attracted to each other. For example, the second case-side connecting portion 352 is configured as a permanent magnet of which the surface portion is the S pole. The second left-side connecting portion 383b is configured as a permanent magnet of which the surface portion is the N pole. The second case-side connecting portion 352 and the second left-side connecting portion 383b are attracted to each other when the respective surface portions oppose each other.

Furthermore, the first case-side connecting portion 351 and the second left-side connecting portion 383b have the same polarity. The second case-side connecting portion 352 and the first left-side connecting portion 383a have the same polarity. In the example described above, the surface portion of the first case-side connecting portion 351 is configured to be the N pole. The surface portion of the second left-side connecting portion 383b is also configured to be the N pole. Therefore, the first case-side connecting portion 351 and the second left-side connecting portion 383b repel each other when the respective surface portions oppose each other. In addition, the surface portion of the second case-side connecting portion 352 is configured to be the S pole. The surface portion of the first left-side connecting portion 383a is also configured to be the S pole. Therefore, the second case-side connecting portion 352 and the first left-side connecting portion 383a repel each other when the respective surface portions oppose each other.

The case 312 can be attached to each mounting portion 366 by the guide portion 350 such as that described above. The orientation of the case 312 (that is, the orientation of the reading direction) is stabilized during attachment. In addition, as a result of the mounting portion 366 and the guide portion 350, the case 312 can be attached to the ear of the user such that the front side portion of the case 312 (the extending portion that extends further to the front side than the portion supported by the mounting portion 366 in the case 312) extends at least towards the front side from the ear of the user.

In addition, a stepped portion 313 (mating portion) is formed in the side wall portion (opposing wall portion 312a) on the user side in the case 312. The stepped portion 313 is configured to be capable of mating with a right-side mated portion (surface portion 372) formed in the right-side mounting portion 370 and capable of mating with a left-side mating portion (surface portion 382) formed in the left-side mounting portion 380. The stepped portion 313 is shaped into a hole that has a shallow bottom. When the case 312 is attached to the right-side mounting portion 370, the stepped portion 313 (mating portion) and the right-side mated portion (surface portion 372) mate. When the case 312 is attached to the left-side mounting portion 380, the stepped portion 313 (mating portion) and the left-side mated portion (surface portion 382) mate. As a result, position holding by mating is performed in addition to position holding by magnets. Significant positional shifting of the case 312 does not readily occur during mounting. In particular, the positional shifting suppressing effect is high when the switches 42a and 42b are pressed.

In addition, a plurality of lead-out holes 320 are formed on the wall surface (opposing wall surface 312a) on the side of the case 312 that is attached to the attaching portion 3650.

The lead-out holes 320 lead out sound. The lead-out holes 320 function as sound emitting holes that lead the sound generated from the sound generating portion (such as a speaker) provided within the case 312 outside of the case 312. In the present configuration, upon attachment when the case 312 is attached to the attaching portion 360, at least some (such as all) of the lead-out holes 320 are covered by a covered portion (specifically, the surface portions 372 and 382) composing a portion of the attaching portion 360. Upon detachment when the case 312 is detached from the attaching portion 360, the section of the lead-out holes 320 covered by the covered portion during attachment is exposed. For example, as shown in FIG. 23 and the like, when the case 312 is attached to the right-side mounting portion 370, all of the lead-out holes 320 are covered by the surface portion 372 of the right-side mounting portion 370. Emission of sound is thereby suppressed. Meanwhile, upon detachment when the attached state such as that above is released and the case 312 is detached from the right-side mounting portion 370, the section of the lead-out holes 320 covered by the surface portion 372 during attachment is exposed. This similarly applies to the left side. When the case 312 is attached to the left-side mounting portion 380, all of the lead-out holes 320 are covered by the surface portion 382 of the left-side mounting portion 380. Emission of sound is thereby suppressed. Meanwhile, upon detachment when the attached state such as that above is released and the case 312 is detached from the left-side mounting portion 380, the section of the lead-out holes 320 covered by the surface portion 382 during attachment is exposed. The position of the two-dot chain line 366a in FIG. 34 is the position that is in contact with the surface portion 372 or the surface portion 382 when the case 312 is attached to the mounting portion 66 and is covered by the surface portion 372 or the surface portion 382.

Figure 37:
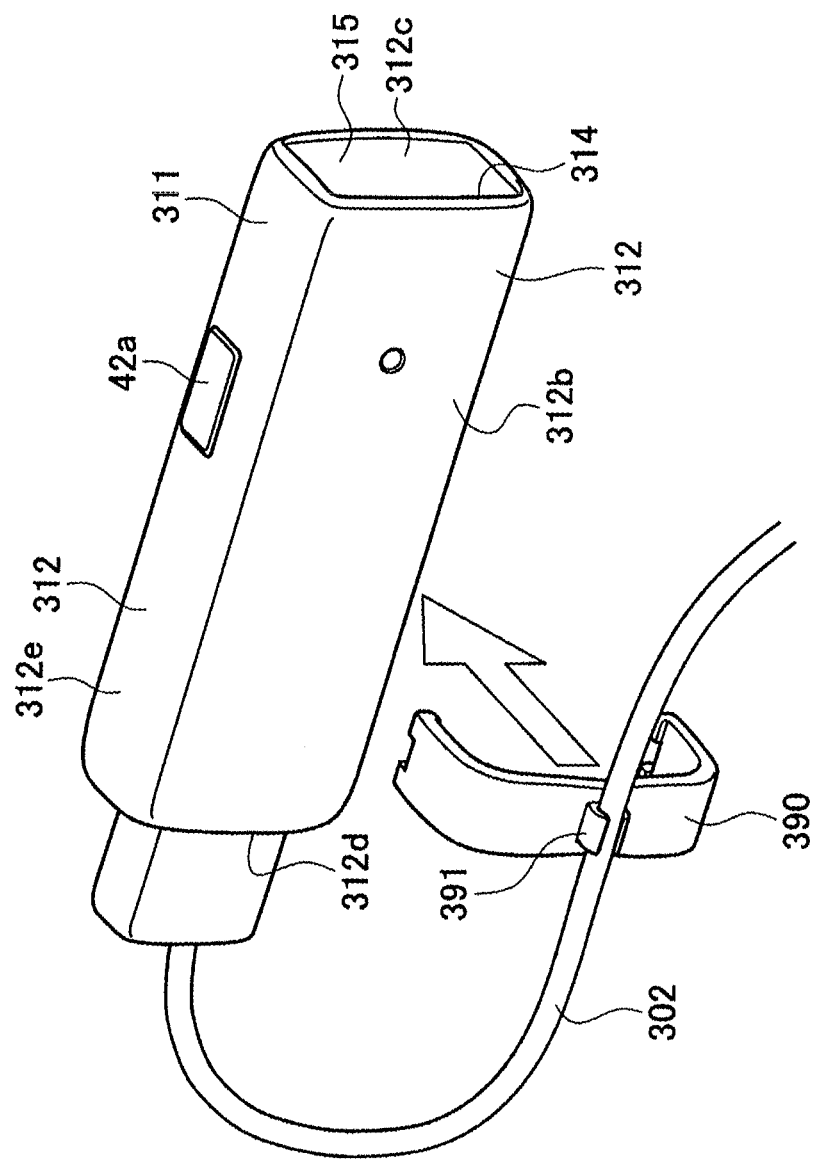
FIG. 37 is an explanatory diagram of a state in which the holding member is detached from the case.
Figure 38:
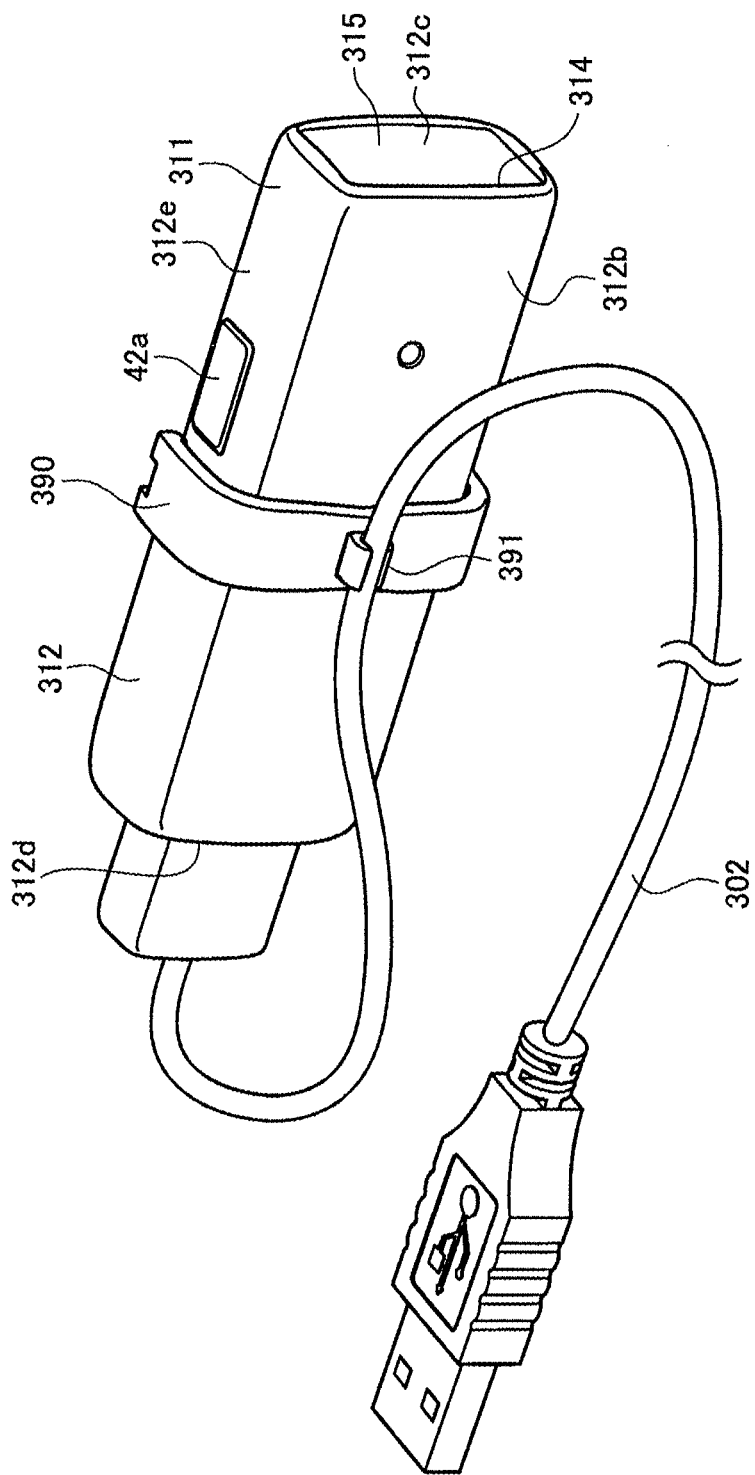
FIG. 38 is an explanatory diagram of a state in which the holding member is attached to the case and the cable is held by the holding member.
Figure 41:
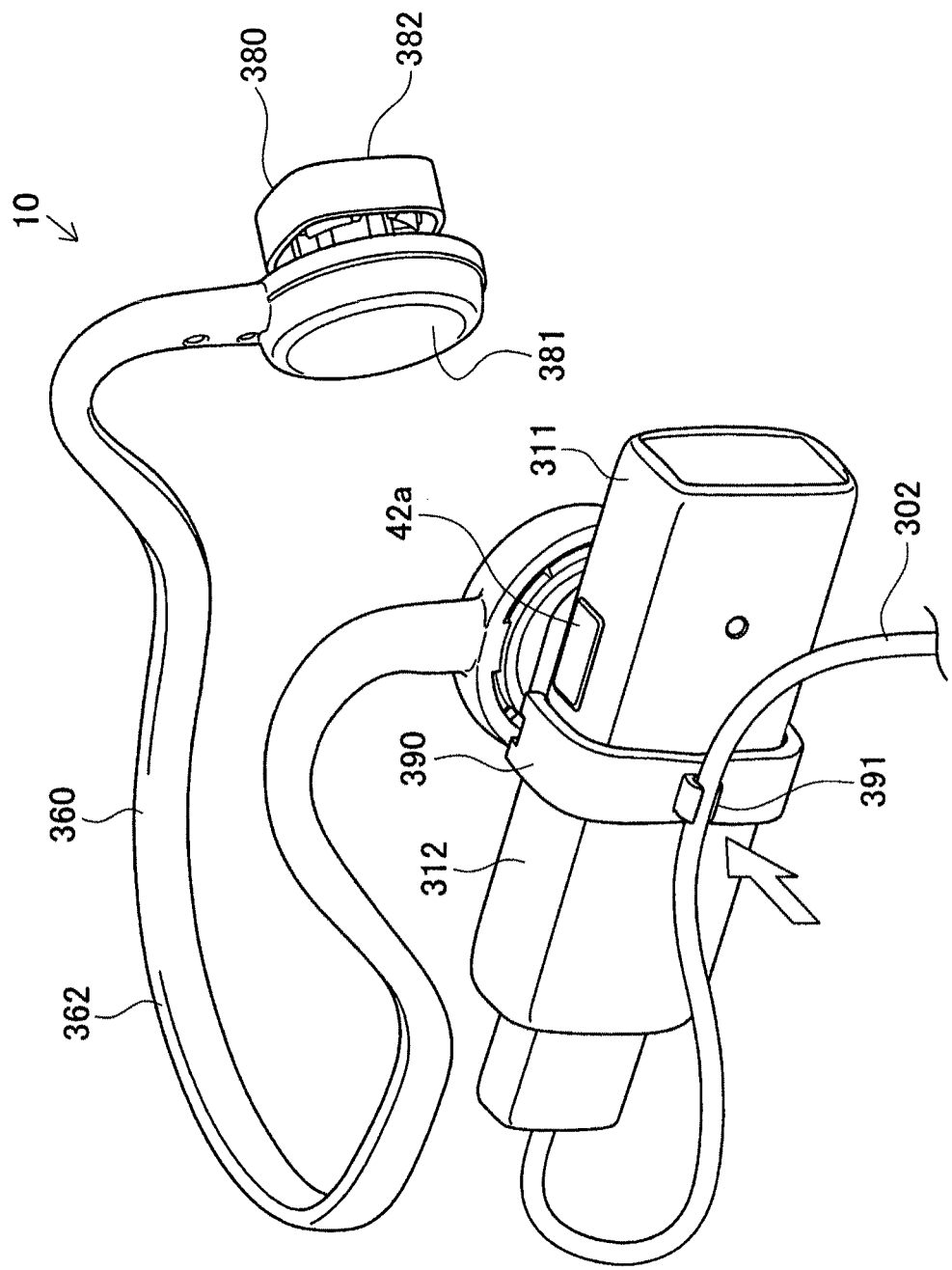
FIG. 41 is a perspective view of the apparatus main body attached to the attaching portion in a state in which the case is attached to the holding member and the cable is held by the holding member.
Figure 42:
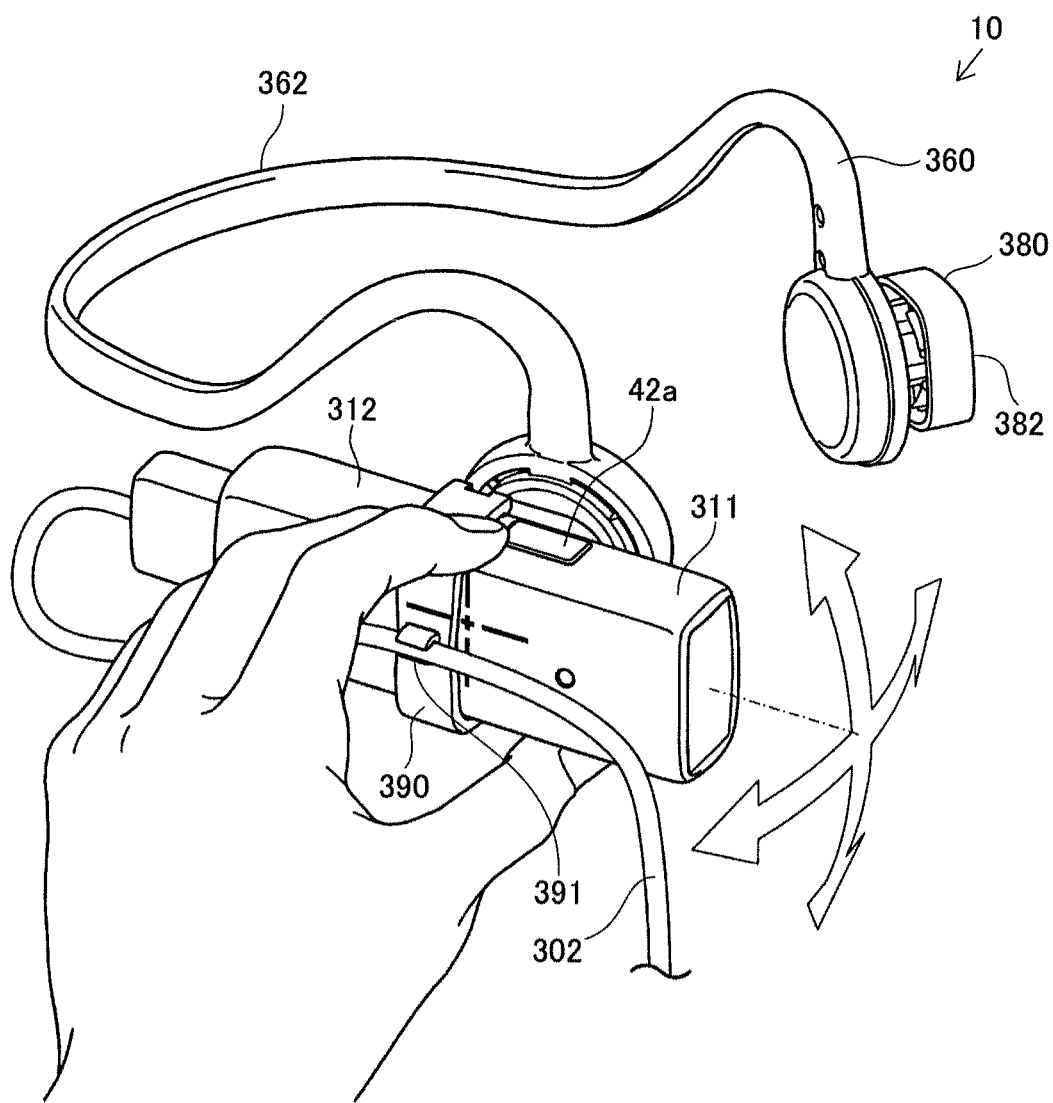
FIG. 42 is an explanatory diagram for explaining fine adjustment of the orientation of the case attached to the attaching portion.

In addition, in the present configuration, as shown in FIG. 33 to FIG. 35, the apparatus main body 311 can be detached from the attaching portion 360. The apparatus main body 311 can be used and can undergo maintenance separately from the attaching portion 360. The apparatus main body 311 is configured such that a holding member 390 is attached to the case 312. The holding member 390 holds a cable 302. As shown in FIG. 30 and FIG. 37, the holding member 390 is detachable. A holding portion 391 that fits onto the cable 302 and holds the cable 302 is formed in the holding member 390. As shown in FIG. 35, the cable 302 can be used and managed such as to be detached from the holding portion 391. As shown in FIG. 38 and FIG. 41, the cable 302 can be used and managed such as to held by the holding portion 391. In addition, in the present configuration, as shown in FIG. 42, the holding portion 391 is disposed in a position directly in the back of the attached portion (the portion held by the attaching portion 360 in the case 312). The cable 302 is held by the holding portion 391 near the center portion of the moment. Therefore, even should the cable 302 be pulled, the orientation of the case 312 does not easily change as indicated by the arrows.

Figure 39:
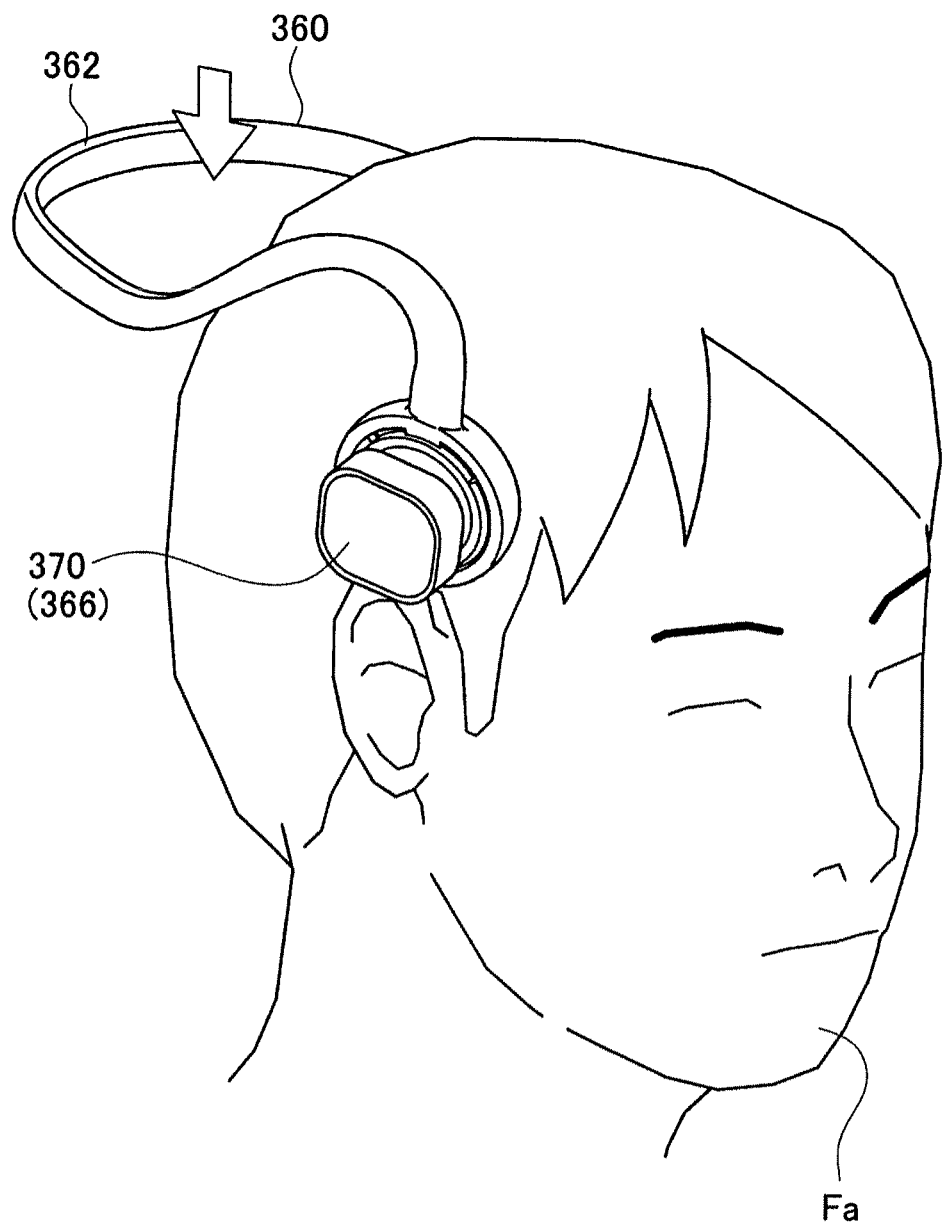
FIG. 39 is an explanatory diagram for explaining a manner in which attaching portion is attached to the user.
Figure 40:
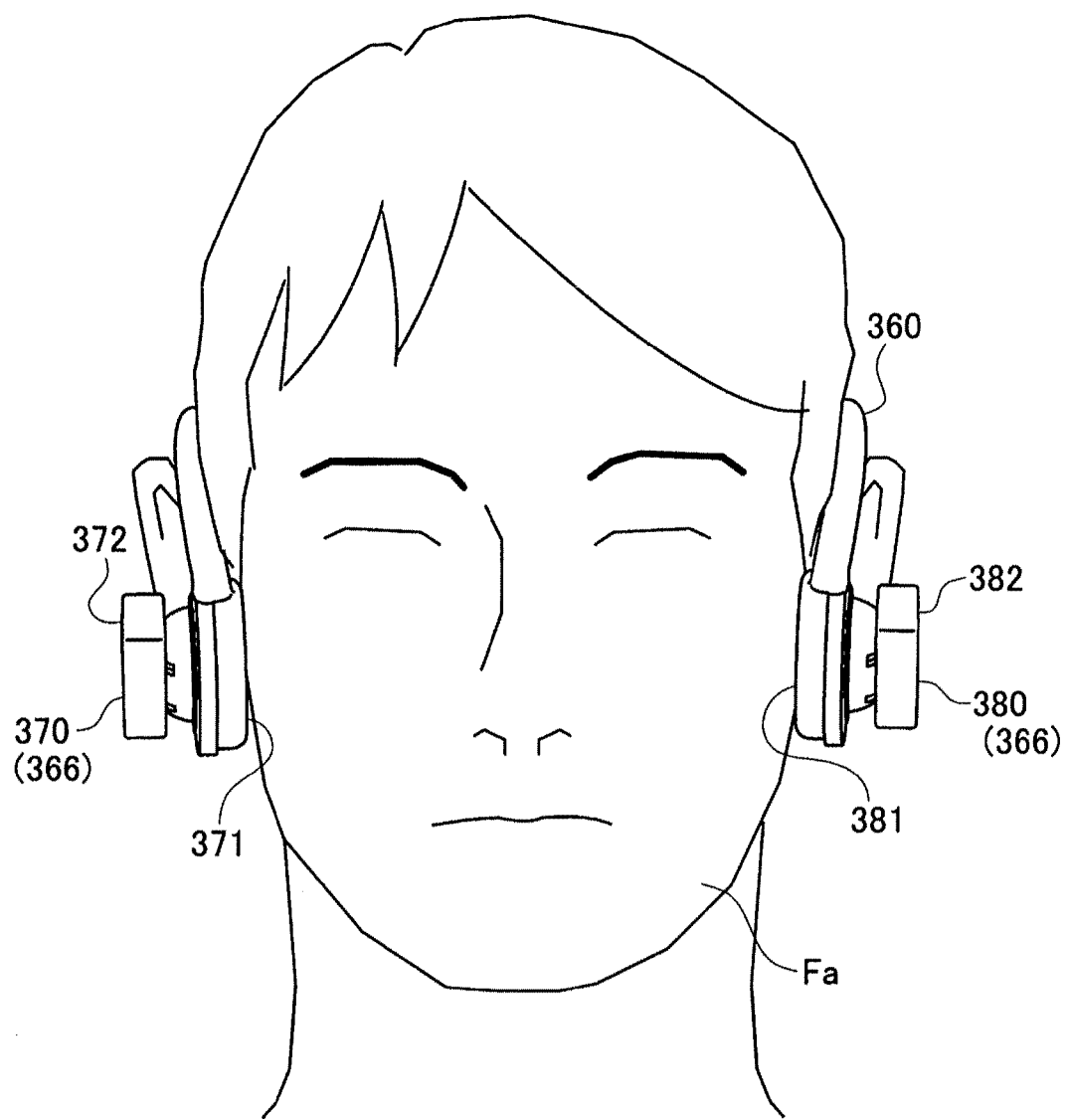
FIG. 40 is an explanatory diagram of a state in which the attaching portion is attached to the user, viewed from the front side of the face of the user.

When the reading apparatus 10 is attached to the user, as shown in FIG. 39 and FIG. 40, first, the attaching portion 360 is hooked onto both ears of the user. Then, as shown in FIG. 23 and FIG. 29, the apparatus main body 311 is attached to either the right-side mounting portion 370 or the left-side mounting portion 380. As a result, the reading apparatus 10 can be quickly and easily attached. In addition, the method is not limited to the foregoing. The reading apparatus 10 may be attached to the user after being assembled as in FIG. 41.

Next, a reading process will be described. In the reading apparatus 10 of the present configuration as well, an information code reading process can be continuously performed each time a predetermined trigger condition is met or after a predetermined start condition is met. For example, pressing of the operating switch may be set as the trigger for the start of imaging. The imaging unit 23 may continuously perform the imaging process after the operating switch is pressed. An information code may be read each time an information code enters the imaging area. Alternatively, reading may be started under a condition that a predetermined state is detected by a sensor that differs from the operating switch 42. For example, a publically known proximity sensor that detects the approach of an object in the forward direction of the case 312 may be provided. When an object approaches, the illumination light source and the imaging unit may be operated, and imaging and decoding may be performed.

Alternatively, sound inputted from a microphone may be analyzed. A determination may be made regarding whether or not the sound corresponds to a predetermined sound (such as whether or not a sound level that is a certain level or higher is detected, or whether or not sound that has a predetermined waveform is detected). The determination process may be performed by the reading apparatus 10 or by an external apparatus.

A process such as this can, for example, also be performed by a flow such as that in FIG. 43. In the example in FIG. 43, for example, when sound is inputted from the microphone provided in the apparatus main body 311, the sound data is transmitted from the reader apparatus 10 to an information terminal, such as a smartphone. Then, when the transmission of sound data from the reader apparatus 10 is received, the information terminal transmits the sound data to a management server via a communication line, such as the Internet. The management server analyzes the sound data and converts the sound data to information such as characters and symbols. The management server then transmits the converted information (decoded information obtained by decoding the sound) to the information terminal again. A plurality of commands are provided in the information terminal in advance. When the decoded information transmitted from the management server corresponds to any of the commands, the information terminal issues an instruction to transmit the command to the reader apparatus 10. In a configuration such as this, for example, information "start" is a start command registered in the information terminal. In this case, when the user emits the sound "start", the sound is analyzed by the management server. Subsequently, the decoded information that is "start" after analysis is transmitted to the information terminal. When such information (decoded information corresponding to a start command) is received from the management server, the information terminal transmits instruction information that gives an instruction to start reading to the reader apparatus 10. The reader apparatus 10 starts the reading process using the reception of such instruction information as the trigger.

Figure 44:
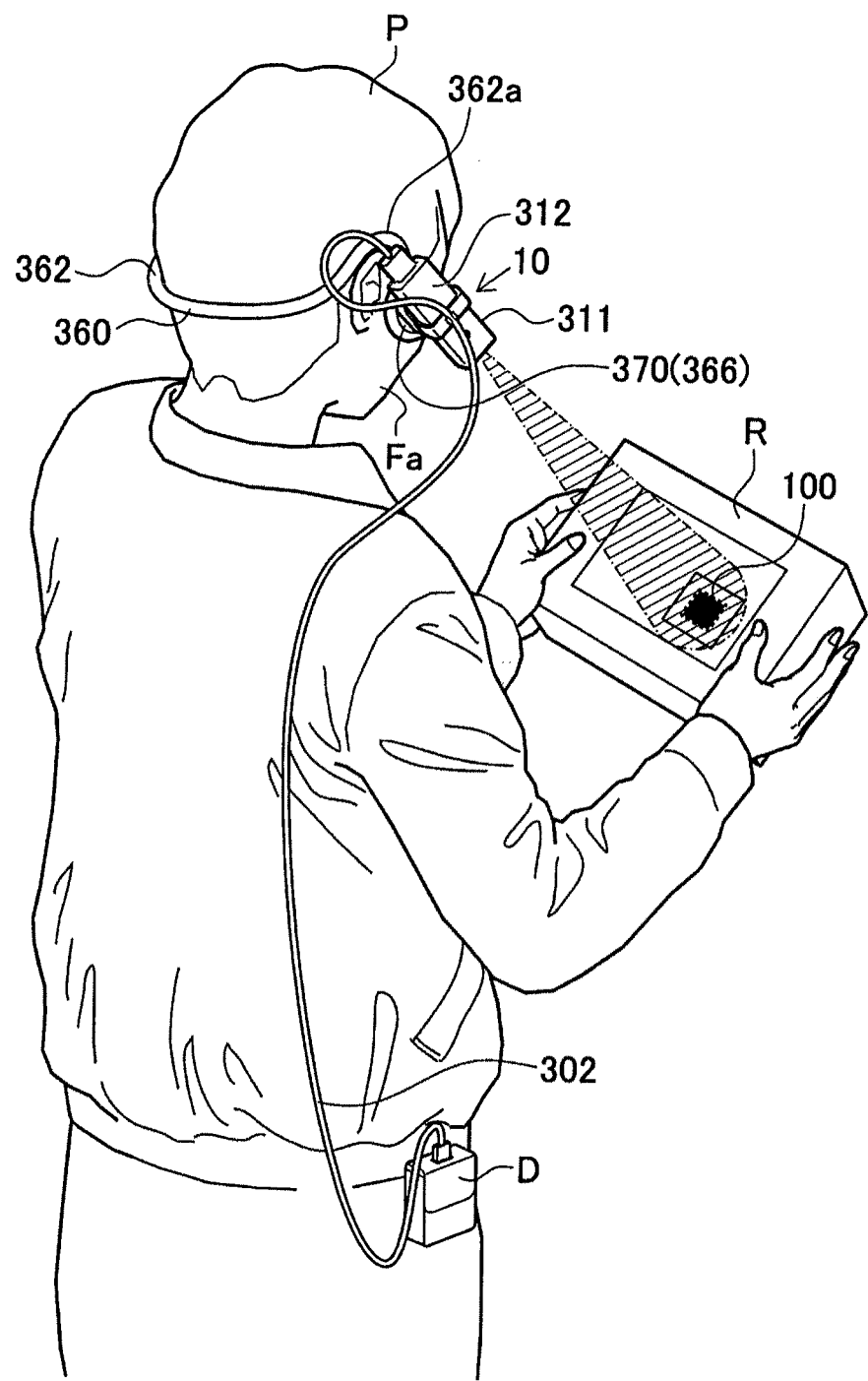
FIG. 44 is an explanatory diagram for explaining a method of use of the portable information code reading apparatus according to the third embodiment, differing from that in FIG. 23.
Figure 45:
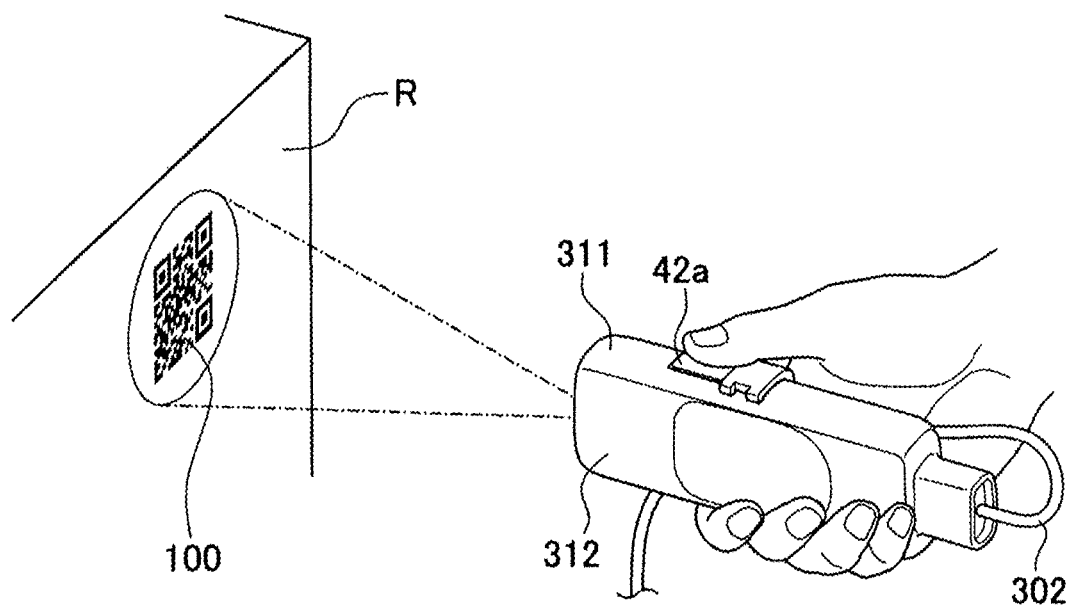
FIG. 45 is an explanatory diagram for explaining a method of use of the portable information code reading apparatus according to the third embodiment, differing from those in FIG. 23 and FIG. 44.
Figure 46:
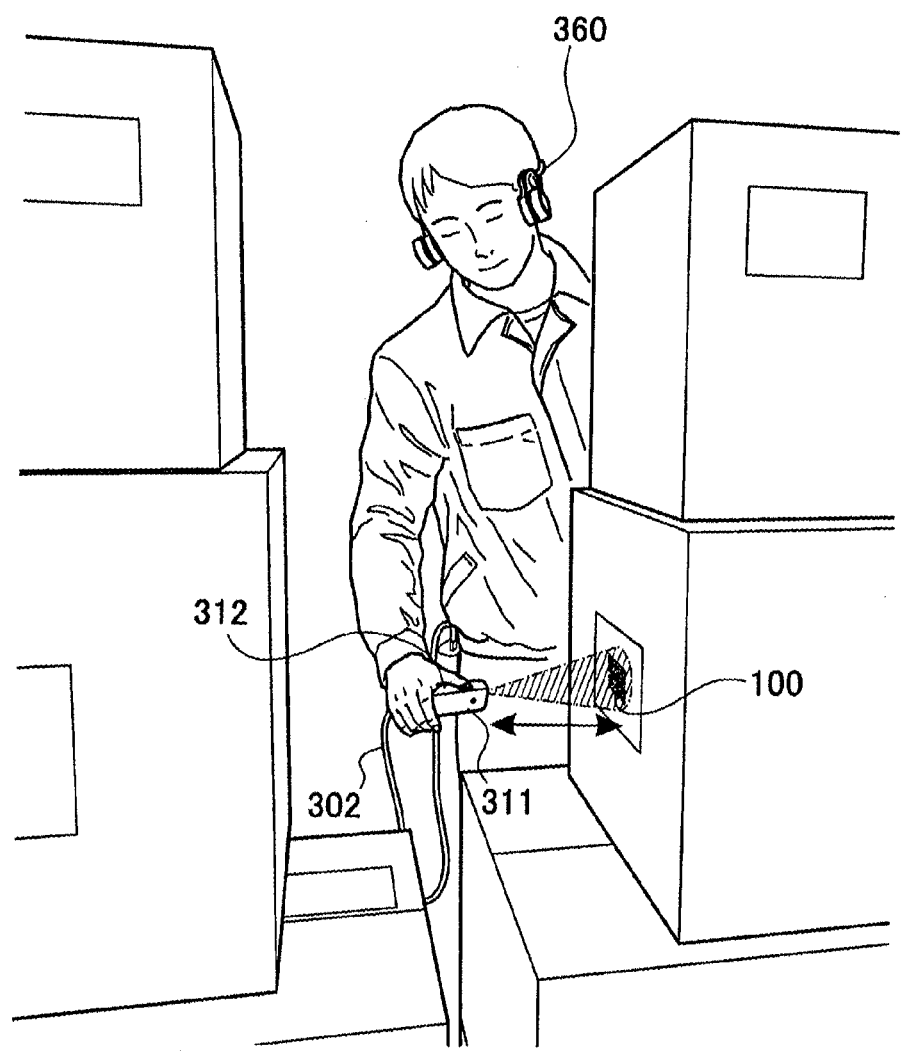
FIG. 46 is an explanatory diagram for explaining a situation in which a method of use such as that in FIG. 45 is used.
Figure 47:
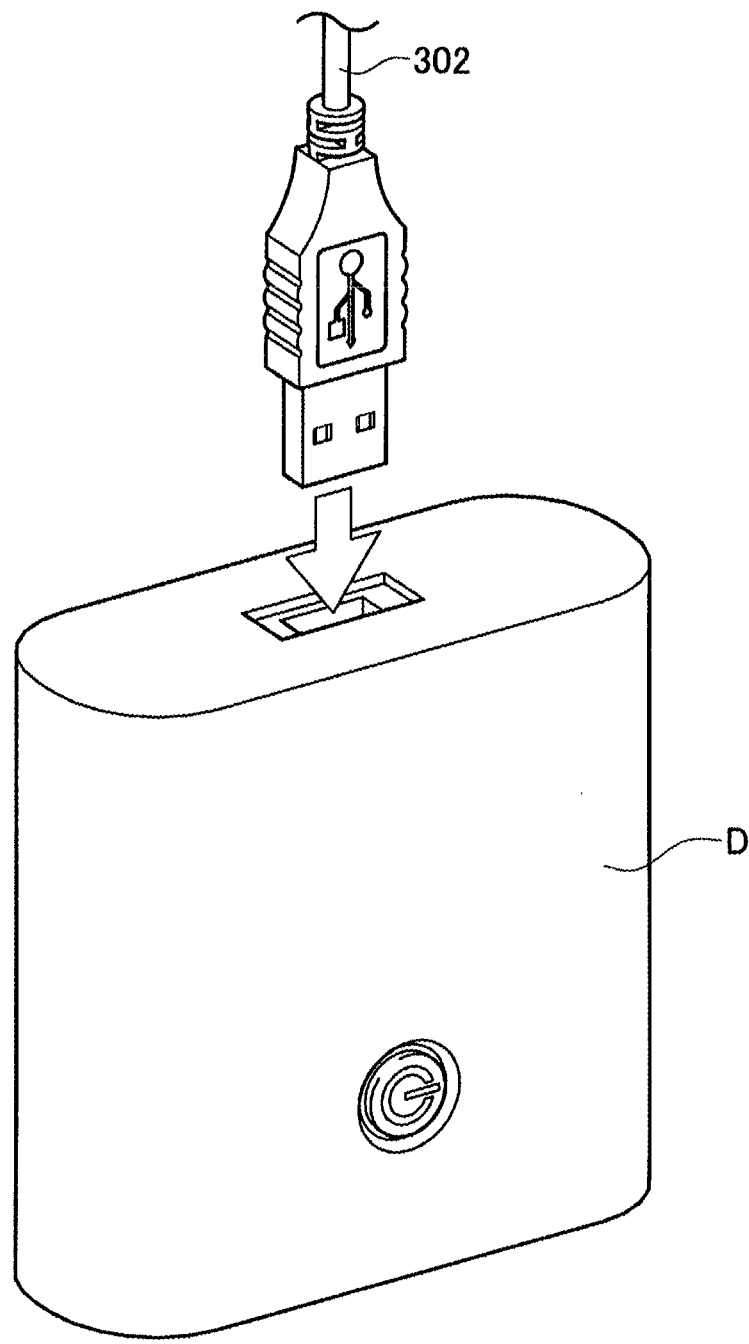
FIG. 47 is a perspective view schematically showing an external apparatus or the like that is electrically connected to the apparatus main body.

The reading apparatus of the present configuration is not limited to the method of mounting and the method of use as in FIG. 23 and FIG. 29, and can be used by various methods of use. For example, an external apparatus D (FIG. 47) that is connected to the cable 302 may be used such as to be hung at the hip as in FIG. 23, or may be placed inside a breast pocket of the user as in FIG. 44. In addition, as shown in FIG. 45 and FIG. 46, the apparatus main body 311 may be temporarily or continuously detached from the attaching portion 360 and used for reading. In this case as well, as shown in FIG. 23 and FIG. 44, the external apparatus D can be disposed in various locations.

In addition, in the present configuration, the cable 302 is detachably attached to the external apparatus D (the external apparatus used during use in a reading operation). As shown in FIG. 48, the cable 302 can also be detached from the external apparatus D and attached to external equipment PC or the like that differs from the external apparatus D. The external apparatus D is provided with various functions. The external apparatus D may function as a supply source that supplies power to the apparatus main body 311. The external apparatus D may also function as a storage medium that stores therein information (such as the decoded data obtained when the apparatus main body 311 decodes the information code) from the apparatus main body 311. Alternatively, a control circuit, such as a CPU, may be installed in the external apparatus D. The external apparatus D may decode the code image captured by the imaging unit 23.

In the present configuration, the attaching portion 360 is configured as a component separate from the case 312. The attaching portion 360 has the right-side mounting portion that is disposed on the right side of the face of the user and can be detached from the case. The attaching portion 360 also has the left-side mounting portion that is disposed on the left side of the face of the user and can be detached from the case.

In this configuration, the case can be mounted onto the right side and the left side of the face of the user. The degree of freedom in mounting is increased.

In addition, the attaching portion 360 has the right-ear attaching portion that is attached to the right ear of the user, the left-ear attaching portion that is attached to the left ear of the user, and the connecting portion that connects the right-ear attaching portion and the left-ear attaching portion.

As a result of this configuration, the attaching portion is attached to both ears. Therefore, stability during mounting is increased. The movement of the face and the case can be more stably moved in tandem. In addition, because the case can be attached to the ear, mounting on the body is facilitated even when another mounted tool (such as a helmet or glasses) is used.

In addition, a magnet is disposed in either of the case and the attaching portion. An attracted portion that is attracted to the magnet is disposed in the other of the case and the attaching portion. When the case is mounted in the right-side mounting portion, the case and the right-side mounting portion are held by the attraction between the magnet and the attracted portion. When the case is mounted in the left-side mounting portion, the case and the left-side mounting portion are held by the attraction between the magnet and the attracted portion.

As a result of this configuration, when the case is mounted on the right side of the face and when the case is mounted on the left side of the case, mounting is facilitated through use of the attracting force of the magnet. In addition, detachment from the attaching portion, replacement, and the like of the case can be facilitated.

In addition, the mating portion is formed in the case or another component assembled to the case. The mating portion is configured to be capable of mating with the right-side mated portion formed in the right-side mounting portion and mating with the left-side mated portion formed in the left-side mounting portion. When the case is attached to the right-side mounting portion, the mating portion and the right-side mated portion mate. When the case is attached to the left-side mounting portion, the mating portion and the left-side mated portion mate.

In this configuration, when the case is mounted on the right side of the face and when the case is mounted on the left side of the case, attachment is performed in a mated state. Therefore, positional shifting of the case does not easily occur.

In addition, the first guide portion is provided that detachably connects the case to the right-side mounting portion, and guides the posture of the case in relation to the right-side mounting portion to a first predetermined posture when the case is connected to the right-side mounting portion. The second guide portion is provided that detachably connects the case to the left-side mounting portion, and guides the posture of the case in relation to the left-side mounting portion to a second predetermined posture when the case is connected to the left-side mounting portion.

In this configuration, when the case is mounted on the right side of the face and when the case is mounted on the left side of the case, the posture of the case in relation to the attaching portion can be stably set.

In addition, the guide portion is provided with at least two case-side connecting portions provided in the case, at least two right-side connecting portions provided in the right-side mounting portion, and at least two left-side connecting portions provided in the left-side mounting portion. The case is attached to the right-side mounting portion by the at least two case-side connecting portions and the at least two right-side connecting portions being respectively connected. The case is attached to the left-side mounting portion by the at least two case-side connecting portions and the at least two left-side connecting portions being respectively connected.

As a result of this configuration, when the case is mounted on the right side of the face and when the case is mounted on the left side of the case, two connecting portions (case-side connecting portions) provided in the case are connected such as to be aligned to at least two connecting portions determined in the attaching portion. Therefore, the orientation of the case can be set to face the desired direction with more accuracy.

In addition, the first case-side connecting portion that is configured as a permanent magnet and the second case-side connecting portion that is configured as a permanent magnet are provided as the two case-side connecting portions. The first right-side connecting portion that is configured as a permanent magnet and the second right-side connecting portion that is configured as a permanent magnet are provided as the two right-side connecting portions. The first left-side connecting portion that is configured as a permanent magnet and the second left-side connecting portion that is configured as a permanent magnet are provided as the two left-side connecting portions. The polarity of the first case-side connecting portion differs from those of the first right-side connecting portion and the first left-side connecting portion, and is the same as those of the second right-side connecting portion and the second left-side connecting portion. The polarity of the second case-side connecting portion differs from those of the second right-side connecting portion and the second left-side connecting portion, and is the same as those of first right-side connecting portion and the first left-side connecting portion.

In this configuration, when the case is mounted on the right side of the face and when the case is mounted on the left side of the case, the case can be more firmly and more accurately led to the appropriate position using the attraction force between magnets in at least two positions. The burden of positioning and connection can be further reduced. In addition, when the case is mounted on the right side of the face and when the case is mounted on the left side of the case, when attachment is performed in reverse such that connecting portions that do not correspond are aligned, the connecting portions repel each other at each position because the connecting portions that do not correspond have the same polarity. Connection is not achieved. Therefore, when the case is mounted on the right side of the face and when the case is mounted on the left side of the case, positioning of the case to the attaching portion can be more accurately and quickly performed in the correct orientation. Abnormal connection in the reverse orientation can be prevented with certainty.

In addition, the attaching portion is provided with at least the supported portion that is hooked onto either ear of the user and supported, the front-side extending portion that extends from the supported portion, and the holding portion that is connected to the front-side extending portion and holds the case. When the attaching portion is attached to the user, the front-side extending portion is disposed such as to extend further to the front side than the supported portion. The holding portion is disposed in a position further to the front than the earhole of the ear that supports the supported portion.

In this configuration, the holding portion that holds the case is disposed in a position further to the front than the earhole of the user. Therefore, the holding portion does not easily cover the earhole of the user.

In addition, the holding portion is provided with the back surface portion that opposes the face of the user in a position further to the front than the earhole, and the front surface portion that is disposed on the side opposite the back surface portion. The case is held in the front surface portion.

In this configuration, the case is held in the front surface portion that is disposed in a position away from the face of the user. Therefore, the case that is held in the front surface portion does not easily cover the earhole of the user.

In addition, a lead-out hole is formed in the wall portion on the side of the case that is attached to the attaching portion. The lead-out hole leads out sound. Upon attachment when the case is attached to the attaching portion, at least some of the lead-out holes are covered by a covered portion that forms a portion of the attaching portion. Upon detachment when the case is detached from the attaching portion, the section of the lead-out holes covered by the covered portion during attachment is exposed.

In this configuration, during mounting in which the case is disposed near the face, sound can be relatively suppressed as a result of the lead-out holes being covered. Even when a sound generating source is present near the ear of the user, loud sounds excessively reaching the user can be suppressed. Meanwhile, during non-mounting when the case tends to be used away from the face, sound can be made relatively loud by the lead-out holes being exposed. Sound can more easily reach the user even when the sound generating source is away from the ear of the user to a certain extent.

Other Embodiments in Relation to the First to Third Embodiments

The present invention is not limited to the above-described first to third embodiments. For example, the following embodiments are also included in the technical scope of the present invention.

In addition to the configuration according to the first embodiment, a cable supporting portion that supports a cable may be provided. In the example in FIG. 1 and the like, the attaching portion 60 is provided on one wall portion (side wall portion 13*b*) side of the case 12. The cable supporting portion may be formed in the position on the backside of the attaching portion in the wall portion (side wall portion 13*a*) opposite the one wall portion of the case 12. The cable supporting portion supports the cable 80 that is led out from the case 12. For example, an annular through-hole portion may be provided integrally with the side wall portion 13*a* or fixed to the side wall portion 13*a*, in the position of the operating switch 42 shown in FIG. 5. Alternatively, the cable 80 which has been led out from another position may be fixed to the position on the backside of the attaching portion 60 by a fastening member or a fixing jig. Alternatively, the cable 80 may be held by a portion of the case 12 (such as a hole that allows passage of the cable 80), with the position itself from which the cable 80 is led out as the position on the backside of the attaching portion 60. In this configuration, even should the case 12 is pulled to a certain extent, the cable 80 is received on the backside of the attaching portion that serves as a rotation center portion. Moment centered near the attaching portion 60 does not easily occur. Therefore, the case 12 does not readily rotate. As a result, the relative orientation of the overall reading apparatus in relation to the face of the user can be stably maintained.

The ear hook portion 62 given as an example according to the first embodiment may be provided such as to be capable of displacement in relation to a portion of the case 12 or a connecting portion connected to the case 12 (such as the ear inserting portion 61). In this case, positioning may be possible at a first position when the ear hook portion 62 is attached to the left ear of the user and at a second position when the ear hook portion 62 is attached to the right ear of the user. As a result of this configuration, the reading apparatus can be attached to the right ear and to the left ear of the user. When the reading apparatus is attached to an ear, the position of the ear hook portion 62 can be positioned at a position based on the ear.

According to the first embodiment, the sensor portion 46 is provided inside or outside of the case 12. According to any of the embodiments, the processing unit may decode an information code under a condition that at least a predetermined detection result is obtained by the sensor portion 46. For example, a configuration may be used in which the sensor portion 46 is capable of detecting a predetermined state in which the attaching portion 60 is attached to the ear of the user. Under a condition that the sensor portion 46 has detected the predetermined state, irradiation by the illumination light source and the marker light irradiating portion may be started, and imaging by the imaging unit may be started. The processing unit may then decode an information code based on the foregoing. Specifically, the sensor portion may be configured by an acceleration sensor having a plurality of axes (such as a three-axis acceleration sensor). A state in which the acceleration sensor (such as the three-axis acceleration sensor) enters a predetermined acceleration state (such as an acceleration state in which almost no movement is detected) may be set as the above-described "predetermined state". Alternatively, the sensor portion 46 may be composed of a three-axis sensor or the like. Irradiation and decoding may be started with the occurrence of gravitational acceleration in a predetermined direction as the "predetermined state". Alternatively, issuing an instruction through application of impact such as by teeth clenching or by up/down movement of a leg may be premised. A predetermined acceleration change attributed to the impact may be detected.

According to any of the embodiments, the imaging unit 23 is capable of continuously or intermittently capturing an image outside of the case 12. The image captured by the imaging unit 23 being in a predetermined state may be set as a condition. The processing unit may decode an information code that has been imaged by the imaging unit 23 after the condition has been met. A method by which the imaging unit 23 (camera) detects a captured image such as this includes, for example, detection of a gestured instruction (changing movement by the shape of the hand, such as rock, scissors, or paper), detection of movement (although there is movement during operation, movement stops during code reading; therefore, continuation of a predetermined still image is detected), monitoring of an image without turning on an instruction light with a QR code for setting or the like, detection of what appears to be a code, or detection of a finger. In this configuration, the decoding process by the processing unit is stopped until the image captured by the imaging unit 23 is in a predetermined state. Power can be saved. As a result of measures being taken such that the image in the predetermined state is captured by the imaging unit 23, the reading apparatus can return to an decoding start state.

According to any of the embodiments, sound input from a microphone may be used as the trigger for decoding and illumination start. In this case, the sound inputted from the microphone may be analyzed, and whether or not the sound corresponds to a predetermined sound may be determined. The determination process may be performed by the reading apparatus 10 or by an external apparatus.

Figure 12:
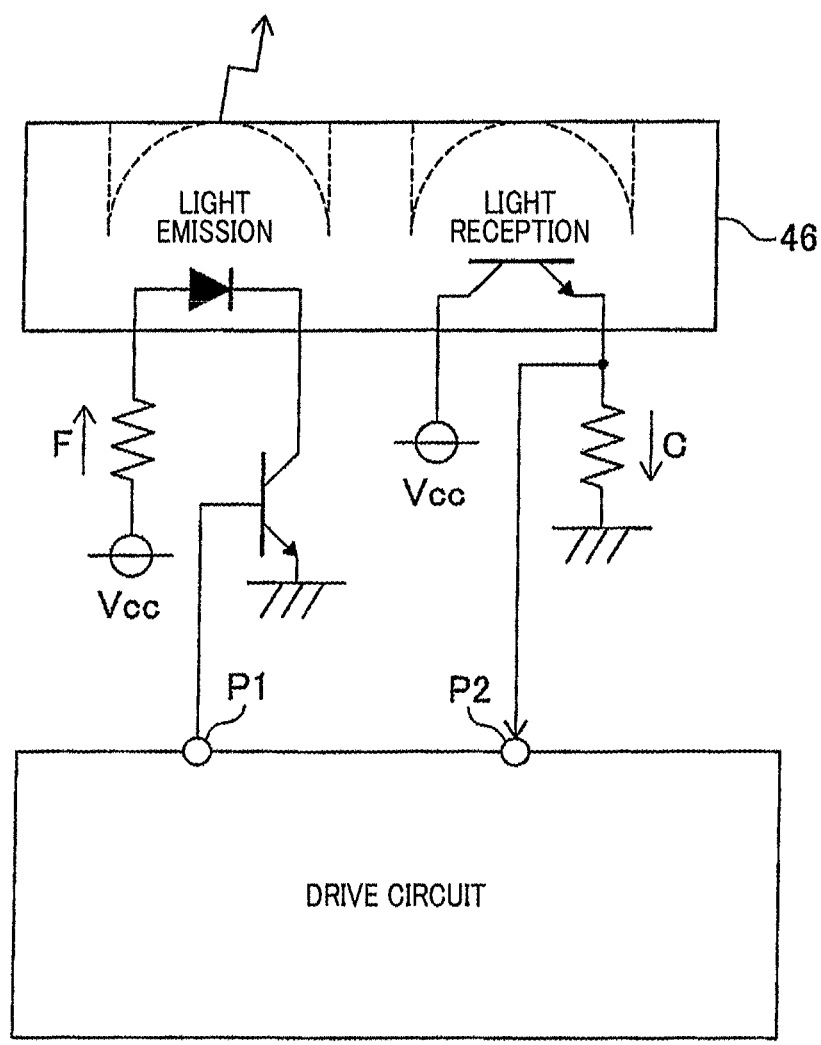
FIG. 12 is an explanatory diagram schematically showing an example of a blinking detecting sensor as an example of a sensor portion.

According to any of the embodiments, a reading opening may be extended to the vicinity of the eye, and a blinking detection sensor may be provided as in FIG. 13. Irradiation and decoding may be started under a condition that a predetermined detection result is obtained by the blinking detection sensor. In this case, an instruction can be issued by the number of blinks, or the amount of time the eye is closed. The blinking detection sensor may be configured, for example, as shown in FIG. 12. A state in which the eyelashes block light and light returns to the light-receiving element may be detected as a blinking occurrence state.

According to any of the embodiments, when a proximity sensor is provided and the reading apparatus 10 is attached to the ear, the approach of the face of the user may be detected by the proximity sensor. In this case, irradiation and decoding may be started under a condition that a predetermined detection result is obtained by the proximity sensor. Alternatively, a publically known distance measurement sensor (such as that of a laser-type or an ultrasonic-type (may be provided. Whether or not an object is disposed within a predetermined distance on the front side of the reading apparatus 10 may be detected. In this case, irradiation and decoding may be started under a condition that a predetermined detection result is obtained by the distance measurement sensor.

According to any of the embodiments, a myoelectric sensor may be used, and the changes in facial muscle (such as the buccinators muscle or the risorius muscle) may be detected. In this case, irradiation and decoding may be started under a condition that a predetermined detection result is obtained by the myoelectric sensor.

According to the first embodiment, the ear inserting portion 61 and the ear hook portion 62 are provided as the attaching portion 60. However, either of the ear inserting portion 61 and the ear hook portion 62, or both may be detachable. As an example thereof, for example, the ear inserting portion 61 that is configured as an earphone can be detached as in FIG. 14 and FIG. 15. In the example in FIG. 14, in the ear inserting portion 61 that is configured as an earphone, a terminal 69 is provided. The terminal 69 can be inserted into a hole (terminal) 18 that is formed in the case. When the terminal 69 is inserted into the hole 18, sound signals are transmitted from the case 12 side to the ear inserting portion 61 side. Sound is emitted from the ear inserting portion 61 based on the sound signals. Meanwhile, as in FIG. 14 and FIG. 15, when an earphone is not inserted in the hole 18 (such as when nothing is inserted in the hole 18, or when a medium serving as a transmission target for sound signals is not inserted), notification of information by an information notifying unit (not shown) provided on the case 12 side is possible. The information notifying unit may be, for example, a speaker. In this case, when the ear inserting portion 61 is not inserted into the hole 18, sound is emitted from the speaker instead of the ear inserting portion 61. In addition, the information notifying unit may be a display unit (such as a monitor or a lamp), a vibrator, or the like.

As a result of this configuration, the attaching portion can be detached from the case, and use as a hand-held type, for example, is facilitated. In addition, even in use with the attaching portion detached, notification of information can be performed. Convenience is further improved.

Figure 14:
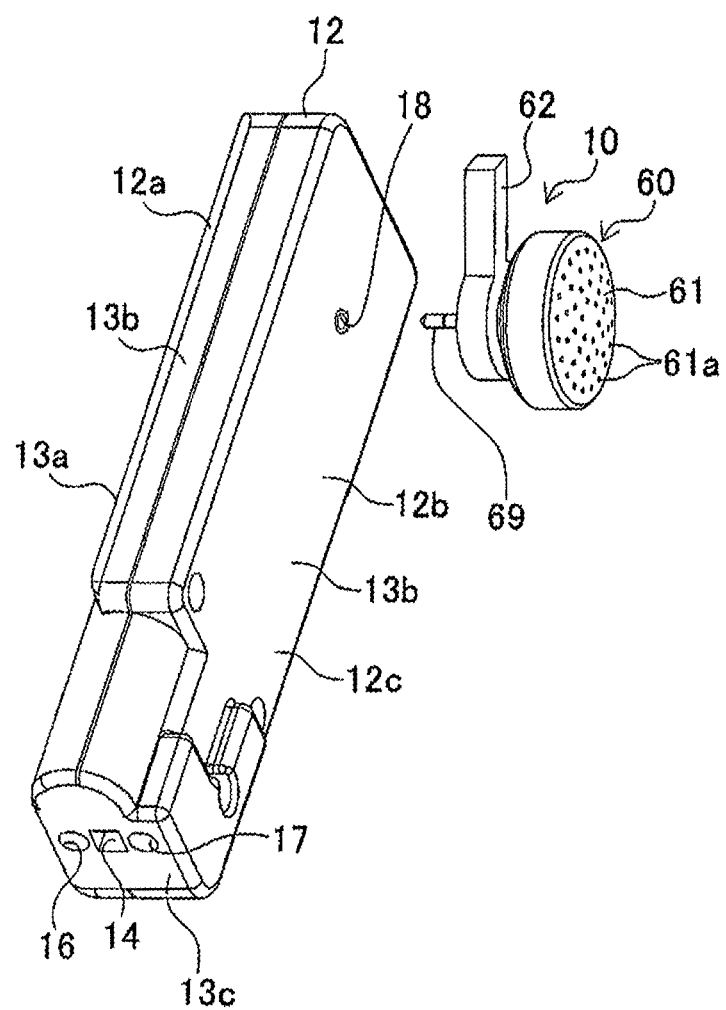
FIG. 14 is a perspective view schematically showing an example in which an ear inserting portion is configured to be detachable.
Figure 15:
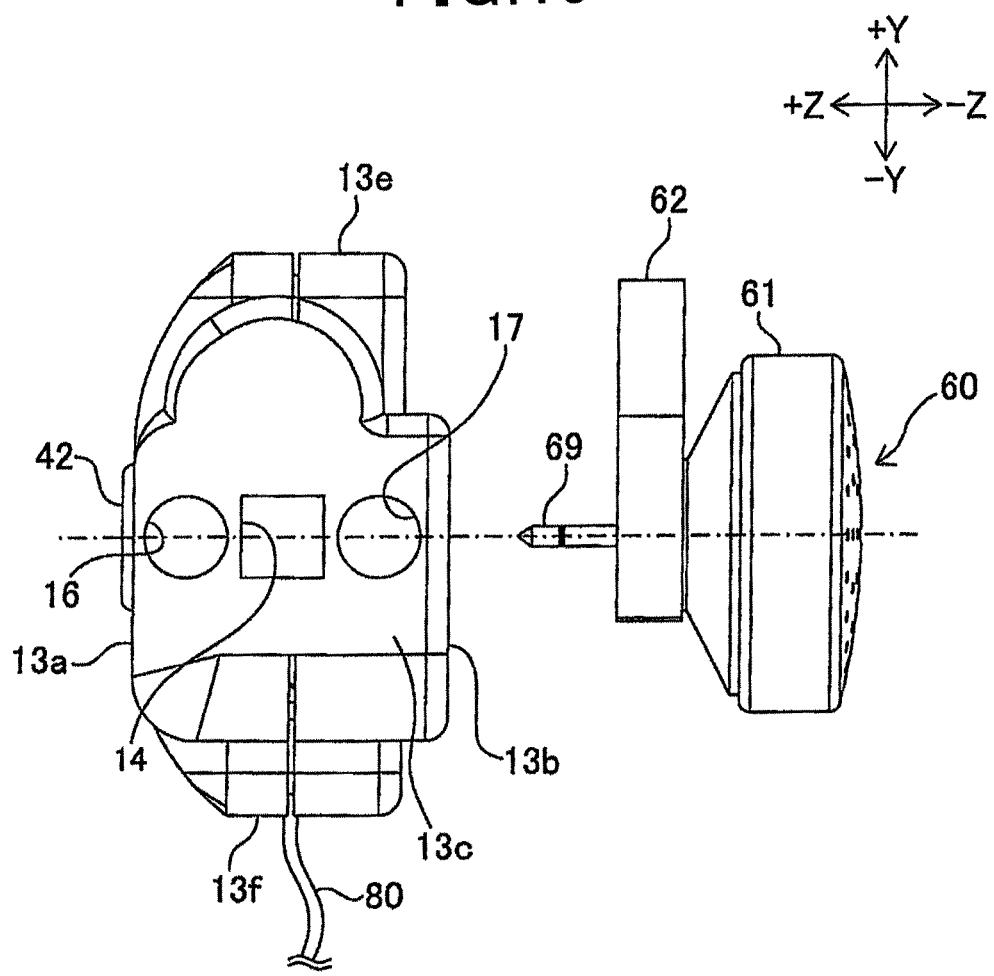
FIG. 15 is a front view of the configuration in FIG. 14.

In addition, the ear inserting portion and the ear hook portion can be detached as in FIG. 14 and FIG. 15 and replaced. A measure, such as replacing the attaching portion with each user, can be taken as a result of replacement being made possible. Therefore, this is useful for users who do not wish to use a component that has been used by another person for attachment to the ear. In addition, a measure is also possible in which the ear inserting portion and the ear hook portion are available in numerous sizes and can be replaced.

In addition, when the ear inserting portion is detachable as in FIG. 14 and FIG. 15, a hole that has similar configuration and function as the hole 18 (the hole in which the terminal 69 is inserted) as in FIG. 14 may be formed in the side wall portion 13a on the side opposite the side wall portion 13b. The terminal 69 may be inserted in this hole. In this case, when the reading apparatus 10 is mounted on the right ear, the terminal 69 of the ear inserting portion 61 may be fixed such as to be inserted into the hole 18. When the reading apparatus 10 is mounted on the left ear, the terminal 69 of the ear inserting portion 61 may be fixed such as to be inserted into the hole on the side opposite the hole 18.

In addition, when either of the ear inserting portion 61 and the ear hook portion, or both is detachable as in the configurations in FIG. 14 and FIG. 15, described above, after either of these attaching portions or both attaching portions are detached, another attaching member differing from the detached attaching portion may be attached. For example, the example in FIG. 16 shows an example in which an attaching member (clip) 160 is attached to the case 12 instead of the ear inserting portion 61, when the ear inserting portion 61 is detachable as in FIG. 14 and FIG. 15. The attaching member 160 is provided with an elastic member 162 that is composed of an elastically deformable metal material or the like. One end portion 162a of the elastic member 162 is fixed to a main body portion 164. The other end portion 162b side is configured to be capable of elastic deformation, and is urged towards the side in contact with the main body portion 164. An object can be sandwiched between the other end portion 162b and the main body portion 164. Therefore, when the attaching member 160 is fixed to the case 12 and used, the case 12 can be used such as to be attached to clothing or the like by the attaching member 160 functioning as a clip.

As a result of the attaching portion being capable of being detached and replaced with another component having a different function, the reading apparatus 10 becomes further advantageous in terms of convenience.

In any of the configurations described above, a sound level adjusting unit that adjusts the sound level of the sound generated from the sound generating unit 44 (such as the sound emitted from the ear inserting portion 61 that is configured as an earphone) may be provided. For example, an operating unit, such as a knob or a sound level adjustment button (such as a sound level increase button and a sound level decrease button), may be provided in the case 12. When an instruction for increase is issued from the operating unit, the sound from the sound generating unit 44 may be increased by a publically known method. When an instruction for decrease is issued from the operating unit, the sound from the sound generating unknit 44 may be decreased by a publically known method. As a result of this configuration, the sound level of the sound emitted from the information code reading apparatus can be adjusted inside the apparatus.

According to the first embodiment, the control circuit 40 is given as an example of the processing unit. As a process performed by the control circuit 40 on the image of an information code captured by the imaging unit, decoding of the code image of the information code is given as an example. However, the process performed on the image of an information code captured by the imaging unit is not limited thereto. For example, a process in which the image data of the information code captured by the imaging unit is transmitted to an external apparatus is also possible. In this case, the image data can be decoded by the external apparatus (such as a host apparatus).

As the representative example and variation examples according to the second embodiment, a configuration including all of the features according to the first embodiment is given as an example. However, control such as that in the representative example and variation examples according to the second embodiment may be performed in a configuration including all of the features according to the third embodiment. Alternatively, control such as that in the representative example and variation examples according to the second embodiment may be performed in any of the configurations described according to other embodiments.

According to the above-described embodiments, an example in which a sound generating unit, such as a speaker or an earphone, is provided is given. However, as the driving method of these sound generating units, various publically known driving methods can be used such as a dynamic type, a magnetic type, a balanced armature type, a hybrid type, a piezoelectric type, a crystal type, or an electrostatic type. In addition, the driving method is merely required to be that which is capable of transmitting sound to the user. For example, a bone conduction-type speaker or earphone that transmits sound to the user through bone conduction is also possible.

In any of the configurations according to any of the embodiments, the image data of the information code captured by the imaging unit 23 may be transmitted from the apparatus main body to an external apparatus, and the external apparatus may perform decoding.

In any of the configurations according to any of the embodiments, the battery may be provided inside the case that is mounted on the body, or may be provided inside an external apparatus that is connected to the case by a cable.

According to the third embodiment, a configuration in which the right-side mounting portion and the left-side mounting portion are provided is given. However, a configuration having only the right-side mounting portion and a configuration having only the left-side mounting portion are also possible (that is a configuration in which the reading apparatus 10 is attached to only either one of the ears is also possible). In this case, only either of the mounting portions may simply be mounted from the configuration according to the third embodiment.

According to the third embodiment, a configuration in which magnets are provided in both the case 312 and the attaching portion 360 is given as an example. However, the magnets may be disposed in either of the case 312 and the attaching portion 360, and a magnetic body (an attracting portion that is attracted to the magnet), such as iron, may be disposed in the other. For example, the magnets may be disposed in a manner similar to that according to the third embodiment on the case 312 side. The first right-side connecting portion and the second right-side connecting portion in the right-side mounting portion 370, and the first left-side connecting portion and the second left-side connecting portion in the left-side mounting portion 380 may be replaced with magnetic bodies, such as iron. In this case as well, when the case 312 is mounted in the right-side mounting portion 370, the case 312 and the right-side mounting portion 370 are held by the attraction between the magnet and the attracting portion. When the case 312 is mounted in the left-side mounting portion 380, the case 312 and the left-side mounting portion 380 are held by the attraction between the magnet and the attracting portion. Alternatively, the magnetic bodies, such as iron, may be disposed on the case 312 side, and the magnets may be disposed on the attaching portion 360 side.

Fourth Embodiment

A fourth embodiment actualizing the present invention will be described hereafter with reference to the drawings. Constituent elements according to this embodiment that are identical or similar to those according to the above-described embodiments are given the same reference numbers. Descriptions thereof are omitted or simplified.

(Overall Configuration)

Figure 49:
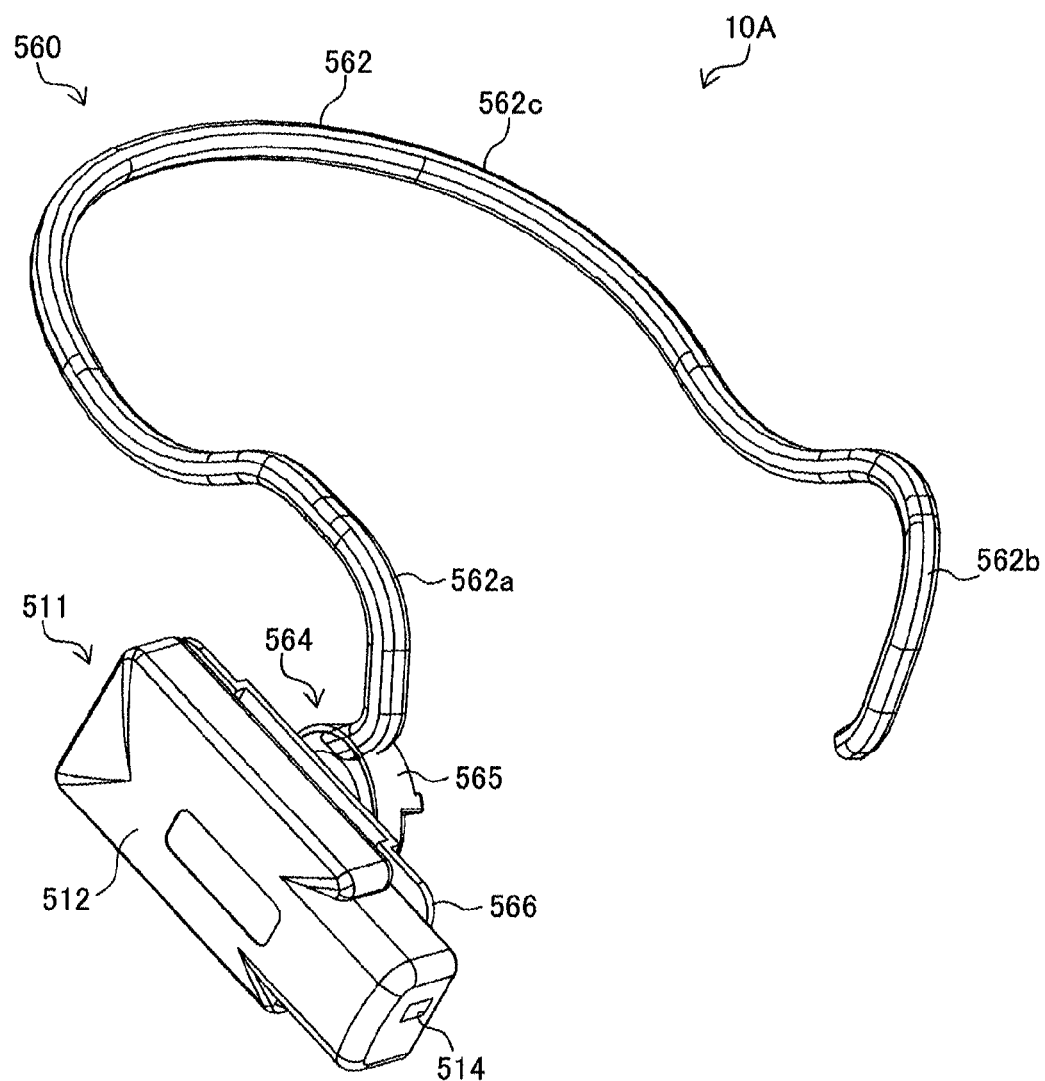
FIG. 49 is a perspective view schematically showing an example of a portable information code reading apparatus according to a fourth embodiment.

As shown in FIG. 49 and above-described FIG. 2, a portable information code reading apparatus 10A (also referred to, hereafter, as simply an information code reading apparatus 10A or a reading apparatus 10A) according to the fourth embodiment includes an imaging unit 23, a processing unit (control circuit 40), a case 512, and an attaching member 560. The imaging unit 23 captures an image of an information code. The processing unit processes the image of the information code captured by the imaging unit 23. The case 512 holds the imaging unit 23 and the processing unit. The attaching member 560 is provided as a component separate from the case 512 and attaches the case 512 to a user while holding the case 512.

First, an electrical configuration of the information code reading apparatus 10A will be described. As shown in FIG. 2 described above, in terms of hardware, the information code reading apparatus 10A is configured as a code reader that is capable of reading a one-dimension code, a two-dimensional code, and the like. The outer shell of the information code reading apparatus 10A is configured by the case 512. The information code reading apparatus 10A is configured such that various electronic components are housed inside the case.

As shown in FIG. 2, described above, the information code reading apparatus 10A is mainly configured by an optical system, a microcomputer (referred to, hereafter, as "micon") system, and a power supply system. The optical system includes an illumination light source 21, a marker light irradiating unit 50, the imaging unit 23, a filter 25, an imaging lens 27, and the like. The micon system includes a memory 35, a control circuit 40, an operating switch 42, and the like. The power supply system includes a power switch 41, a battery 49, and the like. These components are mounted on a printed wiring board (not shown) or provided inside the case. The electrical configurations and operations thereof are identical or similar to those described above.

(Mounting Structure and the Like)

Next, a mounting structure, which is the main feature of the portable information code reading apparatus 10A, and the like will be described.

The portable information code reading apparatus 10A is mainly configured by an apparatus main body 511 and the attaching member 560. The apparatus main body 511 includes the imaging unit 23, the processing unit (the control circuit 40 (see FIG. 2 described above)), and the case 512. The imaging unit 23 is capable of imaging the information code 100. The processing unit processes the image of the information code 100 captured by the imaging unit 23. The case 512 holds the imaging unit 23 and the processing unit. In addition, the attaching member 560 is provided as a component separate from the case 512. The attaching member 560 includes a flexible body mounting portion (mounting portion) 562 that is capable of flexible deformation and an attaching portion 566 to which the case 512 is attached and detached.

First, a configuration of the apparatus main body 511 will be described.

The apparatus main body 511 is configured such that various electronic components shown in FIG. 2, described above, are housed inside the case 512. In the present configuration, the apparatus main body 511 can be mounted on the attaching member 560 as in FIG. 49, and detached as in FIG. 55 and FIG. 56.

Figure 51:
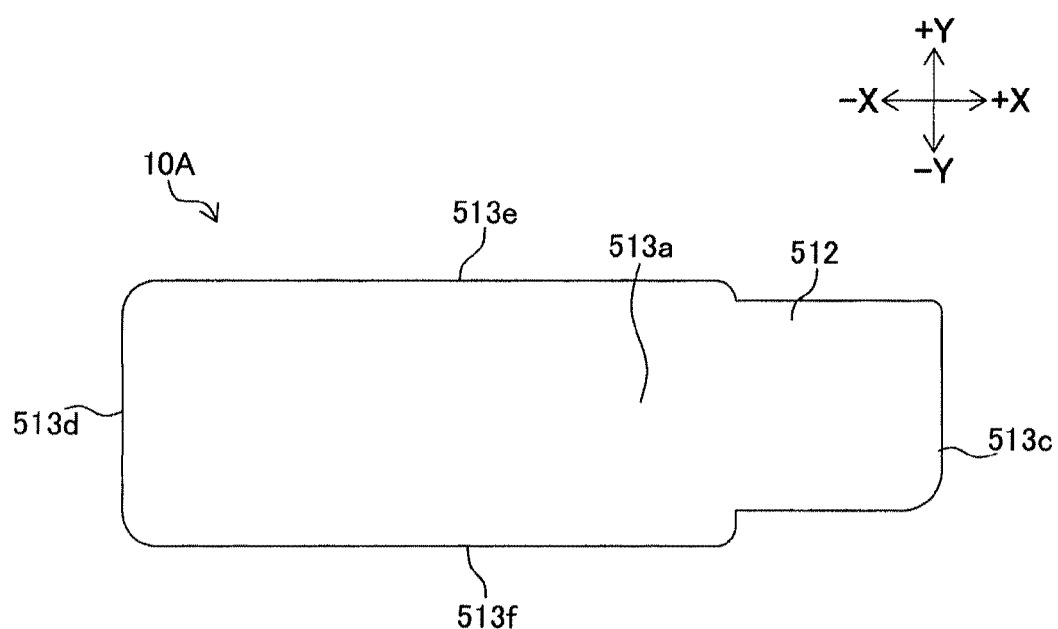
FIG. 51 is a simplified explanatory view of an outer shape when an apparatus main body of the portable information code reading apparatus in FIG. 49 is viewed from one side in a lateral direction.
Figure 54:
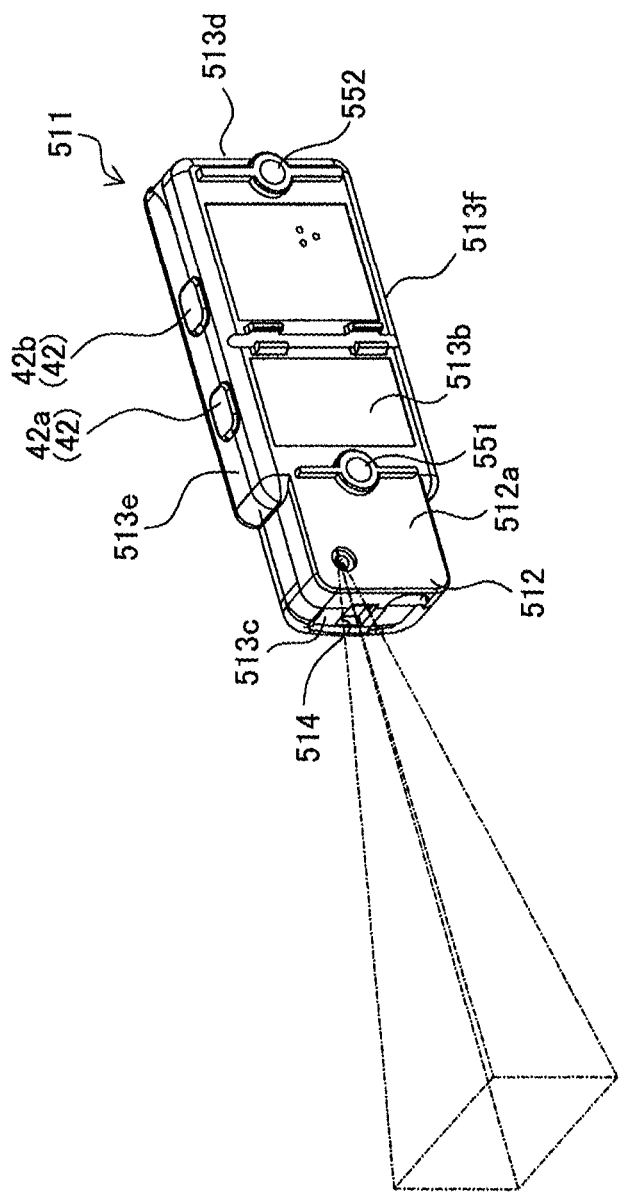
FIG. 54 is a perspective view of the apparatus main body in the portable information code reading apparatus in FIG. 49.
Figure 57:
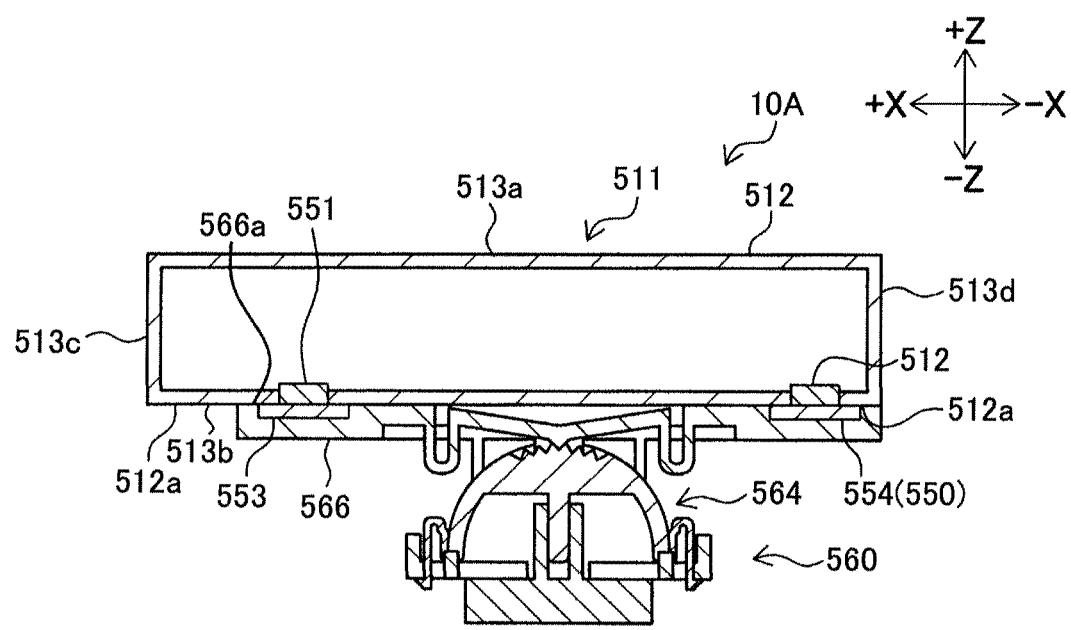
FIG. 57 is a schematic cross-sectional view schematically showing the portable information code reading apparatus in FIG. 49 cut off near a guide portion.

As shown in FIG. 51 and FIG. 52, the case 512 is formed such as to be elongated and box-shaped, as a whole. In the present configuration, the front/back direction, the width direction (lateral direction), and the up/down direction of the apparatus main body 511 are prescribed as described below. First, the direction of the center of the visual range of the imaging unit 23 (the optical axis direction) is the front/back direction, and the longitudinal direction of the case 512 is the front/back direction. The thickness direction of the case 512 in the direction perpendicular to the front/back direction is the width direction (lateral direction), and the direction in which an opposing wall portion 512a of the case 512 and an attachment wall portion 566a of the attaching portion 566 face each other is the width direction (lateral direction). The direction perpendicular to the front/back direction and the width direction is the up/down direction. As shown in FIG. 51, FIG. 57, and the like, hereafter, the front/back direction is described as being an X-axis direction. The up/down direction is described as being a Y-axis direction. The width direction (lateral direction) is described as being a Z-axis direction. The front direction is a positive X-axis direction. The back direction is a negative X-axis direction. Furthermore, the upward direction is a positive Y-axis direction. The downward direction is a negative Y-axis direction. The attaching member 560 side when viewed from the case 512 side is a negative Z-axis direction. The side opposite the attaching member 560 side is a positive Z-axis direction.

Based on the definitions given above, a front wall portion 513c is provided in the front end portion of the case 512. A back wall portion 513d is provided in the back end portion. Furthermore, a side wall portion 513b is provided on one side (the attaching member 560 side) in the width direction (left/right direction). The side wall portion 513a is provided on the side opposite the one side. Still further, an upper wall portion 513e is provided in the upper end portion and a lower wall portion 513f is provided in the lower end portion. A housing portion is formed having a box-like configuration that is surrounded from the front/back, left/right, and up/down by the front wall portion, the back wall portion, the side wall portions, the upper wall portion, and the lower wall portion. The housing portion houses electronic components such as the imaging unit and the control circuit. One side wall portion 513b functions as an opposing wall portion 512a that opposes the attaching member 560.

In addition, in the present configuration, with reference to the face Fa of the user, the direction in which the face Fa faces is described as the front side of the face Fa, and the side of the back of the head is described as the back side of the face Fa.

Figure 50:
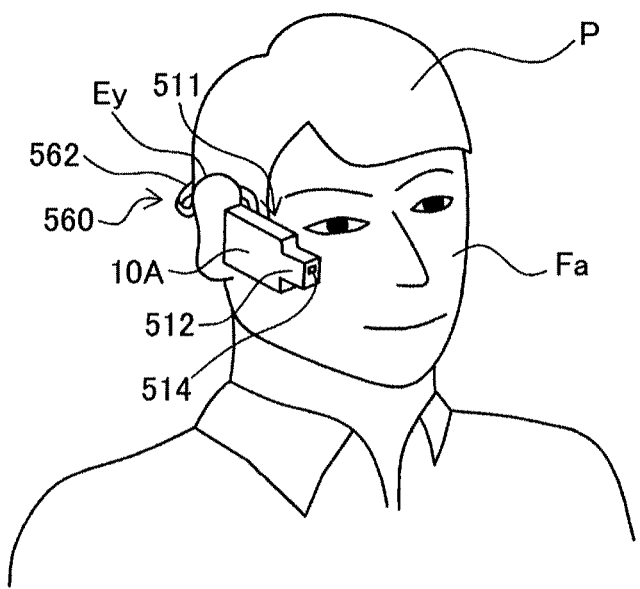
FIG. 50 is an explanatory view of a state of use of the portable information code reading apparatus in FIG. 49.

As shown in FIG. 49, FIG. 50, and FIG. 52, a reading opening 414 into which the light from the information code can be introduced is provided in the front wall portion 513c provided in the front end portion of the case 512. The attaching member 560 attaches the case 512 to an ear Ey of a user P, such that the case 512 is disposed in a lateral position the face Fa of the user and the reading opening 514 faces the front side of the user P, as shown in FIG. 50. In this way, the case 512 is attached by the attaching member 560 such that the imaging unit 23 faces the same field as the field that the face of the user faces.

As in FIG. 52 and FIG. 53, the operating switch 42 (42a and 42b) that can be externally operated is provided in the upper wall portion 513e of the case 512 (see FIG. 2). In addition, the illumination light source 21 and the marker light irradiating unit 50 are provided inside the case 512 as shown in FIG. 2, described above. The illumination light source 21 irradiates an illumination light. The marker light irradiating unit 50 irradiates a marker light. The illumination light from the illumination light source 21 and the marker light from the marker light irradiating unit 50 are both irradiated towards the front side of the case from the front wall portion 513c.

Next, the attaching member 560 will be described.

The attaching member 560 is provided with the flexible body mounting portion 562 that is capable of flexible deformation, the attaching portion 566 to which the case 512 is attached and detached, and a base portion 565 that supports the body mounting portion 562. The attaching member 560 attaches the case 512 to the ear Ey of the user such that the reading opening 514 faces the field that the face Fa of the user faces.

The body mounting portion 562 is configured as ear hook portions that are hooked onto both ears of the user. As shown in FIG. 49, the body mounting portion 562 is configured such that a predetermined shape is retained in a natural state when mounted, and is capable of elastic deformation. The body mounting portion 562 is configured such as to extend from the base portion 565 and is U-shaped, as a whole. The body mounting portion 562 is provided with a right-ear hook portion 562a, a left-ear hook portion 562b, and a connecting portion 562c. The right-ear hook portion 562a is formed into a curve such as to protrude upwards. The left-ear hook portion 562b is formed apart from the right-ear hook portion 562a and is formed into a curve such as to protrude upwards.

The intermediate connecting portion 362c connects the right-ear hook portion 562a and the left-ear hook portion 562b. As shown in FIG. 50, the connecting portion 562c is a portion that wraps around the user such as to be placed against the back of the head or the neck, when mounted such that the attaching member 560 is hooked onto the ears of the user.

The base portion 565 is connected to the back surface side (the surface side opposite the attachment wall portion 566a) of the attaching portion 566 that is formed in an elongated shape, near the center portion of the attaching portion 566 in the longitudinal direction. The base portion 565 is configured to protrude from the back surface side of the base portion 565. The body mounting portion 562 is formed into a curve such as to extend with the peripheral wall portion of the base portion as the starting point.

The attaching portion 566 is formed into a sheet shape, as a whole. The base portion 565 is connected on one sheet surface side. The case 512 is detachably connected on the other sheet surface side. The wall portion on the sheet surface side to which the case 512 is connected is configured as the attachment wall portion 566a. The case 512 can be mounted on and detached from the attachment wall portion 566a.

A guide portion 550 detachably connects the case 512 to the attaching portion 566 of the attaching member 560. The guide portion 550 also functions to guide the posture of the case 512 in relation to the attaching portion 566 to a predetermined posture (specifically, a posture in which the reading opening 514 faces the direction in which the face of the user P faces (the field to which the line of sight is oriented) during connection. The guide portion 550 includes two case-side connecting portions (a first case-side connecting portion 551 and a second case-side connecting portion 552) provided in the case 512, and two attaching member-side connecting portions (a first attaching member-side connecting portion 553 and a second attaching member-side connecting portion 554) provided in the attaching portion 566 of the attaching member 560. As a result of the two case-side connecting portions and the two attaching member-side connecting portions being respectively connected, the attaching member 560 and the case 512 are connected.

The two case-side connecting portions are composed of the first case-side connecting portion 551 and the second case-side connecting portion 552 that are configured as magnets. The two attaching member-side connecting portions are composed of the first attaching member-side connecting portion 553 and the second attaching member-side connecting portion 554 that are configured as magnets. The first case-side connecting portion 551 and the second case-side connecting portion 552 correspond to an example of a one-side magnet or a magnetic body. The first attaching member-side connecting portion 553 and the second attaching member-side connecting portion 554 correspond to an example of a magnetic body or a one-side magnet.

The polarities differ between the first case-side connecting portion 551 and the first attaching member-side connecting portion 553. The first case-side connecting portion 551 and the first attaching member-side connecting portion 553 are connected such as to be attracted to each other. For example, the first case-side connecting portion 551 is configured as a permanent magnet of which the surface portion is the N pole. The first attaching member-side connecting portion 553 is configured as a permanent magnet of which the surface portion is the S pole. The first case-side connecting portion 551 and the first attaching member-side connecting portion 553 are attracted to each other when the respective surface portions oppose each other. In addition, polarities differ between the second case-side connecting portion 552 and the second attaching member-side connecting portion 554. The second case-side connecting portion 552 and the second attaching member-side connecting portion 554 are connected such as to be attracted to each other. For example, the second case-side connecting portion 552 configured as a permanent magnet of which the surface portion is the S pole. The second attaching member-side connecting portion 554 is configured as a permanent magnet of which the surface portion is the N pole. The second case-side connecting portion 552 and the second attaching member-side connecting portion 554 are attracted to each other when the respective surface portions oppose each other.

Furthermore, the first case-side connecting portion 551 and the second attaching member-side connecting portion 554 have the same polarity. The second case-side connecting portion 552 and the first attaching member-side connecting portion 553 have the same polarity. In the example described above, the surface portion of the first case-side connecting portion 551 is configured to be the N pole. The surface portion of the second attaching member-side connecting portion 554 is also configured to be the N pole. Therefore, the first case-side connecting portion 551 and the second attaching member-side connecting portion 554 repel each other when the respective surface portions oppose each other. In addition, the surface portion of the second case-side connecting portion 552 is configured to be the S pole. The surface portion of the first attaching member-side connecting portion 553 is also configured to be the S pole. Therefore, second case-side connecting portion 552 and the first attaching member-side connecting portion 553 repel each other when the respective surface portions oppose each other.

Furthermore, a displacement adjusting portion 564 is provided that is capable of changing the displacement of the imaging unit 23 for which the opposing wall portion 512*a* serves as reference or the displacement of the attaching portion 566 for which the base portion 565 serves as reference. The displacement adjusting portion 564 is, for example, configured as a publically known ratchet mechanism. The displacement adjusting portion 564 is configured to be capable of rotating the attaching portion 566 with a predetermined rotation axis as the center. The displacement adjusting portion 564 is capable of changing the rotation position of the attaching portion 566 in steps.

In the reading apparatus 10A that is configured as described above, an information code reading process can be continuously performed each time a predetermined trigger condition is met or after a predetermined start condition is met. For example, pressing of the operating switch may be set as the trigger for the start of imaging. The imaging unit 23 may continuously perform the imaging process after the operating switch is pressed. An information code may be read each time an information code enters the imaging area. Alternatively, reading may be started under a condition that a predetermined state is detected by a sensor that differs from the operating switch 42. For example, a publically known proximity sensor that detects the approach of an object in the forward direction of the case 312 may be provided. When an object approaches, the illumination light source and the imaging unit may be operated, and imaging and decoding may be performed. Alternatively, sound inputted from a microphone may be analyzed. A determination may be made regarding whether or not the sound corresponds to a predetermined sound (such as whether or not a sound level that is a certain level or higher is detected, or whether or not a sound that has a predetermined waveform is detected). The determination process may be performed by the reading apparatus 10 or by an external apparatus.

(Main Effects of the Present Configuration)

In the present configuration, a configuration that enables the information code reading apparatus 10A to be used such as to be mounted on the body rather than being gripped in the hand can be actualized. Furthermore, in this configuration, the case side can be detached such as to be separated, in a state in which the section (body mounting portion 562) that is mounted on the body is attached to the body. Therefore, detachment operation can be facilitated. Furthermore, the body mounting portion 562 has a flexible structure that is capable of flexible deformation. Therefore, the degree of freedom in mounting on the body can be increased.

In addition, the body mounting portion 562 is configured such that a predetermined shape is retained in a natural state when mounted, and is capable of elastic deformation. Because the structure is that in which the body mounting portion 562, which attempts to maintain a prescribed shape by elastic return force in this way, is attached, complicated binding operations and the like during attachment to the body can be more easily omitted. Further facilitation of mounting can be achieved.

In addition, the body mounting portion 562 is configured as an ear hook portion that is hooked onto the ear of the user. In this configuration, because the reading apparatus 10A is attached to the ear, the movement of the face and the overall reading apparatus 10A move in tandem. The reading direction can be more easily set such as to match the movement of the face of the user. Furthermore, because the attachment position is the ear, the reading apparatus can be easily mounted even when another mounted tools (such as a helmet or glasses) is used.

In addition, the guide portion 550 is provided that detachably connects the case 512 to the predetermined attaching portion 556 of the attaching member 560. The guide portion 550 guides the posture of the case 512 in relation to the attaching portion 566 to a predetermined posture (specifically, a posture in which the reading opening 514 faces the direction in which the face of the user P faces (the field to which the line of sight is oriented) during connection. In this configuration, detachment of the case side from the body can be easily performed in a configuration in which the reading apparatus 10A can be used such as to be mounted on the body rather than being gripped in the hand. Furthermore, a configuration in which remounting after detachment can be easily performed can be actualized. In particular, during remounting, the guide portion 550 provides guidance such that the posture of the case 512 in relation to the attaching portion 566 that remains attached to the user becomes a predetermined posture. Therefore, the case 512 side can be more quickly mounted such as to be in a more accurate position and orientation.

In addition, the guide portion 550 includes at least two case-side connecting portions provided in the case 512 and at least two attaching member-side connecting portions provided in the attaching portion 566 of the attaching member 560. As a result of the two case-side connecting portions and two attaching member-side connecting portions being respectively connected to each other, the attaching member 560 and the case 512 are connected. In this way, the configuration is that in which two connecting portions (case-side connecting portions) provided in the case 512 are connected such as to be aligned to the at least two connecting portions (attaching member-side connecting portions)

set in the attaching member 560. Therefore, the orientation of the case 512 can be more accurately set to face the desired direction.

In addition, the guide portion 550 has a one-side magnet that is provided in either of the case 512 and the attaching portion 566, and a magnetic body that is provided in the other of the case 512 and the attaching portion 566 and is attracted to the one-side magnet. As a result of this configuration, the case 512 can be led to a predetermined position in the attaching member 560 using the attraction force between the one-side magnet and the magnetic body on the other side. The burden of positioning and connection can be further reduced.

Specifically, the two case-side connecting portions are composed of the first case-side connecting portion 551 and the second case-side connecting portion 552 that are configured as magnets. The two attaching member-side connecting portions are composed of the first attaching member-side connecting portion 553 and the second attaching member-side connecting portion 554 that are configured as magnets. The polarities differ between the first case-side connecting portion 551 and the first attaching member-side connecting portion 553. The first case-side connecting portion 551 and the first attaching member-side connecting portion 553 are connected such as to be attracted to each other. In addition, polarities differ between the second case-side connecting portion 552 and the second attaching member-side connecting portion 554. The second case-side connecting portion 552 and the second attaching member-side connecting portion 554 are connected such as to be attracted to each other. Furthermore, the first case-side connecting portion 551 and the second attaching member-side connecting portion 554 have the same polarity. The second case-side connecting portion 551 and the first attaching member-side connecting portion 553 have the same polarity.

In this configuration, as shown in FIG. 57, when a positional relationship is established in which the connecting portions that correspond at the two connecting positions (that is, the first case-side connecting portion 551 and the first attaching member-side connecting portion 553, and the second case-side connecting portion 552 and the second attaching member-side connecting portion 554) respectively oppose each other, the case 12 can be more accurately led to a predetermined position of the guide portion 5509 using the attraction force generated at each connecting position. Conversely, the connecting portions that do not correspond (that is the first case-side connecting portion 551 and the second attracting member-side connecting portion 554, and the second case-side connecting portion 552 and the first attracting member-side connecting portion 553) have the same polarity. Therefore, even when connection is attempted in an orientation (reverse orientation) in which the connecting portions that do not correspond oppose each other, the connecting portions repel each other at each position and connection is not achieved. Therefore, in the correct orientation as shown in FIG. 57, the positioning of the case 512 to the attracting member 560 can be more accurately and quickly performed. Abnormal connection in the reverse orientation can be prevented with further certainty.

In addition, the attracting member 560 includes the base portion 565 that is connected to the attaching portion 566. The body mounting portion (mounting portion) 562 extends from the base portion 565. The case 512 includes an opposing wall portion (attached portion) 512a that is connected to the attaching portion 566 by the guide portion 550. Furthermore, the displacement adjusting portion 64 is provided that is capable of changing the displacement of the attaching portion 566 with reference to the base portion 565. In this configuration, the displacement of the attaching portion 566 with reference to the base portion 565 can be adjusted by the displacement adjusting portion 564. Therefore, the orientation of the imaging unit 23 when the case 512 is attached to the attaching portion 566 can be more easily finely adjusted to face the desired direction.

In addition, in the present configuration, a battery is housed inside the case 512. In this configuration, the power supply is present inside the case 512. Therefore, reading of an information code can be continued even when power supply is not received from the outside, while the case 512 is detached from the attaching member 560.

Variation Example According to the Fourth Embodiment

Next, a variation example according to the fourth embodiment will be described with reference to FIG. 58.

This variation example differs from the above-described fourth embodiment only in terms of power supply and is the same as the fourth embodiment in other aspects. Specifically, a cable 19 (connecting cable) is provided such as to connect the attaching member 560 and the case 512. The cable 519 is configured such as to supply power to the case 512 side from the attaching member 560 or a battery that is electrically connected to the attaching member 560. In this configuration, the electrical configuration can be divided into the case side (reading side) and the attaching member side. The electronic components on the case side can be further reduced. Therefore, size reduction and weight reduction on the case side can be more easily achieved.

The cable 519 may be used for information communication, rather than for power supply. Alternatively, the cable 519 may be used for both power supply and information communication. For example, the communication unit 48 shown in FIG. 2, described above, may be provided inside equipment provided in the attaching member 560 or inside equipment electrically connected to the attaching member 560. Data (such as decoded data) may be transmitted from the apparatus main body 511 side to the attaching member 560 side. The communication unit 48 provided inside the equipment provided in the attaching member 560 or the equipment electrically connected to the attaching member 560 may transmit data (decoded data) to an external apparatus. Alternatively, the imaging unit 23 may be provided on the apparatus main body 511 side. The control circuit 40 and the memory 35 may be provided inside the equipment provided in the attaching member 560 or inside the equipment electrically connected to the attaching member 560. In this case, the data imaged by the imaging unit 23 may be decoded by the control circuit 40 that is provided inside the equipment provided in the attaching member 560 or the equipment electrically connected to the attaching member 560.

Figure 58:
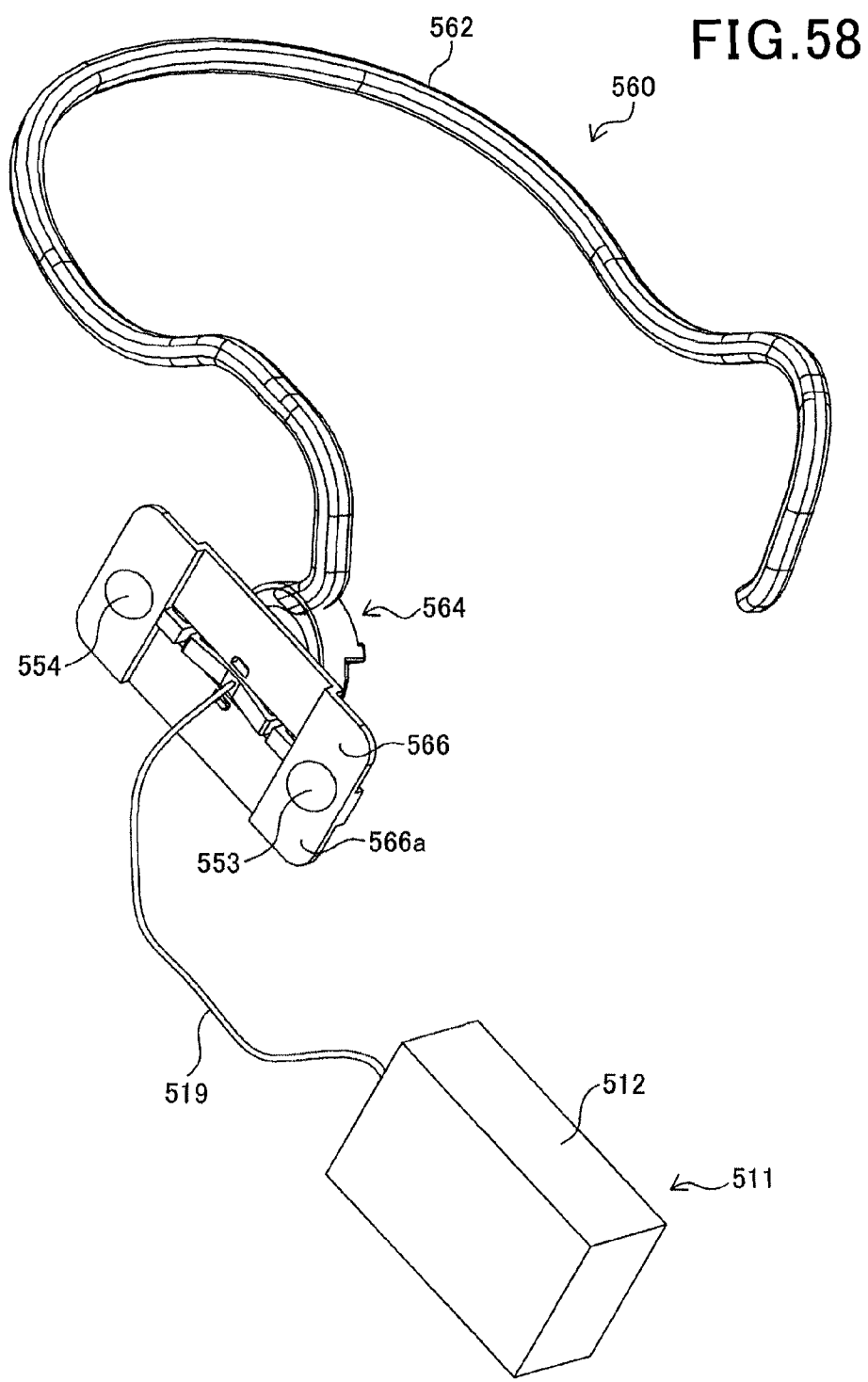
FIG. 58 is an explanatory diagram schematically showing the apparatus main body detached from the attaching member in the portable information code reading apparatus in FIG. 49.

The cable 519 that is shown in FIG. 58 may be configured such as to be capable of being housed inside the case 512 or may be configured such as to be capable of being housed inside a housing portion (not shown) provided in the attaching member 560. When the cable 519 is configured such as to be capable of being housed in this way, the housing portion may be provided with an automatic winding mechanism for the cable 519.

Fifth Embodiment

Figure 59:
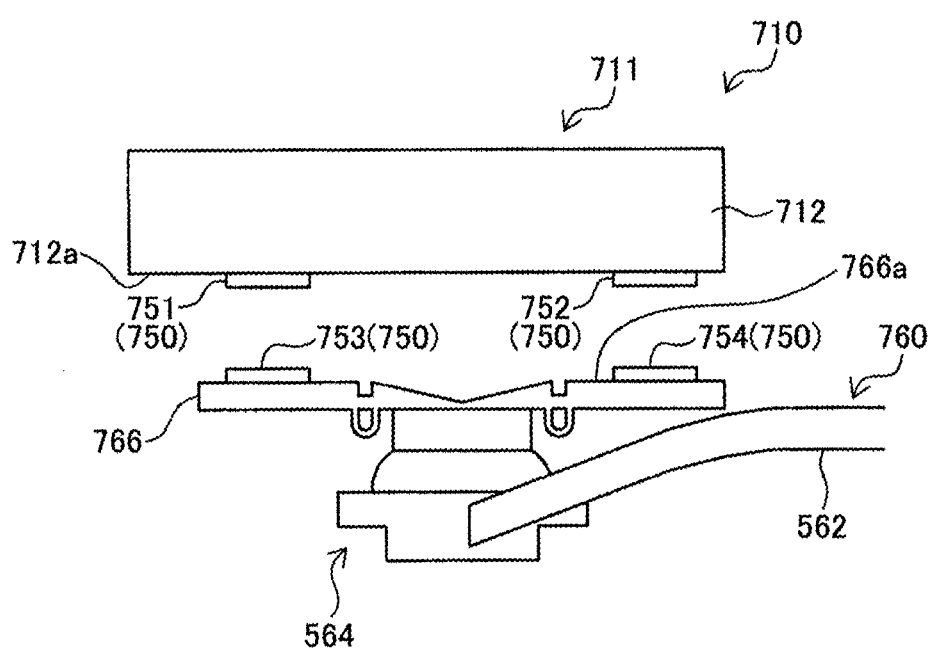
FIG. 59 is an explanatory diagram for explaining a state in which a case is detached from an attaching portion in a portable information code reading apparatus according to a fifth embodiment.

Next, a fifth embodiment will be described with reference to FIG. 59.

The fifth embodiment differs from the fourth embodiment or the variation example according to the fourth embodiment only in terms of the configuration of the opposing wall portion of the case, the configuration of the attaching wall portion of the attaching member, and the configuration of the guide portion. The fifth embodiment is the same as the fourth embodiment or the variation example according to the fourth embodiment in other aspects. Therefore, because the fifth embodiment is the same as the fourth embodiment or the variation example according to the fourth embodiment in other aspects, a detailed description of these aspects are omitted.

In the present configuration as well, a guide portion 750 is provided that detachably connects a case 712 to a predetermined attaching portion 766 of an attaching member 760. The guide portion 750 guides the posture of the case 712 in relation to the attaching portion 766 to a predetermined posture (specifically, a posture in which the reading opening 514 faces the direction in which the face of the user P faces (the field to which the line of sight is oriented), in a manner similar to that in FIG. 50) during connection.

The guide portion 750 used according to the fifth embodiment includes two case-side connecting portions 751 and 752 provided in the case 712, and two attaching member-side connecting portions 752 and 754 provided in the attaching portion 766 of the attaching member 760. As a result of the two case-side connecting portions 751 and 752 and the two attaching member-side connecting portions 753 and 754 being respectively connected to each other, the attaching member 760 and the case 712 are connected. The two case-side connecting portions 751 and 752 function as a one-side sheet material. The two attaching member-side connecting portions 753 and 754 function as an other-side sheet material. The case-side connecting portion 751 and the attaching member-side connecting portion 753 are connected as hook-and-loop fasteners. The case-side connecting portion 752 and the attaching member-side connecting portion 754 are connected as hook-and-loop fasteners.

As a result of this configuration, the case 512 can be led to a predetermined position in the attaching member 560 using the action by which the one-side sheet material and the other-side sheet material attempt to couple with each other. In particular, during remounting, operation is merely required such as to bring the one-side sheet material and the other-side sheet material into contact with each other. Because large force and complicated operations are not required during remounting, the configuration is excellent also in terms of workability.

Sixth Embodiment

Figure 60:
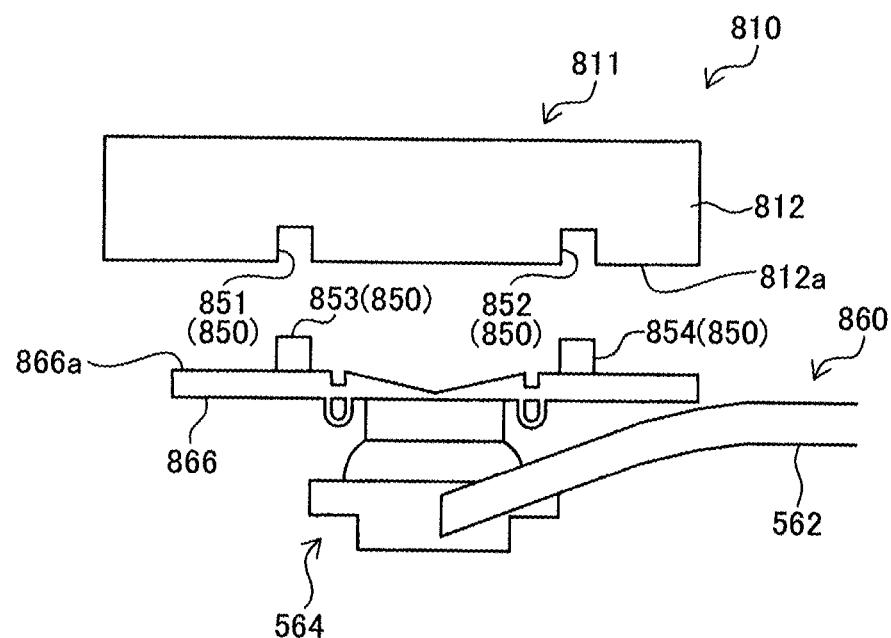
FIG. 60 is an explanatory diagram for explaining a state in which a case is detached from an attaching portion in a portable information code reading apparatus according to a sixth embodiment.

Next, a fifth embodiment will be described with reference to FIG. 60.

The sixth embodiment differs from the fourth embodiment or the variation example according to the fourth embodiment only in terms of the configuration of the opposing wall portion of the case, the configuration of the attaching wall portion of the attaching member, and the configuration of the guide portion. The sixth embodiment is the same as the fourth embodiment or the variation example according to the fourth embodiment in other aspects. Therefore, because the sixth embodiment is the same as the fourth embodiment or the variation example according to the fourth embodiment in other aspects, a detailed description of these aspects are omitted.

In the present configuration as well, a guide portion 850 is provided that detachably connects a case 812 to a predetermined attaching portion 866 of an attaching member 860. The guide portion 850 guides the posture of the case 812 in relation to the attaching portion 366 to a predetermined posture (specifically, a posture in which the reading opening 514 faces the direction in which the face of the user P faces (the field to which the line of sight is oriented), in a manner similar to that in FIG. 50) during connection.

The guide portion 850 used according to the sixth embodiment includes two case-side connecting portions 851 and 852 provided in the case 812, and two attaching member-side connecting portions 852 and 854 provided in the attaching portion 866 of the attaching member 860. As a result of the two case-side connecting portions 851 and 852 and the two attaching member-side connecting portions 853 and 854 being respectively connected to each other, the attaching member 860 and the case 812 are connected. The two case-side connecting portions 851 and 852 function as a one-side mating portion. The two attaching member-side connecting portions 853 and 854 function as a mated portion. The case-side connecting portion 851 and the attaching member-side connecting portion 853 are connected by a mating structure. The case-side connecting portion 852 and the attaching member-side connecting portion 754 are connected by a mating structure.

As a result of this configuration, the case 512 can be led to a predetermined position in the attaching member 560 using the action by which the one-side mating portion and the mated portion attempt to mate with each other. In addition, the case 512 can be stably attached to the attaching member 560 without extensive use of special materials and complicated structures.

Seventh Embodiment

Figure 61:
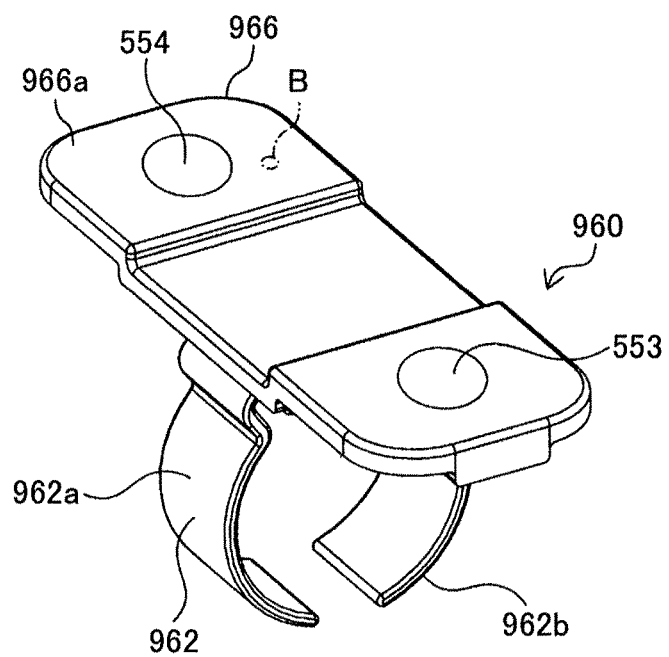
FIG. 61 is a perspective view of an attaching member in a portable information code reading apparatus according to a seventh embodiment.
Figure 62:
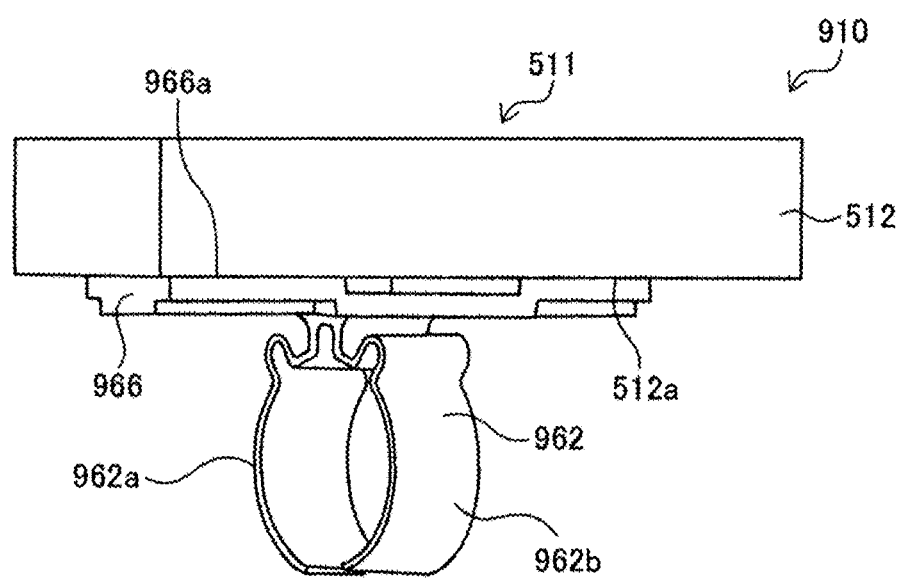
FIG. 62 is a perspective view of the attaching member in FIG. 61, viewed from a direction differing from that in FIG. 61.

Next, a seventh embodiment will be described with reference to FIG. 61, FIG. 62, and the like.

The seventh embodiment differs from the fourth embodiment or the variation example according to the fourth embodiment only in terms of the configuration of the attaching member. The seventh embodiment is the same as the fourth embodiment or the variation example according to the fourth embodiment in other aspects. Specifically, the seventh embodiment differs from the fourth embodiment or the variation example according to the fourth embodiment only in terms of the base portion and the body mounting portion. The seventh embodiment is the same as the fourth embodiment or the variation example according to the fourth embodiment in other aspects. For example, the apparatus main body 511 is the same as that according to the fourth embodiment.

In an attaching member 960 used according to the seventh embodiment, the structure of an attaching portion 966 is the same as that of the attaching portion 566 used according to the fourth embodiment. Meanwhile, a body mounting portion 962 differs from the body mounting portion 562 used according to the fourth embodiment. The body mounting portion 962 is configured as a band member that is hooked onto an arm or a finger of the user. In the body mounting portion 962, a pair of curved portions 962a and 962b are disposed such as to oppose each other. The body mounting portion 962 is formed into a substantially annular shape, as a whole. The tip end portions of the pair of curved portions 962a and 962b are disposed such as to oppose each other, and a gap is formed between the tip end portions. When the body mounting portion 462 is configured to be about the size of a typical finger, the attaching member 960 can be mounted on the finger of the user by the finger being inserted between the curved portions 962a and 962b, such as those described above, and held in a ring-like manner. In addition, when the body mounting portion 462 is configured to be about the size of a typical wrist, the attaching member 960 can be mounted on the arm of the user by the wrist being placed between the curved portions 962a and 962b, such as those described above, and held in a bracelet-like manner.

In this configuration, the apparatus main body 511 is attached to the finger or the arm. Therefore, movement in tandem with the movement of the hand can be facilitated while actualizing a configuration that enables operation without the reading apparatus being gripped in the hand.

In any of the configurations according to the seventh embodiment, the configuration of the opposing wall portion, the configuration of the attaching wall portion, and the configuration of the guide portion may be similar to those according to the fifth embodiment or those according to the sixth embodiment.

Variation Example According to the Seventh Embodiment

A variation example according to the seventh embodiment enables use of the attaching member 560 (such as in FIG. 55) according to the fourth embodiment and the attaching member 960 (such as in FIG. 61 and FIG. 62) according to the seventh embodiment.

In the present configuration, the configuration of the apparatus main body 511 is the same as that according to the fourth embodiment. In this configuration as well, the apparatus main body 511 is provided with the imaging unit 23, the processing unit, and the case 512. The imaging unit 23 images an information code. The processing unit processes the image of the information code captured by the imaging unit 23. The case 512 holds the imaging unit 23 and the processing unit. All of the attaching members include the body mounting portion and the attaching portion to which the case 512 is attached and detached. The attaching member is configured as a component separate from the case 512.

On this configuration, various types of attaching members 560 and 960 can be attached to the user. When any of the attaching members is attached to the user, the case 12 can be connected to the attached attaching member. In this case, the attaching member 560 and the attaching member 960 may be alternatively used. Both attaching members 560 and 960 may be mounted, and the case 512 may be attached to either attaching member.

In this configuration, any attaching member among a plurality of types of attaching members 560 prepared in advance can be selected and used. The attaching member can be mounted in the appropriate position based on the usage conditions. In addition, when any type of attaching member 560 is used, the case side can be commonly used. Therefore, a structure for the case side is not required to be prepared for each type of attaching member 560. Reduction in the number of components and reduction in cost can be more easily achieved.

In addition, in the present configuration, when any of the attaching members, among the plurality of types of attaching members 560 and 960, is connected to the case 512, the type of attaching portion connected to the case 512 may be determined.

Figure 55:
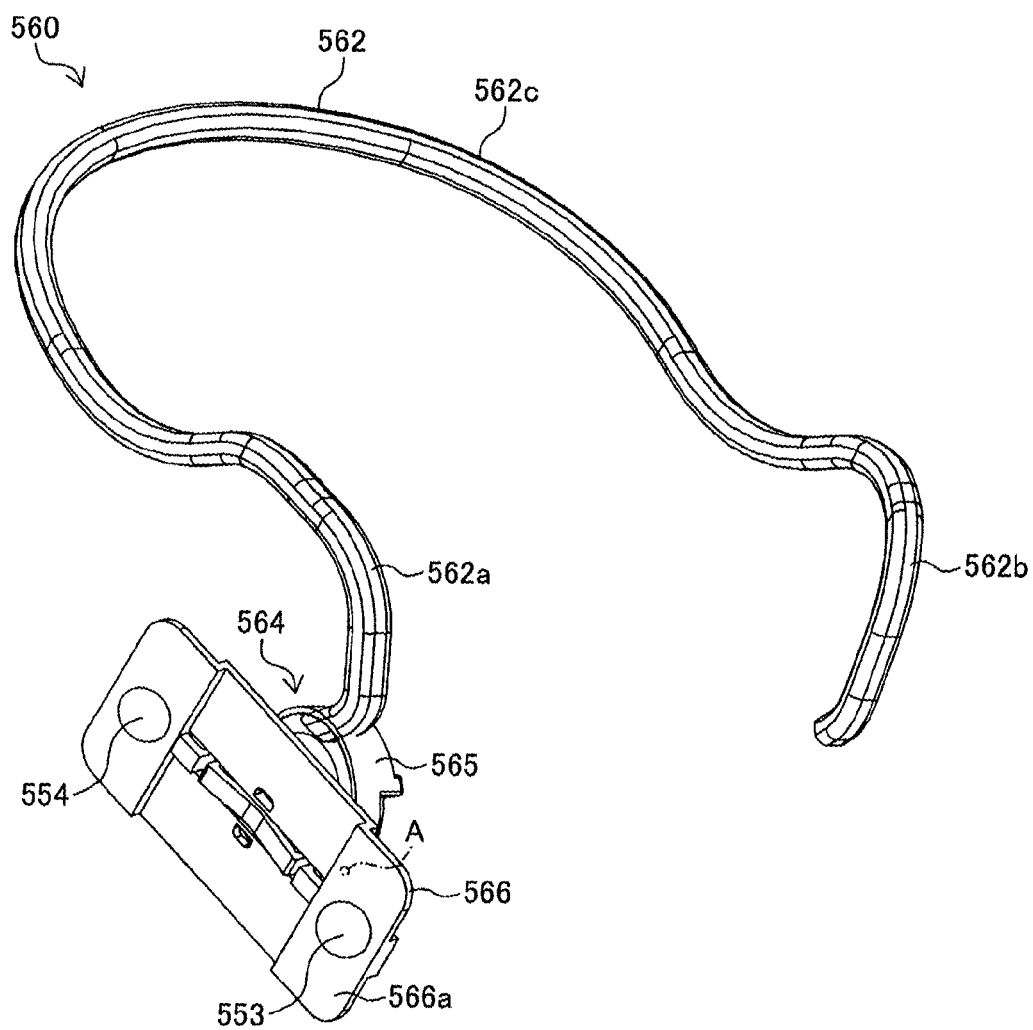
FIG. 55 is a perspective view of an attaching member of the portable information code reading apparatus in FIG. 49.
Figure 56:
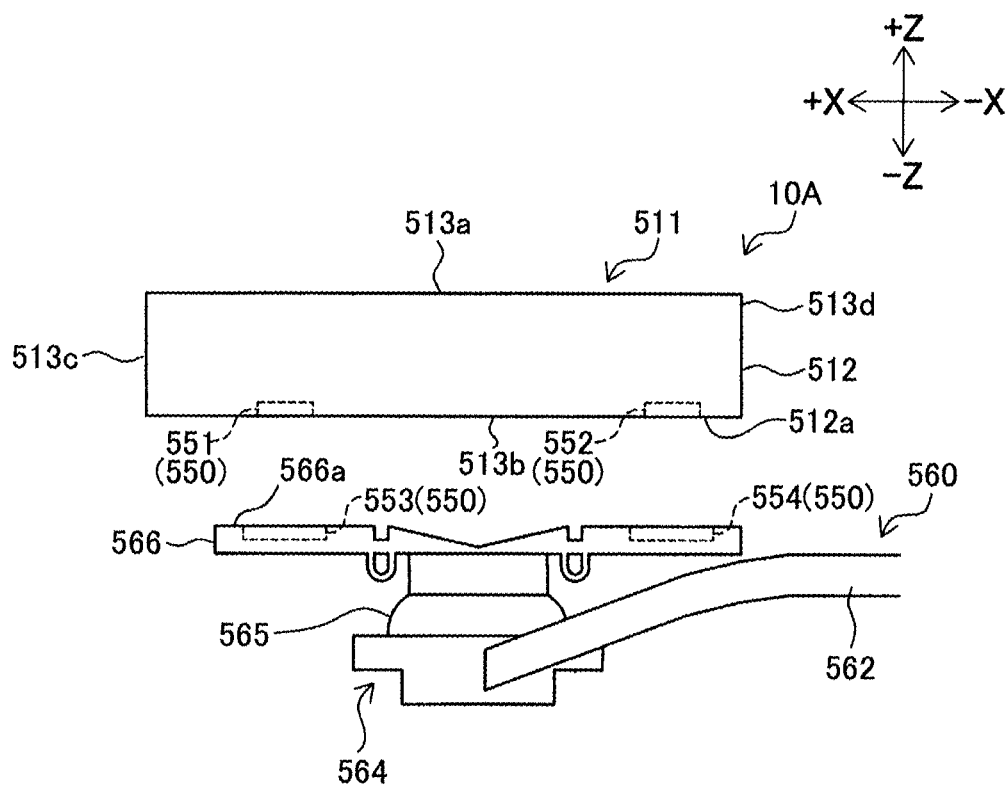
FIG. 56 is an explanatory diagram for explaining a state in which a case is detached from an attaching portion.

For example, a protruding portion is provided in the attaching member 560 in the position of the single-dot chain line A shown in FIG. 55. A protruding portion is also provided in the attaching member 960 in the position of the single-dot chain line B shown in FIG. 61. A first hole portion and a second hole portion may each be formed in the case 512 such as to correspond to the position A and the position B. For example, when the attaching member 560 is mounted on the case 512, the protruding portion formed in the position A is inserted into the first hole portion formed in the case 512. When the attaching member 960 is mounted on the case 512, the protruding portion formed in the position B is inserted into the second hole portion formed in the case 512. In this case, a sensor is provided that detects the insertion of the protruding portion into the first hole portion and the insertion of the protruding portion into the second hole portion. When the sensor detects the insertion of the protruding portion into the first hole portion, a determination is made that the case 512 is attached to the attaching member 560. When the sensor detects the insertion of the protruding portion into the second hole portion, a determination is made that the case 512 is attached to the attaching member 960. In this configuration, the above-described sensor and the control circuit correspond to an example of a determining unit.

In addition, in the apparatus main body 511, a corresponding process based on the type determined by the determining unit may be performed. For example, when the determining unit detects that the case 512 is attached to the attaching member 560, the reading mode is set to a first mode. When the determining unit detects that the case 512 is attached to the attaching member 960, the reading mode is set to a second mode. In this way, a configuration in which mode switching is performed is possible. In this case, in the first mode when the reading apparatus is mounted on the ear, the imaging process is performed continuously and an automatic sense mode may be used in which the reading process is automatically performed each time an information code is imaged. In addition, in the second mode when the reading apparatus is mounted on a finger or an arm, a mode may be used in which the reading process is performed each time the operating switch 42 is pressed. In the present configuration, the control circuit 40 corresponds to an example of a corresponding processing unit and functions to perform a corresponding process based on the type determined by the determining unit.

In the present configuration, while actualizing a configuration that enables common use of the case 512 when a plurality of types of attaching members 560 are used, on the case side, the type of the mounted attaching member 560 can be determined and a process based on the determined type can be performed.

The method for determining the type of the attaching member connected to the case 512 is not limited to the above-described method. For example, the user may input information on the type of attaching member into the case 512. Alternatively, a communication means may be provide in each attaching member. A signal specifying the type of the attaching member itself may be transmitted from each attaching member to the case 512 side.

Eighth Embodiment

Figure 63:
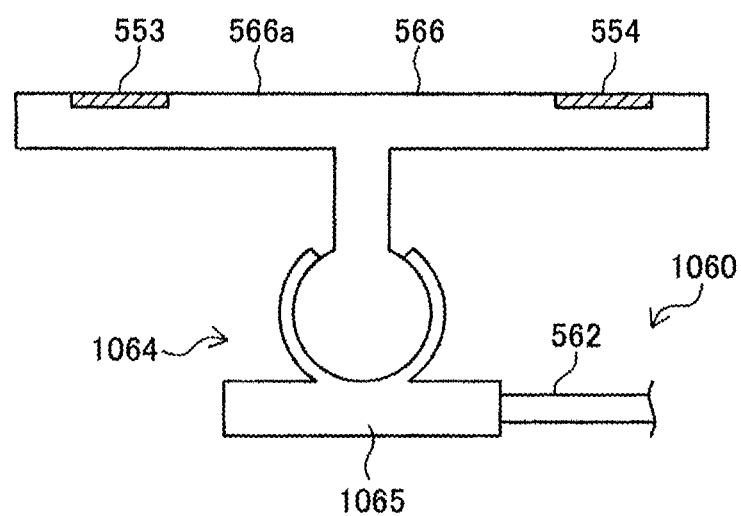
FIG. 63 is an explanatory diagram schematically showing an attaching member of a portable information code reading apparatus according to an eleventh embodiment.

Next, an eighth embodiment will be described with reference to FIG. 63.

The eighth embodiment differs from the fourth embodiment only in terms of the configuration of the attaching member 560 (specifically, the configuration of a base portion 1065 that connects the attaching portion 566 and the body mounting portion 562 (the configuration of a displacement adjusting portion 1064)). The eighth embodiment is the same as the fourth embodiment in other aspects. Therefore, because the eighth embodiment is the same as the fourth embodiment in other aspects, detailed descriptions of these aspects are omitted.

The displacement adjusting portion 1064 used according to the eighth embodiment is configured as a ball joint that connects the body mounting portion 562 side and the attaching portion 566 side by a spherical pair structure. In this configuration, as a result of the base portion 1065 and the attaching portion 566 being connected by the spherical pair structure, the orientation of the attaching portion 566 in relation to the base portion 1065 can be changed in a three-dimensional manner.

In any of the configurations according to the eighth embodiment, the configuration of the opposing wall portion, the configuration of the attaching wall portion, and the configuration of the guide portion may be similar to those according to the fifth embodiment or those according to the sixth embodiment. In addition, the structure of the base portion according to the eighth embodiment may be applied to the seventh embodiment and the variation example according to the seventh embodiment.

Ninth Embodiment

Figure 64:
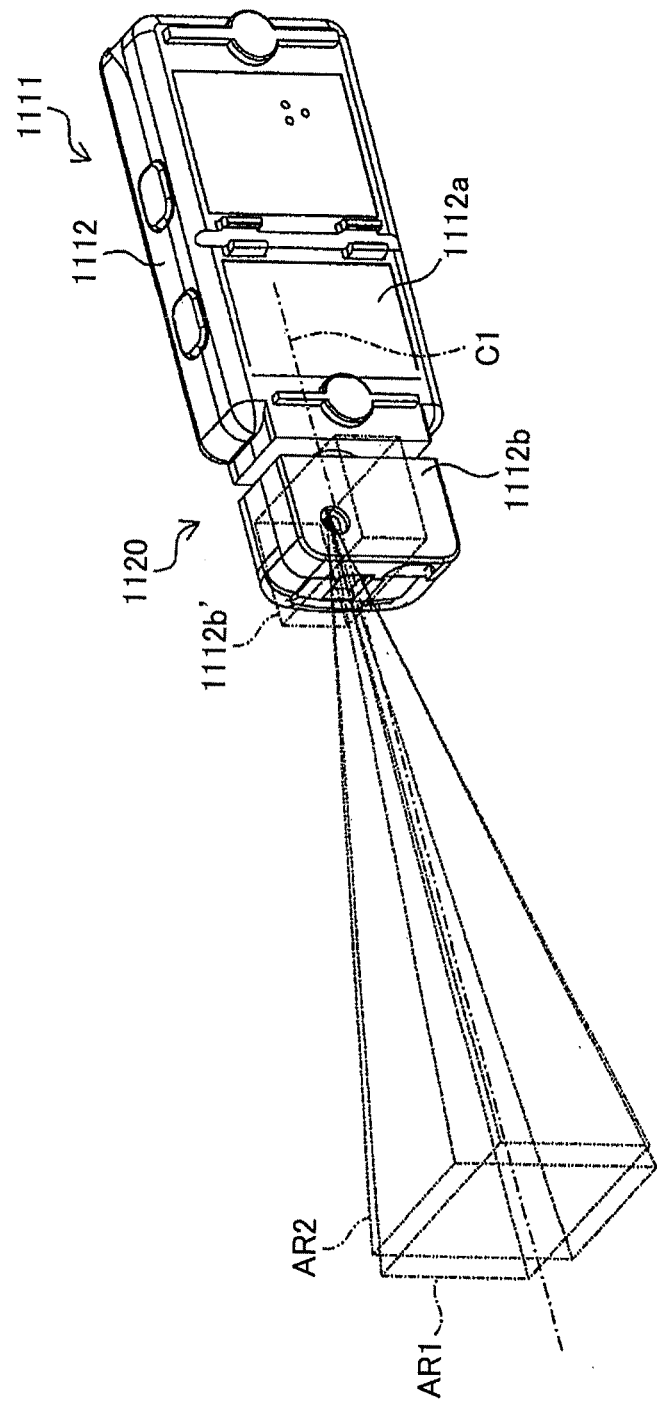
FIG. 64 is a perspective view of a configuration inside a case of the portable information code reading apparatus according to the sixth embodiment.

Next, a ninth embodiment will be described with reference to FIG. 64 and FIG. 65.

The present embodiment differs from the first embodiment or the variation examples according to the first embodiment only in terms of the configuration on the apparatus main body side. Other configurations are identical to those according to the first embodiment or the variation examples according to the first embodiment. In particular, the attaching portion 60 is identical to that according to the first embodiment.

In the present configuration as well, the electrical configuration within an apparatus main body 1111 is identical to that according to the first embodiment. The imaging unit 23 that images an information code and the control circuit 40 (processing unit) that processes the image of the information code captured by the imaging unit 23 are provided. The imaging unit 23, the processing unit, and the like are housed inside a case 1112 and integrated. In addition, the configuration of the attaching member 560 is the same as that according to the first embodiment. The attaching member 560 is configured as a component separate from the case 1112, and includes the body mounting portion 562, the base portion 565, and the attaching portion 566 that are the same as those in FIG. 55 and the like.

In the present configuration, the imaging unit 23 is configured such as to be capable of rotating around a rotation axis C1 in a predetermined direction that intersects the planar direction of the light-receiving surface of the imaging unit 23. A rotating mechanism 1120 is provided that is capable of switching the imaging unit 23 between at least two rotation positions. In the example in FIG. 64, a portion on the tip end side (rotating portion 1112b) of the case 1112 is capable of being switched between a solid line position and a two-dot chain line position in FIG. 64. In the solid line position, a visual range AR1 that is wide in the lateral direction, as indicated by the single-dot chain line in FIG. 64 and FIG. 65 is set. When the rotating portion 712b is in the two-dot chain line position (reference number 1112b'), a visual range AR2 that is wide in the vertical direction, as indicated by the two-dot chain line in FIG. 64 and FIG. 65, is set. The rotation axis C1 is an axis in the front/back direction and is, for example, the direction of the optical axis serving as the center of the visual range. In FIG. 65, the outer shape of the rotating portion 1112b is conceptually shown by the single-dot chain line. The internal structure of the rotating portion 1112 is indicated by the solid line.

In the present configuration, the imaging unit 23 is configured such as to be capable of rotating around the rotation axis C1 in a predetermined direction that intersects the planar direction of the light-receiving surface of the imaging unit 23. The rotating mechanism 1120 is provided that is capable of switching the imaging unit 23 between at least two rotation positions. In this configuration, the orientation of the imaging unit 23 can be more easily changed to a more appropriate orientation based on the state of mounting on the body.

The feature according to the present embodiment can be applied to the configurations according to any of the above-described embodiments and can also be applied to the variation examples according to any of the embodiments.

Tenth Embodiment

Next, a tenth embodiment will be described.

The present embodiment differs from the variation example according to the seventh embodiment only in terms of the method of control by the control circuit. The present invention is identical to the variation example according to the seventh embodiment in other aspects.

In the present configuration, the configuration of the apparatus main body 511 is the same as that according to the fourth embodiment. In this configuration as well, the apparatus main body 511 is provided with the imaging unit 23, the processing unit, and the case 512. The imaging unit 23 images an information code. The processing unit processes the image of the information code captured by the imaging unit 23. The case 512 holds the imaging unit 23 and the processing unit. As the attaching member, the attaching member 560 according to the fourth embodiment (such as in FIG. 55) and the attaching member 960 according to the seventh embodiment (such as in FIG. 61 and FIG. 62) can be used. All of the attaching members include the body mounting portion and the attaching portion to which the case 512 is attached and detached. The attaching member is configured as a component separate from the case 512.

In this configuration as well, a plurality of types of attaching members 560 and 960 can be attached to the user. When any of the attaching members is attached to the user, the case 512 can be connected to the attached attaching member. In this case, the attaching member 560 and the attaching member 960 may be alternatively used. Both attaching members 560 and 960 may be mounted, and the case 512 may be attached to either attaching member.

The attachment position of the case 512 can be detected by a detecting unit. An area corresponding to the detection result from the detecting unit is selected from the image captured by the imaging unit 23. Specifically, in a manner similar to that in the variation example according to the seventh embodiment, when the case 512 is connected to any of the attaching members among the plurality of types of attaching members 560 and 960, the type of the attaching portion to which the case 512 is connected is determined. The determining unit (the sensor that detects the type of attaching member and the control circuit 40) used in the variation example according to the seventh embodiment corresponds to an example of the detecting unit.

Figure 66:
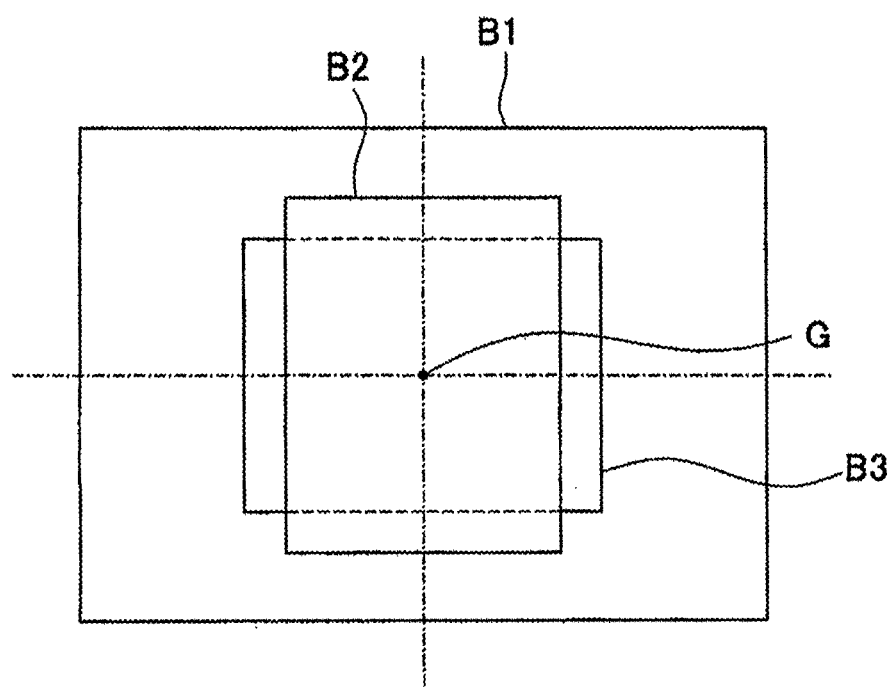
FIG. 66 is an explanatory diagram for explaining a clipping area from a captured image.

For example, when the apparatus main body 511 is attached to the attaching member 560 that is hooked onto the ear, as shown in FIG. 66, a vertically elongated area B2 may be selected from an area B1 of the overall captured image, and used in image processing. When the apparatus main body 511 is attached to the attaching member 960 that is hooked onto a finger or an arm, as shown in FIG. 66, a laterally elongated area B3 may be selected from the area B1 of the overall captured image, and used in image processing.

The control circuit 40 corresponds to an example of a selecting unit and functions to select an area corresponding to the detection result from the detecting unit, from the image captured by the light-receiving sensor 23 (imaging unit).

As a result of this configuration, an area based on the position in which the case 512 is attached can be selected from the image captured by the imaging unit 23 and used. Therefore, an image of a more appropriate area based on the attachment position can be more easily used, while reducing the amount of processed data compared to a method in which all data of all pixels is used at all times.

Eleventh Embodiment

Next, an eleventh embodiment will be described.

The present embodiment differs from the variation example according to the seventh embodiment only in terms of the method of control by the control circuit. The present embodiment is identical to the variation example according to the seventh embodiment in other aspects.

In the present configuration, the configuration of the apparatus main body 511 is the same as that according to the fourth embodiment. In this configuration as well, the apparatus main body 511 is provided with the imaging unit 23, the processing unit, and the case 512. The imaging unit 23 images an information code. The processing unit processes the image of the information code captured by the imaging unit 23. The case 512 holds the imaging unit 23 and the processing unit. As the attaching member, the attaching member 560 according to the fourth embodiment (such as in FIG. 55) and the attaching member 960 according to the seventh embodiment (such as in FIG. 61 and FIG. 62) can be used. All of the attaching members include the body mounting portion and the attaching portion to which the case 512 is attached and detached. The attaching member is configured as a component separate from the case 512.

In this configuration as well, a plurality of types of attaching members 560 and 960 can be attached to the user. When any of the attaching members is attached to the user, the case 512 can be connected to the attached attaching member. In this case, the attaching member 560 and the attaching member 960 may be alternatively used. Both attaching members 560 and 960 may be mounted, and the case 512 may be attached to either attaching member.

When the type of the attaching member to which the case 512 is attached is determined, the control circuit 40 transmits information specifying the type to an external apparatus HST. For example, when the attaching member 560 is type 1 and the attaching member 960 is type 2, the control circuit 40 transmits information indicating type 1 to the external apparatus HST when attachment of the case 512 to the attaching member 560 is confirmed. At this time, the external apparatus HST transmits a program corresponding to type 1 to the apparatus main body 511. In addition, the control circuit 40 transmits information indicating type 2 to the external apparatus HST when attachment of the case 512 to the attaching member 960 is confirmed. At this time, the external apparatus HST transmits a program corresponding to type 2 to the apparatus main body 511.

In the present configuration, the control circuit 40 and the communication interface 48 correspond to an example of a transmission control unit, and functions to transmit, to an external apparatus, information on the attachment position of the case 512 detected by the detecting unit. In addition, when information on the attachment position of the case 512 is transmitted to the external apparatus HST by an apparatus in which the control circuit 40 and the communication interface 48 serve as an example of a receiving unit or the transmission control unit, the control circuit 40 and the communication interface 48 function to receive response information corresponding to the information on the attachment position of the case 512 from the external apparatus HST.

As a result of this configuration, data based on the position in which the case 512 is attached can be acquired from the external apparatus and used.

Other Embodiments in Relation to the Fourth to Eleventh Embodiments

The present invention is not limited to the above-described fourth to eleventh embodiments. For example, the following embodiments are also included in the technical scope of the present invention.

According to the present embodiment, the control circuit 40 is given as an example of the processing unit. As a process performed on the image of an information code 100 captured by the imaging unit 23, decoding of the code image of the information code 100 is given as an example. However, the process performed on the image of an information code 100 captured by the imaging unit 23 is not limited thereto. For example, a process in which the image data of the information code 100 captured by the imaging unit 23 is transmitted to an external apparatus HST is also possible. In this case, the image data can be decoded by the external apparatus HST (such as a host apparatus).

According to the above-described embodiments, the body mounting portion that is hooked onto both ears is given as an example. However, the body mounting portion may be hooked on either ear.

According to the above-described embodiments, the body mounting portion that is attached to the ear, finger, arm, or the like of the user is given as an example. However, the body mounting portion may be configured as a band member that is attached to the head of the user. For example, the body mounting portion may be configured as a band member having a structure that is headband-like, hairband-like, Alice band-like, or the like. In this configuration, because the apparatus main body 511 is attached to the head, the movement of the face and the overall apparatus main body 511 move in tandem. The reading direction can be more easily set such as to match the movement of the face of the user. In addition, in this case, the attaching member according to the fourth embodiment, the attaching member according to the seventh embodiment, and the attaching member of the present configuration may be set as usage candidates based on the concept behind the variation example according to the seventh embodiment, and any of the attaching members may be selected and used. In this case, the apparatus main body may be configured to be attachable to any of these three types.

According to the above-described embodiments, an attaching member that has a body mounting portion that is configured such as to be hooked onto or wrapped around the ear, finger, arm, head, or the like of the user is given as an example. However, the attaching member may be configured as an attachment that is attached to a mounted article (such as glasses, a helmet, a glove, or clothing) on the user.

According to the above-described embodiment, a configuration in which two case-side connecting portions and two attaching member-side connecting portions are respectively connected is given as an example. However, the present invention is not limited to such an example. A configuration is also possible in which three or more case-side connecting portions are respectively connected to three or more attaching member-side connecting portions of the same quantity.

According to the above-described embodiments, a configuration in which the displacement of the attaching wall portion with reference to the base portion can be adjusted is given as an example. In the configuration of any of the embodiments or in a configuration obtained by changing the configuration of any of the embodiments, a configuration is possible in which the displacement of the imaging unit 23 with reference to the opposing wall portion 512a can be adjusted.

Twelfth Embodiment

A twelfth embodiment actualizing the present invention will hereinafter be described with reference to the drawings.
(Overall Configuration)
A portable information code reading apparatus 10B (also referred to, hereafter, as simply an information code reading apparatus 10B or a reading apparatus 10B) according to the twelfth embodiment has an outer appearance such as that shown in FIG. 67, for example. The reading apparatus 10B includes an imaging unit 23, a processing unit (control circuit 40 (FIG. 68)), a marker light irradiating unit 50, and an illumination light source 21. The imaging unit 23 captures an image of a predetermined imaging area AR (see FIG. 75). The processing unit processes the captured image obtained by the imaging unit 23. The marker light irradiating unit 50 irradiates a marker light Mk (FIG. 68) towards the imaging area AR (see FIG. 75) of the imaging unit 23. The illumination light source 21 irradiates an illumination light Lf (FIG. 68) differing from the marker light Mk (FIG. 68). Furthermore, the reading apparatus 10B includes a case 12 and an attaching member 60. The case 12 holds the marker light irradiating unit 50, the illumination light source 21, the imaging unit 23, and the like. The attaching member 60 is provided integrally with the case 12 or as a component separate from the case 12. The attaching portion 60 is attached to the body of a user or to a mounted article on the user.

First, an electrical configuration of the information code reading apparatus 10B will be described. As shown in FIG. 68, in terms of hardware, the information code reading apparatus 10B is configured as a code reader that is capable of reading an information code 100 (FIG. 68), such as a one-dimension code, a two-dimensional code, or the like. The outer shell of an apparatus main body 11 is configured by the case 12 shown in FIG. 67. The information code reading apparatus 10B is configured such that various electronic components are housed inside the case 12.

As shown in FIG. 68, the information code reading apparatus 10B is mainly configured by an optical system, a microcomputer (referred to, hereafter, as "micon") system, and a power supply system. The optical system includes the illumination light source 21, the marker light irradiating unit 50, the imaging unit 23, a filter 25, an imaging lens 27, and the like. The micon system includes a memory 35, a control circuit 40, an operating switch 42, and the like. The power supply system includes a power switch 41, a battery 49, and the like. These components are mounted on a printed wiring board (not shown) or provided inside the case 12.

Figure 75:
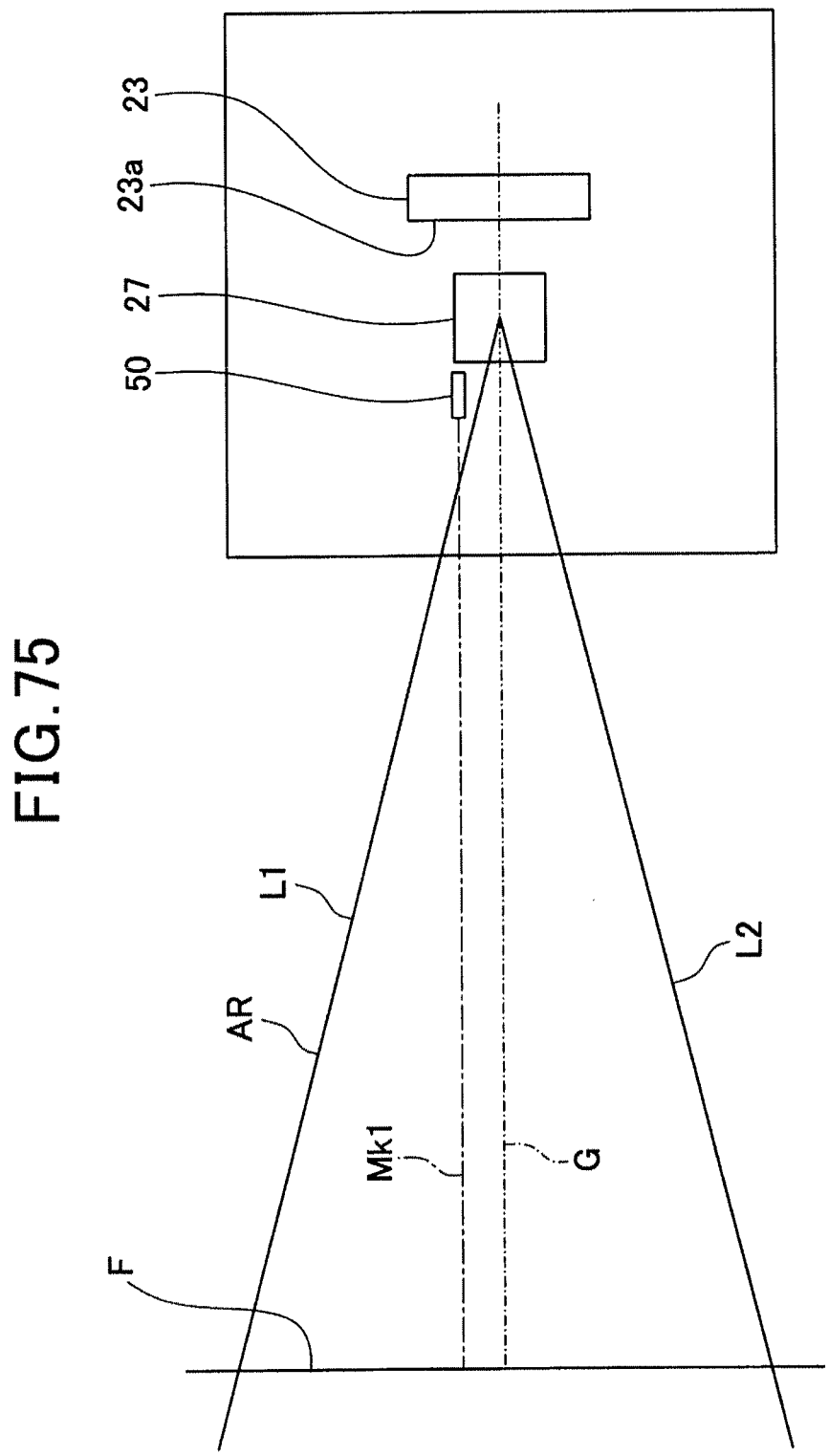

In a manner similar to the configuration in FIG. 2, described above, the optical system is configured by the illumination light source 21, the imaging unit 23, the filter 25, the imaging lens 27, the marker light irradiating unit 50, and the like. In particular, the marker light irradiating unit 50 is configured by a publically known marker light source such as an LED or laser light source, or the like. The marker light irradiating unit 50 is configured to irradiate the marker light MK (FIG. 68) having high directivity, for example, towards the same side as the side to which the illumination light source 21 irradiates light. Specifically, the marker light irradiating unit 50 irradiates the marker light Mk (FIG. 68) towards the area (imaging area AR) that can be imaged by the imaging unit 23 as in FIG. 75. In FIG. 75, the optical axis (center axis) of the marker light Mk irradiated by the marker light irradiating portion 50 is conceptually shown by a single-dot chain line Mk1.

As shown in FIG. 75, the imaging unit 23 is configured to capture an image of the predetermined imaging area AR set outside of the case 12.

In a manner similar to that described above, the micon system is configured by an amplifier circuit 31, an A/D converter circuit 33, the memory 35, an address generating circuit 36, a synchronization signal generating circuit 38, the control circuit 40, the operating switch 42 (42a and 42b), a microphone 43, a sound generating unit 44, a sensor unit 46, a communication unit 48, and the like. The external apparatus is not limited to an example in which the external apparatus is a personal computer in this way. Any is possible as long as the external apparatus is an information processing apparatus that is disposed outside of the information code reading apparatus 10B and is capable of communicating with the information code reading apparatus 10B. The communication unit 48 operates together with the control circuit 40 and functions as a "transmitting unit". For example, the communication unit 48 functions to transmit, to the above-described "external apparatus", decoded data obtained by decoding the information code 100, after the elapse of a fixed amount of time after decoding of the information code 100.

The electrical configuration of the information code reading apparatus 10B is basically equivalent to that described in FIG. 2, described above.
(Mounting Structure and the Like)
Next, the mounting structure and the like of the portable information code reading apparatus 10B will be described. The mounting structure is similar to that in FIG. 49, described above. However, some redundant descriptions are given improve the overall description of the examples.

The portable information code reading apparatus 10B is mainly configured by the apparatus main body 511 and the attaching member 560. The apparatus main body 511 includes the imaging unit 23, the processing unit (the control circuit 40 (FIG. 68)), and the case 512. The imaging unit 23 is capable of imaging the information code 100. The processing unit processes the image of the information code 100 captured by the imaging unit 23. The case 512 holds the imaging unit 23 and the processing unit. In addition, the attaching member 560 is provided as a component separate from the case 512. The attaching member 560 includes a flexible body mounting portion (mounting portion) 562 that is capable of flexible deformation and an attaching portion 566 to which the case 512 is attached and detached.

The attachment/detachment structure of the attaching portion 566 and the case 512 may be, for example, a configuration in which the case 512 is attached by the attaching portion 566 by a fastening member, such as a screw. Alternatively, the attachment/detachment structure may be a configuration in which the case 512 is attached by an engaging portion (for example, a mating portion such as a protruding portion) formed in the case 512 engages with an engaged portion (for example, a mated portion such as a recessing portion) formed in the attaching portion 566. Alternatively, the attachment/detachment structure may be a configuration in which the case 512 is attached by attraction force between a magnet fixed to either of the case 512 and the attaching portion 566 and a magnetic body (a metal member or a magnet) fixed to the other. Here, an example is given in which the case 512 and the attaching member 560 are configured as separate components. However, all that is required is that the case 512 and the attaching member 560 be connected to each other. For example, the case 512 and the attaching member 560 may be integrally formed.

Figure 67:
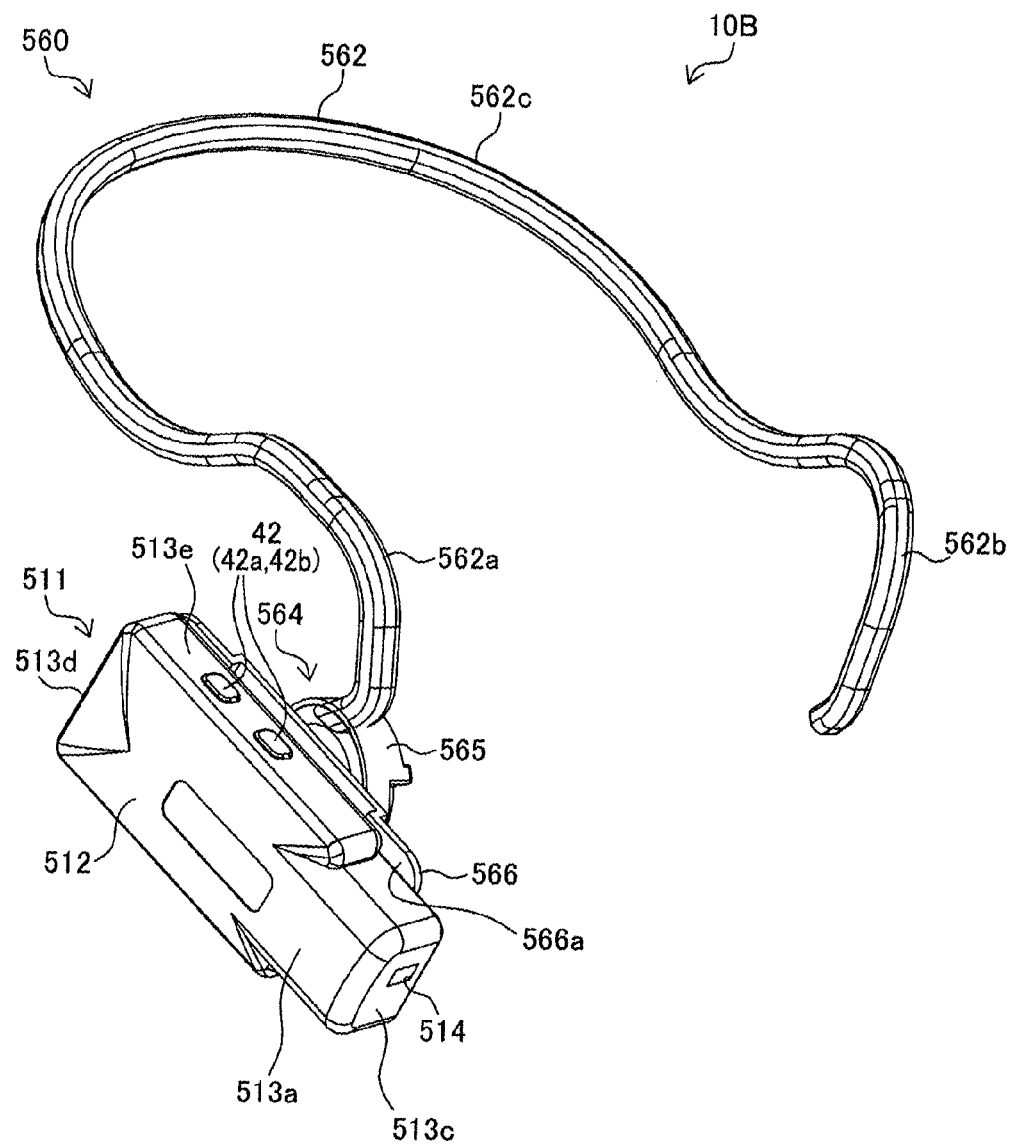
FIG. 67 is a perspective view schematically showing an example of a portable information code reading apparatus according to a twelfth embodiment.
Figure 68:
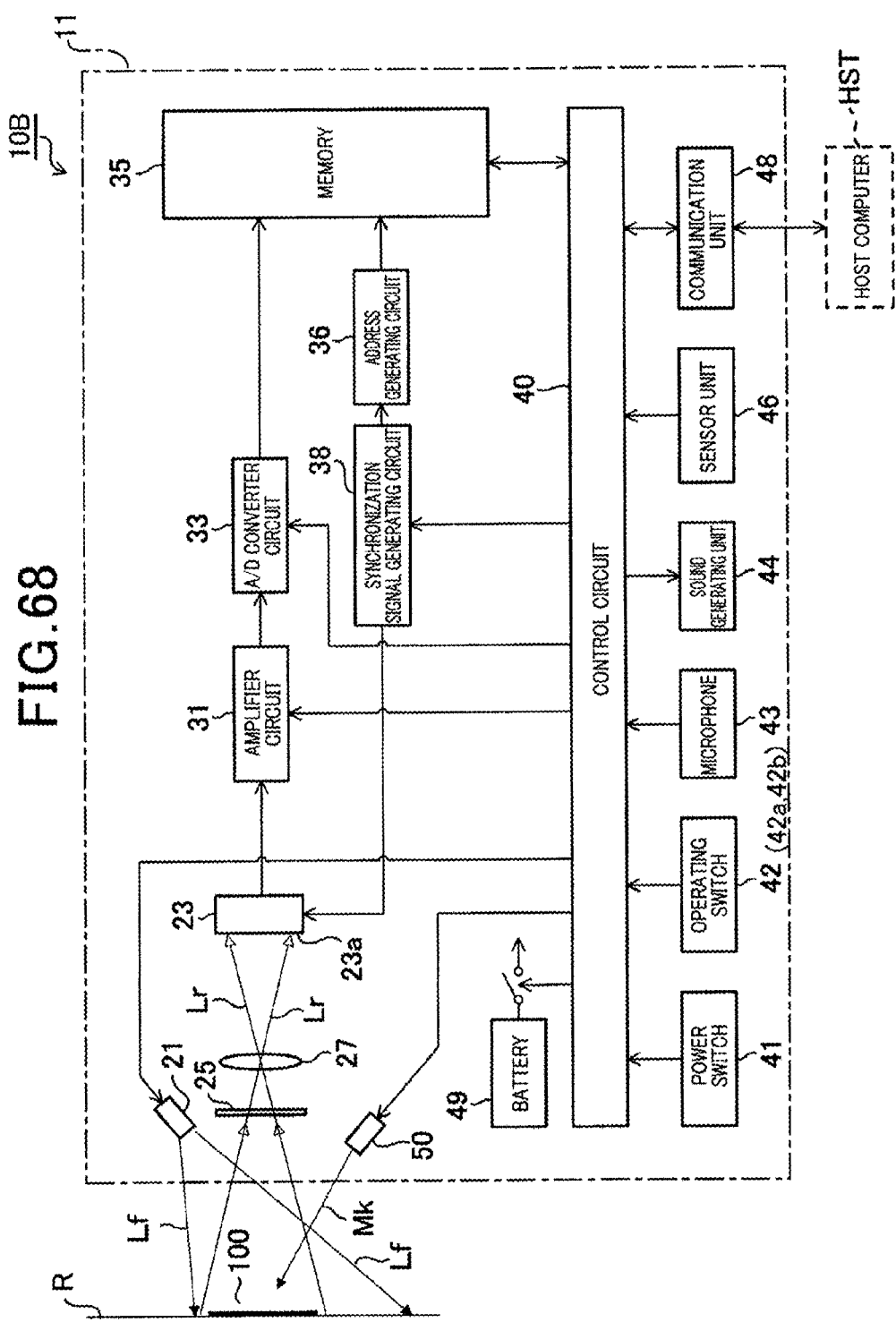
FIG. 68 is a block diagram schematically showing an example of an electrical configuration of the portable information code reading apparatus in FIG. 67.

The apparatus main body 511 shown in FIG. 67 and the like is configured such that various electronic components shown in FIG. 68 are housed inside the case 512. For example, the apparatus main body 511 can be attached to the attaching member 560 as in FIG. 67, and further, can be detached from the attaching member 560. The case 512 that forms the outer shell of the apparatus main body 511 is formed such as to be elongated and box-shaped, as a whole. In the present configuration, the front/back direction, the width direction (lateral direction), and the up/down direction of the apparatus main body 511 are prescribed as described below. First, the direction of the center of the visual range of the imaging unit 23 (the direction of the optical axis G shown in FIG. 75) is the front/back direction, and the longitudinal direction of the case 512 is the front/back direction. The thickness direction of the case 512 in the direction perpendicular to the front/back direction is the width direction (lateral direction). The direction perpendicular to the front/back direction and the width direction is the up/down direction.

A front wall portion 513c is provided in the front end portion of the case 512. A back wall portion 513d is provided in the back end portion. Furthermore, a side wall portion is provided on one side (the attaching member 560 side) in the width direction (left/right direction). The side wall portion 513a is provided on the side opposite the one side.

Figure 69:
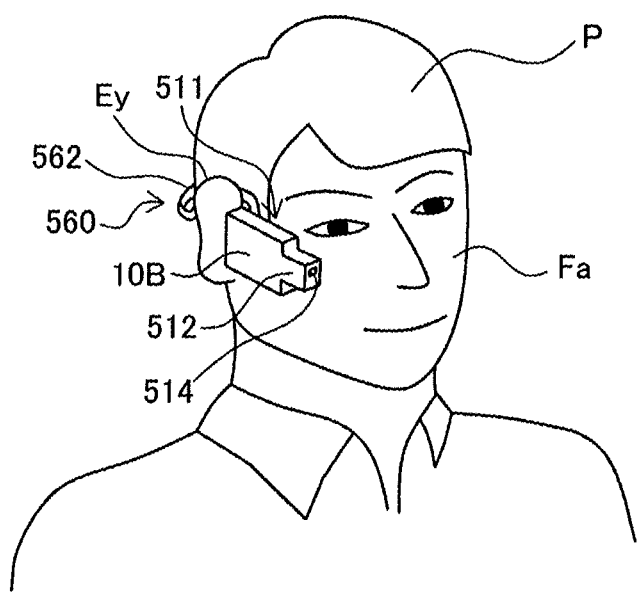
FIG. 69 is an explanatory diagram of a state of use of the portable information code reading apparatus in FIG. 67.
Figure 71:
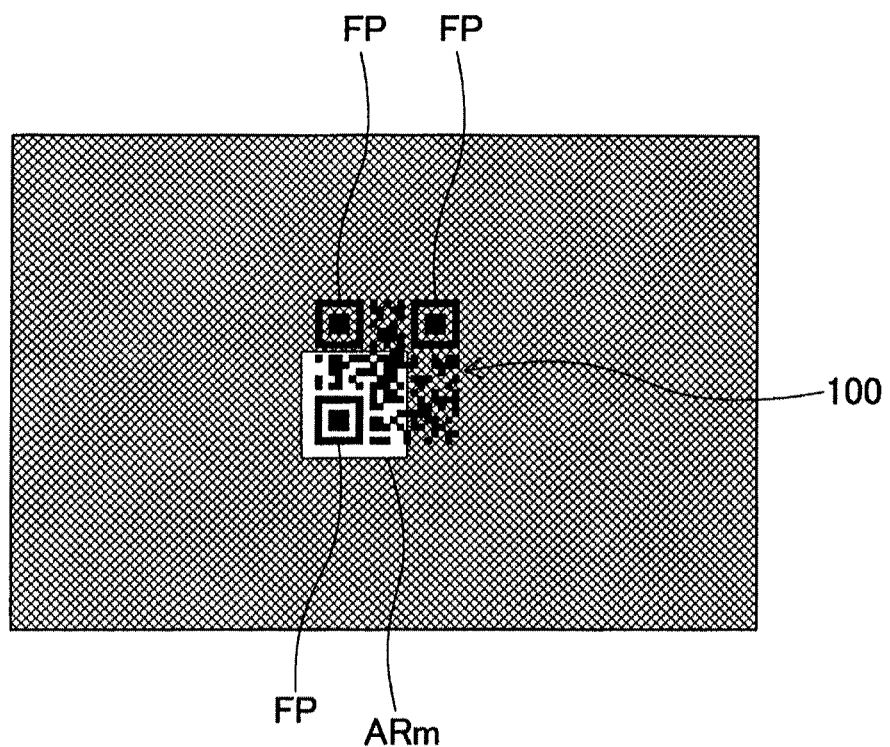
FIG. 71 is an explanatory diagram for conceptually explaining a captured image when a QR code (registered trademark) is included in an imaging area.

As shown in FIG. 67, FIG. 69, and FIG. 71, a reading opening 514 into which the light from the information code can be introduced is provided in the front wall portion 513c provided in the front end portion of the case 512. The attaching member 560 is, for example, structured such as to be hooked onto both ears of the user P during use. The attaching member 560 attaches the case 512 to an ear Ey of a user P, such that the case 512 is disposed in a lateral position the face Fa of the user and the reading opening 514 faces the front side of the user P, as shown in FIG. 69. In this way, the case 512 is attached by the attaching member 560 such that the imaging unit 23 faces the same side as the side that the face of the user faces.

As in FIG. 67, the operating switch 42 (42a and 42b) that can be externally operated (such as a pressing operation downward from above) is provided in the upper wall portion 513e of the case 512. In addition, the illumination light source 21 and the marker light irradiating unit 50 are provided inside the case 512 as shown in FIG. 68. The illumination light source 21 irradiates an illumination light. The marker light irradiating unit 50 irradiates a marker light. The illumination light Lf from the illumination light source 21 and the marker light Mk from the marker light irradiating unit 50 are both irradiated towards the front side of the case 512 from the front wall portion 513c.

The attaching member 560 is provided with the flexible body mounting portion 562 that is capable of flexible deformation, the attaching portion 566 to which the case 512 is attached and detached, and a base portion 565 that supports the body mounting portion 562. The attaching member 560 is provided as a component separate from the case 512.

As shown in FIG. 69, the body mounting portion 562 is configured as ear hook portions that are hooked onto both ears of the user P. As shown in FIG. 67, the body mounting portion 562 is configured such that a predetermined shape is retained in a natural state when mounted, and is capable of elastic deformation The configurations of the base portion 565 and the attaching portion 566 are the same as the configurations described in FIG. 49, described above.

(Reading Process)

Next, a reading process performed by the reading apparatus 10B will be described.

Figure 70:
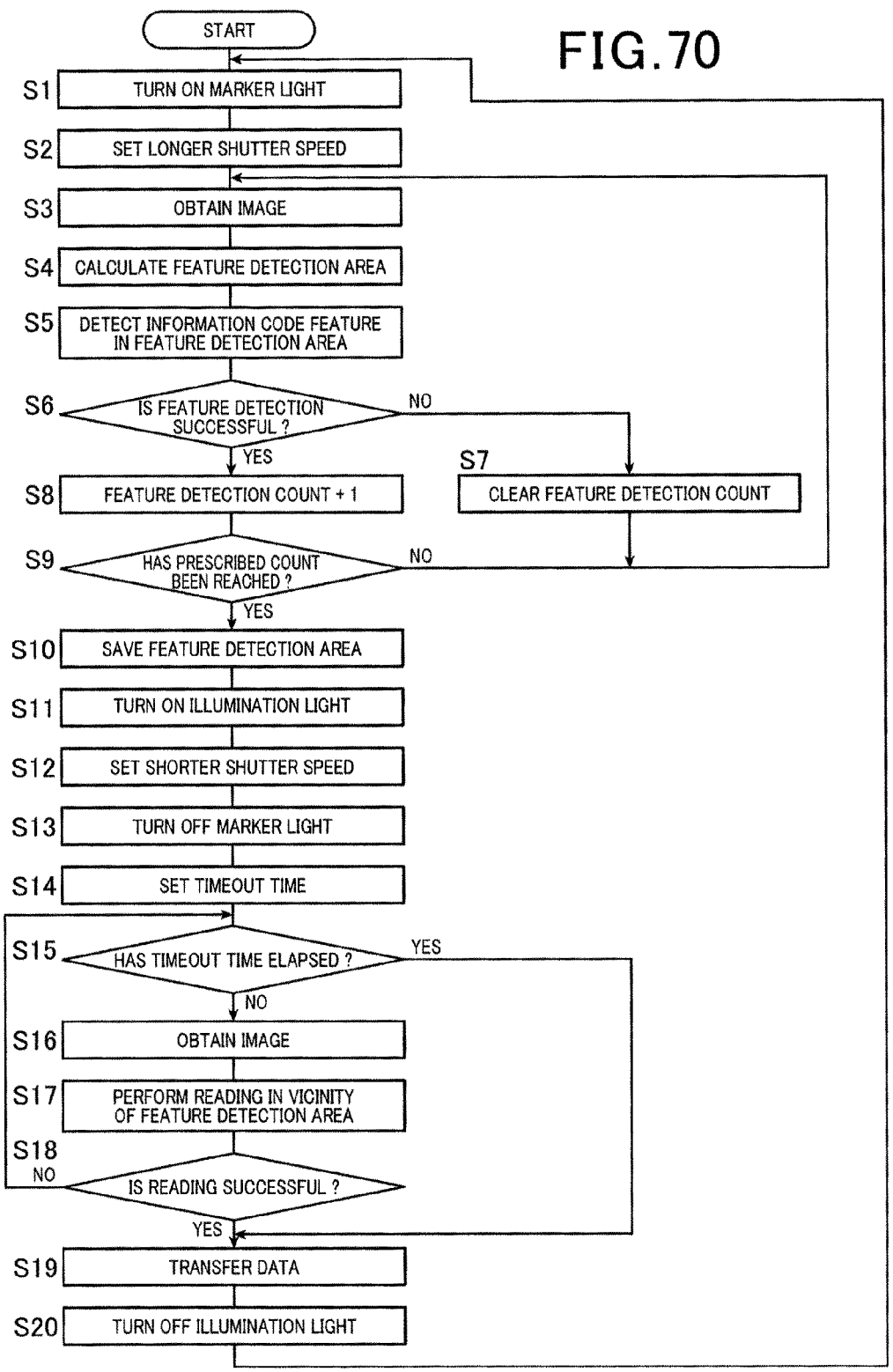
FIG. 70 is a flowchart showing an example of the flow of a reading process in the portable information code reading apparatus in FIG. 67.

In the reading apparatus 10B, when a predetermined start condition is met (such as when power is turned ON or a predetermined pressing operation is performed on the operating switch 42), the control circuit 40 performs a reading process shown in FIG. 70. While the reading process in FIG. 70 is being performed, the reading process for an information code can be continuously performed. Reference symbol S indicates a step.

The reading process shown in FIG. 70 is performed based on the predetermined start condition being met. After the start of execution, first, the control circuit 40 operates the marker light irradiating unit 50 to irradiate the marker light Mk (S1). In the process at S1, the illumination light source 21 is not operated and the illumination light Lf is not irradiated. In the present configuration, after the start of irradiation of the marker light Mk at S1, the state in which the illumination light Lf is not irradiated is maintained until the irradiation of the illumination light Lf is started at S13.

After the process at S1, the control circuit 40 sets the shutter speed of the imaging unit 23 to a first shutter speed that is relatively slower (longer) that a second shutter speed, described hereafter (S2). In other words, at S2, the control circuit 40 sets the exposure time when imaging is performed by the imaging unit 23 to be longer than the exposure time set at S12, described hereafter. Then, in a state in which the shutter speed of the imaging unit 23 is set to the first shutter speed in this way, the imaging unit 23 performs imaging of the imaging area (S3). As a result, the captured image (first captured image) by the imaging unit 23 in a state in which the shutter speed is set to the first shutter speed is generated.

Then, the control circuit 40 calculates a "feature detection area" within the captured image (first captured image) obtained at S3.

As a first example of the method for performing area identification at S3, for example, as shown in FIG. 71, the captured image (first captured image) obtained at S3 may be analyzed and an irradiation area ARm of the marker light Mk may be identified from the first captured image. Then, the irradiation area ARm of the marker light Mk may be set as the "feature detection area". Specifically, for example, an area (area ARm) in which the amount of light received is a predetermined value or more may be detected in the first captured image. A rectangular area or a circular area including the overall area ARm may then be set as the irradiation area of the marker light. Alternatively, an area having a predetermined shape (the irradiation shape of the marker light Mk and a rectangular shape in the example of the area ARm in FIG. 71) maybe detected from the captured image (first captured image) obtained at S3, and the area may be set as the irradiation area of the marker light.

In addition, as a second example of the method for performing area specification at S3, the memory 35 may function as a position data storage unit. The position data indicating the position of the irradiation area of the marker light Mk in the captured image obtained by the imaging unit 23 may be stored in the memory 35. The position data includes, for example, center data indicating the center position of the irradiation area of the marker light Mk, and size data indicating the size with the center position at the center. For example, as shown in FIG. 75, when the irradiation direction of the marker light Mk (the direction of the center axis (optical axis) Mk1) from the marker light irradiating unit 50 is substantially parallel to the center axis (optical axis) G) of the imaging area AR1, and the distance between the center axis Mk1 of the marker light Mk and the optical axis G is extremely close (for example, short enough to be ignored), the center position of the irradiation area of the marker light Mk is substantially the center pixel in the captured image. Therefore, in a case such as this, for example, the coordinate data of the center pixel in the captured image generated by the imaging unit 23 is stored in the memory 35 as the center data and the diameter of the irradiation spot (diameter of the marker light) premised in advance for the marker light Mk is stored in the memory 35 as the size data. In this case, based on such position data, the irradiation area (such as the center of the irradiation area and the diameter of the irradiation area) can be identified in the captured image (first captured image) obtained at S3.

In this case, the control circuit 40 that corresponds to the detecting unit functions to identify the position of the irradiation area of the marker light Mk in the captured image (first captured image) obtained at S3, based on the position data stored in the memory 35 (position data storage unit), in the process at S4. In the process at S5, the control circuit 40 functions to detect a feature pattern from the irradiation area ARm within the first captured image.

In addition, as a third example of the method for performing area specification at S3, for example, as shown in FIG. 75, when the marker light irradiating unit 50 is configured to irradiate the marker light Mk along the center axis G of the imaging area AR by the imaging unit 23, the position data is not required to be stored in the memory 35. That is, in a case such as this, the irradiation area of the marker light Mk is specified in advance to be a predetermined area including the center portion of the captured image by the apparatus configuration. Therefore, the control circuit 40 that corresponds to the detecting unit may identify the predetermined center area (such as a position specified by the center of the irradiation area and the diameter of the irradiation area, described above) including the center portion of the captured image (first captured image) obtained at S3 as the "feature detection area". In the process at S5, the control circuit 40 may detect a feature pattern from the "feature detection area" identified in this way.

In the case of any of the examples described above as the process at S4, in the process at S5, the feature pattern is detected from the "feature detection area" identified at S4. Specifically, for example, when the information code 100 to be read is a publically known QR code (registered trademark) such as in FIG. 71, a position detection pattern (clipping pattern) FP included in the QR code is detected as the "feature pattern" by a well-known detection method. Specifically, for example, scanning is performed in a predetermined direction at a plurality of positions within the "feature detection area" identified at S4. In an area in which light-colored cells and dark-colored cells are alternately arranged, an area in which the area widths are 1:1:3:1:1 is detected.

The light-colored cell is a cell of a color having a relatively higher brightness than the dark-colored cell. For example, the light-colored cell is white when the dark-colored cell is black. The dark-colored cell is a cell of a color having a relatively lower brightness than the light-colored cell. For example, the dark-colored cell is black when the light-colored cell is white. The light color and dark color of the cell is described, for example, in "International standard ISO/IEC 18004, second edition 2006-09-01, page 109, Annex M, "M1 Symbol contrast"".

Figure 72:
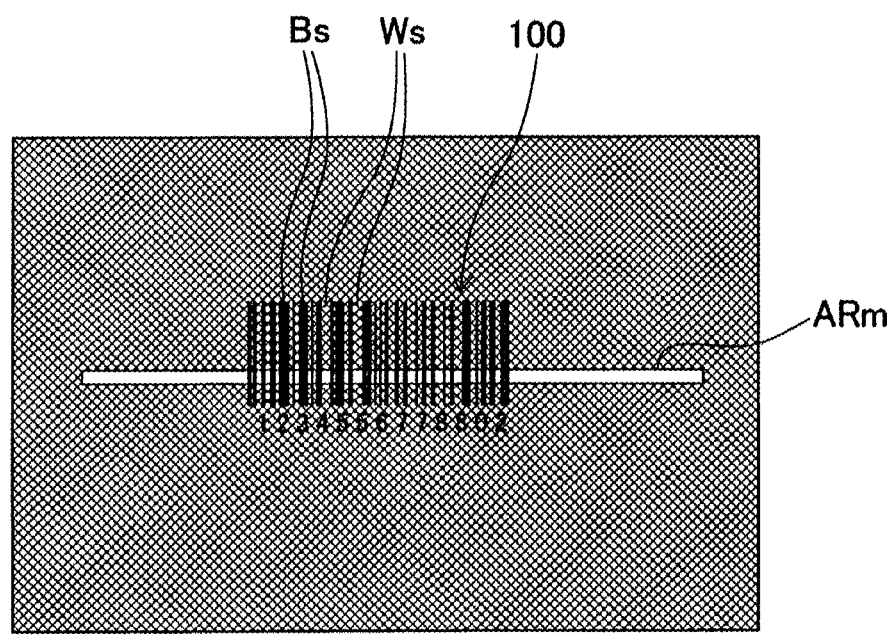
FIG. 72 is an explanatory diagram for conceptually explaining a captured image when a barcode is included in an imaging area, related to an example in which a marker light is irradiated on an irradiation area differing from that in FIG. 71.
Figure 73:
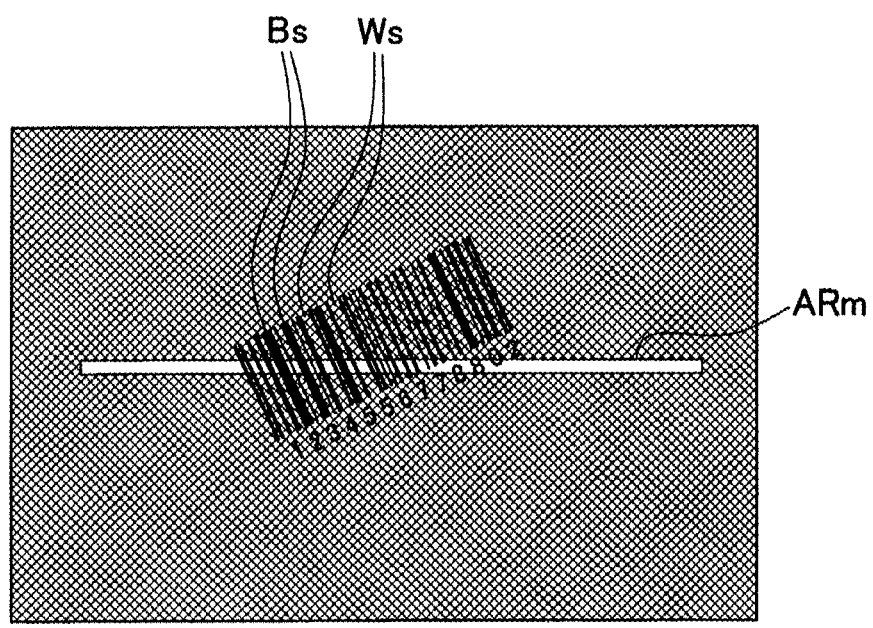
FIG. 73 is an explanatory diagram for conceptually explaining a captured image when a barcode is included in the imaging area in a tilted state, related to the example of the marker light in FIG. 72.

The feature pattern detected at S5 is not limited to the feature pattern such as in FIG. 71. For example, a plurality of types of feature patterns to be detected at S5 may be premised. For example, a portion of an array of light-colored bars Ws (space) and dark-colored bars Bs (bar) of a barcode such as in FIG. 72 may be set as the "feature pattern". For example, as shown in FIG. 73, a portion of a barcode (information code 100) positioned in the irradiation area ARm of the marker light may be decoded by a publically known method. When the portion of the barcode is decoded, the control circuit 40 may proceed to Yes at S6. Specifically, for example, the control circuit 40 may proceed to Yes at S6 when at least a publically known start bit, stop bit, or the like is detected. Alternatively, the control circuit 40 may proceed to Yes at S6 when at least a predetermined character portion is decoded.

FIG. 71 shows an example in which the marker light is irradiated such that a rectangular marker light irradiation area ARm is configured. Even in the rectangular area as in FIG. 71, a portion of the barcode as in FIG. 72 can be read at S5. However, when reading of a barcode as in FIG. 72 is premised, the marker light may be irradiated such that a linear marker light irradiation area ARm is configured as in FIG. 72. The examples of the marker light irradiation area ARm are not limited to the foregoing. For example, various configurations are possible as in FIG. 74.

When determined that the feature pattern is detected at S6, the control circuit 40 proceeds to Yes at S6. The control circuit 40 increments a feature detection count such as to add a single count. The value of the feature detection count that is counted up at S8 is set to zero (reset) immediately after the process at S1 is performed, for example. The feature detection count is counted up each time the process at S8 is performed. After S8, the control circuit 40 determines whether or not the feature detection count has reached a prescribed count (such as three times) (S9). When determined that the feature detection count that has been counted up at S8 has reached the prescribed count, the control circuit 40 proceeds to Yes at S9. Meanwhile, when determined that the feature detection count that has been counted up at S8 has not reached the prescribed count, the control circuit 40 proceeds to No at S9 and repeats the processes at S3 and subsequent steps. In addition, when determined that the feature pattern has not been detected in the determination process at S6, the control circuit 40 proceeds to Yes at S6 and clears the feature detection count to zero.

Then, when proceeding to Yes at S9, the control circuit 40 saves the position of the feature detection area calculated at S4 in the memory 355. The control circuit 40 then operates the illumination light source 21 and starts the irradiation of illumination light (S11). The control circuit 40 sets the shutter speed of the imaging unit 23 to the second shutter speed that is relatively faster (shorter) than the first shutter speed set at S2 (S12). In other words, at S12, the exposure time when imaging is performed by the imaging unit 23 is set to be shorter than the exposure time set at S2. The control circuit 40 then stops the operation of the marker light irradiating unit 50 and turns off the marker light (S13).

In the present configuration, the control circuit 40 corresponds to an example of a light source control unit. The control circuit 40 performs control to switch between first control (control at S1 to S10) in which the marker light irradiating unit 50 is driven without driving the illumination light source 21, and second control (control at 511 to S19) in which the illumination light source 21 is driven. Specifically, when the control circuit 40 corresponding to an example of the detecting unit detects the feature pattern from the captured image (first captured image) obtained at S3, the control performed on the marker light irradiating unit 50 and the illumination light source 21 is switched from the first control to the second control. More specifically, until the control circuit 40 proceeds to Yes at S9, the imaging unit 23 obtains the captured image (first captured image) a plurality of times by the process at S3 in the state in which the marker light is irradiated based on the first control by the light source control unit. When, in the first captured images amounting to the plurality of times, the feature pattern is continuously detected a predetermined number of times by the detecting unit (that is, when proceeding to Yes at S9), the control circuit 40 corresponding to the light source control unit switches control from the first control to the second control.

After stopping the operation of the marker light irradiating unit 50 and turning off the marker light at S13, the control circuit 40 sets a timeout time T (S14). The control circuit 40 starts time measurement until time T. Then, the control circuit 40 determines whether or not the measured time started at S14 has reached the timeout time T. When determined that the time after the process at S14 has reached the timeout time T, the imaging unit 23 images the imaging area (S16). As a result, a captured image (second captured image) by the imaging unit 23 in a state in which the second shutter speed is set is generated. Then, the control circuit 40 decodes the information code included in the second captured image obtained at S16 by a publically known method (S17). In the process at S17, the information code included in the vicinity of the feature detection area saved at S10 (such as the area within a fixed range from the center of the feature detection area saved at S10 in the second captured image obtained at S16) is decoded by a publically known method. Then, when decoding is successful at S17, the control circuit 40 proceeds to Yes at S18. The control circuit 40 transmits the data decoded at S17 (the data recorded in the information code 100) to an external apparatus (such as the host computer HST in FIG. 68) (S19). Then, after S19, the control circuit 40 stops the illumination light source 21 and turns off the illumination light (S20). The control circuit 40 returns to S1 again. Meanwhile, when decoding has failed at S17, the control circuit 40 proceeds to No at S18. In this process, the control circuit 40 repeats the process at S16 and subsequent steps each time the control circuit 40 proceeds to No at S18, until the timeout time T elapses from S14.

In the present configuration, the control circuit 40 that performs the processes at S2 and S12 corresponds to an example of a setting unit. When a feature pattern is detected by the detecting unit (specifically, when proceeding to Yes at S9), the control circuit 40 functions to change the setting of the shutter speed of the imaging unit 23 to the second shutter speed which is relatively faster than the first shutter speed before detection of the feature pattern by the detecting unit. In addition, in the present configuration, after the process at S20, the control unit 40 returns to S1 again and performs the process at S2. That is, the control circuit 40 corresponding to the setting unit performs the process at S2 again after the second captured image is processed by the processing unit. The control circuit 40 returns the shutter speed of the imaging unit 23 to the first shutter speed again.

In the present configuration, the control circuit 40 corresponds to an example of the processing unit. The control circuit 40 functions to process the second captured image obtained by the imaging unit 23 in a state in which the illumination light is irradiated based on the second control by the light source control unit. Specifically, after the feature pattern is detected by the detecting unit from the first captured image at the first shutter speed, the control circuit 40 functions to process the second captured image obtained by the imaging unit in which a setting change to the second shutter speed has been made by the setting unit. The processing unit performs the process to decode the information code included in the second captured image obtained at S16 and the process to transmit the decoded data to an external apparatus, as a process performed on the second captured image. However, the process performed on the second captured image may be a process to display the decoded data of the information code included in the second captured image or a process to store the decoded data. Alternatively, the process performed on the second captured image may be a process to store the second captured image itself, and may be a process to transmit the second captured image itself to the external apparatus.

(Examples of the effect of the present configuration)

In the present configuration, the light source control unit switches between the first control in which the marker light irradiating unit 50 is driven without driving the illumination light source 21 and the second control in which the illumination light source 21 is driven. Detection of a feature pattern is attempted using a first captured image obtained in a state in which the marker light is irradiated, until the feature pattern is detected. After the feature pattern is detected, processing of the information code is performed using the second captured image obtained by driving the illumination light source 21.

When the feature pattern is detected using the first captured image obtained in a state in which the marker light is irradiated, the likelihood is high that the information code is present in a direction intended by the user (the direction in which the reading apparatus is facing). When the illumination light source 21 is driven and the second captured image is captured when a detection result such as this is obtained, the information code intended by the user can be selectively decoded. Compared to a configuration in which decoding of an information code is attempted with the illumination light source 21 being driven at all times, decoding of unintended information codes can be more easily prevented. In addition, because the illumination light source 21 is driven when the likelihood is high that the information code is present in the direction in which the reading apparatus 10B is facing, power consumption can be effectively suppressed.

In addition, the detecting unit analyzes the irradiation area of the marker light in the first captured image obtained at S3 and detects the feature pattern from the irradiation area. As a result, whether or not an information code is present at the irradiation destination of the marker light can be detected with further certainty. Reading can be performed with further certainty by aiming towards the information code present at the irradiation destination of the marker light.

In addition, in the second example described in the process at S4, the position data storage unit (memory 35) is provided that stores therein position data indicating the position of the irradiation area of the marker light in the captured image obtained by the imaging unit 23. The detecting unit identifies the position of the irradiation area of the marker light in the first captured image based on the position data stored in the position data storage unit, and detects the feature pattern from the marker light irradiation area in the first captured image. As a result, when the irradiation area of the marker light in the first captured image is analyzed, the position of the irradiation area of the marker light can be more accurately known and analysis can be performed.

In the second example of the process at S4, the position data includes the center data indicating the center position of the irradiation area and the size data indicating the size with the center position at the center. As a result, the specific range of the irradiation area of the marker light can be known in further detail and analysis can be performed using simpler data.

In addition, the marker light irradiating unit 50 irradiates the marker light Mk along the center axis G of the imaging area AR of the imaging unit 23. In the third example described in the process at S4, the feature pattern is detected from a predetermined center area including the center portion of the first captured image. As a result, when the irradiation area of the maker light in the first captured image is analyzed, the position of the irradiation area of the marker light can be known with further accuracy and analysis can be performed.

In addition, in the present configuration, the imaging unit 23 obtains the first captured image a plurality of times in a state in which the marker light is irradiated based on the first control by the light source control unit. In the first captured images of the plurality of times, when the feature pattern is continuously detected a predetermined number of times by the detecting unit, the light source control unit switches control from the first control to the second control. In this way, the illumination light source is driven and the second captured image is processed only when the feature pattern has been continuously detected a predetermined number of times. As a result, in instances in which an unintended information code coincidentally temporarily crosses the imaging area (such as when a feature pattern just happens to be detected once), the decoding process for the unintended information code can be more easily eliminated.

In addition, in the present configuration, as in FIG. 74, the marker light irradiating unit 50 irradiates the marker light such that the irradiation shape on a plane perpendicular to the irradiation direction of the marker light is a shape including a linear shape extending in a predetermined direction (see FIGS. 74(D) and (E)), a substantially rectangular shape (see FIG. 74(A)), a substantially circular shape (see FIGS. 74(B) and (C)). As a result, a feature pattern can be more favorably detected regarding an information code in which the feature pattern can be detected by scanning in a predetermined direction, or an information code in which a feature pattern can be detected by analysis of a circular area or a rectangular area.

In addition, in the present configuration, the shutter speed of the imaging unit 23 is set to be relatively slow (long) until the feature pattern is detected. The image relatively tends to be blurry. As a result, when an undesired information code instantaneously enters the imaging area, the feature pattern of the information code is not easily detected, and reading of the information code is made difficult. Conversely, when a feature pattern is detected in the first captured image in a state in which the image tends to be blurry, the likelihood is high that the user has aimed the apparatus towards the desired information code and has held the apparatus for a certain amount of time. Therefore, in the above-described configuration, the information code desired by the user can be easily read, and an information code that is not desired by the user can be easily eliminated with further certainty. In addition, when the feature pattern is detected in the first captured image, the shutter speed is set to be faster (shorter). As a result, the second captured image, which is highly likely to include the intended information code, can be more clearly captured. The desired information code can be more easily read with further certainty.

In the present configuration, after the second captured image is processed by the processing unit, the setting unit returns the shutter speed of the imaging unit to the first shutter speed again. In this configuration, as a result of the shutter speed being returned to the first shutter speed again after the second captured image is processed, the setting can be that in which an undesired information code can be easily eliminated. That is, the apparatus can be returned to a state in which only the desired information code can be easily selected, each time the second captured image is processed. Reading can be performed with more efficiency.

Thirteenth Embodiment

Figure 76:
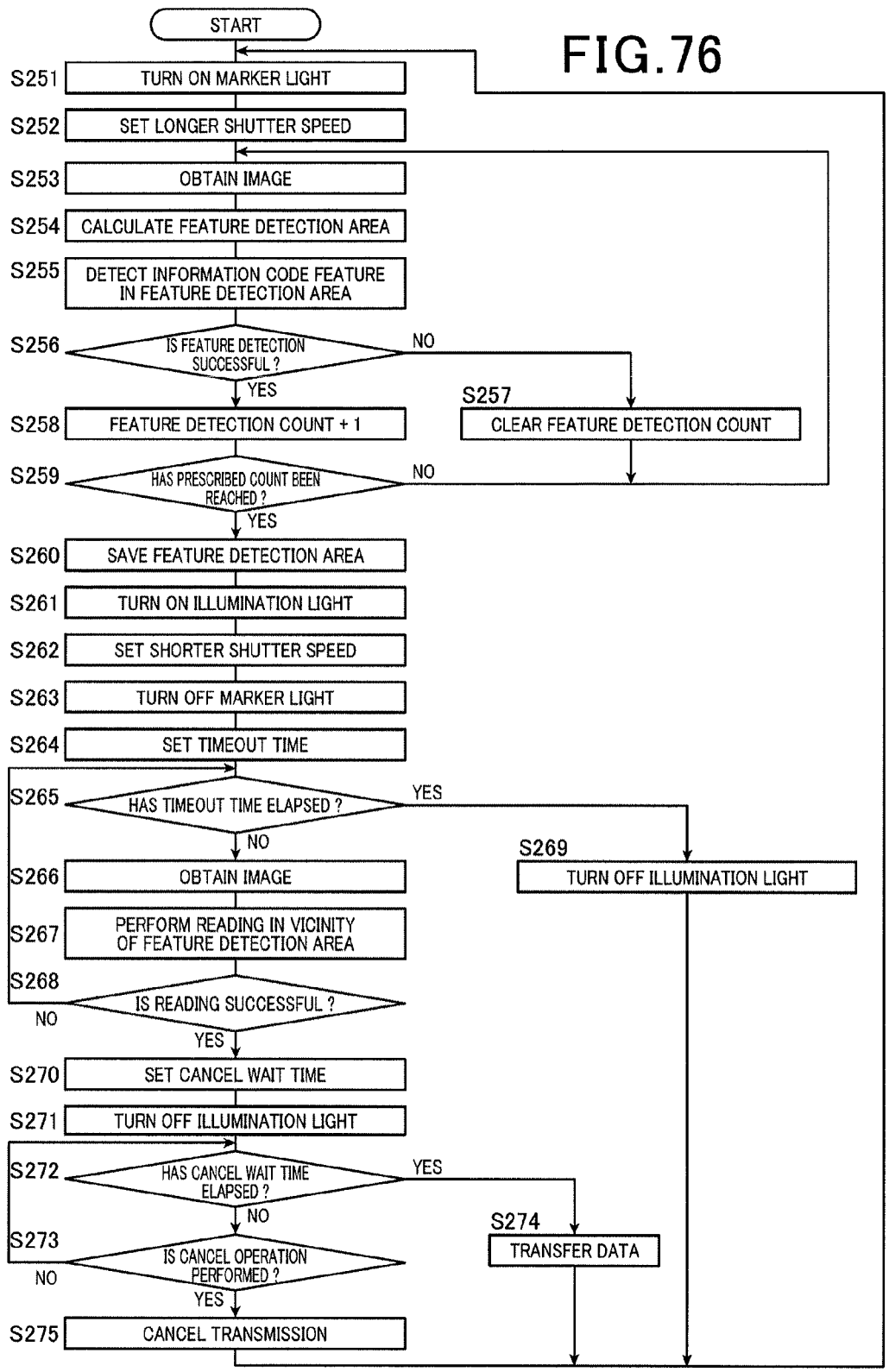
FIG. 76 is a flowchart showing an example of the flow of a reading process in a portable information code reading apparatus according to a thirteenth embodiment.

According to a thirteenth embodiment, only a reading process shown in FIG. 76 differs from the reading process (FIG. 70) according to the twelfth embodiment. Other configurations are similar to those according to the twelfth embodiment. Therefore, the reading process will mainly be described hereafter. Detailed descriptions of other configurations similar to those according to the twelfth embodiment will be omitted.

In the reading apparatus 10B according to the thirteenth embodiment, the reading process is performed based on a flow such as that in FIG. 76. In the reading process in FIG. 76, the processes at S251 to S268 are the same as the processes at S1 to S8 in FIG. 70. A detailed description of these processes will be omitted.

In the reading process in FIG. 76, the process performed when the control circuit 40 proceeds to Yes at S265 differs from the process performed when the control circuit 40 proceeds to Yes at S15. The process performed when the control circuit 40 proceeds to Yes at S268 differs from the process performed when the control circuit 40 proceeds to Yes at S158. Other processes are similar to the processes in FIG. 70 described according to the twelfth embodiment.

In the reading process in FIG. 76, when proceeding to Yes at S265, the control circuit 40 stops the operation of the illumination light source 21 and turns off the illumination light (S269). In this case, after the process at S269, the processes at S251 and subsequent steps are performed again.

Meanwhile, when proceeding to Yes at S268, the control circuit 40 sets a cancel wait time T2 at S270. The control circuit 40 starts time measurement until the elapsed time after the process at S270 reaches the time T2 (S270). Then, the control circuit 40 stops the operation of the illumination light source 21 and turns off the illumination light Lf (S271). The control circuit 40 determines whether or not the measured time started at S270 has reached the cancel wait time T2 (S272). When determined that the elapsed time after the process at S270 has reached the cancel wait time T2, the control circuit 40 proceeds to Yes at S272. When processing to Yes at S272 in this way, the control circuit 40 transfers the decoded data (processed data) decoded at S267 to an external apparatus (such as the host computer HST in FIG. 68). The process at S267 is similar to the process at S19 in FIG. 70.

Meanwhile, in the determination process at S272, when determined that the elapsed time after the process at S270 has not reached the cancel wait time T2, the control circuit 40 proceeds to No at S272. The control circuit 40 determines whether or not a "predetermined cancel operation" has been performed (S273). When determined that the "predetermined cancel operation" has not been performed, the control unit 40 proceeds to No at S273 and repeats the processes at S272 and subsequent steps. In other words, in this process, until the cancel time T2 (a fixed amount of time) elapses after the process at S270, the processes at S272 and S273 are repeated unless the "predetermined cancel operation" is performed. Meanwhile, when determined that the "predetermined cancel operation" has been performed in the determination process at S273, the control circuit 40 proceeds to Yes at S273. The control circuit 40 cancels the transmission of the decoded data decoded at S267 to the external apparatus (such as the host computer HST in FIG. 68) and deletes the decoded data.

As a first example of the "predetermined cancel operation" determined at S273, for example, "a reading operation of a predetermined dedicated code by the portable information code reading apparatus 10B" can be performed. In a configuration such as this, when proceeding to No at S272, when determined that "a reading operation of a predetermined dedicated code by the portable information code reading apparatus 10B" has been performed, the control circuit 40 proceeds to Yes at S273. Otherwise, the control circuit 40 proceeds to No at S273. In an example such as this, the light-off process at S271 may be performed after S275 or after S274. There are various examples of the "dedicated code". For example, the "dedicated code" may be an information code in which unique identification information (identification information indicating a dedicated code) is recorded. Alternatively, the "dedicated code" may be a specific type of code premised as the dedicated code, or the like.

In addition, as a second example of the "predetermined cancel operation" determined at S273, "a predetermined pressing operation of the operation switch 42" can be performed. In a configuration such as this, when proceeding to No at S272, when determined that "a predetermined pressing operation of the operation switch 42" has been performed, the control circuit 40 proceeds to Yes at S273. Otherwise, the control circuit 40 proceeds to No at S273. The "predetermined pressing operation" can be, for example, a long-press operation in which the operation switch 42 is continuously pressed for a certain amount of time or longer, or an operation in which the operation switch 42 is repeatedly pressed a certain number of times or more.

In addition, as a third example of the "predetermined cancel operation" determined at S273, "an operation in which the portable information code reading apparatus 10B rereads a read code that has already been read by the portable information code reading apparatus 10B" can be performed. In a configuration such as this, when proceeding to No at S272, when determined that "an operation in which the portable information code reading apparatus 10B rereads a read code that has already been read by the portable information code reading apparatus 10B" has been performed, the control circuit 40 proceeds to Yes at S273. Otherwise, the control circuit 40 proceeds to No at S273. An information code that has been decoded in the process at the most recent S267 can be given as an example of the "read code that has already been read by the portable information code reading apparatus 10B". When such an information code is read during the period from after the process at S271 to the elapse of the cancel wait time T2, the decoded data of the information code is deleted at S275.

In addition, the read code premised in the third example such as that above is not limited to an information code read at the most recent S267. For example, when an information code read by the reading apparatus 10B before the most recent S267 is reread, at S275, a process may be performed to delete the decoded data of this information code. In this case, when the decoded data of this information code remains collected in the memory 35, the decoded data is preferably deleted from the memory 35. In addition, when the decoded data of this information code has already been transmitted to the external apparatus, a command to delete the decoded data of this information code may be transmitted to the external apparatus.

In addition, as a fourth example of the "predetermined cancel operation" determined at S273, "an operation in which the portable information code reading apparatus 10B rereads a read code that has already been read by the portable information code reading apparatus 10B, while a predetermined external operation is performed on the operation switch 42" can be performed. In a configuration such as this, when proceeding to No at S272, when determined that "an operation in which the portable information code reading apparatus 10B rereads a read code that has already been read by the portable information code reading apparatus 10B, while a predetermined external operation is performed on the operation switch 42" has been performed, the control circuit 40 proceeds to Yes at S273. Otherwise, the control circuit 40 proceeds to No at S273. In this case, for example, an operation in which the operation switch 42 can be given as the predetermined external operation. An information code that has been decoded in the process at the most recent S267 can be given as an example of the "read code that has already been read by the portable information code reading apparatus 10B". In a case such as this, when an information code such as this (the information code read at the most recent S267) is read in a state in which the operation switch 42 is pressed, during the period from after the process at S271 to the elapse of the cancel wait time T2, the decoded data of this information code is deleted at S275.

In the fourth example such as that above, as well, the read code that is premised is not limited to the information code read at the most recent S267. For example, when the information code read by the reading apparatus 10B before the most recent S267 is reread together with the pressing of the operation switch 42, at S275, a process may be performed to delete the decoded data of this information code. In this case, when the decoded data of this information code remains collected in the memory 35, the decoded data is preferably deleted from the memory 35. In addition, when the decoded data of this information code has already been transmitted to the external apparatus (such as the host computer HST in FIG. 68), a command to delete the decoded data of this information code may be transmitted to the external apparatus.

In addition, as a fifth example of the "predetermined cancel operation" determined at S273, "an operation in which an information code is continuously imaged by the imaging unit for a predetermined amount of time or more" can be performed. In a configuration such as this, when proceeding to No at S272, when determined that "an operation in which an information code is continuously imaged by the imaging unit 23 for a predetermined amount of time or more" has been performed, the control circuit 40 proceeds to Yes at S273. Otherwise, the control circuit 40 proceeds to No at S273. The information code premised in the fifth example may be a dedicated code as in the first example, or may be a read code as in the third example or the fourth example. In addition, in the case of the read code, when determined that "an operation in which an information code is continuously imaged by the imaging unit 23 for a predetermined amount of time or more" has been performed, the control circuit 40 may proceed to Yes at S273 and perform a process to delete the decoded data of the read code. For example, when the read code is an information code that has been decoded in the process at the most recent S267, when an information code such as this has been continuously imaged for a predetermined amount of time during the period from after the process at S271 to the elapse of the cancel wait time T2, the decoded data of this information code may be deleted at S275. In addition, when the read code is an information code read by the reading apparatus 10B before the most recent S267 and a read code such as this is reread after the process at S270, a process may be performed to delete the decoded data of this information code. In this case as well, when the decoded data of this information code remains collected in the memory 35, the decoded data is preferably deleted from the memory 35. In addition, when the decoded data of this information code has already been transmitted to the external apparatus, a command to delete the decoded data of this information code may be transmitted to the external apparatus.

As described above, in the present configuration, a responding unit is provided that performs a predetermined cancel operation for processed data obtained by processing a captured image by the processing unit when a predetermined instruction operation is performed on the portable information code reading apparatus 10B. As a result of this configuration, when the captured image of an undesired information code is processed, when the likelihood of the captured image being processed is high, or the like, the processed data obtained by processing the captured image can be canceled (deleted). Therefore, the configuration enables only the processed data of a desired information code to more easily remain.

In addition, in the present configuration, the control circuit 40 that corresponds to the processing unit functions as an decoding unit that decodes the captured image captured by the imaging unit 23. Furthermore, the control circuit 40 also functions as a transmitting unit that stops transmission of decoded data obtained by the decoding unit until a certain amount of time elapses from after decoding of the captured image, and transmits the decoded data after the elapse of the certain amount of time to an external apparatus provided outside of the portable information code reading apparatus. When a predetermined instruction operation is not performed on the portable information code reading apparatus 10B before the elapse of the certain amount of time after decoding of the captured image, the control circuit 40 that corresponds to the responding unit performs a process to delete the decoded data. When the decoded data is deleted by the responding unit, the transmitting unit does not perform the process to transmit the decoded data to the external apparatus.

As a result of the this configuration, when an undesired information code is decoded, transmission of the decoded data of this information code can be more easily terminated, while actualizing a configuration in which data obtained by decoding an information code can be transmitted to an external apparatus. Therefore, the external apparatus can more easily obtain only the decoded data of an information code desired by the user.

In the present configuration, the memory 35 (setting data storage unit) is included that stores therein the value showing the above-described "certain amount of time" (the cancel wait time T2 at S270). The control circuit 40 corresponding to the transmitting unit stops the transmission of the decoded data (the data decoded at S267) at S272 and S273 only for the certain amount of time (cancel wait time T2), based on the data stored in the memory (setting data storage unit). The setting of the value showing the certain amount of time (cancel wait time T2) stored in the memory 35 (setting data storage unit) can be changed. For example, the value showing the certain amount of time (cancel wait time T2) can be updated by operation of the operation switch 42 or by data input from the outside. As a result of this configuration, the setting of the cancel wait time T2 (certain amount of time) during which cancellation is possible in the apparatus can be arbitrarily changed by the user. Convenience is further improved.

In addition, in a first example related to the "cancel operation", the control circuit 40 corresponding to the responding unit performs cancel control when a predetermined dedicated code is read by the portable information code reading apparatus 10B. As a result of this configuration, existing processed data can be canceled by the user performing a simple operation in which a dedicated code is read by the portable information code reading apparatus 10B. In particular, because cancellation becomes possible by a measure (a code reading operation) similar to ordinary reading even for cancellation, cancellation taking advantage of the characteristic hands-free configuration can be performed.

In addition, in a second example related to the "cancel operation", the control circuit 40 corresponding to the responding unit performs cancel control when a predetermined external operation is performed on the operation switch 42. As a result of this configuration, existing processed data can be canceled by the user performing a simple operation in which the operation switch 42 is operated.

In addition, in a third example related to the "cancel operation", a deletion process in which processed data of a read code processed by the processing unit is deleted is performed when the read code that has already been read by the portable information code reading apparatus 10 is reread by the portable information code reading apparatus 10B. As a result of this configuration, existing processed data can be canceled by the user performing a simple operation in which a read code is read by the portable information code reading apparatus 10B. In particular, because cancellation becomes possible by a measure (a code reading operation) similar to ordinary reading even for cancellation, cancellation taking advantage of the characteristic hands-free configuration can be performed. In addition, because cancellation becomes possible upon specifically designating the processed data to be cancelled, unnecessary data can be selected and cancelled with certainty when a plurality of pieces of processed data are present.

In addition, in a fourth example related to the "cancel operation", a deletion process in which processed data of a read code processed by the processing unit is deleted is performed when the read code that has already been read by the portable information code reading apparatus 10 is reread by the portable information code reading apparatus 10B while a predetermined external operation is performed on the operation switch 42. As a result of this configuration, unnecessary data can be selected and cancelled with certainty when a plurality of pieces of processed data are present. In addition, because operation of the operation switch is set as a condition for cancellation, erroneous cancellation of processed data that should not be cancelled can be more easily prevented.

Fourteenth Embodiment

A portable information code reading apparatus according to a fourteenth embodiment is similar to that according to the thirteenth embodiment, aside from the "predetermined cancel operation". A reading process is performed based on a flow such as that in FIG. 76. The fourteenth embodiment is identical to the twelfth embodiment and the thirteenth embodiment, aside from the reading process in FIG. 76.

According to the fourteenth embodiment, the "predetermined cancel operation" that is subjected to determination at S273 is "an operation in which an information code is imaged by the imaging unit 23 at an orientation rotated by a predetermined angle or more (such as 90° or more) from the orientation of the information code in a captured image of the information code decoded at S267 (the captured image captured at S266 (second captured image))". In a configuration such as this, when proceeding to No at S272, when determined that "an operation in which an information code is imaged by the imaging unit 23 at an orientation rotated by a predetermined angle or more (such as 90° or more) from the orientation of the information code in a captured image of the information code decoded at S267 (the captured image captured at S266 (second captured image))" has been performed, the control circuit 40 proceeds to Yes at S273. Otherwise, the control circuit 40 proceeds to No at S273. In a QR code (registered trademark), the posture of the information code (first captured posture) in the captured image (second captured image) can be identified by the positions of three position detection patterns FP (FIG. 71) in the captured image (second captured image) of the information code decoded at S267. Thereafter, when an operation in which the information code is imaged by the imaging unit 23 is performed, the posture of the information code (second captured posture) in the captured image (third captured image) can be identified from the positions of the three position detection patterns FP in the captured image (third captured image). Whether or not "an operation in which an information code is imaged by the imaging unit 23 at an orientation rotated by a predetermined angle or more (such as 90° or more)" has been performed can be determined through comparison of the images.

In this configuration, the control circuit 40 that performs the process in FIG. 76 corresponds to an example of the responding unit. When processed data (decoded data decoded at S267) is generated by the processing unit when the information code included in a captured image (the second captured image obtained at S266) obtained by the imaging unit 23 is in a predetermined first captured posture, when the information code is subsequently read in a second captured posture that differs in orientation from the first captured posture by the imaging unit 23 by a predetermined angle or more, cancel control is performed on the processed data (for example, a process is performed in which the decoded data obtained by decoding the information code is deleted from the memory 35 or a command for deleting the decoded data obtained by decoding the information code is transmitted to the external apparatus).

As a result of this configuration, existing processed data can be canceled by the user performing a simple operation in which an information code is read by the portable information code reading apparatus 10B. In particular, because cancellation becomes possible by a measure (a code reading operation) similar to ordinary reading even for cancellation, cancellation taking advantage of the characteristic hands-free configuration can be performed. In addition, because cancel control is performed when reading is performed in a second captured posture differing from the posture (first captured posture) subjected to processing by the processing unit, the user can perform cancellation by making a simple change, namely "changing the reading posture".

In addition, the concept according to the fourteenth embodiment is not limited to the reading process as in FIG. 76, nor limited to when the information code is decoded based on a flow such as from S251 to S268 in FIG. 76. For example, the concept can be similarly applied when the information code is read in a sequence such as in FIG. 77.

Figure 77:
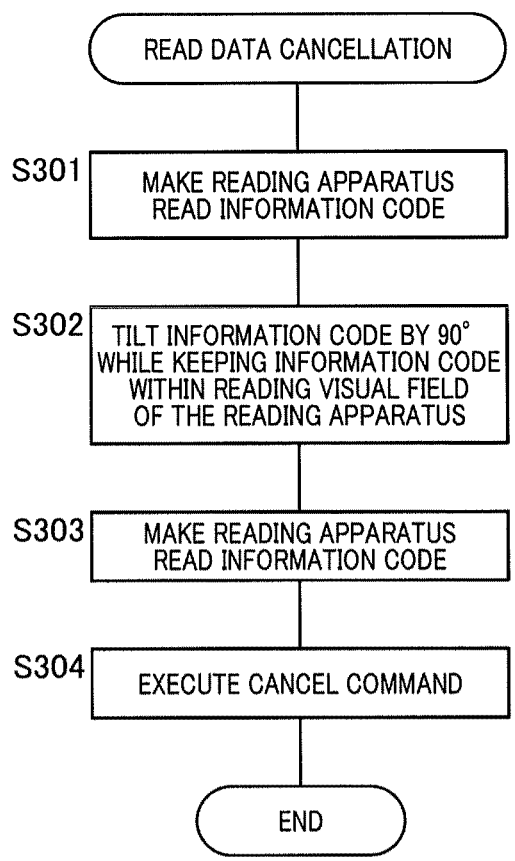
FIG. 77 is an explanatory diagram for explaining the flow of a cancel operation when a portable information code reading apparatus according to a fourteenth embodiment is used.

In the example in the sequence explanatory diagram in FIG. 77, an operation to make the reading apparatus 10B read an information code is performed as at S301 (S301). Thereafter, if cancellation of the decoded data of this information code is unnecessary, the worker is not required to perform a special operation. Meanwhile, after the operation at S301, when the worker wishes to cancel the decoded data of the information code, the worker rotates the information code by 90° or more from the captured posture (first captured posture) of the information code at the time of the reading at S301, while keeping the information code within the imaging area of the imaging unit 23 from the time of the reading at S301 (S302). Then, the reading apparatus 10B is made to read the information code that has been rotated in this way (S303). Subsequently, at S304, the reading apparatus 10B is made to execute a cancel command (S304).

In the reading apparatus 10B in which a cancellation flow such as in FIG. 77 is premised, the control circuit 40 determines whether or not, after the reading of an information code has been performed, an image is obtained of a captured posture (second captured posture) that has been rotated by 90° or more from the captured posture (first captured posture) of the information code at the time of the reading, while keeping the information code within the imaging area of the imaging unit 23 from the time of the reading. When determined that an image is obtained of a captured posture (second captured posture) that has been rotated by 90° or more from the captured posture (first captured posture) of the information code at the time of the reading, the control circuit 40 deletes the decoded data of the information code from the reading apparatus 10B. In addition, when the decoded data of the information code has already been transmitted to an external apparatus, a command instructing deletion of the decoded data of the information code may be transmitted to the external apparatus.

Fifteenth Embodiment

A portable information code reading apparatus according to a fifteenth embodiment is similar to that according to the thirteenth embodiment, aside from the "predetermined cancel operation". A reading process is performed based on a flow such as that in FIG. 76. The fourteenth embodiment is identical to the twelfth embodiment and the thirteenth embodiment, aside from the reading process in FIG. 76.

According to the fifteenth embodiment, the "predetermined cancel operation" that is subjected to determination at S273 is "an operation in which the information code processed by the processing unit is removed from the imaging area AR (FIG. 75) of the imaging unit 23, and the information code is placed in the imaging area AR (FIG. 75) within a certain amount of time from removal (for example, within a predetermined amount of time shorter than the above-described cancel wait time T2)". In a configuration such as this, when proceeding to No at S272, when determined that "an operation in which the information code processed by the processing unit (the information code decoded at S267) is removed from the imaging area AR (FIG. 75) of the imaging unit 23, and the information code is placed in the imaging area within a certain amount of time from removal" has been performed, the control circuit 40 proceeds to Yes at S273. Otherwise, the control circuit 40 proceeds to No at S273.

In this configuration, the control circuit 40 corresponds to an example of the responding unit. When the information code processed by the processing unit (the information code decoded at S267) is no longer present in the imaging area AR (FIG. 75) of the imaging unit 23, and the information code enters the imaging area AR (FIG. 75) within a certain amount of time from becoming no longer present, cancel control is performed on the processed data (the information code decoded at S267) (for example, a process in which the decoded data obtained by decoding the information code is deleted from the memory 35 or a command for deleting the decoded data obtained by decoding the information code is transmitted to the external apparatus). As a result of this configuration, existing processed data can be canceled by the user performing a simple operation in which the processed information code is temporarily removed from the imaging area and is again placed in the imaging area within a certain amount of time. In particular, because cancellation becomes possible by a measure (a code reading operation) similar to ordinary reading even for cancellation, cancellation taking advantage of the characteristic hands-free configuration can be performed.

In addition, the concept according to the fifteenth embodiment is not limited to the reading process as in FIG. 76, nor limited to when the information code is decoded based on a flow such as from S251 to S268 in FIG. 76. For example, the concept can be similarly applied when the information code is read in a sequence such as in FIG. 78.

Figure 78:
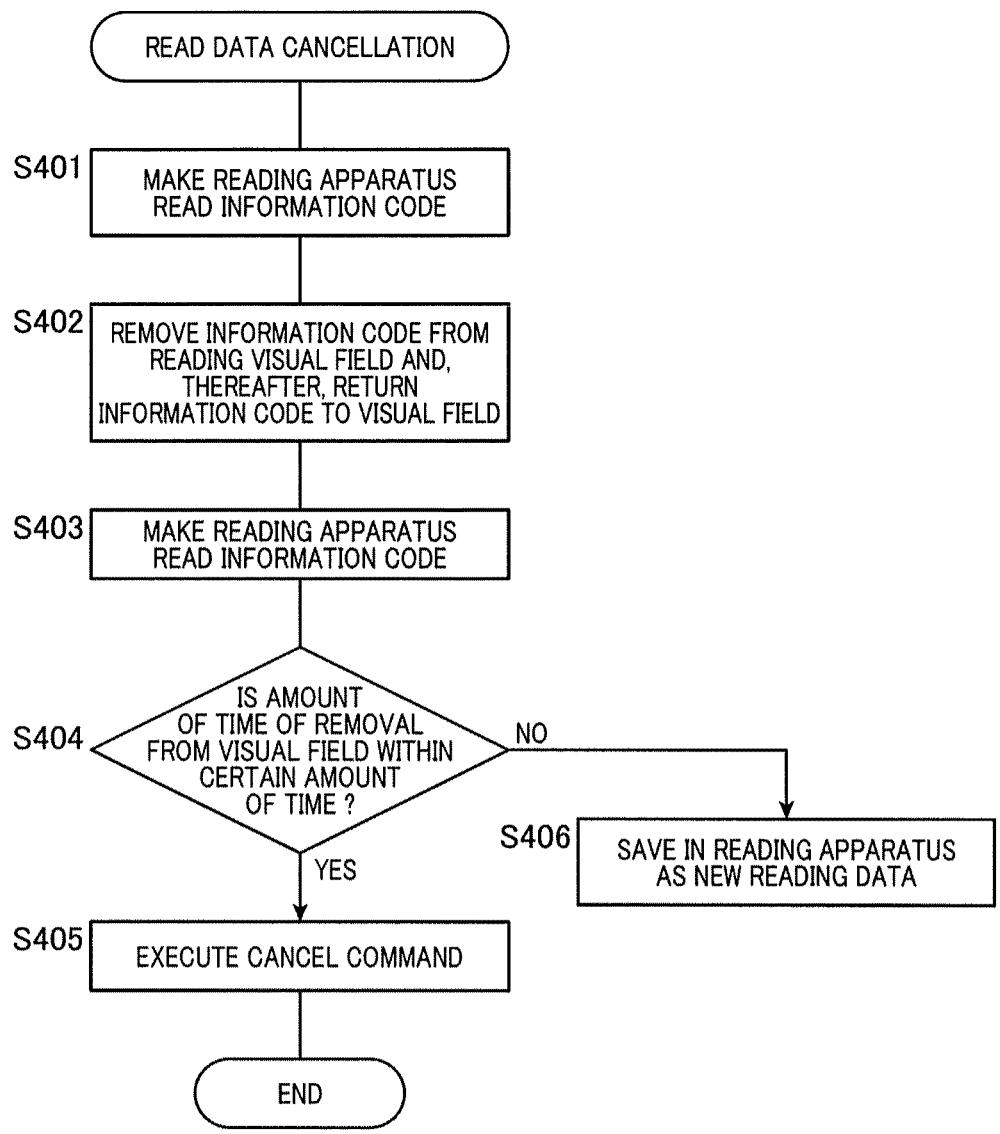
FIG. 78 is an explanatory diagram for explaining the flow of a cancel operation when a portable information code reading apparatus according to a fifteenth embodiment is used.

In the example in the sequence explanatory diagram in FIG. 78, first, the worker performs an operation to make the reading apparatus 10B read an information code as at S401 (S301). Thereafter, if cancellation of the decoded data of this information code is unnecessary, the worker is not required to perform a special operation. Meanwhile, after the operation at S401, when the worker wishes to cancel the decoded data of the information code, the worker performs an operation in which, after removing the information code from the reading visual field of the reading apparatus (the imaging area of the imaging unit 23), the information code is returned to the reading visual field (the imaging area of the imaging unit 23) (S402). The information code is then read by the reading apparatus 10B. In this way, when the information code is removed from the imaging area and subsequently enters the imaging area, the reading apparatus 10B performs cancellation of the decoded data of the information code that has been read at S401 when the amount of time of removal from the imaging area is within a certain amount of time. Meanwhile, when the amount of time of removal from the imaging area exceeds the certain amount of time, the decoded data of the information code read at S403 is stored in the memory 35 as new data.

In the reading apparatus 10B in which a cancellation flow such as in FIG. 78 is premised, the control circuit 40 determines whether or not, after reading of an information code has been performed, the information code has been removed from the imaging area of the imaging unit 23 and the imaging code has reentered the imaging area of the imaging unit 23 within a certain amount of time from removal. When determined that the read information has been removed from the imaging area of the imaging unit 23 and the imaging code has reentered the imaging area of the imaging unit 23 within a certain amount of time from removal, the control circuit 40 deletes the decoded data of the information code from the reading apparatus 10B. In addition, when the decoded data of the information code has already been transmitted to an external apparatus, a command instructing deletion of the decoded data of the information code may be transmitted to the external apparatus.

Sixteenth Embodiment

A portable information code reading apparatus according to a sixteenth embodiment is similar to that according to the thirteenth embodiment, aside from the "predetermined cancel operation". A reading process is performed based on a flow such as that in FIG. 76. The sixteenth embodiment is identical to the twelfth embodiment and the thirteenth embodiment, aside from the reading process in FIG. 76.

According to the sixteenth embodiment, the "predetermined cancel operation" that is subjected to determination at S273 is "an operation in which a plurality of information codes are simultaneously imaged by the imaging unit". In a configuration such as this, when proceeding to No at S272, when determined that "an operation in which a plurality of information codes are simultaneously imaged by the imaging unit" has been performed, the control circuit 40 proceeds to Yes at S273. Otherwise, the control circuit 40 proceeds to No at S273.

In this configuration, the control circuit 40 that performs the process in FIG. 76 corresponds to an example of the responding unit. When a plurality of information codes are simultaneously imaged by the imaging unit after processed data (decoded data obtained at S267) is generated by the processing unit, cancel control is performed on the processed data (decoded data obtained at S267). As a result of this configuration, existing processed data can be canceled by the user performing a simple operation in which a plurality of information codes are read by the portable information code reading apparatus 10B. In particular, because cancellation becomes possible by a measure (a code reading operation) similar to ordinary reading even for cancellation, cancellation taking advantage of the characteristic hands-free configuration can be performed. Furthermore, reading for cancellation can be differentiated from normal reading by a simple measure in which a plurality of information codes are simultaneously imaged.

In the above-described example, an example is given in which the most recent decoded data is cancelled when a plurality of information codes are simultaneously imaged. However, a configuration is also possible in which cancel control is performed on processed data (decoded data decoded at S267) under a condition that the plurality of information codes are imaged in a predetermined array prescribed in advance. In this configuration, the plurality of information codes being imaged in a predetermined array prescribed in advance serves as a condition for cancellation. Therefore, cancellation is not performed even should the plurality of information codes be imaged in a manner other than the predetermined array. As a result, erroneous cancellation of processed data that should not be canceled can be prevented with further certainty, while allowing cancellation to be easily performed by a measure (code reading operation) similar to normal reading.

In addition, in all of the above-described examples, an example is given in which the most recent decoded data is cancelled when a plurality of information codes are simultaneously imaged. However, when a plurality of information codes are simultaneously imaged and read by the portable information code reading apparatus after the processed data is generated by the processing unit, cancel control may be performed on the processed data corresponding to the plurality of information codes. As a result of this configuration, further, a plurality of pieces of processed data of which cancellation is desired can be designated with certainty and collectively cancelled. Therefore, convenience is significantly improved.

In addition, none of the concepts according to the sixteenth embodiment is limited to the reading process as in FIG. 76, or limited to when the information code is decoded based on a flow such as from S251 to S268 in FIG. 76. For example, the concept can be similarly applied when the information code is read in a sequence such as in FIG. 79.

In FIG. 79, the sequence of a cancel operation when data that has already been decoded is collected in the reading apparatus 10B is schematically described. In this example, when canceling the collected decoded data, the worker places a plurality of information codes in the imaging area of the imaging unit (S501), and makes the reading apparatus 10B read the plurality of information codes (S502). Thereafter, the reading apparatus 10B executes a cancel command (S503).

In the reading apparatus 10B in which a cancellation flow such as in FIG. 79 is premised, the control circuit 40 determines whether or not images of a plurality of information codes have been obtained after reading of the information codes is performed. When determined that the images of the plurality of information codes is obtained, the control circuit 40 deletes the decoded data of the most recent information code or the decoded data of the plurality of information codes from the reading apparatus 10B. In addition, a condition may be further added. The control circuit 40 may determine whether or not the images of the predetermined information codes are obtained in a predetermined array, after reading of the information codes is performed. When determined that the images of the plurality of information codes are obtained in a predetermined array, the control circuit 40 may delete the decoded data of the most recent information code or the decoded data of the plurality of information codes from the reading apparatus 10B.

Other Embodiments in Relation to the Twelfth to Sixteenth Embodiments

The present invention is not limited to the above-described embodiments described above and described with reference to the drawings. For example, the following embodiments are also included in the technical scope of the present invention.

According to the present embodiments, the control circuit 40 is given as an example of the processing unit. As a process performed on the image of an information code 100 captured by the imaging unit 23, decoding of the code image of the information code 100 is given as an example. However, the process performed on the image of an information code 100 captured by the imaging unit 23 is not limited thereto. For example, a process in which the image data of the information code 100 captured by the imaging unit 23 is transmitted to an external apparatus HST is also possible. In this case, the image data can be decoded by the external apparatus HST (such as a host apparatus).

According to the above-described embodiments, an example is given in which the case 12 is mounted on the body, and the reading apparatus 10B is capable of communicating with an external apparatus that is not mounted on the body. However, the reading apparatus 10B may be capable of communicating with an external apparatus that is mounted on the body.

According to the above-described embodiments, the body mounting portion that is hooked onto both ears is given as an example. However, the body mounting portion may be hooked on either ear.

According to the above-described embodiments, the body mounting portion that is attached to the ear, finger, arm, or the like of the user is given as an example. However, the body mounting portion may be configured as a band member that is attached to the head of the user. For example, the body mounting portion may be configured as a band member having a structure that is headband-like, hairband-like, Alice band-like, or the like. In this configuration, because the apparatus main body 511 is attached to the head, the movement of the face and the overall apparatus main body 511 move in tandem. The reading direction can be more easily set such as to match the movement of the face of the user.

According to the above-described embodiments, an attaching member that has a body mounting portion that is configured such as to be hooked onto or wrapped around the ear, finger, arm, head, or the like of the user is given as an example. However, the attaching member may be configured as an attachment that is attached to a mounted article (such as glasses, a helmet, a glove, or clothing) on the user.

According to the twelfth to sixteenth embodiment, an example in which the most recent processing data (decoded data) is deleted and the like are given as an example of cancel control. However, cancel control is not limited to such examples. For example, when the above-described "predetermined cancel operation" is performed, past processed data (decoded data) collected in the reading apparatus 10B may be collectively deleted. Alternatively, a command may be issued to the external apparatus to collectively delete past processed data (decoded data) transmitted from the reading apparatus 10B to the external apparatus.

According to the fifteenth embodiment, an example is given in which a following operation is recognized as a cancel command when performed at least once. That is, the operation is that in which, for example, an information code (the information code decoded at S267) is removed from, and then returned to, the reading visual field (imaging area AR (FIG. 75)) during the cancel wait time T2 set at S270 in FIG. 76. The information code is then reread. In a case such as this, cancel control is performed in which the decoded data of the information code (the information code decoded at S267) is deleted. However, cancel control is not limited to an example such as this. For example, when an operation such as this is repeated an n-number of times, the n-th decoded data preceding the newest decoded data may be canceled. Alternatively, when the information code is removed from, and then returned to, the reading visual field within a certain amount of time, and thereafter, the information code is read an n-number of times while being kept in the visual field, the n-th decoded data preceding the newest decoded data may be canceled.

In addition, in the second example of the "predetermined cancel operation" described according to the third embodiment, an example is given in which, when "a predetermined pressing operation of the operation switch 42" is performed, the control circuit 40 proceeds to Yes at S273 and deletes the decoded data decoded at the most recent S267. However, the process is not limited to an example such as this. For example, the decoded data to be deleted may be determined by the number of ties the operation switch 42 is pressed. For example, when the pressing operation of the operation switch 42 is repeated an n-number of times, the n-th decoded data preceding the newest decoded data may be canceled.

All of the examples of the "predetermined cancel operation", described above, may be used in combination. A plurality of types of instruction operations may be defined as predetermined instruction operations for the portable information code reading apparatus 10B. A cancel command (such as deletion of the most recent decoded data, deletion of the n-th preceding cancel data, or collective deletion of collected decoded data) may be determined in association with the type of instruction operation. Any of the cancel commands (such as deletion of the most recent decoded data, deletion of the n-th preceding cancel data, and collective deletion of collected decoded data) may be executed based on the type of instruction operation performed on the portable information code reading apparatus 10B.

REFERENCE SIGNS LIST

1 reading system
10 portable information code reading apparatus
10A portable information code reading apparatus
10B portable information code reading apparatus
12, 312 case
14 reading opening
18 supporting portion
21 illumination light source (light source)
23 light-receiving sensor (imaging unit)
35 memory (position data storage unit, setting data storage unit)
40 control circuit (processing unit, audio guidance unit, processing unit, determining unit, detecting unit, selecting unit, transmission control unit, receiving unit, setting unit, responding unit, decoding unit setting unit, responding unit, decoding unit)
42 operation switch
44 sound generating unit (notifying unit)
46 sensor unit
48 communication unit (transmission control unit, receiving unit)
50 marker light irradiating unit
60, 360 attaching portion
61 ear inserting portion
61*a* lead-out hole (lead-out portion)
62 ear hook portion
71 first fixing portion
72 second fixing portion
80, 380 cable
100 information code
512, 712, 812 case
512*a*, 712*a*, 812*a*, 1012*a* opposing wall portion (attached portion)
519 connecting cable
550, 750, 850 guide portion
551 first case-side connecting portion (case-side connecting portion, one-side magnet)
552 second case-side connecting portion (case-side connecting portion, one-side magnet)
553 first attaching member-side connecting portion (attaching member-side connecting portion, magnetic body)
554 second attaching member-side connecting portion (attaching member-side connecting portion, magnetic body)
560, 760, 860, 960 attaching member
562 body mounting portion (mounting portion)
564 displacement adjusting portion
565, 1065 base portion
566 attaching portion
962 band member (body mounting portion)
751 first case-side connecting portion (case-side connecting portion, one-side sheet material)
752 second case-side connecting portion (case-side connecting portion, one-side sheet material)
753 first attaching member-side connecting portion (attaching member-side connecting portion, other-side sheet material)
754 second attaching member-side connecting portion (attaching member-side connecting portion, other-side sheet material)
751 first case-side connecting portion (case-side connecting portion, one-side mating portion)
752 second case-side connecting portion (case-side connecting portion, one-side mating portion)
753 first attaching member-side connecting portion (attaching member-side connecting portion, mated portion)
754 second attaching member-side connecting portion (attaching member-side connecting portion, mated portion)
1120 rotating mechanism
C1 rotation axis
FP position detection pattern (feature pattern)
Bs dark-colored bar (feature pattern)
Ws light-colored bar (feature pattern)
G center axis

What is claimed is:

1. A portable information code reading apparatus, comprising:
an imaging unit that images an information code;
a processing unit that processes an image of the information code imaged by the imaging unit;
a case that holds the imaging unit and the processing unit; and
an attaching portion that is provided integrally with the case or as a component separate from the case, and attaches the case to at least either of the ears of a user.

2. The portable information code reading apparatus of claim 1, wherein
the case includes a reading opening through which light from the information code is introduced, and
the attaching portion is configured to attach the case to the ear of the user such that the case is placed in a lateral position of the face of the user and the reading opening faces a front side of the user.

3. A portable information code reading apparatus, comprising:
an imaging unit that images an information code;
a processing unit that processes an image of the information code imaged by the imaging unit;
a case that holds the imaging unit and the processing unit; and an attaching member comprising a mounting portion and an attaching portion to and from which the case attached and detached selectively, the attaching member being a separate member from the case;

a detecting unit detecting an attachment position of the case; and a selecting unit selecting, from the image imaged by the imaging unit, an area corresponding to a detected result of the detecting unit.

4. A portable information code reading apparatus, comprising:

an imaging unit that images an information code;

a processing unit that processes an image of the information code imaged by the imaging unit;

a case that holds the imaging unit and the processing unit; and an attaching member comprising a body mounting portion and an attaching portion to and from which the case attached and detached selectively, the attaching member being a separate member from the case;

a detecting unit detecting an attachment position of the case;

a transmission controlling unit transmitting, to an external apparatus, information showing the attachment position of the case detected by the detecting unit; and a receiving unit receiving, from the external apparatus, response information corresponding to the information showing the attachment position of the case when the transmission controlling unit has transmitted the information to the external apparatus.

5. A portable information code reading apparatus, comprising:

an imaging unit that images an image of a predetermined imaging area;

a marker light irradiating unit that irradiates a marker light towards the imaging area;

an illumination light source that irradiates an illumination light differing from the marker light;

a case that holds at least the marker light irradiating unit, the illumination light source, and the imaging unit;

an attaching member that is provided integrally with the case or as a component separate from the case, and is attached to the body of a user or a mounted article on the user;

a light source control unit that switches light control between first control in which the marker light irradiating unit is driven without driving the illumination light source and second control in which the illumination light source is driven;

a detecting unit that detects a predetermined feature pattern of an information code from a first image obtained by the imaging unit in a state in which the marker light is irradiated based on the first control by the light source control unit; and a processing unit that processes a second image obtained by the imaging unit in a state in which the illumination light is irradiated based on the second control by the light source control unit, wherein, when the detecting unit detects the feature pattern from the first image, the light source control unit automatically switches control of both the marker light irradiating unit and the illumination light source from the first control to the second control.

6. The portable information code reading apparatus of claim 5, wherein the detecting unit analyzes an irradiated area of the marker light in the first image to detect the feature pattern from the irradiated area.

7. A portable information code reading apparatus, comprising:

a light source irradiating light;

an imaging unit that images an image of a predetermined imaging area;

a case that holds at least the light source and the imaging unit;

an attaching member hooked onto a body of a user or an article mounted on the user, the attaching member being integral with the case or being separate from the case;

a detecting unit detecting, from the image imaged by the imaging unit, a predetermined feature pattern showing an information code;

a setting unit causing the imaging unit to change a shutter speed from a first shutter speed to a second shutter speed when the detecting unit detects the feature pattern, the first shutter speed being set to the imaging unit until the detecting unit detects the feature pattern, the second shutter speed being faster than the first shutter speed; and a processing unit processing the second image imaged by the imaging unit at the second shutter speed which has been set by the setting unit, after the detecting unit detected the feature pattern from the first image imaged at the first shutter speed.

8. A portable information code reading apparatus, comprising:

a light source irradiating light;

an imaging unit that images an image of a predetermined imaging area;

a case that holds at least the light source and the imaging unit;

an attaching member hooked onto a body of a user or an article mounted on the user, the attaching member being integral with the case or being separate from the case;

a processing unit processing the mage imaged by the imaging unit; and;

a responding unit cancelling image data processed by the processing unit, in response to a predetermined command given to the reading apparatus.

* * * * *

UNITED STATES PATENT AND TRADEMARK OFFICE
CERTIFICATE OF CORRECTION

PATENT NO. : 9,904,828 B2
APPLICATION NO. : 14/764608
DATED : February 27, 2018
INVENTOR(S) : Manabu Miyazaki et al.

Page 1 of 1

It is certified that error appears in the above-identified patent and that said Letters Patent is hereby corrected as shown below:

On the Title Page

Item (72) Inventors: should read:
Manabu Miyazaki, Nagoya (JP); Takahiro Tanaka, Obu (JP); Kentaro Maruyama, Chita-gun (JP); Soutaro Tabata, Kariya (JP); Takuya Yoda, Obu (JP); Ryota Banno, Chita-gun (JP); Tomohito Suzuki, Chita-gun (JP); Hiroshi Ota, Nagoya (JP); Akira Kida, Obu (JP)

Signed and Sealed this
Thirty-first Day of July, 2018

Andrei Iancu
*Director of the United States Patent and Trademark Office*